US 6,611,537 B1

(12) United States Patent
Edens et al.

(10) Patent No.: US 6,611,537 B1
(45) Date of Patent: Aug. 26, 2003

(54) SYNCHRONOUS NETWORK FOR DIGITAL MEDIA STREAMS

(75) Inventors: Glenn T. Edens, Redwood City, CA (US); Donald Robert Hoover, Cupertino, CA (US); Roger Charles Meike, Redwood City, CA (US); Timothy Andrew Ryan, Menlo Park, CA (US)

(73) Assignee: Centillium Communications, Inc., Fremont, CA (US)

( * ) Notice: Subject to any disclaimer, the term of this patent is extended or adjusted under 35 U.S.C. 154(b) by 0 days.

(21) Appl. No.: 09/079,914

(22) Filed: May 15, 1998

Related U.S. Application Data

(60) Provisional application No. 60/050,933, filed on May 30, 1997.

(51) Int. Cl.[7] .............................. H04J 3/16; H04J 3/06
(52) U.S. Cl. ....................................... 370/503; 370/465
(58) Field of Search ................................. 370/258, 404, 370/465, 470, 503, 506, 509–510, 512

(56) References Cited

U.S. PATENT DOCUMENTS

| 4,587,651 A | * | 5/1986 | Nelson et al. ................. 370/88 |
| 4,991,172 A | * | 2/1991 | Cidon et al. ................. 370/94.1 |
| 5,185,736 A | * | 2/1993 | Tyrrell et al. ................. 370/55 |
| 5,206,857 A | * | 4/1993 | Farleigh ...................... 370/85.5 |
| 5,283,638 A | * | 2/1994 | Engberg et al. ............... 348/14 |
| 5,307,459 A | * | 4/1994 | Petersen et al. ............. 395/200 |
| 5,321,819 A | * | 6/1994 | Szczepanek ................. 395/325 |
| 5,341,374 A |   | 8/1994 | Lewen et al. ............... 370/85.4 |
| 5,541,957 A |   | 7/1996 | Lau ............................. 375/258 |
| 5,652,712 A | * | 7/1997 | Szczebak, Jr. et al. .. 364/571.01 |
| 5,668,811 A |   | 9/1997 | Worsley et al. ............. 370/424 |
| 5,717,493 A | * | 2/1998 | Ozawa et al. ............... 358/403 |
| 5,822,603 A | * | 10/1998 | Hansen et al. ......... 395/800.01 |
| 5,872,784 A | * | 2/1999 | Rostoker et al. ............ 370/395 |
| 5,907,685 A | * | 5/1999 | Douceur ................. 395/200.78 |

FOREIGN PATENT DOCUMENTS

| WO | PCT/US00/19979 | 7/2001 | ............ H04L/25/49 |

* cited by examiner

Primary Examiner—Alpus H. Hsu
Assistant Examiner—Toan Nguyen
(74) Attorney, Agent, or Firm—Fenwick & West LLP

(57) ABSTRACT

A network adapter for a synchronous logical ring network operates on existing physical twisted-pair telephone topologies. Information propagates around the logical ring, reaching every device on each revolution around the network. Network devices are full-duplex, transmitting and receiving information on every clock cycle. Network devices arbitrate to be elected the network clock device. By synchronizing all network devices to a single reference clock, and providing fixed frames of information propagating around the network at consistent time intervals, the logical ring network ensures that information propagates from one device to another at consistent time intervals. The fixed-length frames are divided into two independent streams: a data stream for the distribution of real-time continuous digital media streams; and a system command stream for the distribution of system commands.

28 Claims, 40 Drawing Sheets

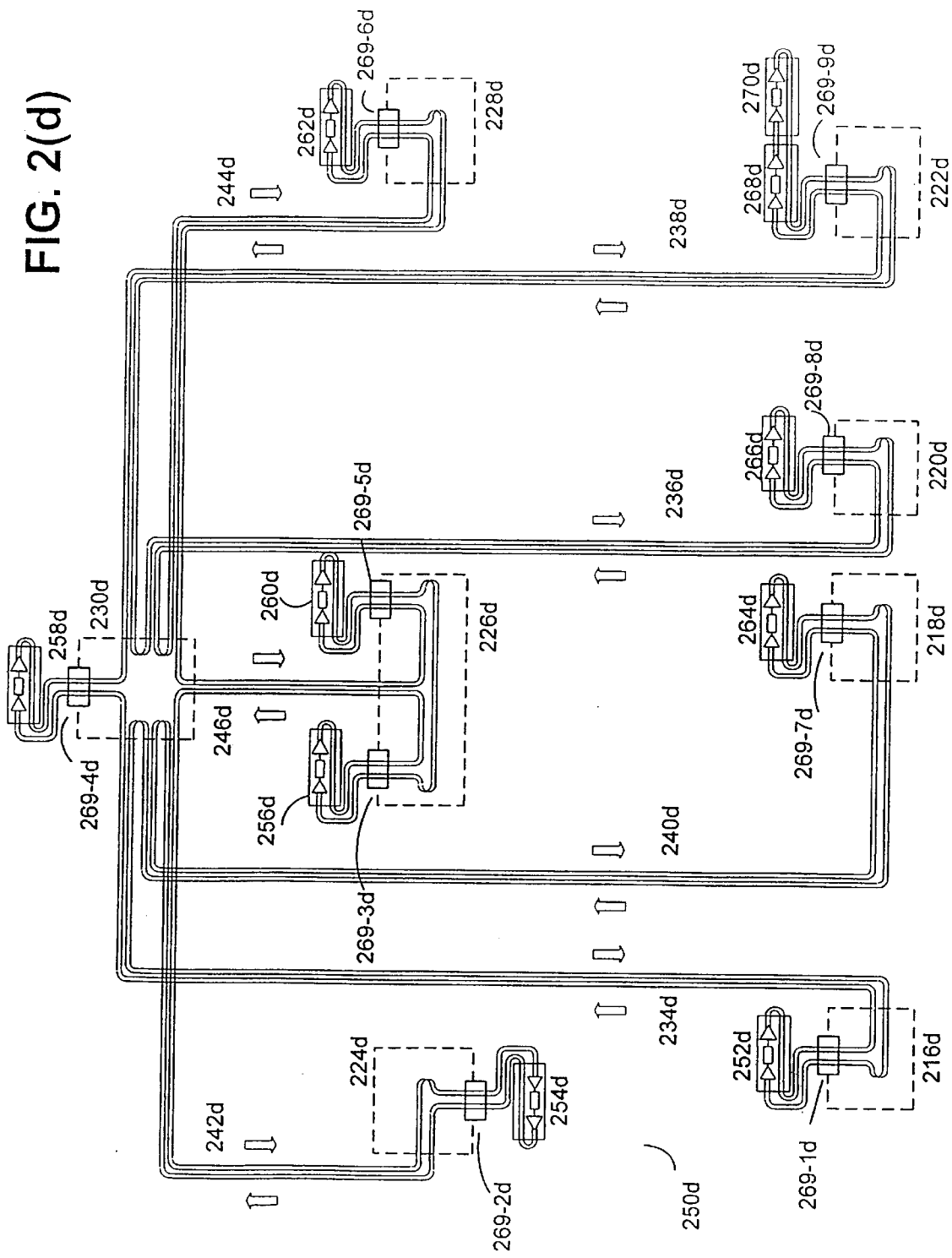

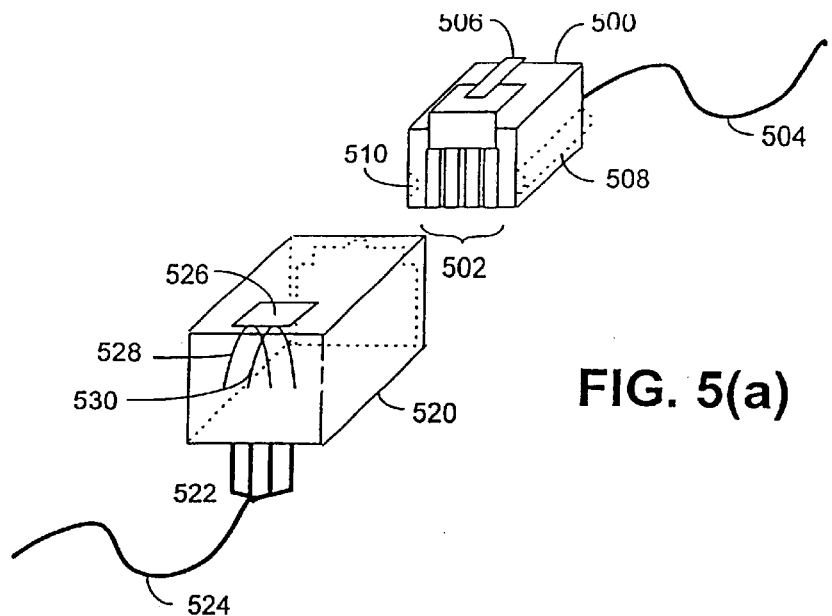
FIG. 5(a)
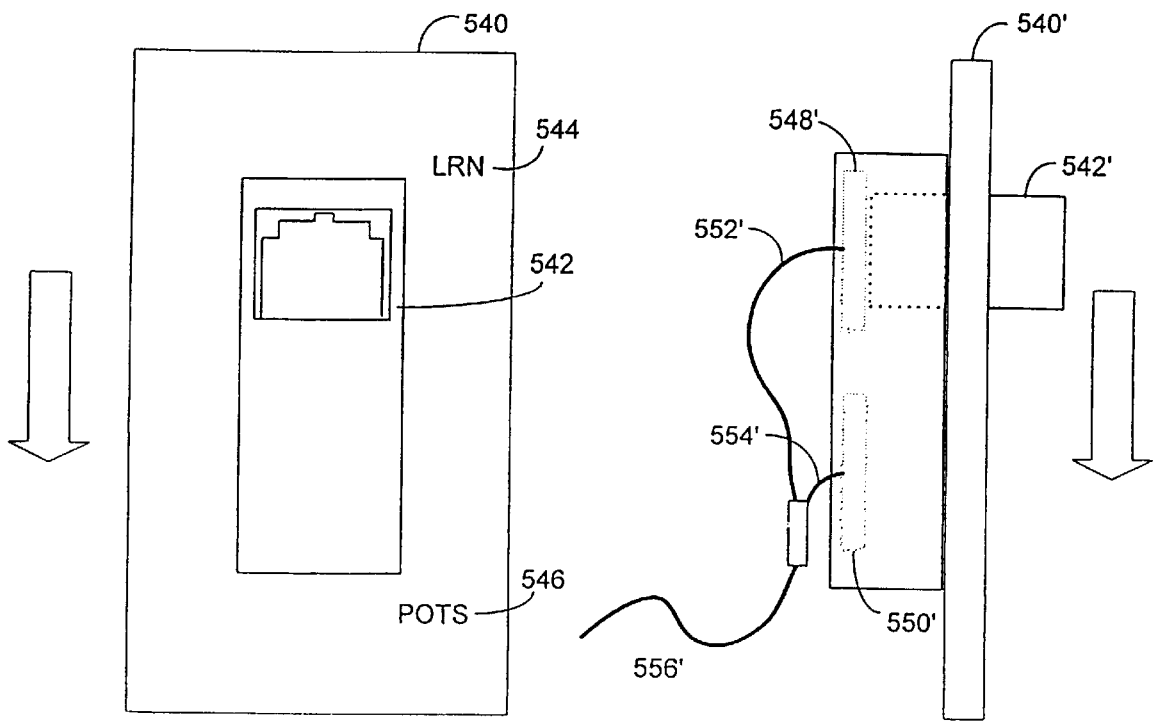
FIG. 5(b)
FIG. 5(c)

SYNCHRONOUS NETWORK FOR DIGITAL MEDIA STREAMS

RELATED APPLICATIONS

This application claims the benefit of U.S. Provisional Application Ser. No. 60/050,933, filed on May 30, 1997, which is hereby incorporated by reference in its entirety.

I. BACKGROUND OF THE INVENTION

A. Field of the Invention

This invention relates generally to networks of consumer electronics devices, and in particular to synchronous networks optimized for digital media streams.

B. Nature of the Problem—Interconnecting Consumer Electronics Devices for Distribution of Audio, Video and other Media/Data, as well as Control Information, Throughout a Home or other Environment The holy grail of the "smart home" has long been sought after, but networking of consumer electronics devices has yet to rise from hobbyist status. One of the fundamental obstacles to widespread acceptance of such networks is the difficulty and expense of interconnecting various types of consumer electronics and other devices within a single room, much less throughout an entire home or other environment, such as a hotel or apartment building, or a car, boat or recreational vehicle.

Moreover, even when such devices are interconnected, there remain problems of distributing control information, as well as audio, video and other types of media/data, in a sufficiently flexible manner to permit users to switch sources, record programs, schedule events and perform other advanced tasks without sacrificing the ease of use provided by a simple television and remote control.

Today's home theater systems, for example, quickly become unwieldy as devices are added (even apart from the "spaghetti" of cables interconnecting devices), in part because such devices typically do not all "speak the same language." Users are faced with fix unenviable task of having to "program" or configure their system to perform even relatively simple tasks, such as turning the system on and off. Anyone who has tried to explain to a spouse, friend or babysitter how to use the "universal" remote control (e.g., to watch or record a television program or videotape, laserdisc or satellite broadcast) understands the nature and complexity of this problem.

With the advent of digital media and services (e.g., audio CDs, DSS or DVB digital satellite broadcasts and DVD movies) comes an opportunity to address this problem from a more general-purpose system or network perspective. Such a network perspective can be contrasted with existing home theater and home automation systems which interconnect devices with dedicated media-specific cables (audio and video cables, speaker wire, etc.,), and provide a separate control topology (infrared remote controls, X10 control networks, etc.).

In a digital domain, all information (from audio, video and other digital media streams to custom commands and other control information, and even asynchronous network protocols) can be distributed, processed and controlled using the "same language"—i.e., the binary language spoken by virtually all of today's computer hardware and software, from dedicated hardware state machines to "smarter" controllers and general purpose CPU-based devices.

The opportunities provided by a network of devices distributing digital media and control information are enormous. It is far more difficult and expensive, for example, to distribute/route analog audio and video streams to devices throughout a home or other environment, much less process (e.g. record, mix and otherwise modify) particular information along the way, than it is to distribute such information in a digital environment. Moreover, by providing software control over individual "samples" of digital media, significant new functionality can be added to a system that simply was not feasible in an analog domain.

For example, users could decide to record a movie after watching the first 15 minutes, or record a song after hearing it in its entirety. Playing and recording digital media streams can be as simple as reading and writing a disk drive, as will be explained below. Moreover, with a software interface, users easily could select a variety of programs to be recorded (e.g., over the course of a week) without having to worry about switching tapes in the VCR. Additional telephone lines, or even complex PBX functionality, could be integrated into the system, all under software control for even greater flexibility. As will become apparent, the possibilities are virtually endless. The sheer flexibility afforded by digital media cannot be underestimated.

As discussed below, current systems for interconnecting consumer electronics and other devices suffer from a variety of problems, not the least of which is a lack of foresight with respect to the imminent digital revolution or "convergence." These problems include difficult and expensive cabling schemes, limited network topologies, complex and expensive devices, inadequate media synchronization and a general lack of integration between the means for distributing audio, video and other media, and the means for processing and controlling the information being distributed.

C. Description of Related Art

1. Home Entertainment Systems and Home Automation Networks

Current home entertainment systems and home automation networks illustrate many of the fundamental problems discussed above. Home theater systems, for example, effectively are limited to a single room in a house, primarily due to the difficulty and expense of interconnecting devices.

Each source device, such as a satellite receiver, VCR, laserdisc or DVD player, typically is connected, by relatively expensive audio and video cables, to a "central" preamplifier or other form of switching device, which is also connected to a main television/monitor as well as to one or more power amplifiers, which are in turn connected to various speakers throughout the room by dedicated (and also expensive) speaker cables.

Such a cabling scheme is both expensive and difficult to maintain. Removing a defective VCR from a rack of equipment, for example, often requires reconnecting cables in a new configuration just to enable the rest of the system to function while the VCR is being repaired. Moreover, flexibility is limited, even with relatively high-end preamplifiers. Only a limited number of source devices can be accommodated by any dedicated device interconnection scheme. It often is prohibitively expensive to replace a high-end preamplifier merely because it will not accommodate the latest source device added to the system. Users therefore still may suffer the inconvenience of connecting and disconnecting cables manually to switch sources.

Moreover, even when all devices can be accommodated, the functionality of such home theater systems still remains limited. Recording programs with a VCR, as noted above, remains a mysteriously unattainable objective. As more source devices are added to a home theater system, the desire to record programs becomes greater, as does the difficulty of successfully recording a desired program.

Users frequently must change tapes, as well as figure out how to "program" a remote control to make the preamplifier, source device and VCR work together to record a program, particularly if someone is watching another program at the same time. Few systems even permit more than one program to be recorded simultaneously.

The difficulty of controlling consumer electronics devices and systems stems from the fact that most devices are not designed to interoperate with one another. User interfaces on universal remote controls are very limited. LCD screens, for example, rarely are used for more than listing a menu of commands. They rarely indicate any dynamic status information (such as which device is selected, which program is being recorded, etc.).

Moreover, universal remote control devices are extremely difficult to operate, and require extensive "programming" to perform even simple functions, such as turning the system on and off, which may require a "program" to send multiple commands—i.e., one to each device. Even switching from one source to another may require a multiple-command program—e.g., to switch video input sources on the television as well as switch the preamplifier source.

The result is an expensive system that is complex to set up, use and maintain, even in a single room. Multi-room systems are even more rare, due to the expense of dedicated cabling solutions, and the additional inconvenience of distributing control over devices across rooms. If VCRs, CD players and other source devices are physically located in different rooms of a house, the complexity of the "central" preamplifier, designed for dedicated cabling to all source and destination devices, becomes unwieldy.

As a result, users improvise by providing redundant functionality. Multiple preamplifiers, multiple VCRs, and multiple remote controls (often "programmed" uniquely for each room) are deployed, not necessarily because multiple devices are needed at any given time, but primarily because the alternative is too complex and expensive to be practical.

It is thus not surprising that such systems still are limited to hobbyists and high-end gadget-oriented users. Current attempts to address the multi-room problem—i.e., "home automation and multimedia networks" exhibit a number of fundamental design flaws. For example, virtually all current home automation standards (X10, CEBus, Echelon LONWorks, etc.) emphasize distribution of control information, as opposed to audio, video and other media.

In other words, such systems distribute analog media on one network or wiring infrastructure and digital control information on another separate network. Custom installation of dedicated audio, video and speaker cables throughout a home is required, and often is prohibitively expensive and results in relatively poor quality due to the degradation of analog signals propagating through multiple devices and extremely long cable runs. Home power lines (or infrared or radio frequency broadcast signals) typically are used to form a separate digital control network onto which remote control/sensor devices can be connected.

The quality of such home automation networks is far below audiophile and videophile standards. Analog audio and video signals simply cannot propagate for long distances, and through multiple A/D and D/A converters and other analog processing circuitry, without suffering significant degradation in quality. Transmitting multiple audio/video channels over coaxial cables, power lines or via radio frequency (RF) transmissions, degrades the signals significantly, and results in relatively low-quality audio and video output. transmissions, degrades the signals significantly, and results in relatively low-quality audio and video output.

Although some systems utilize existing unshielded twisted pair (UTP) telephone wiring to carry analog audio and video signals, the analog modulation of source audio and video signals over UTP cables also produces relatively low-quality audio and video output. Moreover, such systems still require custom installation of such UTP cabling, because the parallel nature of existing telephone wiring topologies (discussed in greater detail below) is not compatible with the dedicated cabling schemes discussed above.

As a result, the expense and complexity of such systems increases exponentially compared with single-room home theater systems. Although control over devices is improved (e.g., by a PC or other controller device, operating under software or firmware control), it is still limited, in essence, to the raw commands accepted by individual devices (e.g., by their remote controls).

Home automation networks, as a result of their separation of control and media distribution functionality, do not allow for sufficiently flexible control over streams of audio, video and other media, except at the most basic level of switching from one source to another. The result, as noted above, is a highly complex and expensive system that is difficult to set up, use and maintain.

Existing home automation networks simply are not poised to take advantage of the advent of digital media. Such media continues to be distributed in analog form over a separate network, distinct from the control network that is the primary focus of such home automation networks.

2. Local Area Networks and Ethernet

One potential solution to the problems rioted above is to implement a digital computer-based network of the type typically found in business environments for interconnecting personal computers, workstations, servers and printers. Although the recent increase in popularity of the home computer market has led to a great deal of discussion of home networks which merge general-purpose computing functionality with the consumer electronics devices found in home theaters, the solutions offered thus far do not seem to have advanced beyond the proposal stage.

Applying local area network technology (e.g., Ethernet and TCP/IP network protocols) to consumer electronics devices raises a number of problems. Although it appears advantageous to connect consumer electronics devices as generic nodes on a network, existing network protocols are far from optimized for real-time streams of digital audio and video.

Although current "solutions" are vague in nature, they typically fall into one of two categories. The first is analogous to the home automation networks discussed above, in which consumer electronics devices are connected via dedicated audio and video cables, and still transmit analog information along one network, while an Ethernet network, for example, enables home computers and other control devices to control the operation of the consumer electronics devices. The interface between the two networks is unclear, although the solutions offered by X10 and other home automation network standards appear to apply equally to this scenario.

The other alternative implementation is to distribute audio, video and other real-time media streams in digital form. There are a number of obstacles to this scenario, however, not the least of which is the apparent absence of an existing physical and logical infrastructure to carry the digital media streams. Ethernet, for example, is not optimized to carry real-time continuous digital media streams. It is an asynchronous, packet-based protocol that would add significant overhead to digital audio and video samples, which require consistent and timely delivery, as opposed to the ability to "burst" packets of information at high speeds on demand.

The direction currently being followed by the computer industry appears to be focused on one high-speed bus protocol in particular, which was designed to enable personal computers to exchange information with peripherals such as disk drives, digital video camcorders and digital televisions. This bus protocol, known as "FireWire" (IEEE 1394), was designed more as an information-exchange protocol (to move data quickly between personal computers and peripherals) than as a network protocol optimized for distributing real-time continuous digital media streams among consumer electronics devices, along with control information, throughout a home.

Nevertheless, the momentum behind FireWire as an industry standard suggests that many home computers and consumer electronics devices soon will have built-in FireWire ports. What remains unclear is whether FireWire can solve the interconnection and control problems discussed above. Following is a brief discussion of FireWire, and of certain of its shortcomings in the context of a home network.

3. FireWire

FireWire devices are connected by a custom 6-wire cable, with two wires for power and two twisted-pairs for data. Devices can be daisy-chained to allow tree and other acyclic topologies (i.e., no "loops" are allowed). FireWire devices have limited "plug and play" and "hot-pluggable" functionality. In other words, devices can configure themselves automatically upon being powered on, and can be attached and removed from the network without turning off the entire system. Yet, doing so may interrupt (i.e., "reboot") the network, and thus interrupt existing digital media streams, as the network reinitializes and reconfigures devices.

On startup, the bus configures itself in three phases: bus initialization tree identification and self-identification. Whenever a new node is connected or disconnected, a signal sends all nodes into an initialization state, whereupon each node resets all topological information in a distributed manner. In other words, each node determines its own connections and passes this information along to its neighboring nodes, and so on throughout the network. One node is selected as the "root" node, and a unique physical ID is assigned to each node (though physical IDs are reassigned every time the bus is reconfigured).

FireWire employs two different processes, called "subactions," for distributing data packets among devices attached to the bus. One is asynchronous, while the other is isochronous. As is explained below. FireWire essentially is an asynchronous bus protocol, in that audio, video and other data packets are not distributed among devices at fixed intervals in accordance with a master clock.

Asynchronous subactions begin with an arbitration period to determine which requesting device is granted control of the bus (because only one device can transmit at a time). The winning node transmits certain transaction and other codes (for speed, format, etc.), along with its address and that of destination nodes, and variable-length data. If the packet is not a broadcast packet, there is a brief gap, followed by an acknowledgment from the destination node. Asynchronous subactions are followed by "subaction gaps," which are required due to propagation delays.

Isochronous subactions are similar, but have a simpler arbitration process, a short channel identifier instead of source and destination addresses, no acknowledgment, and shorter gaps between subactions. FireWire uses a relatively slow 8 kHz clock for isochronous transmissions. After all desired isochronous packets have been sent, the bus resumes asynchronous subactions.

FireWire devices are half-duplex. Thus, devices connected to two or more nodes cannot propagate incoming data while transmitting their own data. FireWire devices employ a "data-strobe encoding" scheme (invented by engineers at Inmos, Ltd.—see U.S. Pat. No. 5,341,371), which involves transmitting data on one twisted-pair wire and a strobe signal on the other pair. The strobe signal transitions whenever two consecutive data bits are the same. This technique was believed to result in increased skew tolerance compared to a standard clocked format (such as 4B/5B or 8B/10B and clocked NRZ coding, as explained below in the context of the present invention).

From the above summary of the characteristics of FireWire, it is apparent that there are a number of obstacles to applying FireWire to real-time distribution of digital media streams among consumer electronics devices, particularly in light of its essentially asynchronous and half-duplex nature.

The installation cost of a FireWire network of consumer electronics devices is likely to be quite high. Custom installation of FireWire cables is likely to he required throughout a house, despite the use of twisted-pair cables. No mechanism for compatibility with existing UTP telephone wiring topologies is included in the FireWire specification.

In addition to the high cost of installing FireWire, the cost of FireWire devices themselves is likely to be quite high, due primarily to the asynchronous nature of FireWire. Because data packets are transmitted asynchronously, devices must be able to buffer incoming packets and generate timing information internally (i.e., "timestamps" associated with the data packets), which must be communicated to other devices. Moreover, almost double the audio data is required due to this buffering/timestamping process, resulting in a significant loss of bandwidth. This results in complex and expensive devices, due to the memory, buffers, counters and associated circuitry required to perform such functions. Even a simple FireWire device requires at least a simple processor (CPU) and memory to implement the FireWire protocol stack.

The 8 kHz isochronous cycle simply is too slow for applications requiring CD-quality (44.1 kHz) audio. Were FireWire to increase its isochronous cycle frequency to 44.1 kHz, some of these obstacles might be overcome.

The lack of asynchronous time base also results insignificant clock jitter. The start time of an isochronous packet may be delayed by an asynchronous packet (due to their variable length). To account for this possibility, a delay is encoded in the "cycle start" signal, resulting in clock jitter. Moreover, additional jitter results from the variable amount of time between the "cycle start" and the actual start of a specific device's subactions, requiring each device to maintain its own timing register to account for this source of jitter.

There are solutions to these timestamp and clock jitter problems. Yet, they add significant cost and complexity to every device attached to a FireWire bus. As a result, FireWire devices need CPUs just to manage these bus protocol issues. This could be a significant obstacle to acceptance of FireWire for anything beyond relatively high-end computer peripherals and the most expensive consumer electronics devices, such as HDTV or digital camcorders.

For applications requiring real-time delivery of continuous digital media streams, FireWire has additional problems. One significant limitation to FireWire is the total length of the connecting cable, which is limited in the current specification to 4.5 meters (unless extremely expensive fiber optic or other alternative cables are used). This short length is a significant limitation even within a single room used for a typical home theater system; and is prohibitive in the context of a house-wide application, such as a home telephone PBX or multi-room digital audio and video distribution system.

Even if repeaters could be accommodated, such devices would be relatively expensive, and would contribute to FireWire's 64-device limitation. An asynchronous FireWire router might well become necessary to accommodate additional devices beyond this limit. Such a route would be extremely complex, requiring knowledge of data types to reassemble packets, buffering of variable-length packets, etc. In addition to being expensive, such a router would impose variable-length delays, making it extremely difficult, for example, to synchronize two speakers receiving information from a source device via the router. Each speaker would have to receive and handle timestamps (due to variable delays from other devices, as well as the router), and reassemble data packets, just in order to play 44.1 kHz digital audio samples.

Another problem with FireWire devices in the context of a network of consumer electronics devices is that no mechanism exists to enable such devices to be truly hot-pluggable. The FireWire bus will reset whenever a device is added or removed, resulting in an interruption (however short) to all existing data streams. The FireWire specification contains no provision for a router or other device to isolate a particular device or chain of devices from the rest of the network, such that the FireWire bus need not reset, and thus disrupt, the entire network when a device is added to or removed from this isolated network segment or zone.

The lack of static device IDs also creates problems. Each device must update its topology table whenever the bus is reinitialized e.g., whenever a new device is added or removed, or a device malfunctions. No device therefore can rely on these device IDs remaining constant.

As will become apparent below, certain of the techniques employed in the present invention could be adapted to FireWire buses and associated FireWire peripherals. For example, FireWire peripherals could be adapted for use as a node on a network of the present invention. Moreover, certain of the disadvantages of FireWire noted above could be overcome to some extent by adopting and/or combining with particular aspects of FireWire certain of the techniques discussed below.

For example, static device IDs could be employed to simplify device identification and addressing, as well as the self-configuration process—because a device's presence could be detected via its static ID. Static IDs also would facilitate the implementation of copy protection, fraud detection and other features that rely on the identification of particular devices. In addition, device-specific information could be stored along with the device ID, such as pointers to external device drivers (as discussed below).

Nevertheless, FireWire remains essentially an asynchronous bus protocol. It simply is not optimized for distributing real-time continuous digital media streams among consumer electronics devices in a network environment. It was designed as a computer peripheral bus, for exchanging data (asynchronously) between computers and peripherals, such as disk drives and digital camcorders.

4. Synchronous Networks and Ring Networks

Unlike FireWire, a truly synchronous network could overcome many of the limitations discussed above. Yet, synchronous network protocols (as discussed below) have not been optimized or adapted for use with consumer electronics devices to enable the distribution of digital media streams in a manner that overcomes the limitations noted above.

TDMA networks, for example, utilize time-division multiplexing, and synchronize all devices to a master clock. Yet, the bandwidth on a TDMA network typically is divided equally among the devices on the network. In other words, if 10 devices are on the network, each device gets $\frac{1}{10}$th the network bandwidth, and thus can transmit information only during that channel or "time slice" (e.g., during unit 1 of every 10 units of time).

In the context of transmitting digital media streams, however, certain data streams require more bandwidth than others. Video data, for example, requires more data than audio, though it is sampled less frequently. Yet, TDMA networks assign each device a single channel in which to transmit all of its data. These channels are based simply on the number of devices on the network, and bear no relationship to the bandwidth requirements of the type of data being transmitted. This problem is exacerbated when asynchronously distributed variable bit-rate data, such as MPEG2 compressed video, must also be accommodated. TDMA network technology provides no solution to either of these problems. TDMA devices are left with a single fixed-width channel which is not well suited for accommodating either multiple real-time continuous data types having differing bandwidth requirements, or an asynchronous data type having bandwidth requirements that vary over time.

Even in the context of a ring network, in which data propagates from one device to another around a loop oaring (and is overwritten when a device desires to insert its own data), a device on a TDMA network could transmit information (such as a digital audio sample) anytime during its assigned time slice. Moreover, that time slice might charge whenever a new device is added to or removed from the network. Thus, a device cannot guarantee consistent delivery of particular data, despite the synchronous nature of TDMA.

Ring networks, however, appear to be good candidates for consistently delivering particular data (e.g., a digital audio stream) from one device to another (e.g., from a CD player to a speaker), assuming that such information propagates around the ring at a consistent rate (e.g., synchronously, based upon a master clock). Yet, existing ring networks suffer from many of the same deficiencies discussed above.

Token Ring networks, for example, are asynchronous in nature. Each device transmits data only when it receives the "token," which does not occur at fixed intervals of time. Thus, such networks cannot guarantee consistent delivery of real-time continuous digital media streams.

FDDI networks on the surface appear to be synchronous ring networks; yet, they transmit information synchronously only in a point-to-point manner. In other words, the transmitter on one device is synchronized to the receiver on the next device on the ring. Yet, the transmitter and receiver within a device are not synchronized to each other. Information therefore will not always propagate through a device at a consistent rate, due to the difference between the transmit and receive oscillators within a device, among other factors.

FDDI devices compensate for this difference with an "elasticity buffer" which avoids losing data, but does not guarantee consistent delivery of data. For example, if a device receives data "late," it will transmit that data late. If it receives data "early," it will place that data in its elasticity buffer, and transmit such data in a FIFO fashion.

Thus, FDDI devices also cannot guarantee consistent delivery of data such as real-time continuous digital media streams. They are optimized for high throughput, but not for consistent, synchronous delivery of data.

D. Resolving the Problem

The above description of home theater systems and home automation networks, and of various existing asynchronous and synchronous network protocols, illustrates many of the obstacles to interconnecting consumer electronics devices for distribution of audio, video and other media (including both real-time continuous digital media streams and asynchronous data), as well as control information, throughout a home or other environment. It also serves to explain why the "smart home" has remained such an elusive goal.

Problems such as those discussed above must be resolved before home networks can achieve widespread acceptance. What is needed is a low-cost physical network topology, preferably one that is compatible with the existing physical cabling infrastructure in a home, to avoid the significant barrier to entry of having to rewire an entire home merely to set up a simple network consisting of a few devices. Such a topology should enable devices to be interconnected with relative ease, as contrasted with the difficulty and expense of interconnecting audio and video and other consumer electronics devices within and across rooms of a home using available technologies.

Such a network also should be compatible with existing consumer electronics devices, again to avoid the significant barrier to entry of having to replace all existing devices merely to set up a simple network consisting of a few devices. Moreover, such adapters and other devices preferably should be relatively inexpensive (at least no more expensive than comparable existing devices) in order to encourage consumers to adopt this new technology.

The network should accommodate real-time continuous digital media streams, as well as asynchronous data (and digitize existing analog audio and video) in order to provide the significant benefits and flexibility noted above. To do so, the network must deliver such digital media streams reliably, in order to provide the same level of synchronization as is currently provided by existing analog delivery mechanisms.

II. SUMMARY OF THE INVENTION

To achieve these objectives, one embodiment of the present invention provides a protocol and architecture for a synchronous logical ring network which operates on the existing physical twisted-pair telephone topologies found in most homes today (forming a "logical" ring without requiring in-wall wiring modifications). The logical ring network can even replace the existing analog telephone network in the home. It can accommodate daisy-chained network devices which, because they need not be connected to a junction box in the wall, require neither in-wall nor junction-box wiring modifications. Moreover, virtually any physical topology (star, loop, tree, etc.) throughout a home, office or other environment can be converted, with minor junction-box wiring modifications, into a logical ring network of the present invention.

Information can propagate around this logical ring, reaching every device on each revolution around the network. Network devices are full-duplex, transmitting and receiving information simultaneously.

An arbitration process occurs automatically upon network initialization, and one of the competing devices is elected the network clock device to which all other devices are then synchronized. By synchronizing all network devices to a single reference clock, and providing fixed frames of information propagating around the network at consistent time intervals (44.1 kHz "frame rates" in one embodiment, to enable device synchronization to the CD audio sample rate), the logical ring network ensures that information always will propagate from one device to another at consistent time intervals. In other words, information will propagate consistently around the logical ring network at the frame rate; and the time required for information to propagate between any two particular devices will remain fixed.

Following network initialization (and whenever devices are added or removed), an auto-configuration process configures each network device and determines the network topology. The entire network topology is discerned and made available to interested devices, even though individual devices need not be capable of interpreting such information. Devices can be added and removed in true "plug and play" fashion, and will be hot-pluggable if connected anywhere on a chain of devices attached to a "hot-pluggable smart jack" device.

Most network devices are relatively "dumb" and inexpensive, in that they require only simple hardware state machines to accommodate the basic network protocol, and to transmit and/or receive digital media streams. Network devices have unique static device IDs, which simplify device identification and addressing, as well as network initialization, and form the basis for encryption to provide network security, authentication and/or copy protection functionality. Devices also can contain other device-specific information, including device drivers (or pointers to external device drivers) that can be executed on their behalf by "smart" CPU-based controllers.

In addition to accommodating adapters that connect existing consumer electronics devices to a logical ring network of the present invention, the network architecture accommodates new "restructured" digital-ready devices that redistribute existing device functionality across the network. For example, by removing MPEG2 decoders from DVD players, the compressed digital information can be distributed/processed throughout the logical ring network before reaching its ultimate destination (e.g., a television attached to or incorporating an MPEG2 decoder).

Information propagates along the logical ring network in fixed-length frames which, in one embodiment, comprise 640 bits of encoded data, transmitted at a raw bit rate of 28.224 MHz. In addition to "frame header" markers that synchronize devices to a master clock, these frames contain two independent streams—a "data stream" for the distribution of real-time continuous digital media streams, as well as asynchronous data, and a "system command stream" for the distribution of "system commands," which are used primarily for network initialization and auto-configuration of network devices, as well as basic switching of digital media streams. The system command stream propagates along a "default network path" that reaches every network device.

The data stream, however, can propagate along any available path, to provide for greater overall network bandwidth (e.g., by adding a switching router device to the network to create alternative data stream paths).

The data stream is divided into distinct "channels" (the size of each channel being tailored to the bandwidth and sample-rate requirements of a particular media type) which operate by default, and can be reallocated dynamically (in some cases even occupying discontiguous portions of the data stream). In this manner, devices can reliably guarantee consistent delivery of data (e.g., audio samples at the standard CD audio 44.1 kHz rate) having particular bandwidth requirements. Thus, two speakers on the network will receive left and right channel digital audio, respectively, at the "same time" (i.e., within one sample time of accuracy), and thus be synchronized to each other (i.e., phase coherent), even if the source device is physically located in another room and/or zone of the network). Phase coherency is a critical factor in high-quality stereo audio systems, as well as multi-channel surround sound systems, such as Dolby AC-3.

The data stream also can contain embedded control information and other asynchronous data, including compressed MPFEG2 video and other variable hit-rate data, as well as asynchronous network protocols, such as I²C, RS232 serial protocols and TCP/IP. Such information is delivered synchronously, however, thereby avoiding collisions. Network devices also can utilize channels of the data stream to send custom commands to one another, including control information, pursuant to virtually any protocol known to such devices.

III. BRIEF DESCRIPTION OF THE DRAWINGS

The foregoing and other objectives, aspects, and advantages will be better understood from the following detailed description of embodiments of the present invention with reference to the following drawings:

FIG. 2(d) is a system diagram illustrating the transformation of a standard physical star topology for a data and/or voice network into a logical ring network of the present invention.

FIG. 5(a) is a diagram illustrating the interconnection of a standard telephone connector and a jack of a replacement junction box on a logical ring network of the present invention.

FIGS. 5(b) and 5(c) are diagrams illustrating a switchable replacement junction box with jacks for both a standard analog telephone network and a logical ring network of the present invention.

Figure 6:
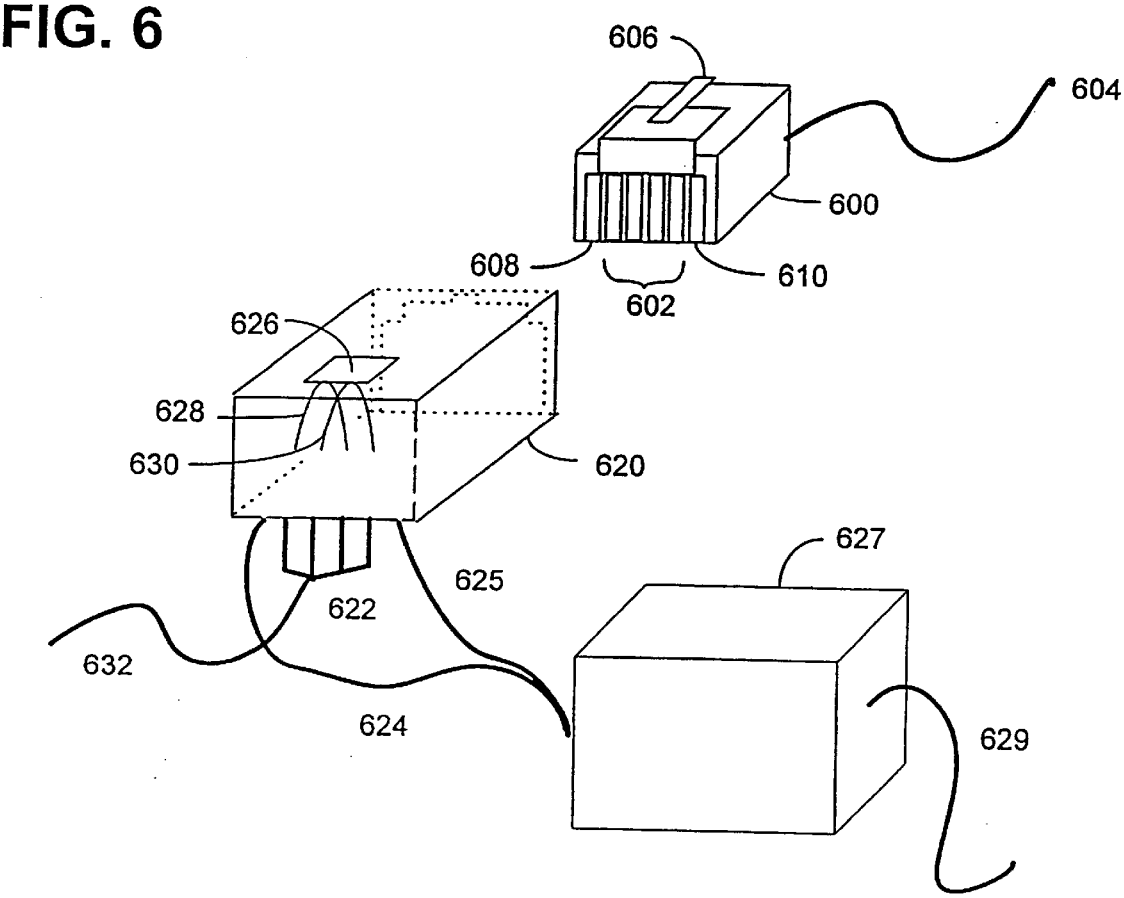

FIG. 6 is a diagram illustrating the integration of phantom power from a standard internal transformer into a jack of a replacement junction box on a logical ring network of the present invention.

Figure 7:
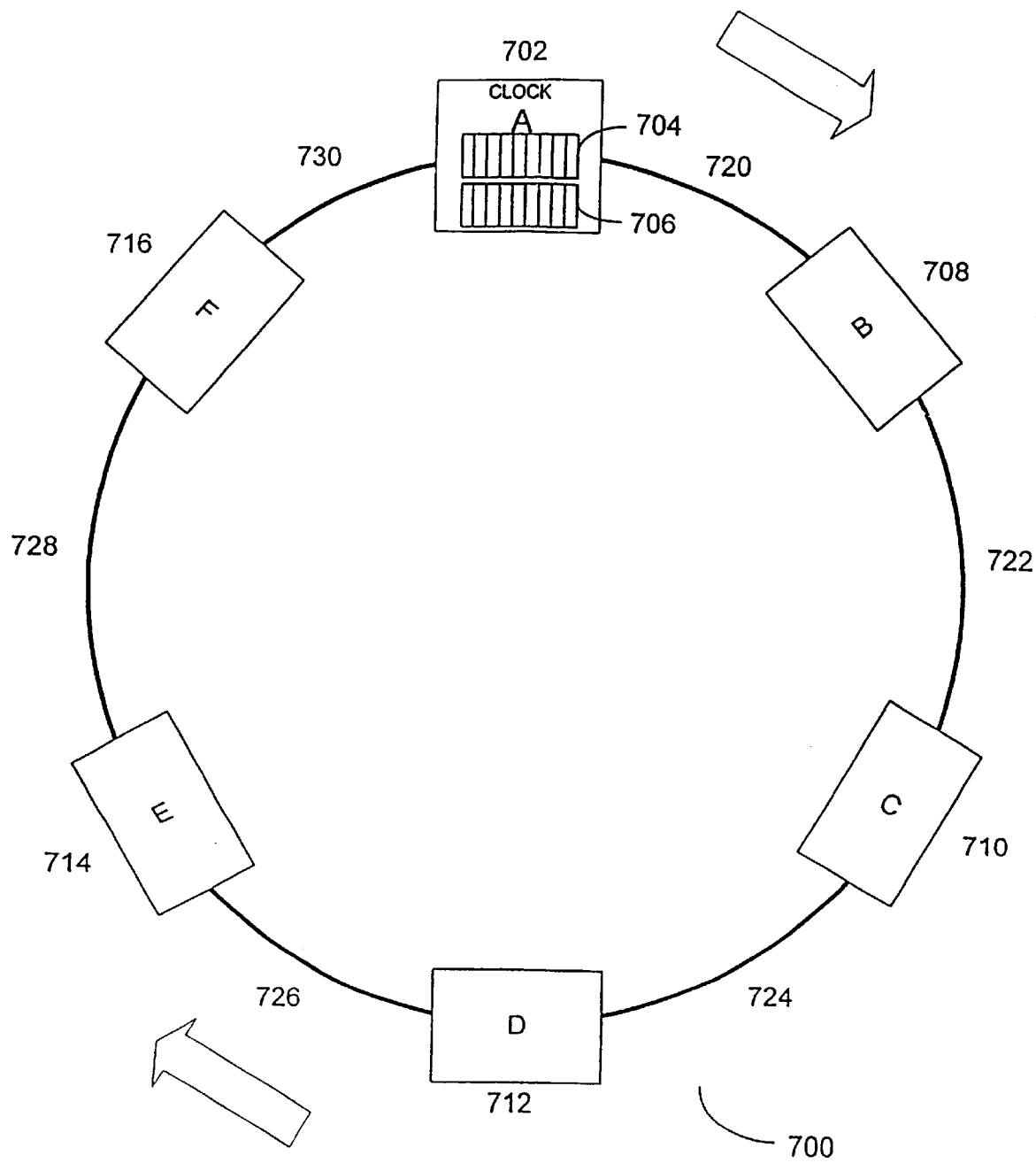

FIG. 7 is a system diagram illustrating the default network path of a logical ring network of the present invention.

Figure 8:
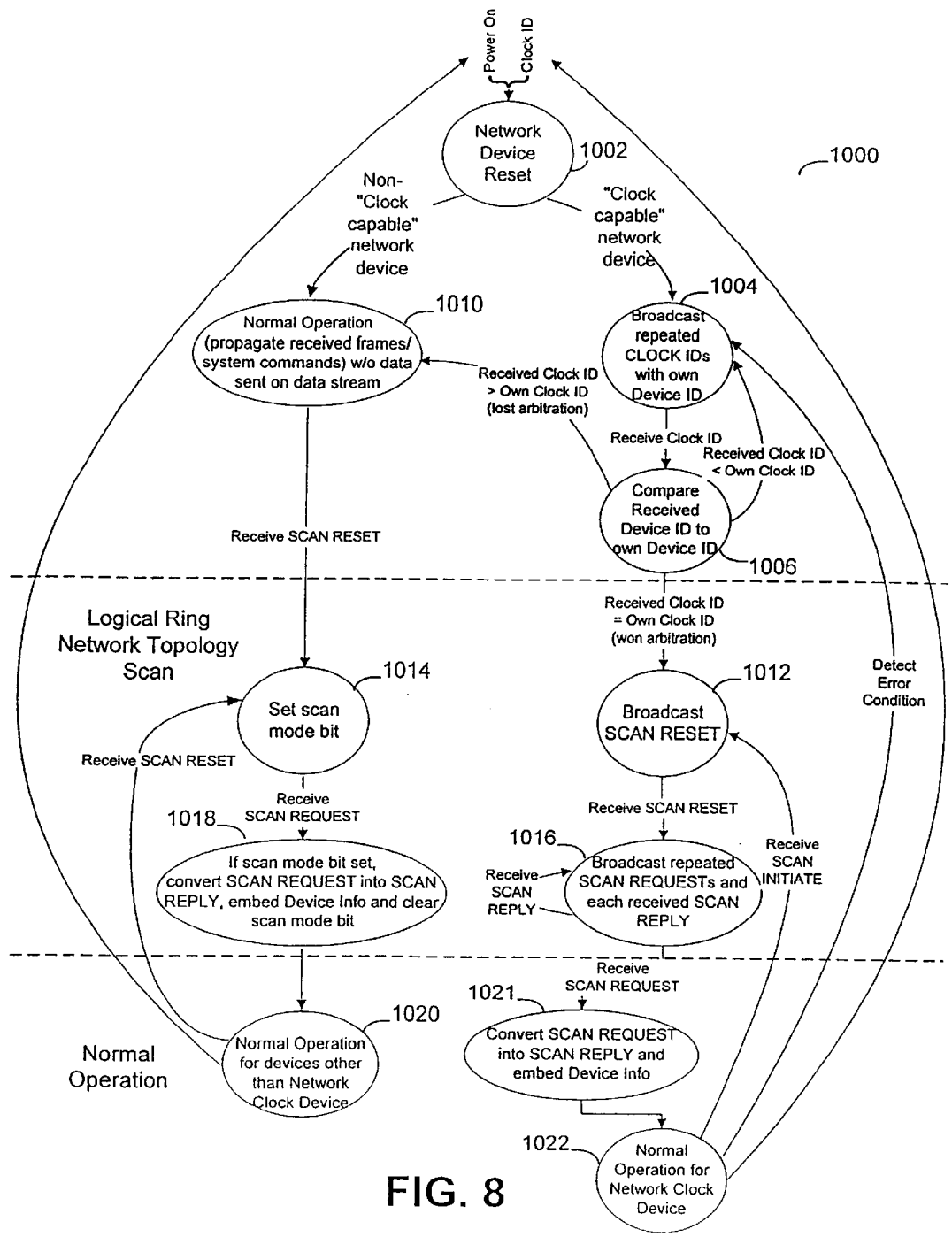

FIG. 8 is a state diagram illustrating network initialization and auto-configuration of a synchronous logical ring network of the present invention.

Figure 9:
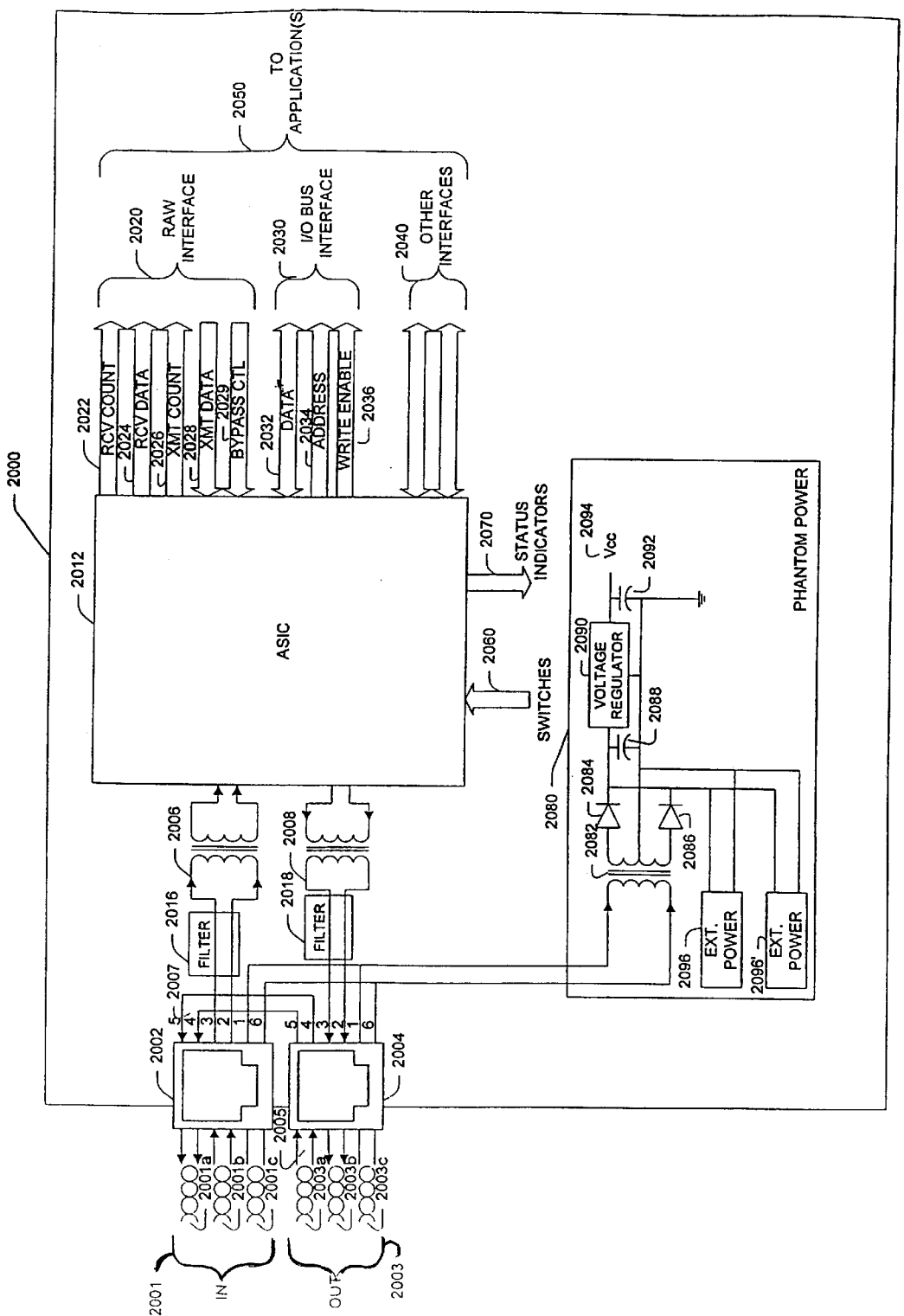

FIG. 9 is a block diagram illustrating various interfaces to an ASIC embodiment of a core network adapter for connecting devices to a synchronous logical ring network of the present invention.

Figure 10:
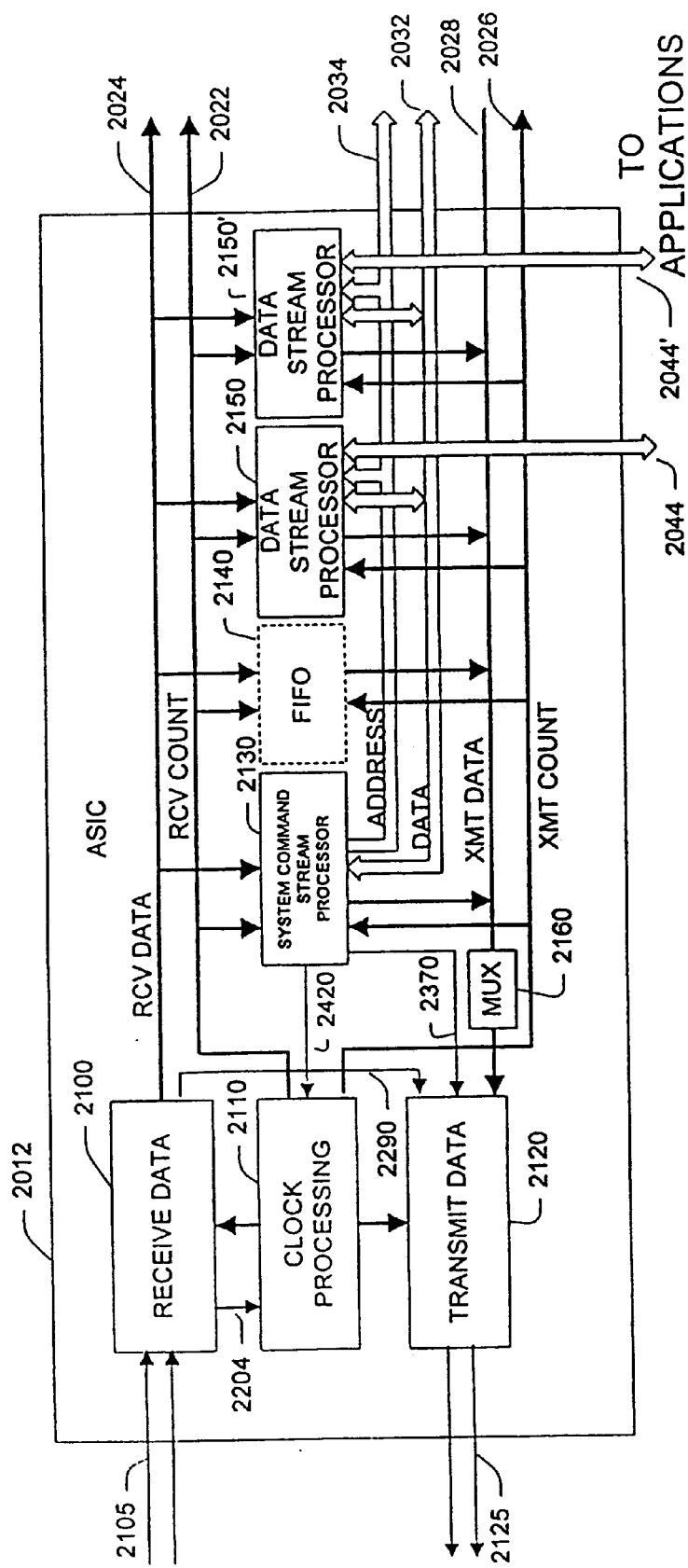

FIG. 10 is a block diagram illustrating major functional components of a core network adapter for connecting devices to a synchronous logical ring network of the present invention.

Figure 11:
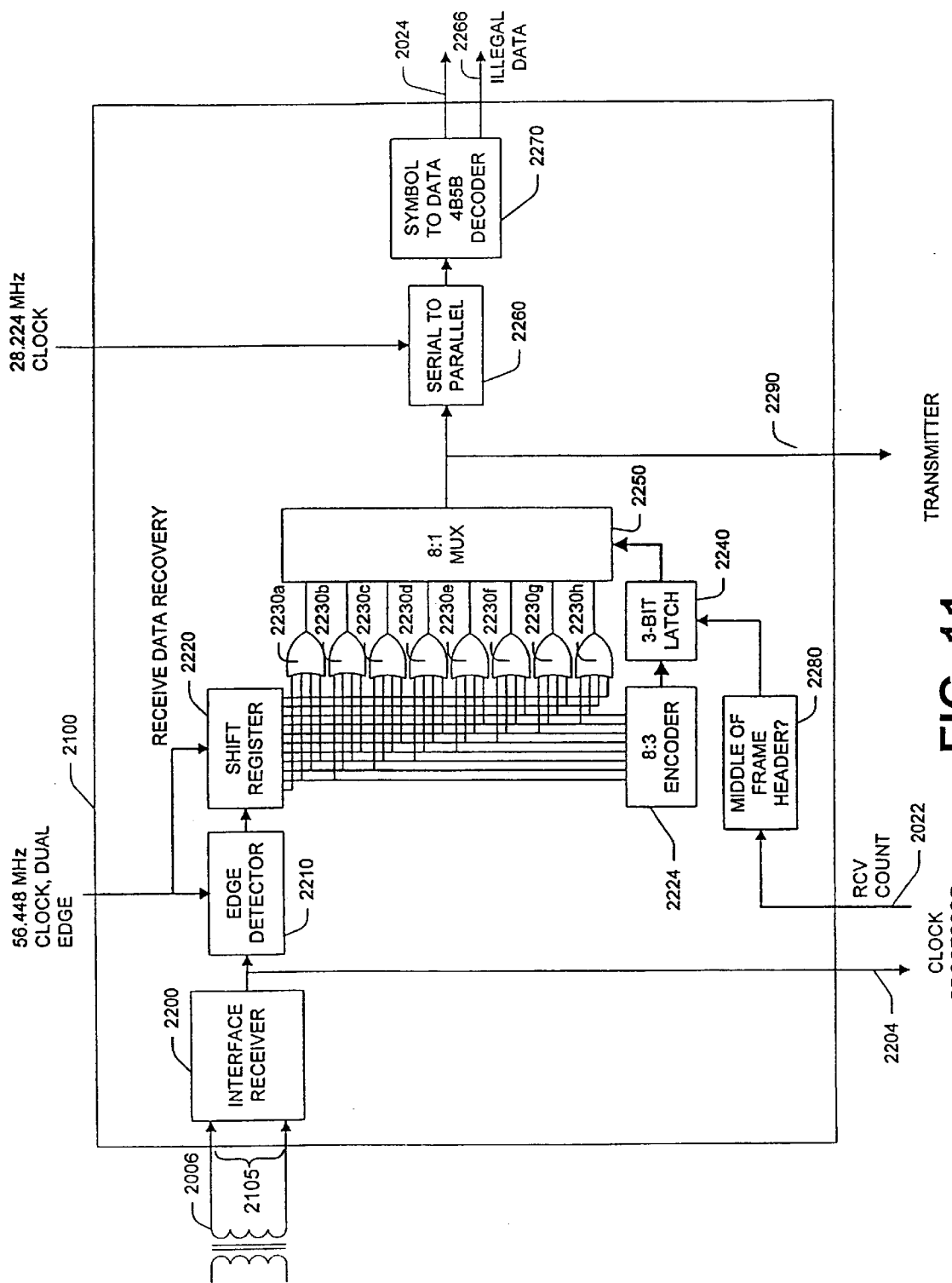

FIG. 11 is a block diagram of a receiver component of a transceiver in a core network adapter for connecting devices to a synchronous logical ring network of the present invention.

Figure 12:
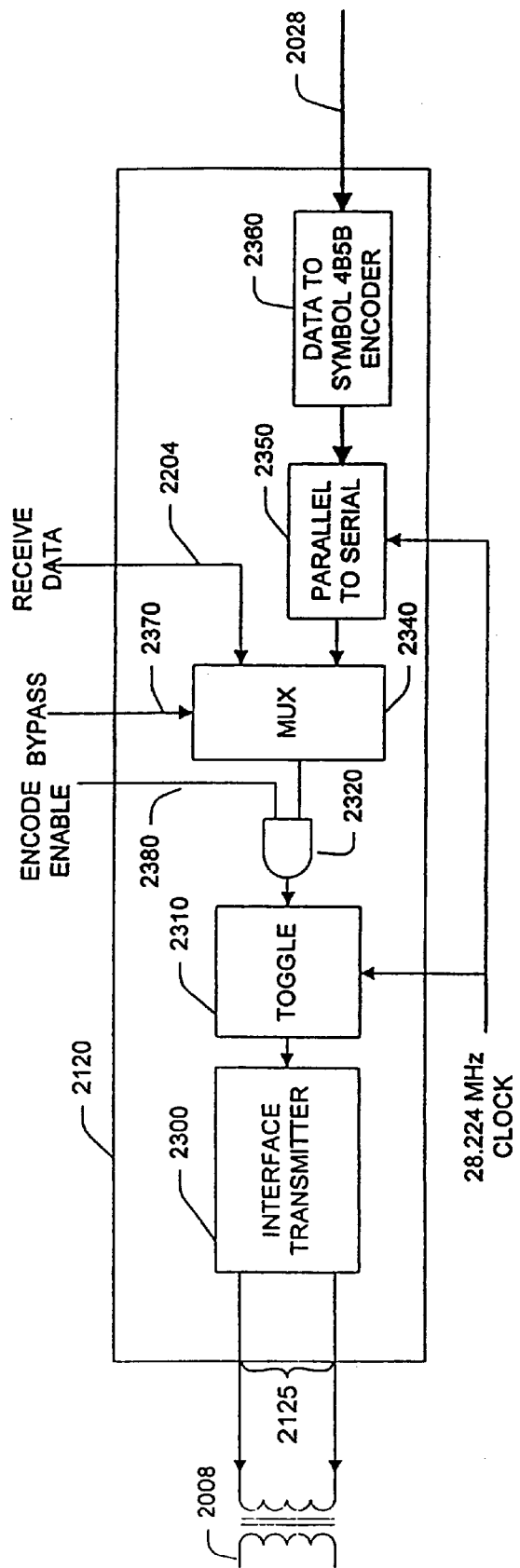

FIG. 12 is a block diagram of a transmitter component of a transceiver in a core network adapter for connecting devices to a synchronous logical ring network of the present invention.

Figure 13A:
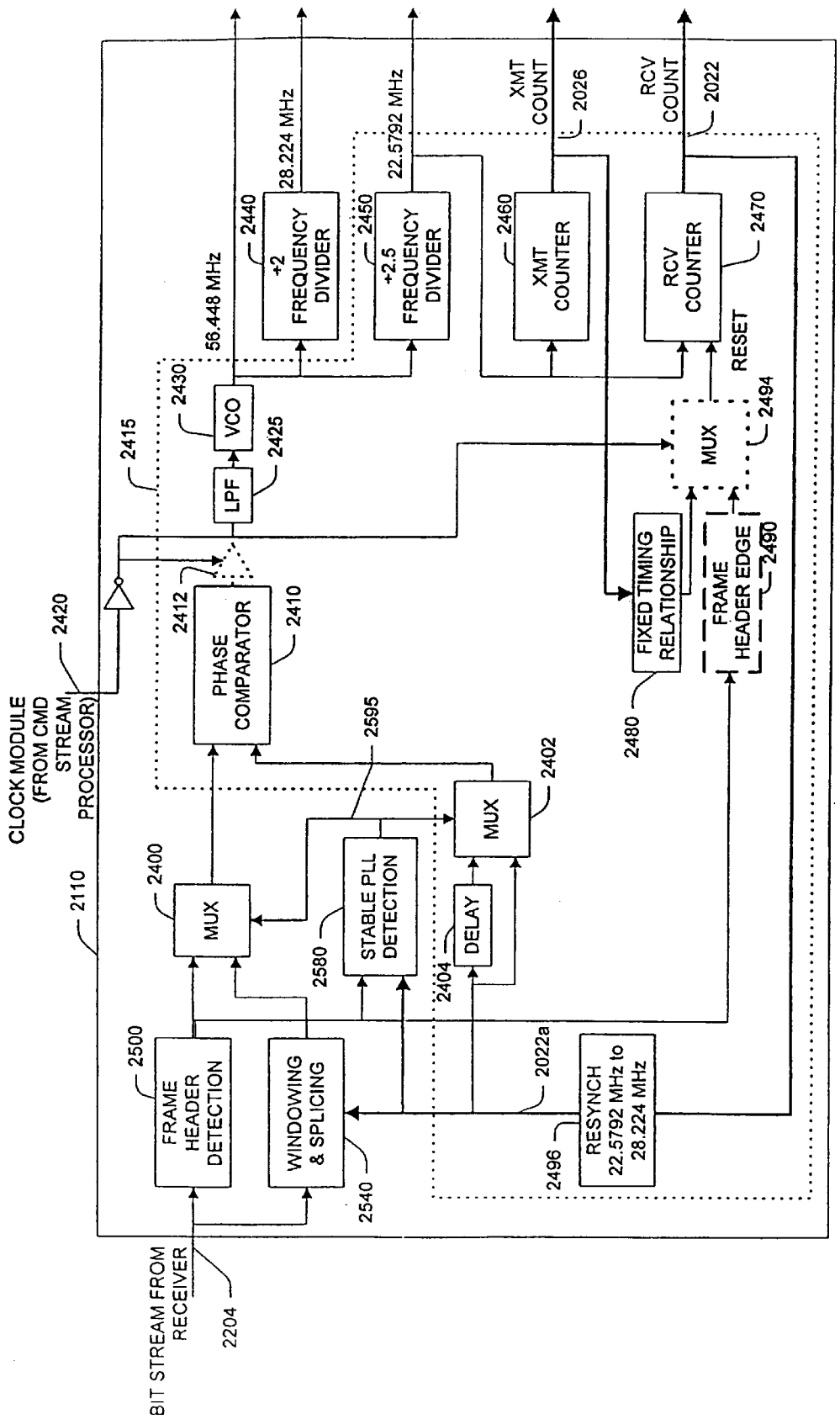

FIG. 13(a) is a block diagram of a clock processing and synchronization component of a transceiver in a core network adapter for connecting devices to a synchronous logical ring network of the present invention.

Figure 13B:
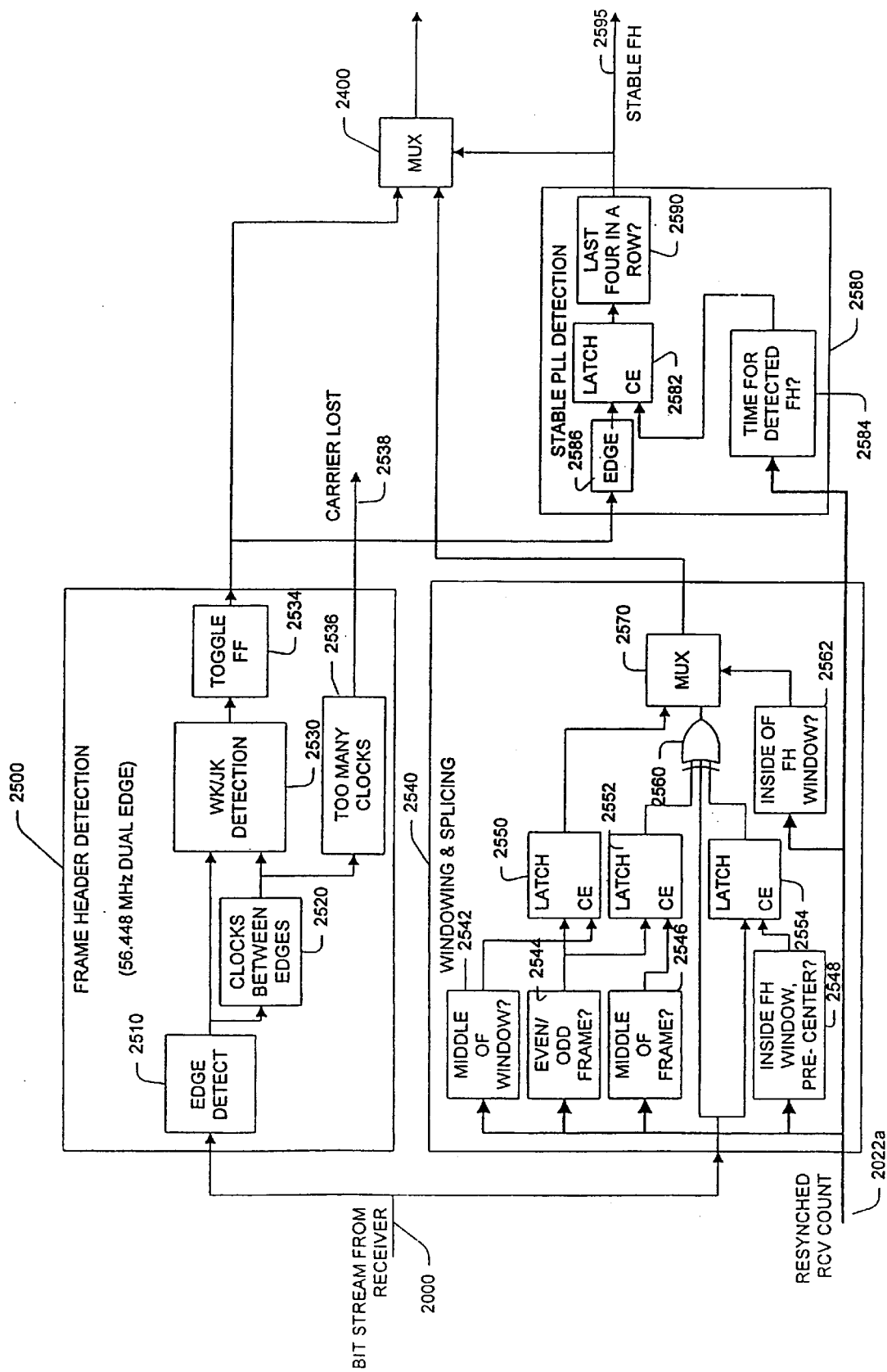

FIG. 13(b) is a detailed block diagram of particular synchronization portions of a clock processing and synchronization component of a transceiver in a core network adapter for connecting devices to a synchronous logical ring network of the present invention.

Figure 14A:
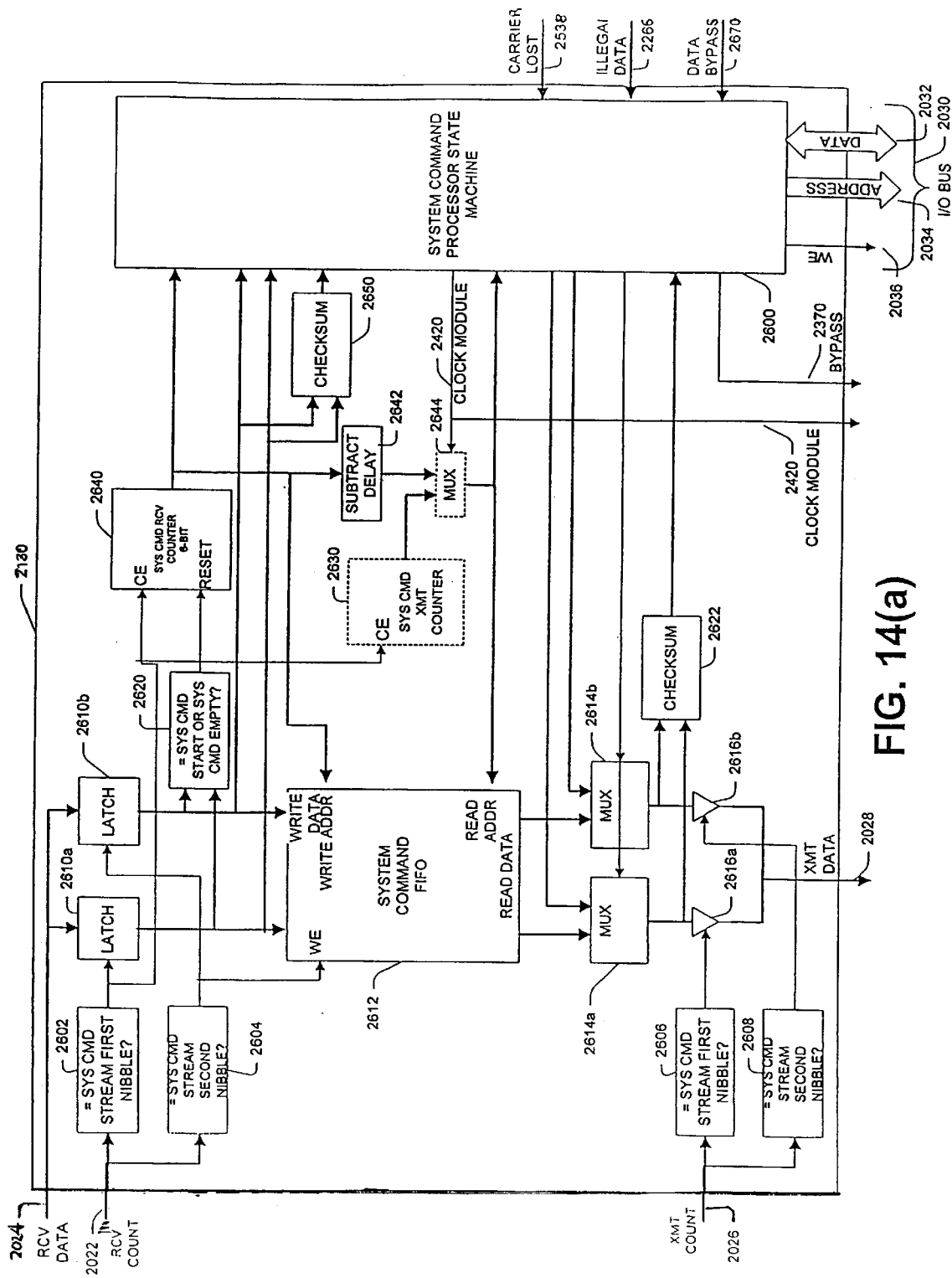

FIG. 14(a) is a block diagram illustrating a system command stream processing component in a core network adapter for connecting devices to a synchronous logical ring network of the present invention.

Figure 14B:
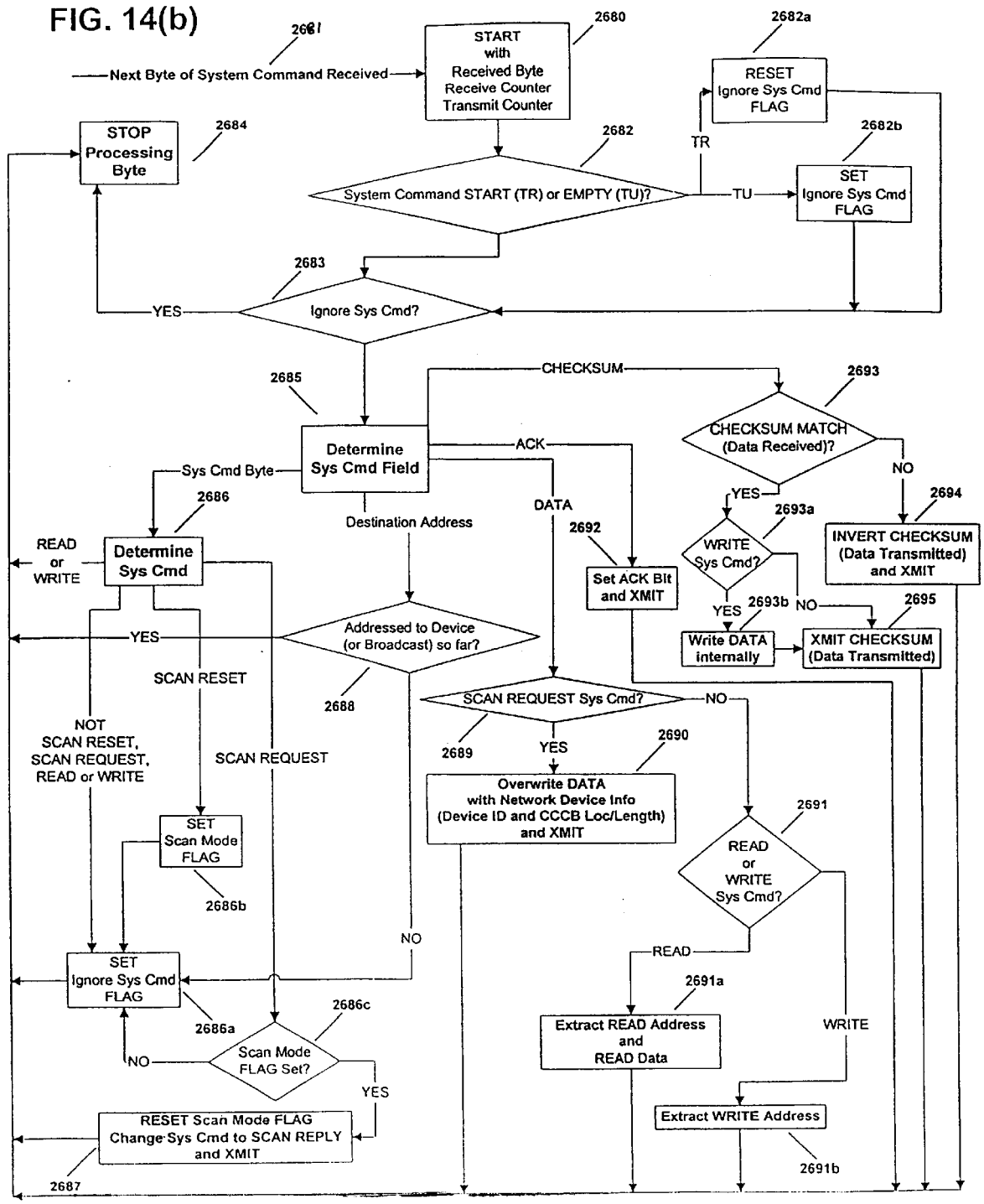

FIG. 14(b) is a flowchart illustrating the operation of a basic system command processor state machine of a core network adapter for connecting devices to a synchronous logical ring network of the present invention.

Figure 15:
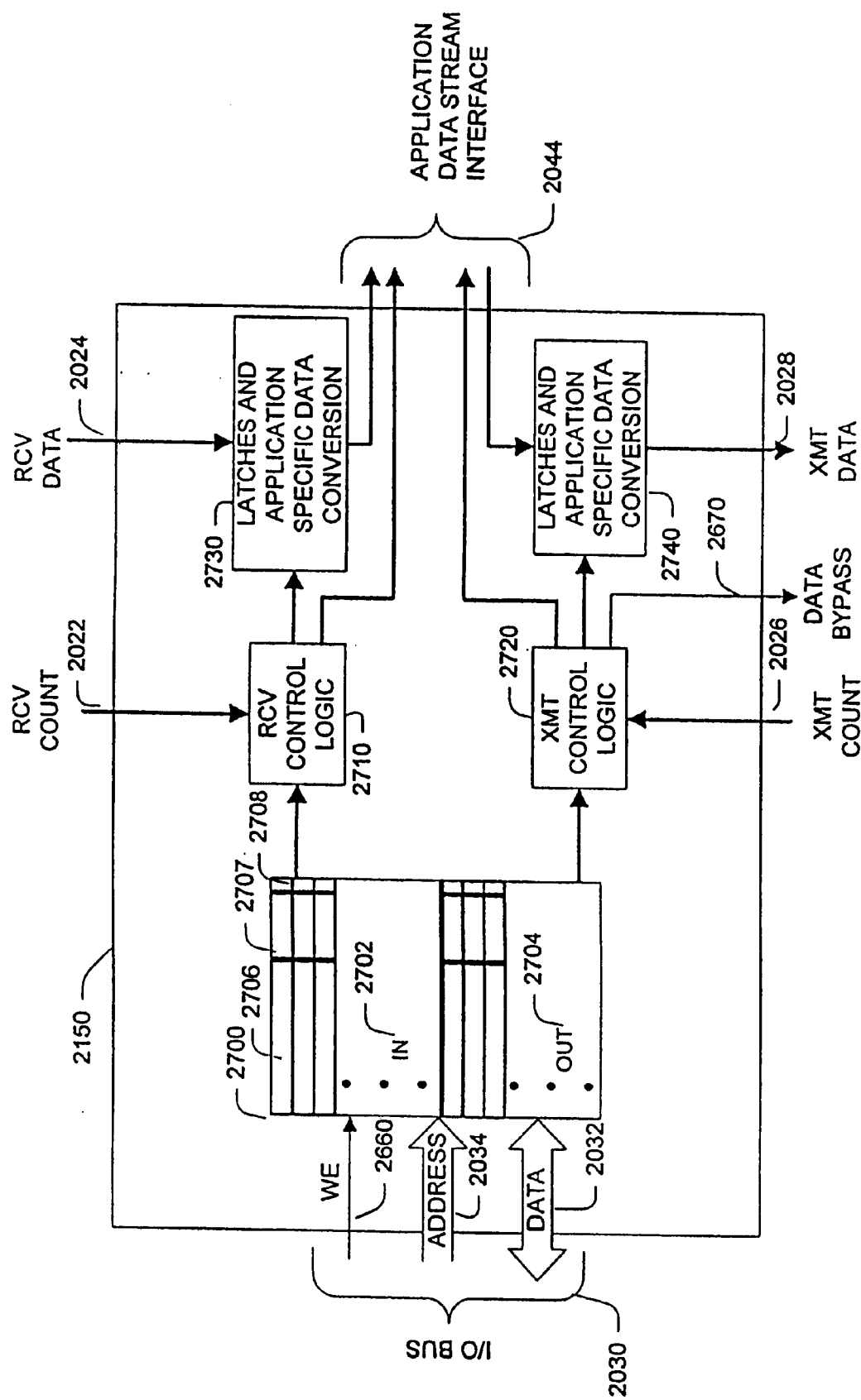

FIG. 15 is a block diagram illustrating a data stream processing component in a core network adapter for connecting devices to a synchronous logical ring network of the present invention.

Figure 16:
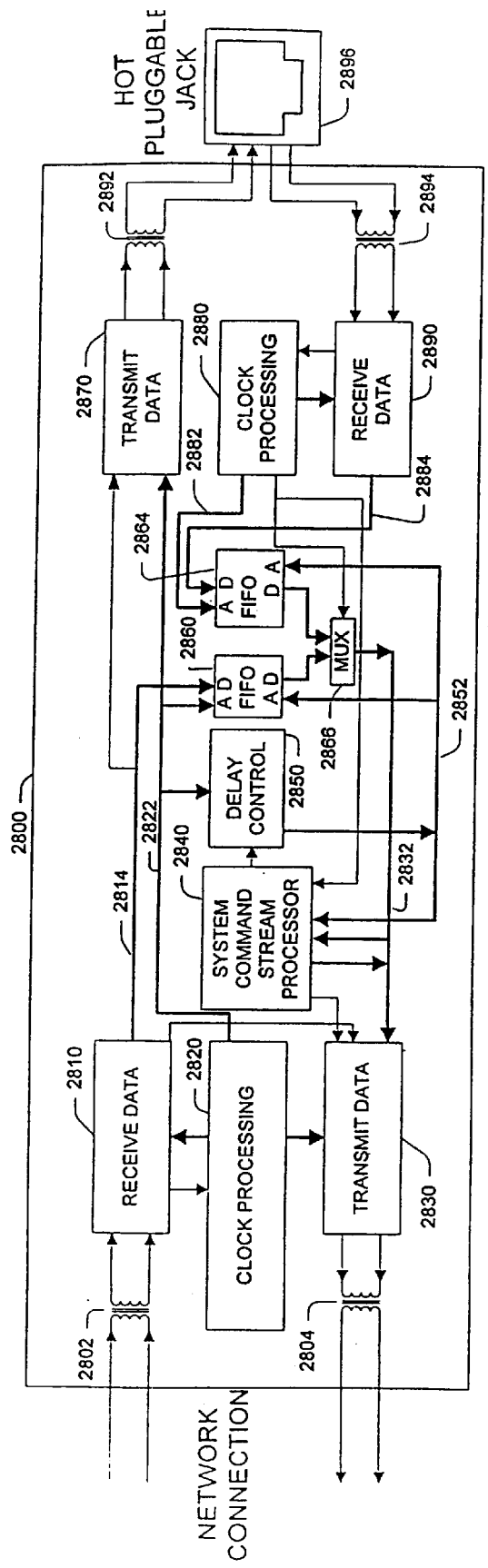

FIG. 16 is a black diagram of a hot-pluggable smart jack device into which other network devices can be connected and disconnected without requiring complete reinitialization of a synchronous logical ring network of the present invention.

Figure 17:
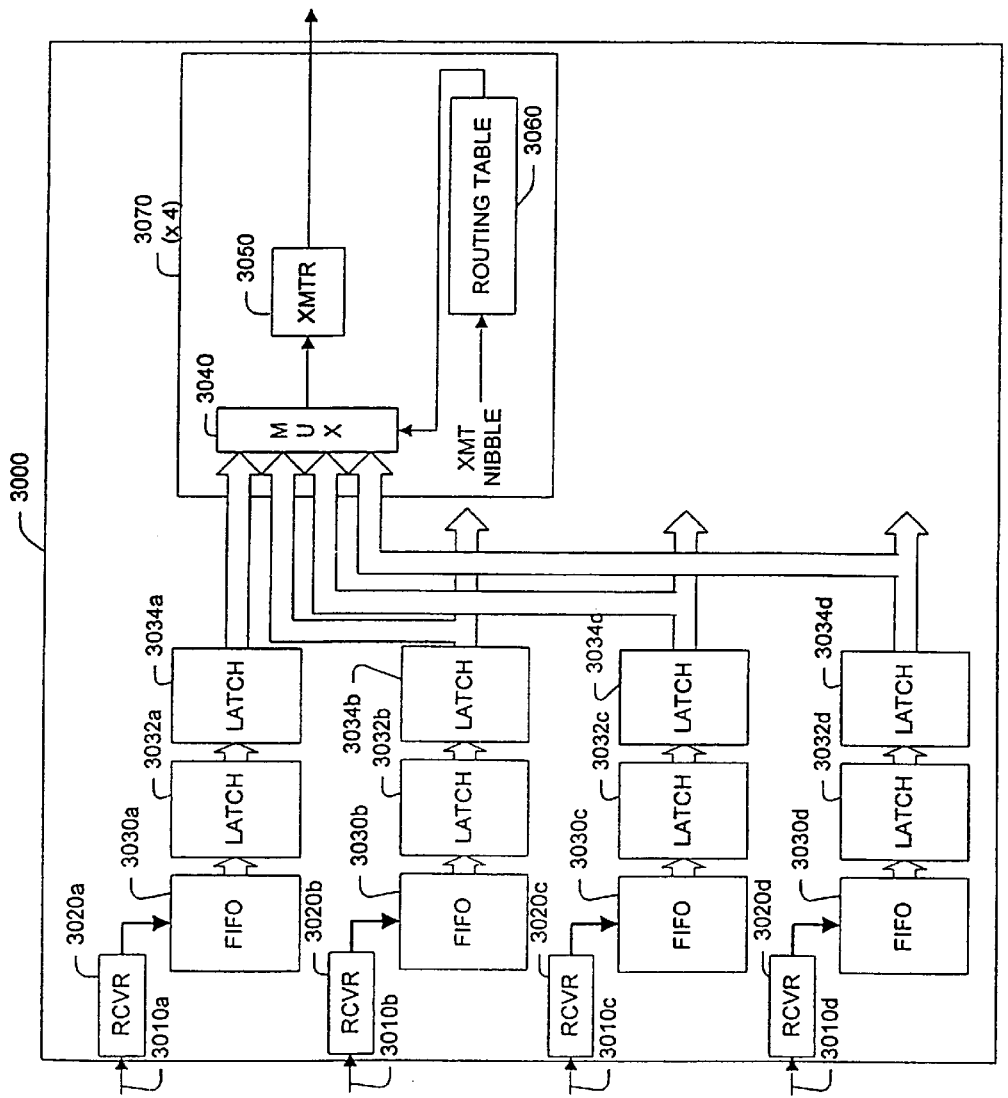

FIG. 17 is a block diagram illustrating a multi-zone router for connecting distinct arms of a synchronous logical ring network of the present invention.

Figure 18:
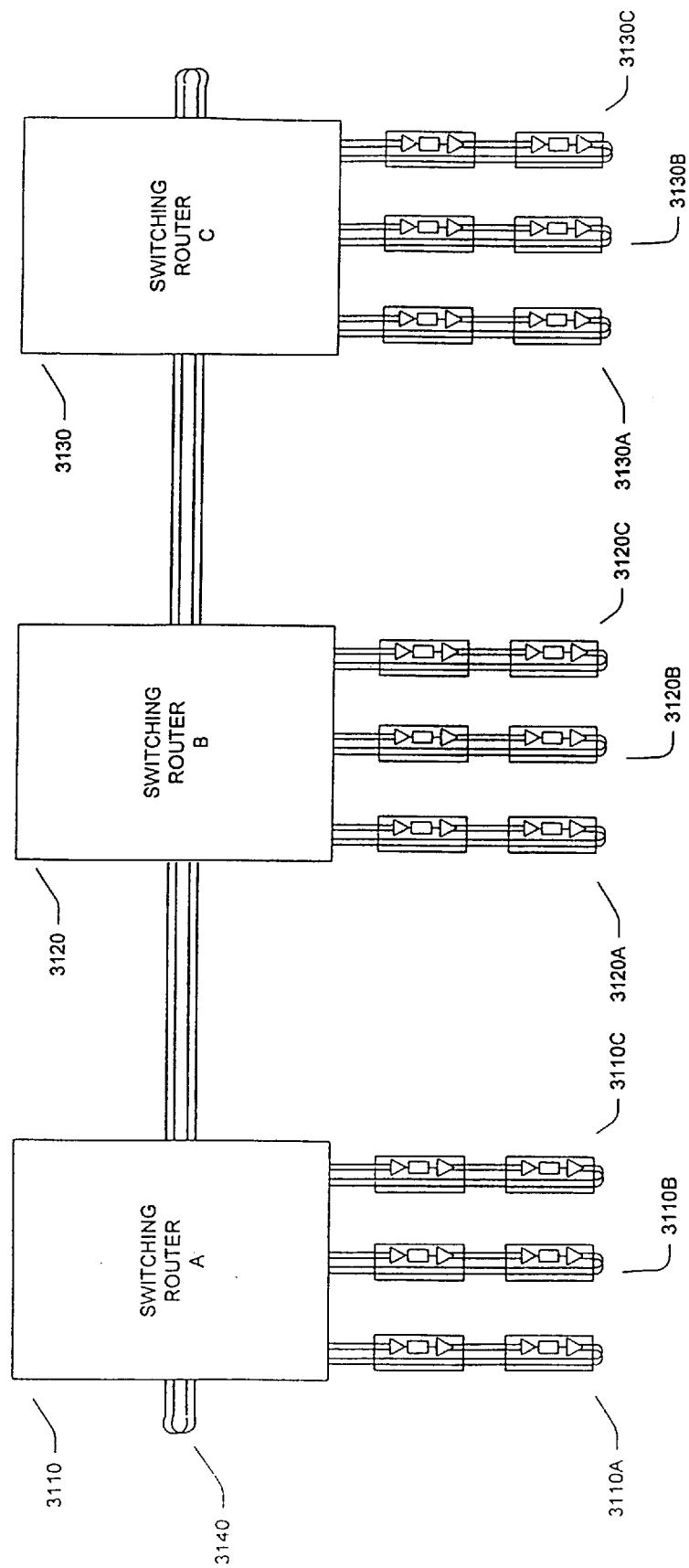

FIG. 18 is a system diagram illustrating the interconnection of multiple multi-zone routers for connecting distinct arms of a synchronous logical ring network of the present invention.

FIGS. 19(a)–(d) are schematic diagrams illustrating single, dual, bidirectional and dual-bidirectional transmission and receive drivers, respectively, of devices on a logical ring network of the present invention.

Figure 19A:
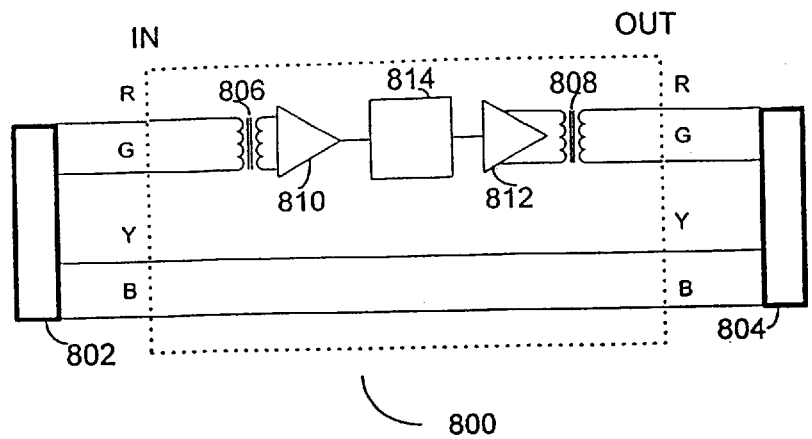
Figure 19B:
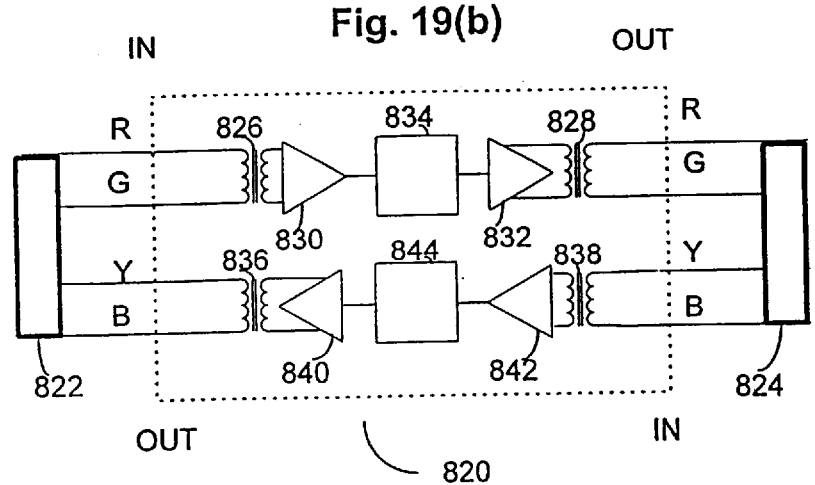
Figure 19C:
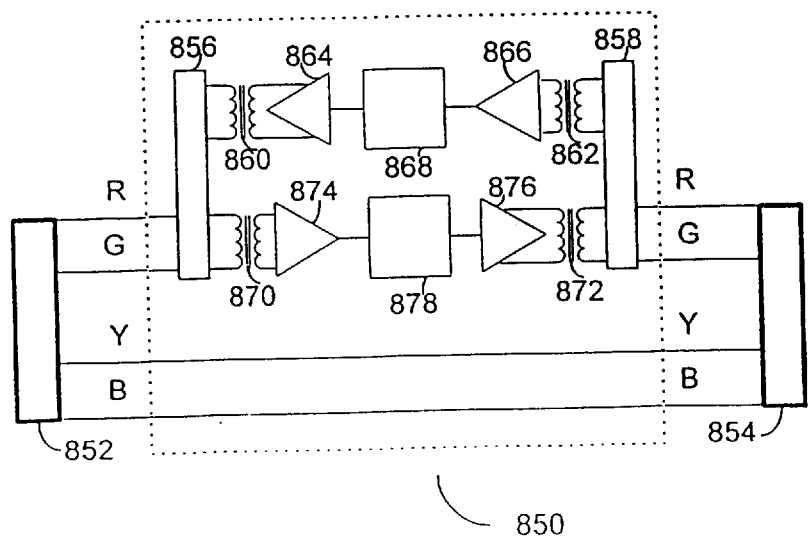
Figure 19D:
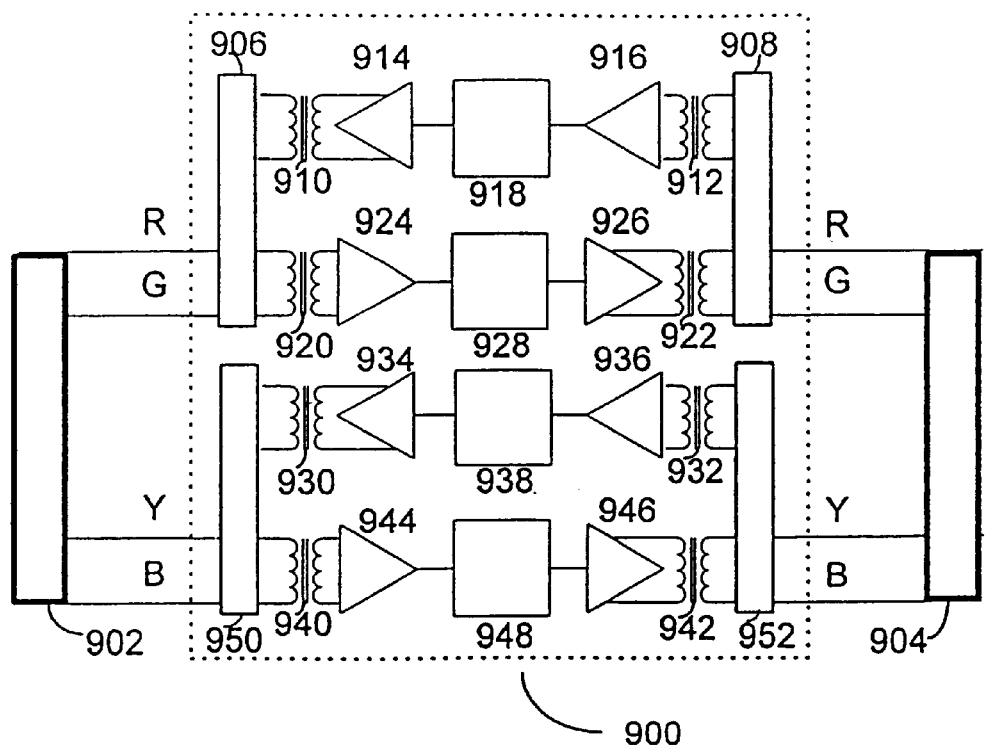
Figure 19E:
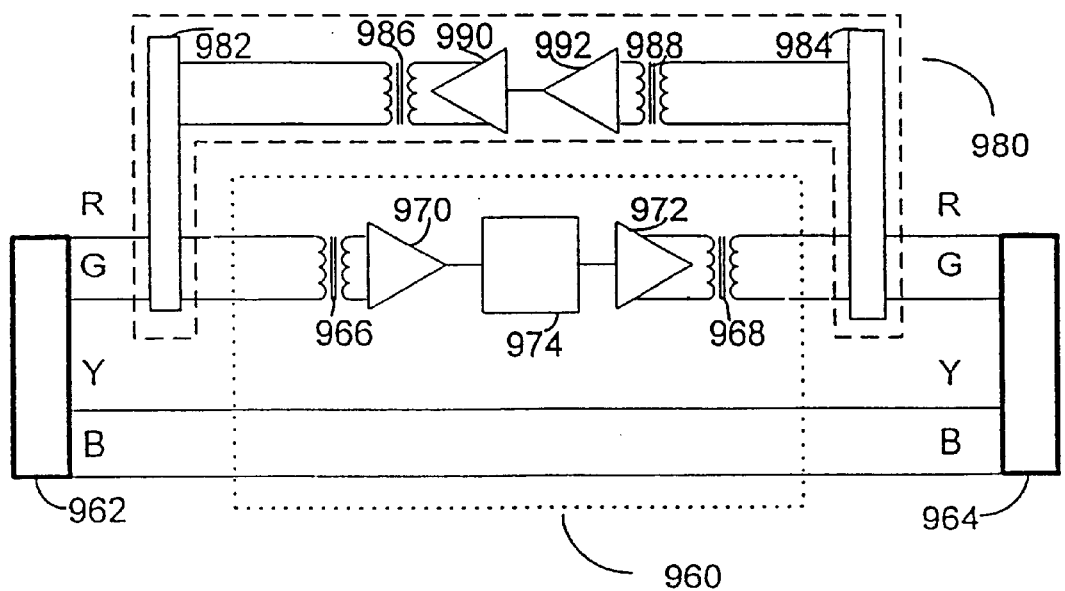

FIG. 19(e) is a schematic diagram of a device adapter for enabling devices having only unidirectional transmission and receive drivers to coexist with devices having bidirectional transmission and receive drivers on a logical ring network of the present invention.

Figure 20:
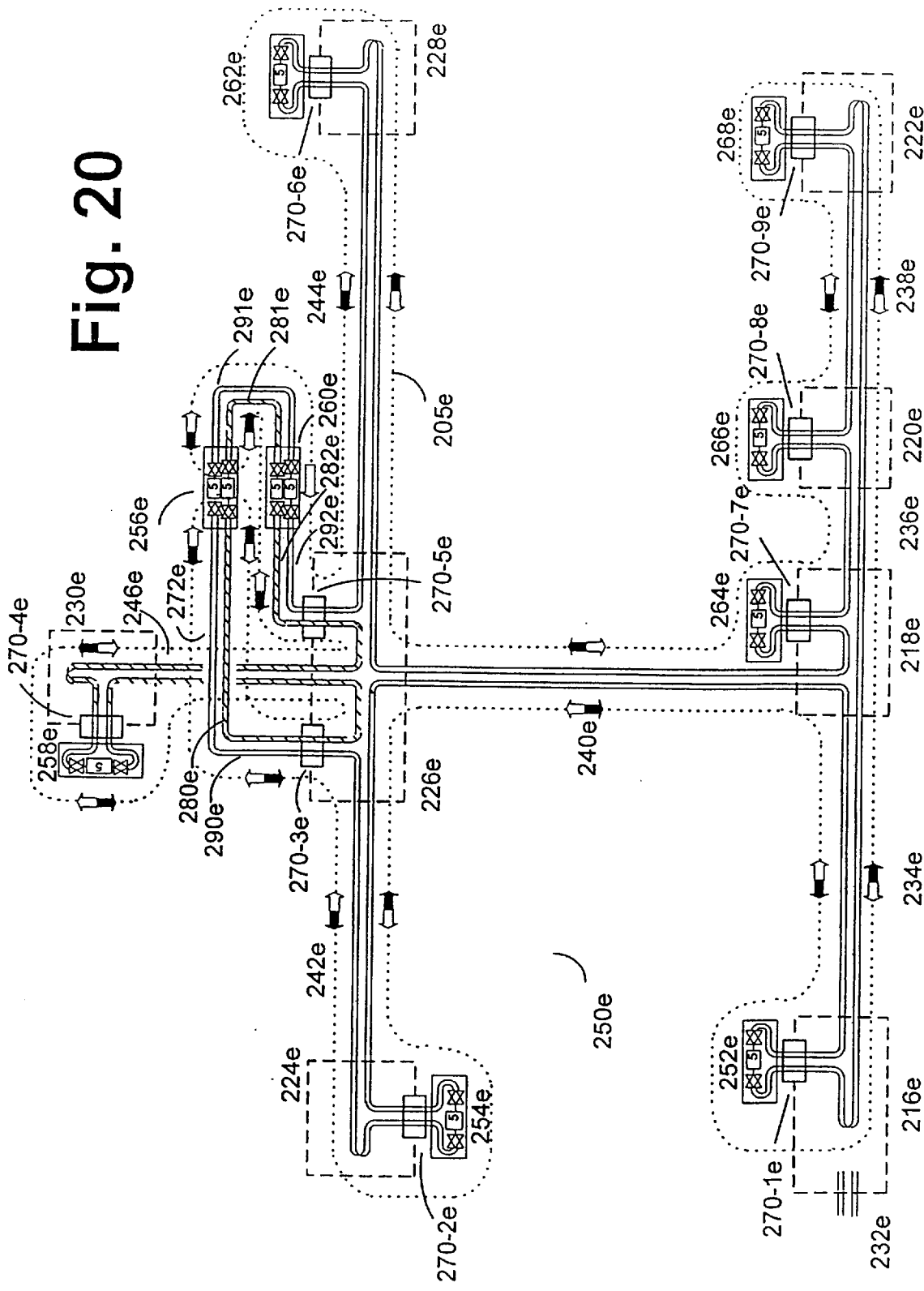

FIG. 20 is a system diagram illustrating the interconnection of devices having 5-level, dual and bidirectional transmission and receive drivers on a logical ring network of the present invention.

Figure 21A:
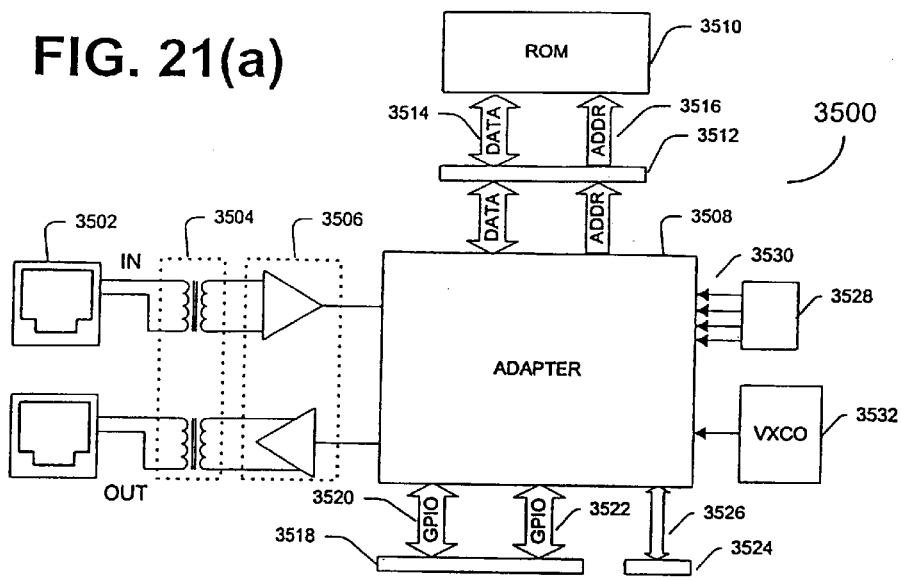
Figure 21B:
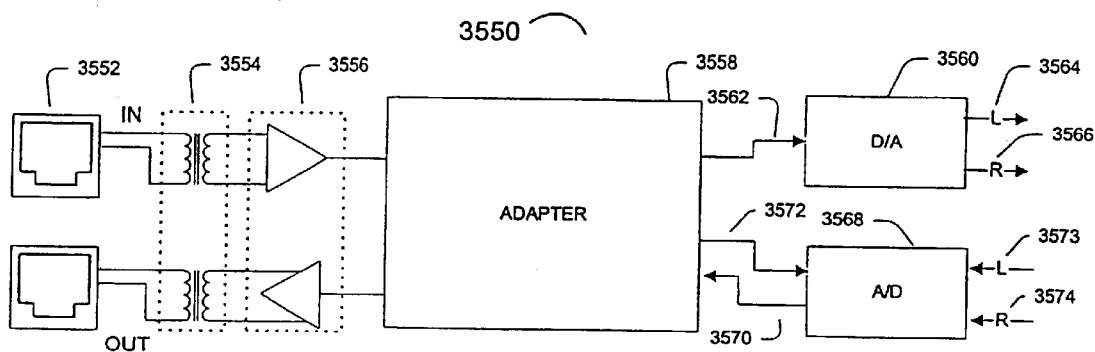
Figure 21C:
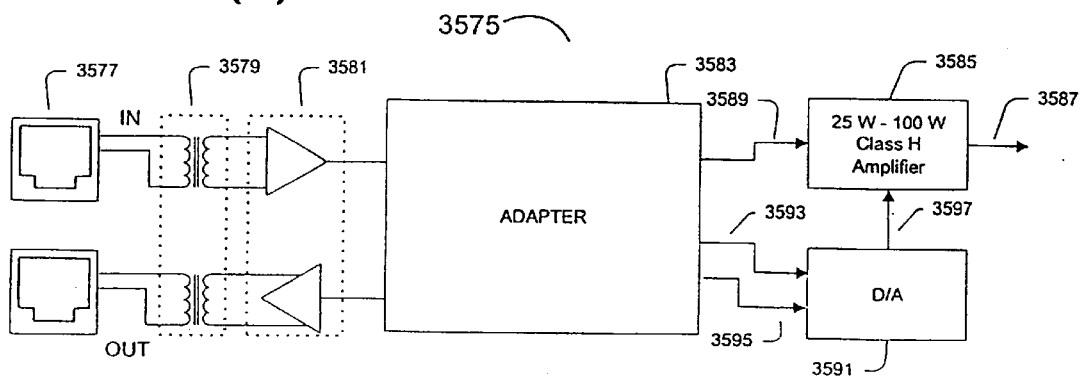
Figure 21D:
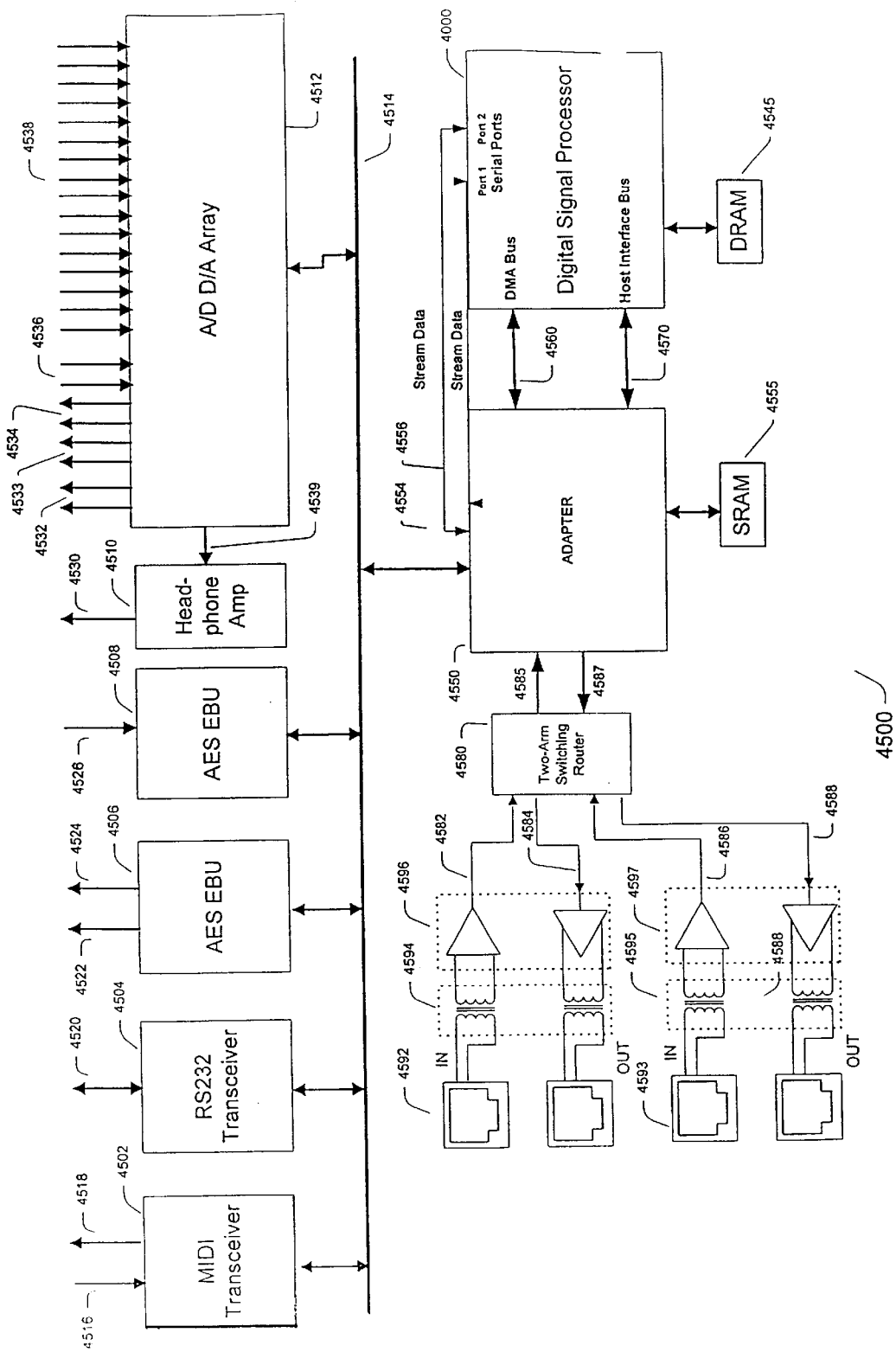
Figure 21E:
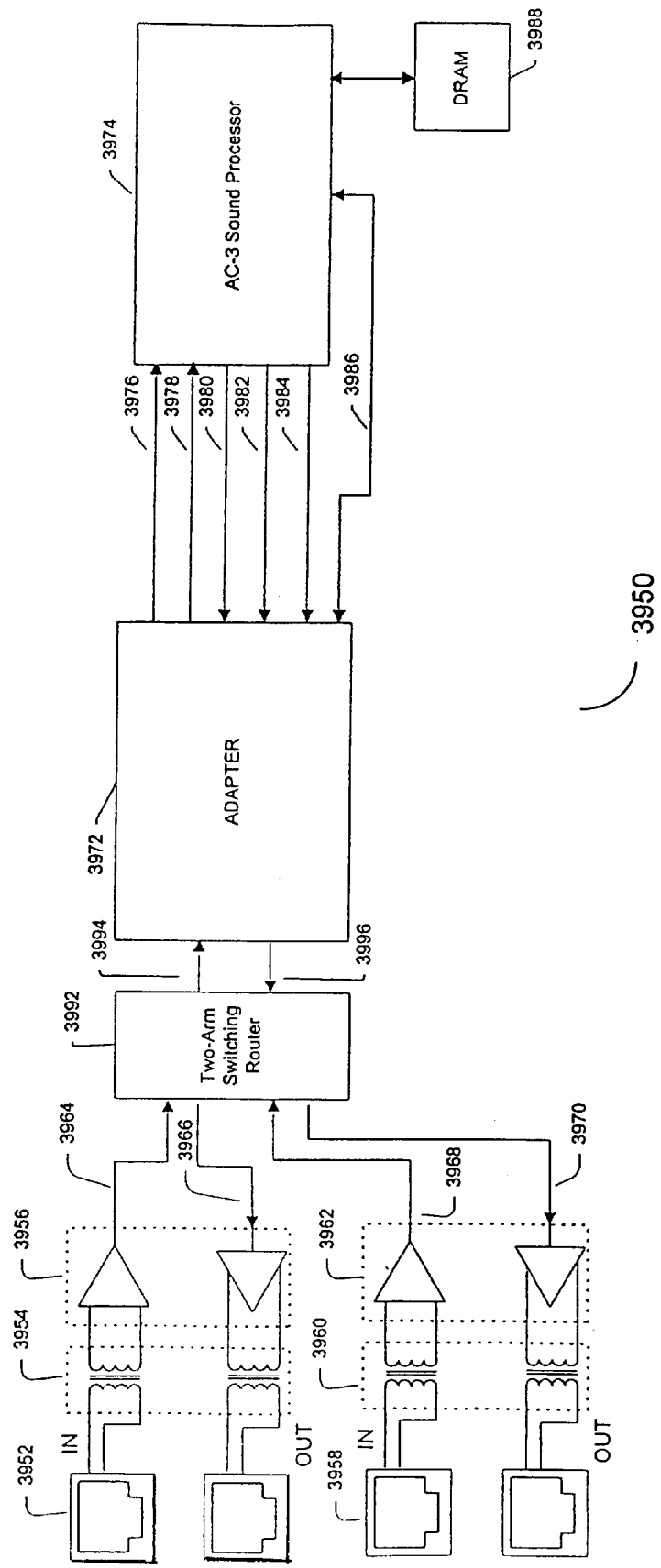
Figure 21F:
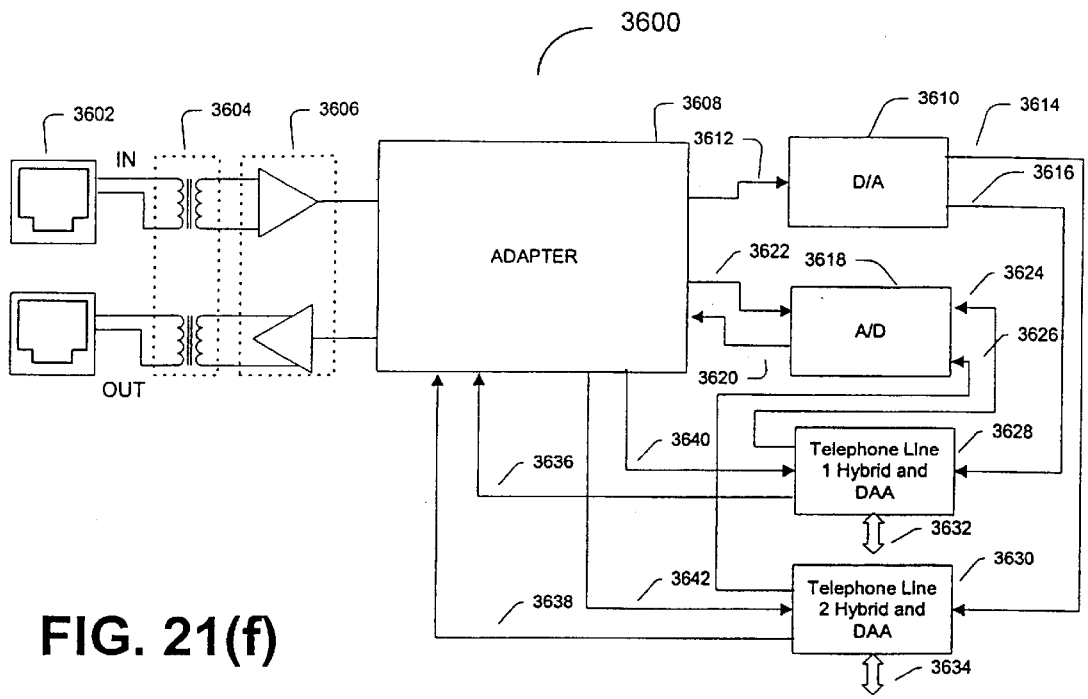
Figure 21G:
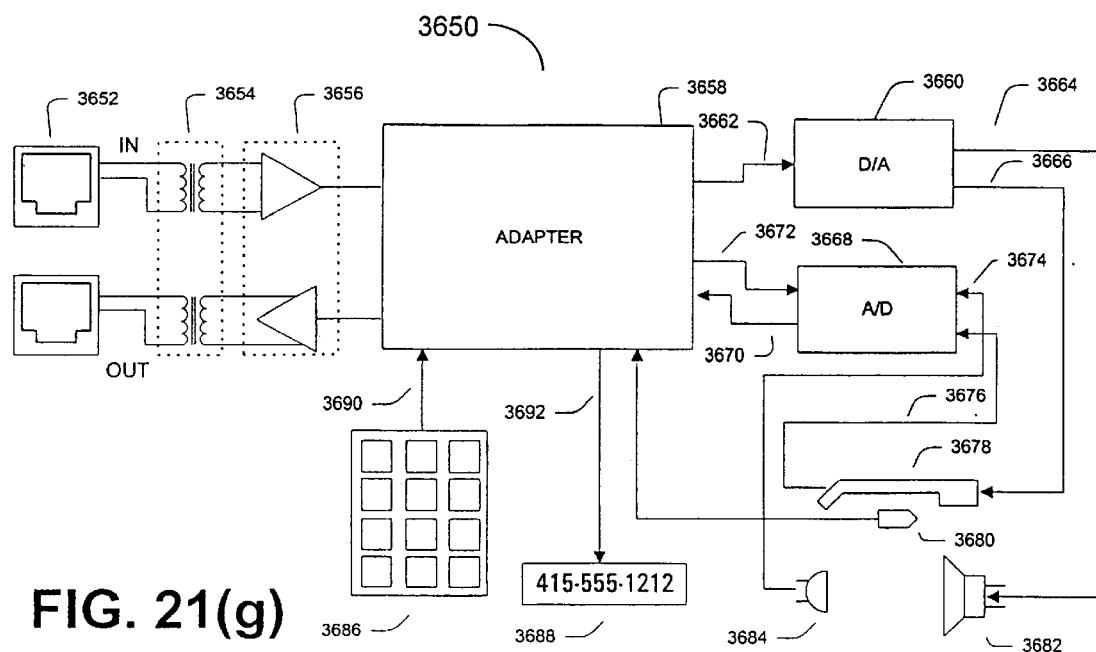
Figure 21H:
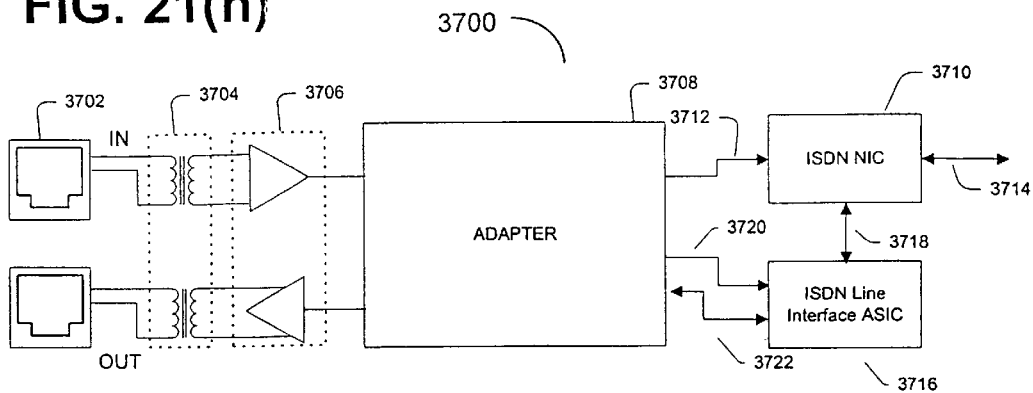
Figure 21I:
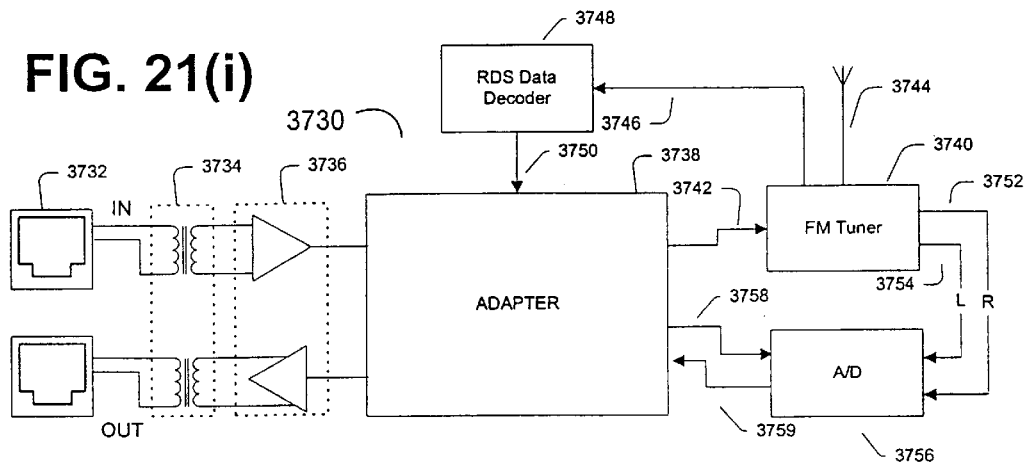
Figure 21J:
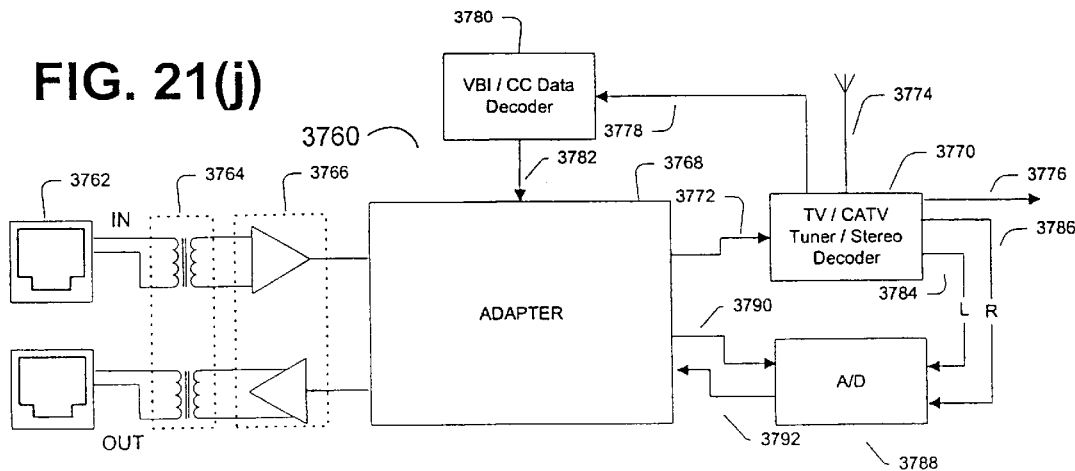
Figure 21K:
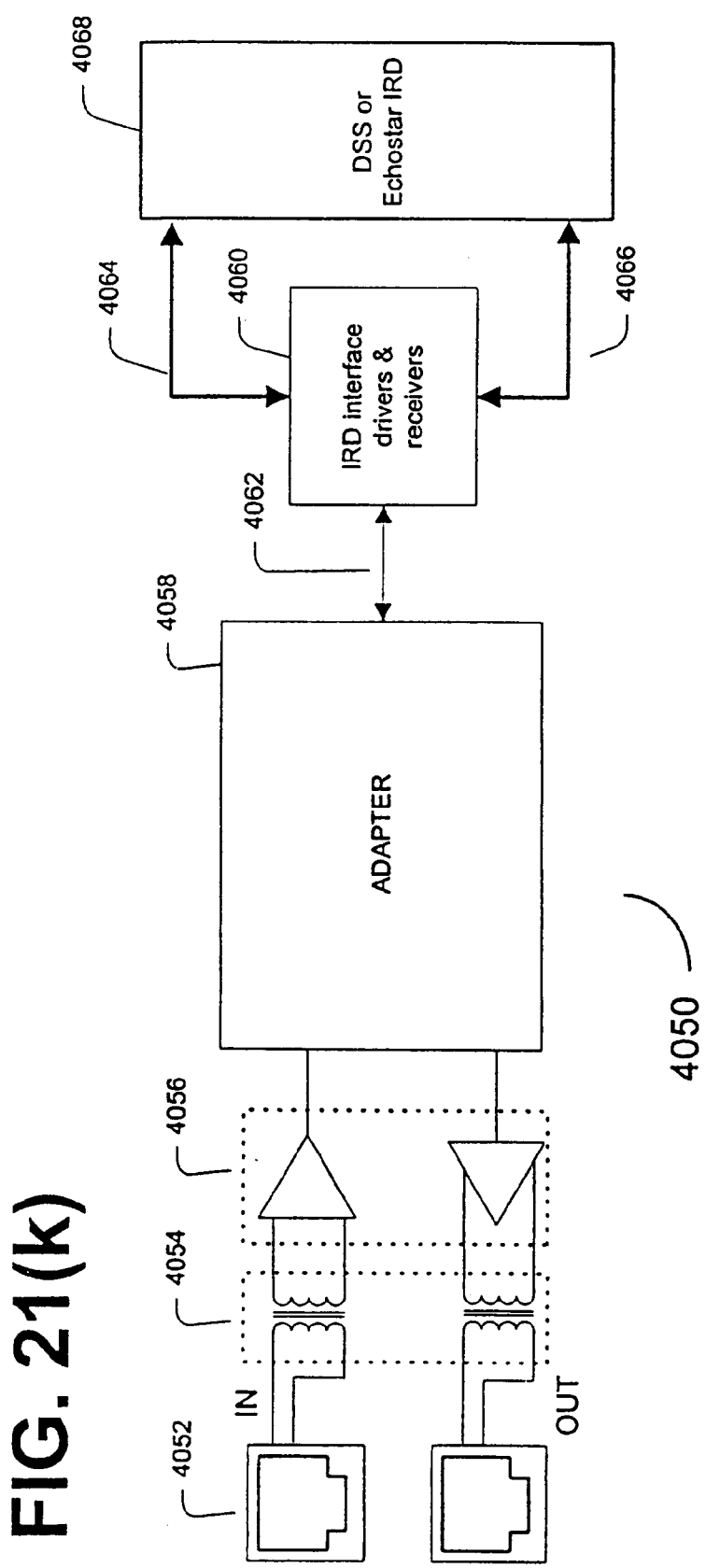
Figure 21L:
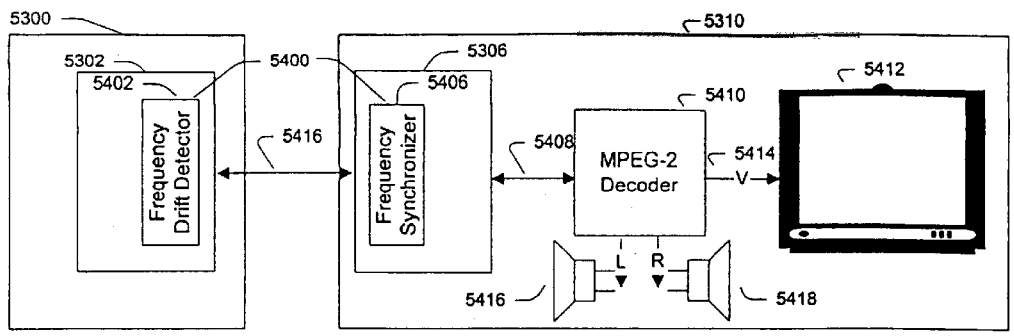
Figure 21M:
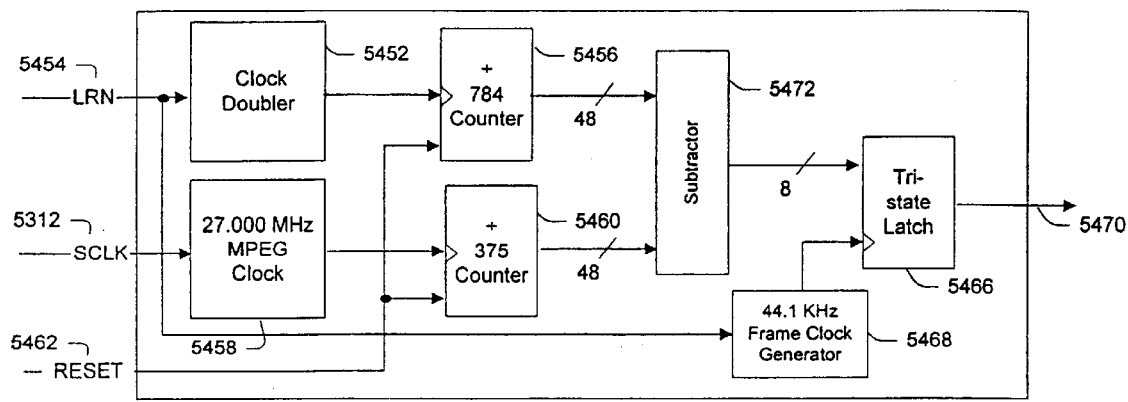
Figure 21N:
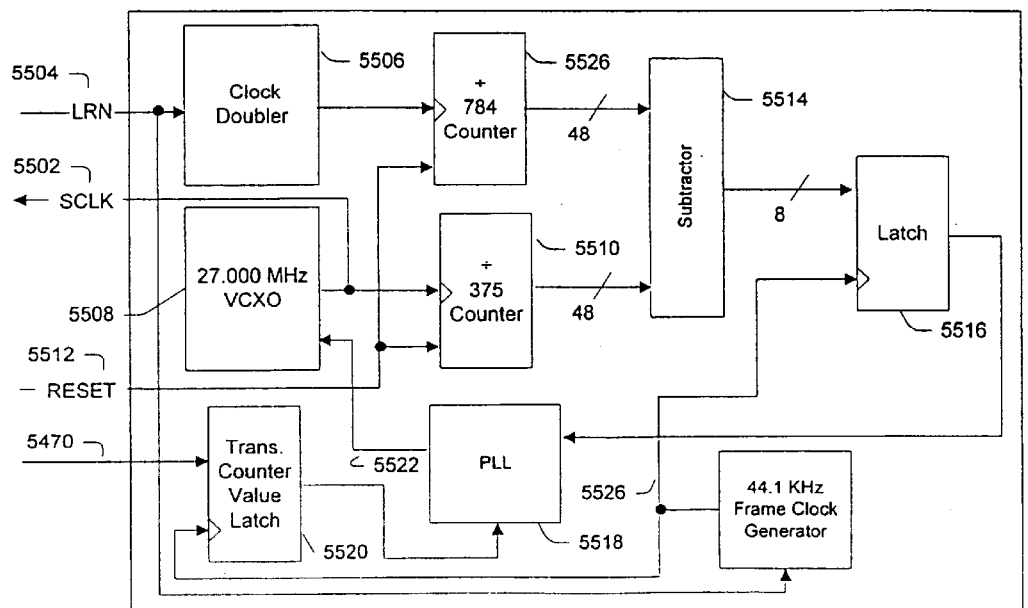
Figure 21O:
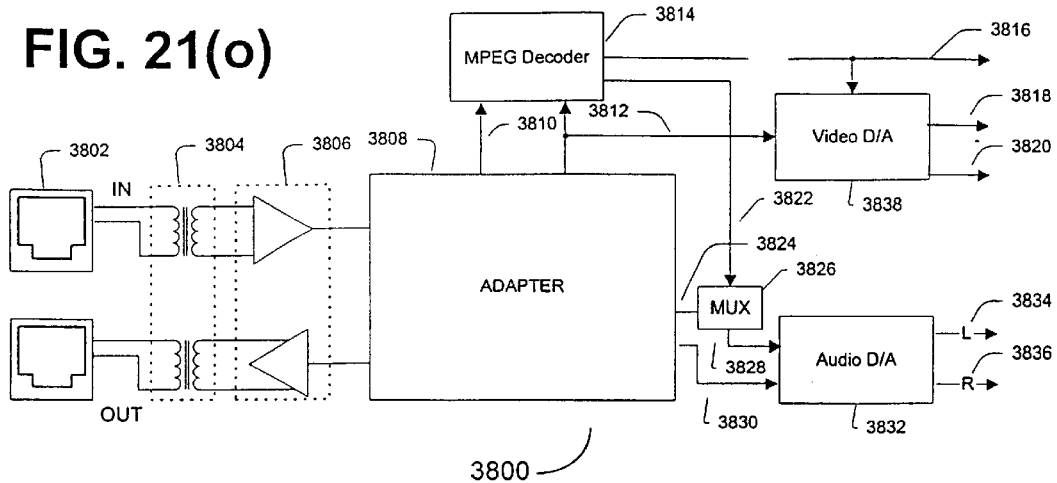
Figure 21P:
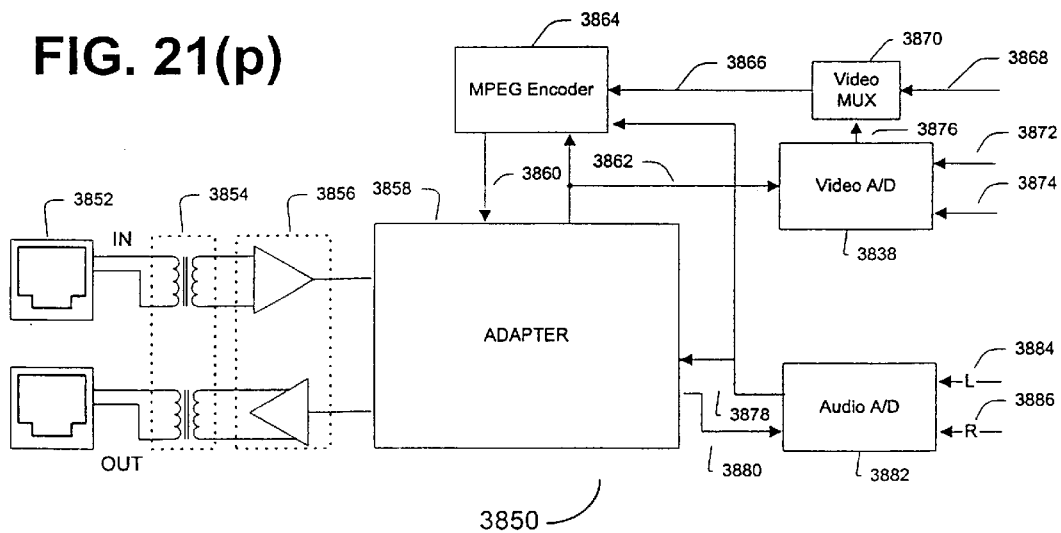
Figure 21Q:
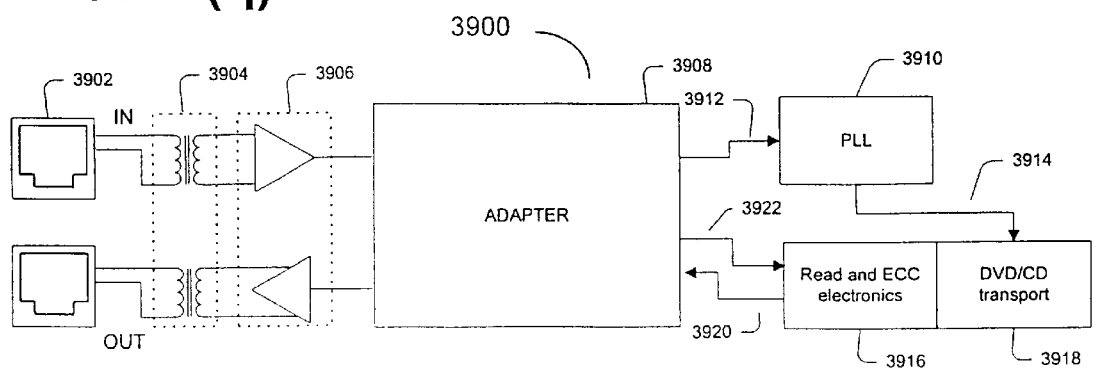
Figure 21R:
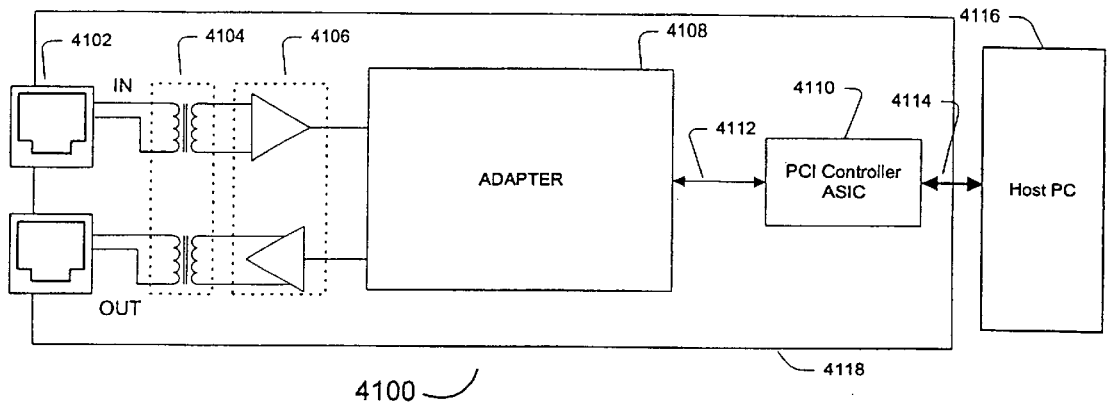
Figure 21S:
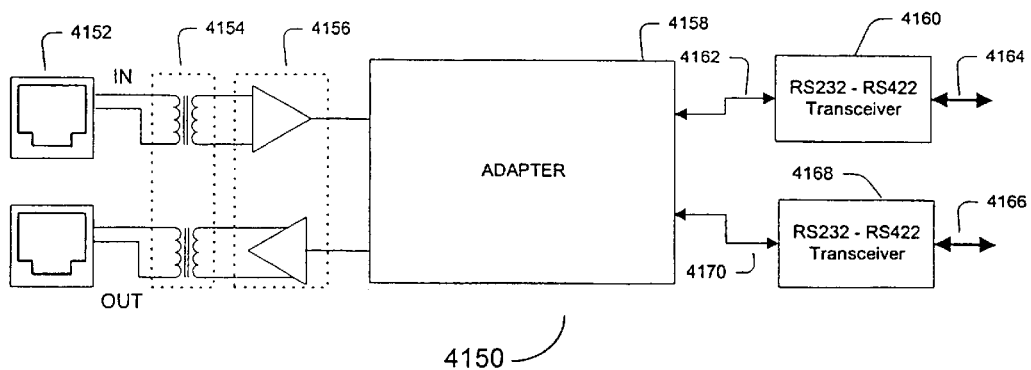
Figure 21T:
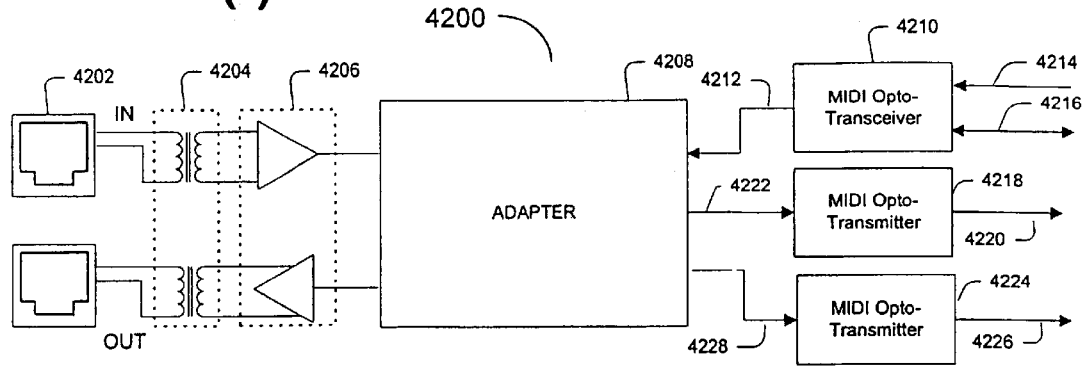
Figure 21U:
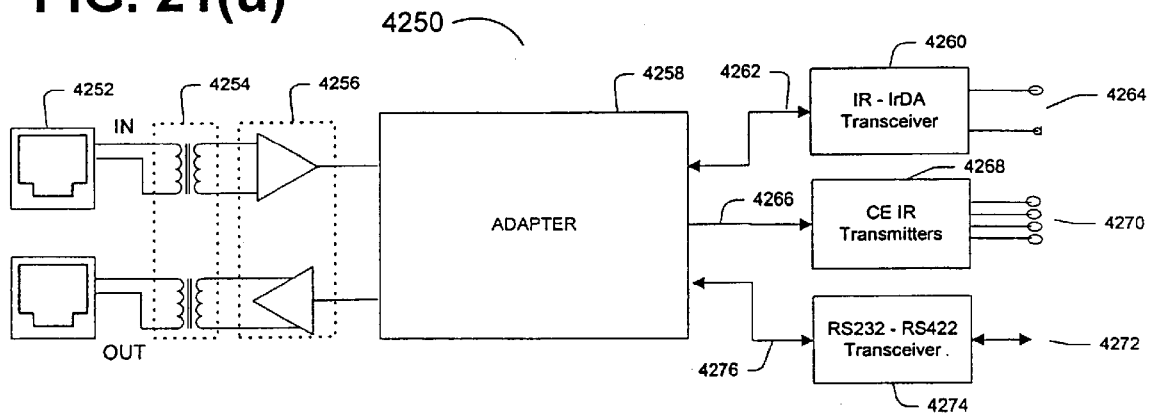
Figure 21V:
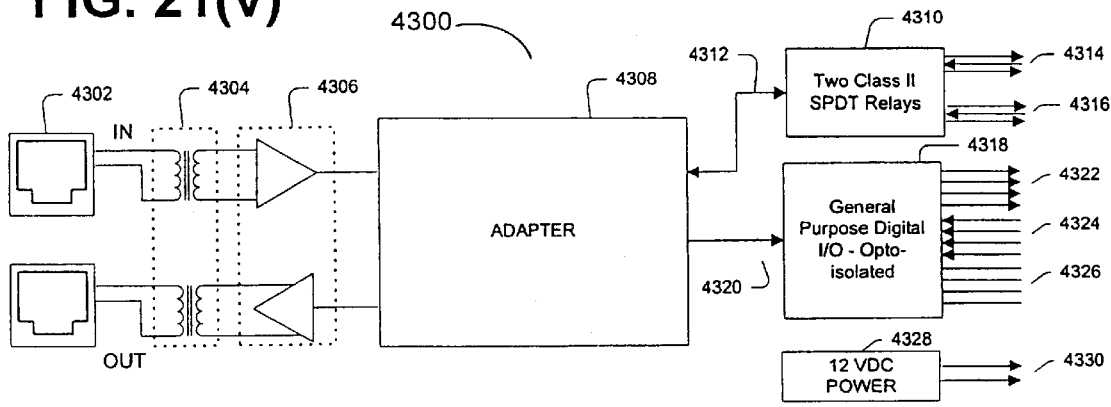
Figure 21W:
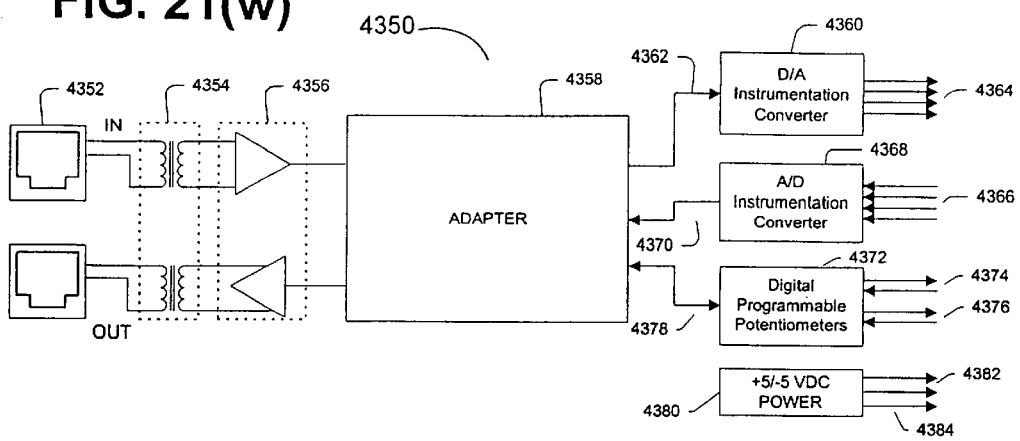
Figure 21X:
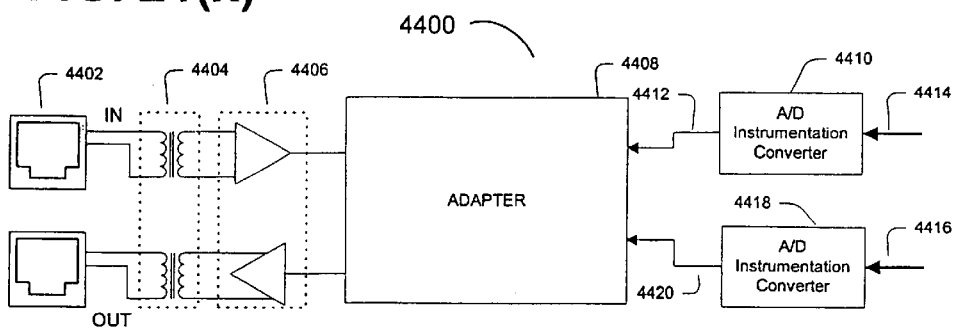
Figure 21Y:
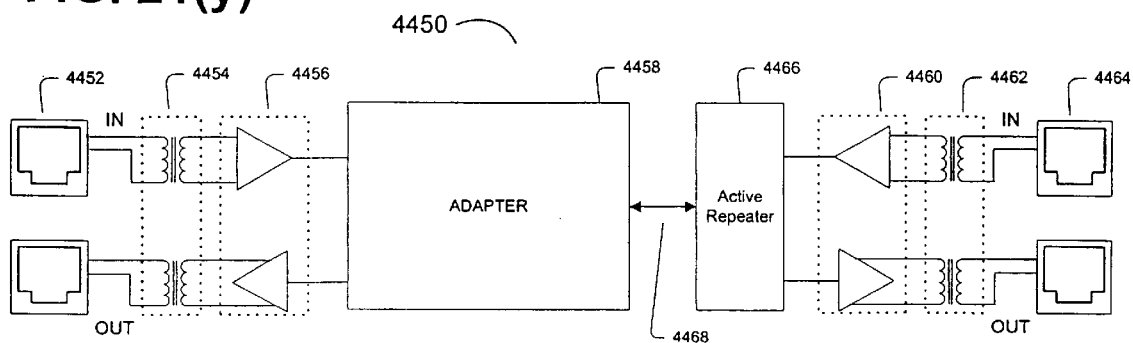

FIGS. 21(a)–21(y) are block diagrams illustrating key components of various network devices on a synchronous logical ring network of the present invention.

Figure 22:
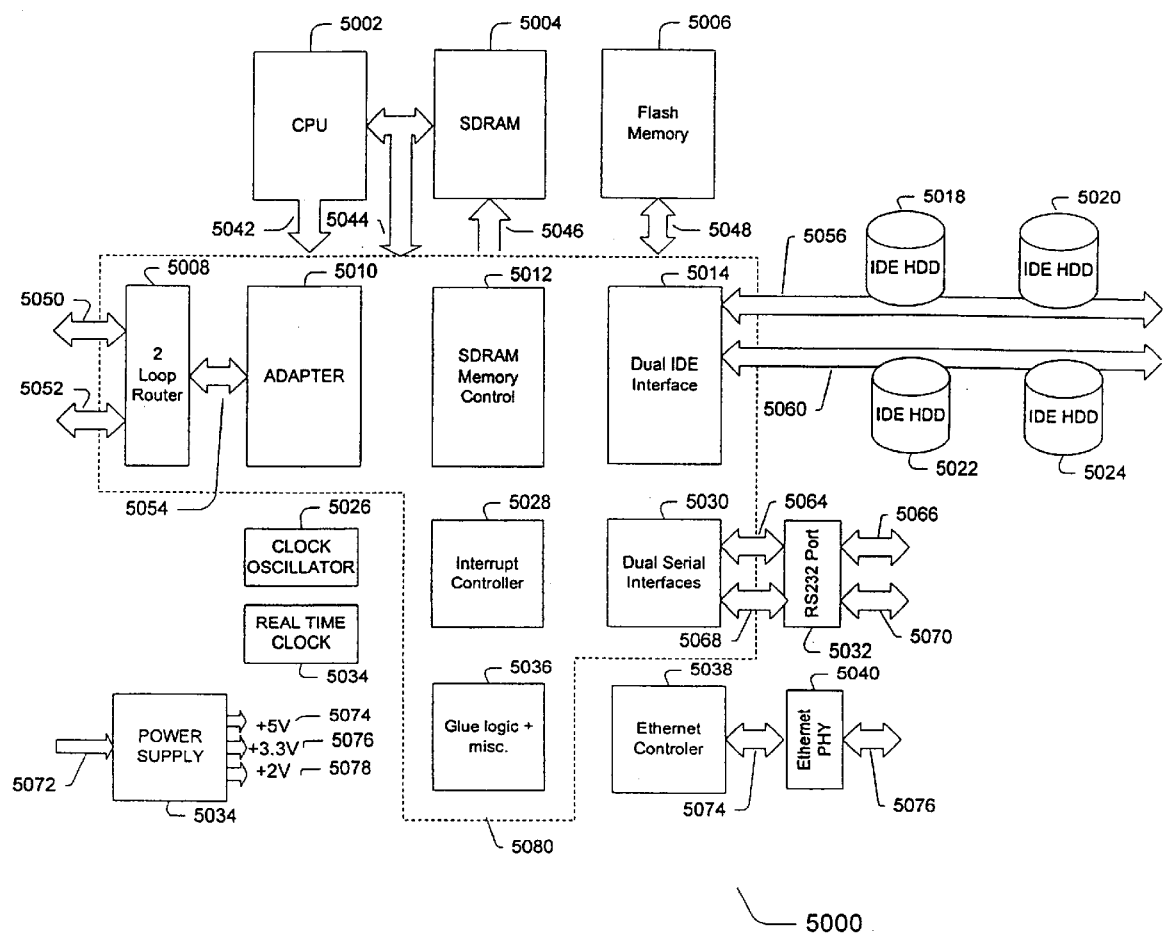

FIG. 22 is a block diagram illustrating a mass storage server device on a synchronous logical ring network of the present invention.

Figure 23:
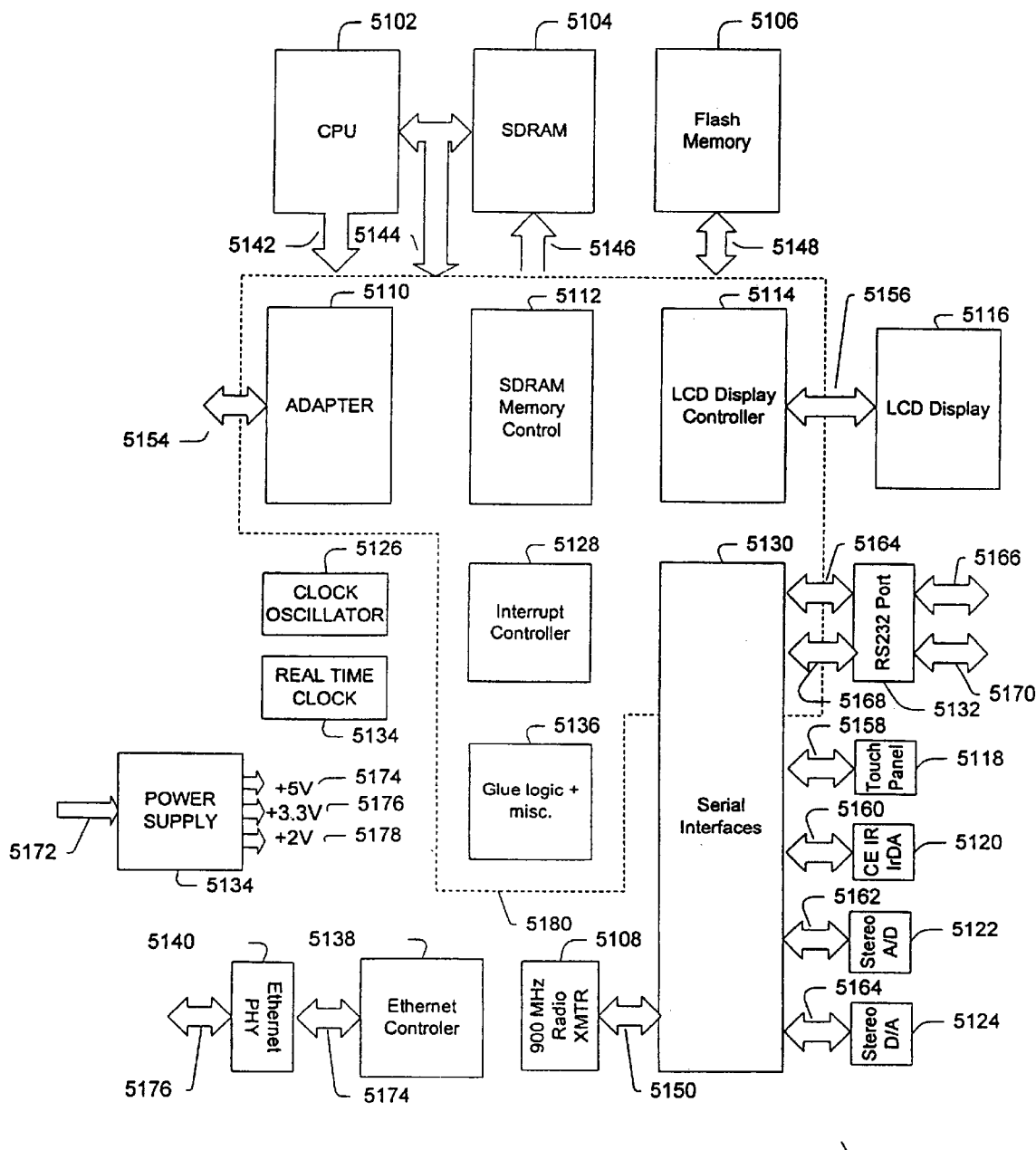

FIG. 23 is a block diagram illustrating a remote control/monitor human interface device on a synchronous logical ring network of the present invention.

IV. DETAILED DESCRIPTION

A. High-Level System Configuration

Figure 1:
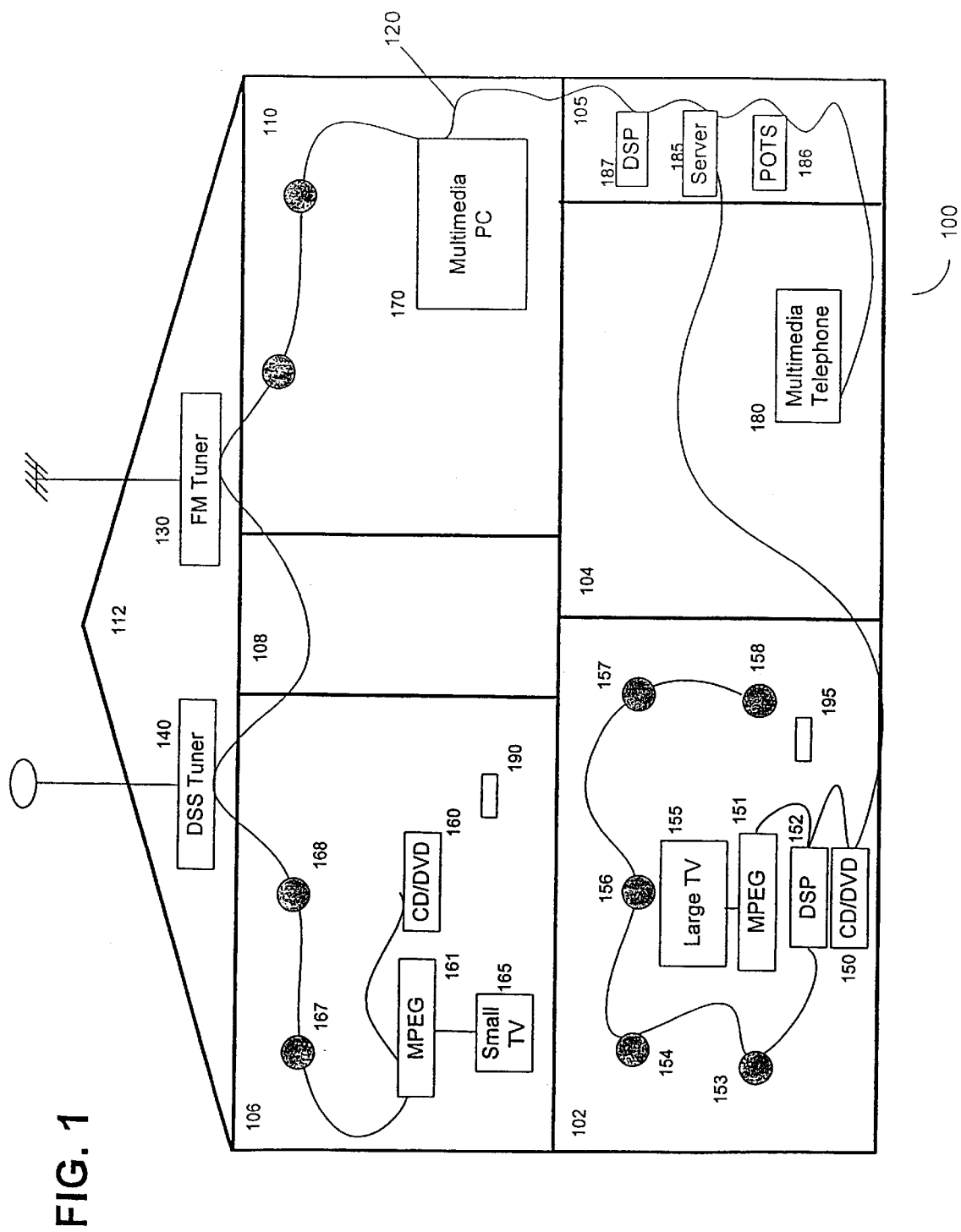
FIG. 1 is a system diagram illustrating a typical configuration of consumer electronics devices connected to a logical ring network of the present invention.

Illustrated in FIG. 1 is a typical system-level configuration of consumer electronics devices connected to a logical ring network 120 of the present invention throughout a typical home 100, having family room 102, kitchen 104, utility room 105, bedroom 106, hallway 108, den 110 and attic 112.

It should be noted that the present invention can be implemented with devices other than consumer electronics devices (e.g., business, industrial, professional and other devices) and in environments other than a home (e.g., office, hotel, apartment building, car, boat, recreational vehicle, etc.). The particular environment or application may result in a significantly different configuration than that illustrated in FIG. 1. The advantages of the present invention described below with reference to a network of consumer electronics devices in a home also apply to these other environments and applications.

It should be further noted that a logical ring network can be formed merely by connecting two network devices together with a standard RJ-11 telephone cable (as well as with standard or slightly modified RJ-11, RJ-12, RJ-45 or other connectors in other embodiments, as discussed below). More devices can be added to the network by daisy-chaining them directly to one of these two devices, or connecting them to a junction box (for distribution throughout home 100), as will be discussed in greater detail below. All devices and/or components illustrated in FIG. 1 are shown attached to logical ring network 120 in a daisy-chain fashion (either within a room or behind the walls via a junction box of house 100). The actual physical topology of logical ring network 120, and the manner in which devices are interconnected, will be discussed in greater detail below.

Broadcast FM audio is received by FM Tuner 130, where it is digitized and transmitted onto logical ring network 120. Broadcast MPEG2 audio/video information is received by DSS Tuner 140. Because such MPEG2 information already is in digital form and compressed, it can be transmitted directly onto logical ring network 120. As will be explained below for one embodiment, the MPEG2 decoding will occur only after such information leaves logical ring network 120 (e.g., it a television where the information will be decoded and decompressed for viewing).

In addition to these two broadcast audio/video sources, other source devices include CD/DVD players 150 (in room 102) and 160 (in room 106), as well as Multimedia PC 170 (in room 110) and Multimedia Telephone 180 (in room 104). Information transmitted by these source devices propagates around logical ring network 120 and can be received by any appropriate destination device, as will be described in greater detail below.

For example, an MPEG2 movie, received by DSS Tuner 140 or played at CD/DVD player 150 or 160, could be displayed on small television 165 and/or large television 155 (after being decoded by MPEG2 decoders 161 and 151, respectively). The audio extracted by MPEG2 decoder 161 could be transmitted back onto logical ring network 120 and played by left 167 and right 168 amplifier/speakers. The audio extracted by MPEG2 decoder 151 could be transmitted back onto logical ring network 120, processed by DSP (e.g., AC-3 surround sound decoder) 152, and then transmitted back onto logical ring network 120 and played by surround sound amplifier/speakers 153, 154, 156, 157 and 158. The systems in rooms 106 and 102 could be controlled by respective remote control/interface/monitor devices 190 and 195 (which could range from simple remote controls to complex controllers with large LCD screens capable of viewing computer graphics images, MPEG2 video, etc.).

As will be discussed below, virtually any information obtained or generated by one network device can be distributed "simultaneously" (i.e., within the same digital sample, appropriate to the media type) to any other network device, merely because such devices are connected to logical ring network 120. For example, server 185 in utility room 105 might be recording various digital audio/video programs/channels previously selected by a family member. Upon request, such information could be transmitted along logical ring network 120 for immediate viewing, or saved for later viewing (e.g., to avoid being overwritten as new programs are recorded). Targeted information, e.g., local advertisements, could even be added to such saved programs (perhaps replacing national advertisements), as could material tailored to any particular "target group" (e.g., middle-class suburban homeowners), or even an individual viewer or family.

Multimedia PC 170 could be used to control devices on logical ring network 120, as well as to transmit and receive digital media to/from other network devices. For example, a family member in room 102 might use control device 195 to control/display PC graphics on the screen of device 195. Multimedia telephone 180 could be a digital telephone, capable of accessing the legacy analog telephone network via POTS adapter 186. Such devices could have built-in PBX functionality, or could provide such functionality via general-purpose DSP device 187.

As can be seen from this relatively simple example, logical ring network 120 provides a great deal of flexibility. Not only can any network device distribute real-time continuous digital media streams (and possibly asynchronous data) to any other network device, but such devices (including legacy devices connected via an adapter, as well as new "digital-ready" devices) can exhibit functionality not feasible with existing technologies, such as recording programs already in progress in their entirety.

It is significant to note that network devices need not be complex or expensive to perform basic functions such as communicating with the network and transmitting and receiving digital media streams. Yet, by adding devices of greater complexity, particularly CPU-based devices controlled by software or firmware, the possibilities are virtually endless (as will be discussed below).

B. Synchronous Logical Ring Network

Figure 2A:
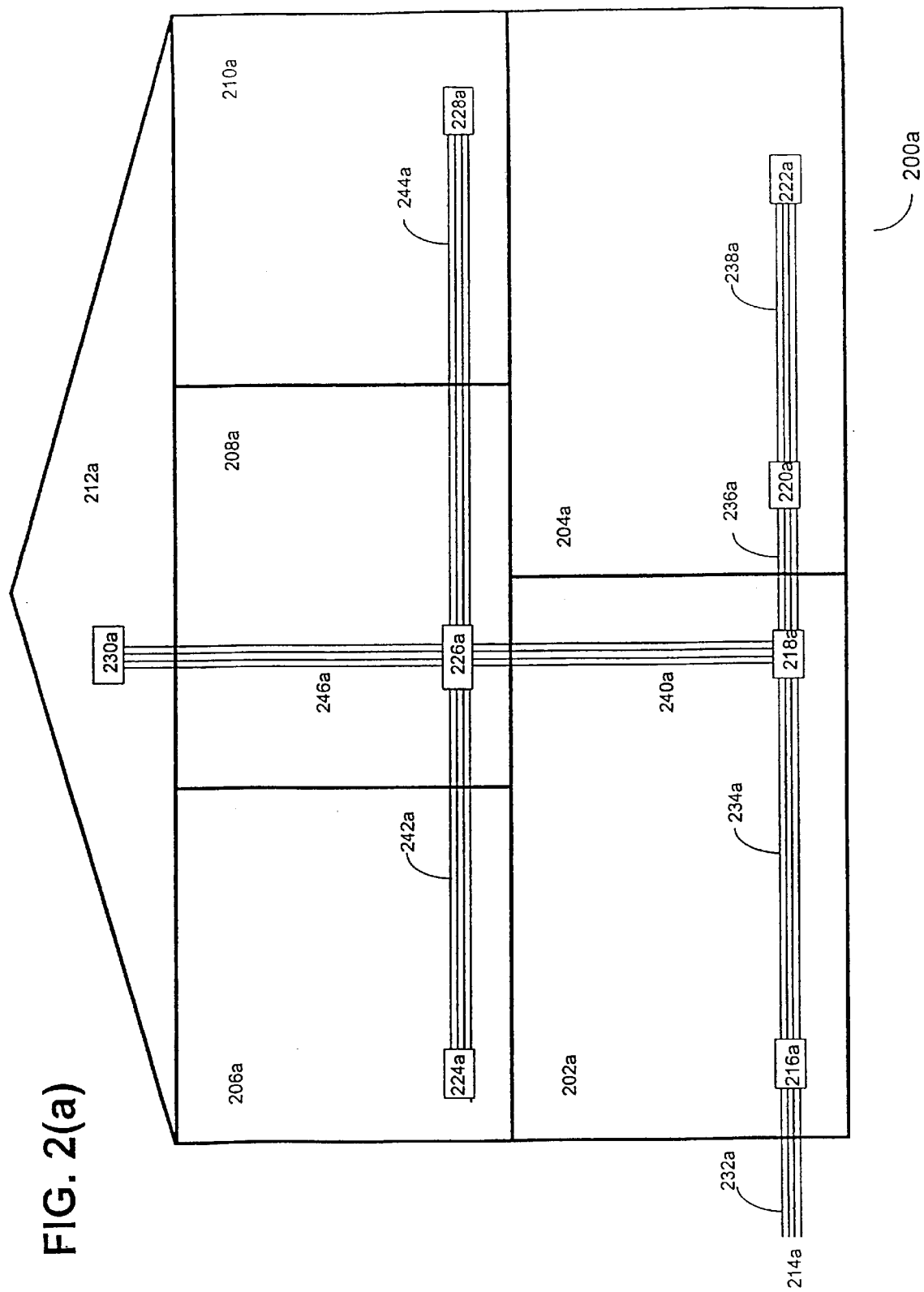
FIG. 2(a) is a system diagram illustrating a standard physical topology for an analog telephone network in a typical home environment.

1. Transforming Arbitrary Physical Topologies into a Logical Ring Network a) Creating a Default Network Path on a Logical Ring Network With reference now to FIG. 2(a), a typical house plan 200a is presented, with rooms 202a, 204a, 206x, 208a, 210a and 212a. Standard unshielded twisted pair telephone wiring segments 232a, 234a, 236a, 238a, 240a, 242s, 244a, and 246a interconnect the telephone network 214a and junction boxes 216a and 218a in room 202a, 220a and 222a in room 204a, 224a in room 206a, 226a in room 208a, 228a in room 210a, and 230a in room 212(a). The wiring forms a three-pronged star or T-junction node at junction box 218a, a four-pronged star or node at junction box 226a, as well as terminator or end nodes at junction boxes 222a, 224a, 228a and 230a (and at junction box 216a once the network is formed), and a "middle" node at junction box 220a.

Because standard residential telephone infrastructure requires junction boxes to be connected in parallel via only a single pair of unshielded twisted pair wiring, the actual physical topology in typical homes may well include many of these multiple-pronged junction boxes. This technique simplifies the task of wiring junction boxes together, One need merely run one pair from a given junction box to another nearby junction box. Typically, however (as a historical by-product of the advent of lighted "Princess" telephones), most homes have at least two pairs run in tandem to each junction box.

As will be illustrated below, a logical ring network can be formed using existing "in-wall" telephone wiring segments 234a, 236a, 238a, 240a, 242a, 244a, and 246a. This logical ring network can be formed from the arbitrary physical topologies found in standard telephone networks merely by modifying the wiring connections at the junction boxes, as will be discussed below. In typical homes, it will not be necessary to incur the potentially significant additional expense of running pairs among junction boxes behind the walls.

Figure 2B:
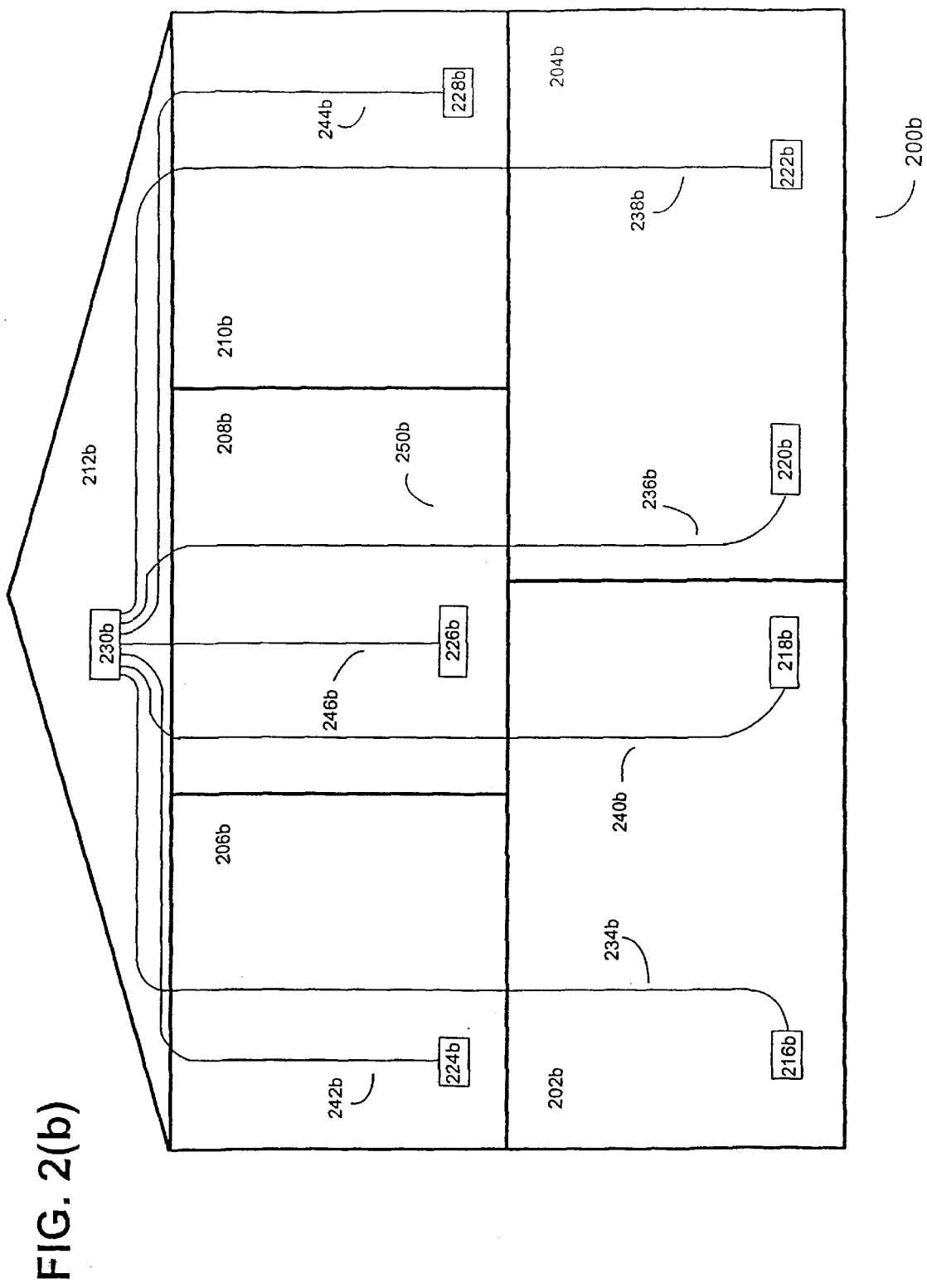
FIG. 2(b) is a system diagram illustrating a standard physical star topology for a data and/or voice network in a typical home environment.

Newer homes, or homes that have been retrofitted via custom "in-wall" wiring, may well have an even more flexible physical topology such as the "star" configuration shown in FIG. 2(b). Each junction box 216b, 218b, 220b, 222b, 224b, 226b, and 228b is wired as a "home run" back to a central location, i.e., junction box 230b. As will be discussed in greater detail below, this physical star topology greatly simplifies the subsequent addition of a switching router device to the logical ring network to increase overall network bandwidth by segmenting the logical ring network into multiple zones or network "arms."

Moreover, the wires themselves may be of a different type from standard residential unshielded telephone wiring. Category 3 or Category 5 unshielded twisted pair wiring, or even coaxial or fiber optic cable, may be installed in order to support higher-speed signal propagation, and thus provide increased cable lengths and/or network bandwidth. As will become apparent, the logical ring network of the present invention can support virtually any transmission media, including wireless configurations.

It also should be noted that, in many star topologies, 4 twisted pairs are used (instead of 2 pairs) for Ethernet and similar networks. Ethernet, for example, uses only 2 of those 4 pairs, leaving the remaining 2 pairs free. One could, for example, dedicate 2 of those pairs to an existing Ethernet network, and utilize the remaining 2 pairs for the logical ring network of the present invention. As will be discussed below, one also can utilize the logical ring network of the present invention to support higher-level protocols, including TCP/IP, RS232, etc. Other variations are possible, of course, depending upon the number of pairs available. A logical ring network can even be formed using a single pair of wires, in a particular configuration discussed below. For simplicity, however, the following discussion of modifications to physical star topologies will reference the more typical 2-pair embodiment of a logical ring network, recognizing that additional pairs could be utilized for other purposes.

A logical ring network also can be formed from this physical star topology by modifying the wiring connections among "in-wall" wiring segments 234b, 236b, 238b, 240b, 242b, 244b, and 246b (each multiple-pair wiring segment represented by a single line) at junction boxes 216b, 218b, 220b, 222b, 224b, 226b, 228b and 230b.

As will be illustrated below, regardless of the network's physical topology, a single path can be created, referred to herein as the "default network path," which traverses each network device in a consistent order on the logical ring. Although signals travelling along this default network path may encounter a junction box and/or device multiple times per "revolution," network devices typically will be connected such that they process signals exactly once per "revolution," as is illustrated in FIG. 2(c), for example, by junction box 226c and device 268c (at junction box 222c).

As will be explained in greater detail below, network devices on a logical ring network of the present invention are synchronized to one another; and each imposes a constant amount of delay (differing from device to device) to process signals. Given that signals travelling along the default network path encounter each network device exactly once per "revolution" around the entire logical ring network, the signal propagation time around the logical ring network along this default network path (and between any two particular devices along the way) remains constant. As a result, network devices are afforded a fixed amount of total network bandwidth for sending and receiving information along this default network path. Various means of increasing network bandwidth will be discussed in greater detail below.

b) Connecting Network Devices to a Logical Ring Network

Figure 2C:
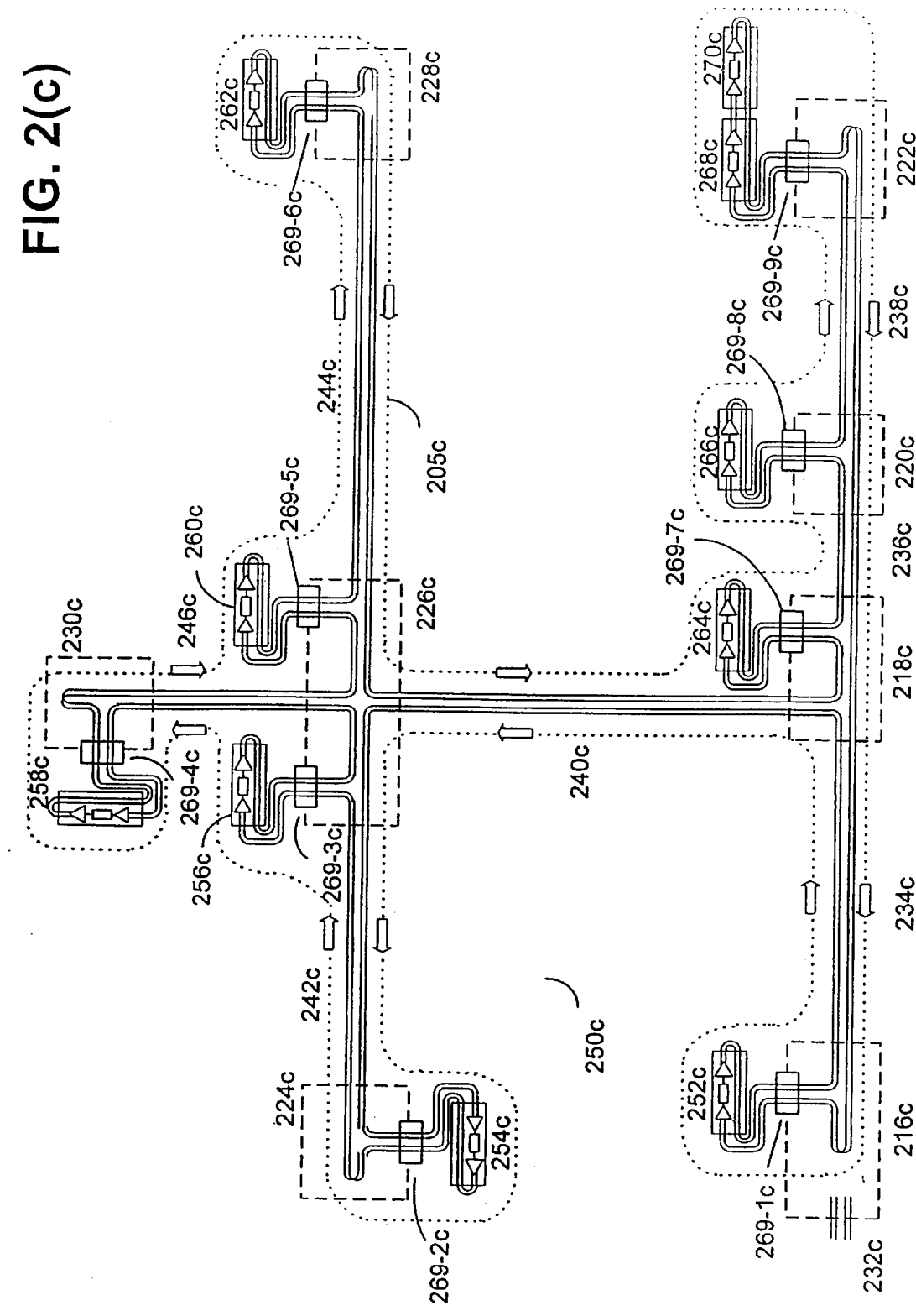
FIG. 2(c) is a system diagram illustrating the transformation of a standard physical topology for an analog telephone network into a logical ring network of the present invention.

FIG. 2(c) illustrates how network devices are connected at the junction boxes of logical ring network 250c. Devices 252c, 254c, 256c, 258c, 260c, 262c, 264c, 266c and 268c are connected, respectively, to junction boxes 216c, 224c, 226c, 230c, 226c (again), 228c, 218c, 220c and 222c, via jacks 269-1c, 269-2c, 269-3c, 269-4c, 269-5c, 269-6c, 269-7c, 269-8c, and 269-9c. In addition, device 270c is "daisy-chained" to device 268c.

Each device receives information on one "incoming" pair of wires and transmits information on one "outgoing" pair of wires. Typically, devices will have at least two jacks (not shown) to enable them to be daisy-chained together, e.g., within a room of a house. In such cases, as is illustrated by devices 268c and 270c, the two jacks can be wired together such that information traveling through junction box 269–9c may be received by device 268c via a first of its two jacks, processed by device 268c and transmitted via its other jack to daisy-chained device 270c, where it eventually will "loop" back to device 268c via that other jack after being processed by device 270c, and finally "loop" back to junction box 269-9c via the first jack of device 268c.

As noted above, one can create a logical ring network (as well as extend an existing logical ring network) merely by daisy-chaining devices to one another, without connecting any devices to a junction box, and thus obviating the need to perform any wiring modifications. To extend the logical ring network to another room of a house, for example, one could daisy-chain RJ-11 cables between the rooms. Even if this were not practical, one would only need to modify the wiring at a single junction box in each room to connect the rooms. Thus, a logical ring network can be extended gradually throughout a house to add new devices as the need arises.

In the embodiment illustrated in FIG. 2(c), network devices each contain only a single unidirectional transceiver (shown as a single pair of receiver/transmitter triangles pointing in the same direction). As a result, each network device is capable of transmitting and receiving information only along a single path. Thus, signals propagate only along the default network path 205c (discussed in greater detail below).

Starting, for example, at device 252c, information would be transmitted along one pair of wiring segments 234c, 240c and 242c to device 254c, and then along the other pair of segment 242c to device 256c, along one pair of segment 246c to device 258c, and then along the other pair of segment 246c to device 260c, along one pair of segment 244c to device 262c, and then along the other pair of segments 244c and 240c to device 264c, then along one pair of segment 236c to device 266c, then along one pair of segment 238c to device 268c, and then to daisy-chained device 270c where it would pass back through device 268c and finally return to device 252c along the other pair of segments 238c, 236c and 234c.

It should be noted that, in another embodiment, any wiring segment between two devices could be replaced with a unidirectional and/or bidirectional wireless link (RF, infrared, etc.). For example, by employing wireless transceivers at the two endpoints of a chain of devices having unidirectional transceivers, a logical ring network could be constructed with only a single pair of wires, with the wireless link serving as the "return path" to complete the default network path.

Contemplating that logical ring network 250c would be created from an existing plain old telephone system ("POTS") network, it can be seen that the connection with the outside telephone network through line 232c is severed. As will be discussed below, this connection could be reestablished (now with a logical ring network instead of a POTS network) via an analog telephone adapter device having the necessary circuitry to interface to both a POTS network and a logical ring network.

Alternatively, as is discussed below, one could configure the entire network with the capability of switching between the analog telephone network and the logical ring network, or simply use one pair for the analog telephone network and the other pair for the logical ring network. In such a configuration, however (as explained below), in order to complete the default network path of the logical ring network along that single pair, either that single pair would have to form a physical loop, or the devices would require bidirectional transceivers (also discussed below). Other combinations are possible, particularly if additional pairs are made available (as can be understood by one of ordinary skill in the art).

FIG. 2 (d) illustrates the analogous connectivity of devices to a logical ring network 250d having a physical star topology (showing the two pairs used by the logical ring network). Devices 252d, 254d, 256d, 258d, 260d, 262d, 264d, 266d and 268d are connected, respectively, to junction boxes 216d, 224d, 226d, 230d, 226d (again), 228d, 218d, 220d and 222d, via jacks 269-1d, 269-2d, 269-3d, 269-4d, 269-5d, 269-6d, 269-7d, 269-8d, and 269-9d. In addition, device 270d is daisy-chained to device 268d.

In this embodiment, as in FIG. 2(c), network devices 252d, 254d, 256d, 258d, 260d, 262d, 264d, 266d, 268d and 270d each contain only a single unidirectional transceiver. Thus, information propagates only along the default network path (not separately identified, but described below).

Starting, for example, at device 258d, connected at junction box 230d, information would be transmitted along one pair of wiring segment 238d to device 268d and daisy-chained device 270d (via junction box 222d), and back "home" (to junction box 230d) along the other pair of segment 238d, and next along one pair of wiring segment 236d to device 266d (via junction box 220d) and back "home" (to junction box 230d) along the other pair of segment 236d, and next along one pair of wiring segment 244d to device 262d (via junction box 228d) and back "home" (to junction box 230d) along the other pair of segment 244d, and next along one pair of wiring segment 246d to devices 260d and 256d (via junction box 226d) and back "home" (to junction box 230d) along the other pair of segment 246d, and next along one pair of wiring segment 242d to device 254d (via junction box 224d) and back "home" (to junction box 230d) along the other pair of segment 242d, and next along one pair of wiring segment 240d to device 264d (via junction box 218d) and back "home" (to junction box 230d) along the other pair of segment 240d, and finally along one pair of wiring segment 234d to device 252d (via junction box 216d) and back "home" (to junction box 230d) along the other pair of segment 234d, where it completes the default network path and returns to original device 258d.

It should be noted that, using standard unshielded twisted pair wiring, whether in a star or other physical topology, the total distance between network devices along the default network path may have a practical limitation due to signal attenuation. This limitation will depend on the quality of the wire. Standard "silver satin" wire, for example, may be limited to approximately 100 feet, whereas Category 5 wire may perform reliably with runs in excess of 300 feet. Should this problem arise, devices that act as repeaters, to amplify the signal, can be added to the logical ring network.

c) Modifying Physical Parallel Wiring Connections to Form a Physical Loop via Replacement Junction Boxes As noted above, unless one limits a logical ring network to devices that are directly daisy-chained to one another, certain physical wiring modifications may well be required at the junction boxes (including jacks) at which network devices will be connected. Such wiring modifications in essence transform arbitrary physical topologies of existing residential telephone networks into a logical ring network of the present invention.

Figure 3:
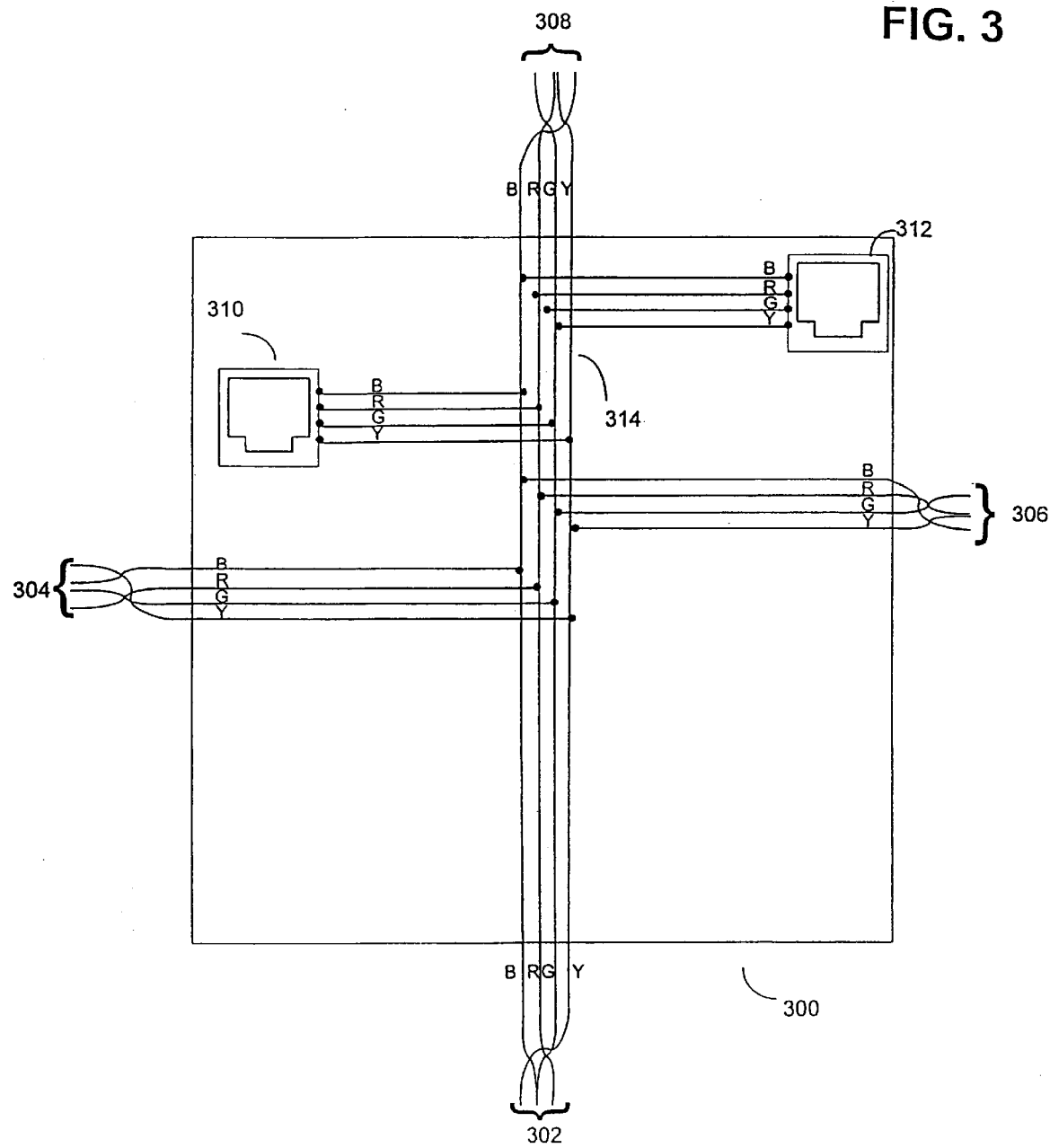
FIG. 3 is a wiring diagram illustrating standard unshielded twisted-pair telephone cables connected in parallel at a junction box in a typical home environment.
Figure 4A:
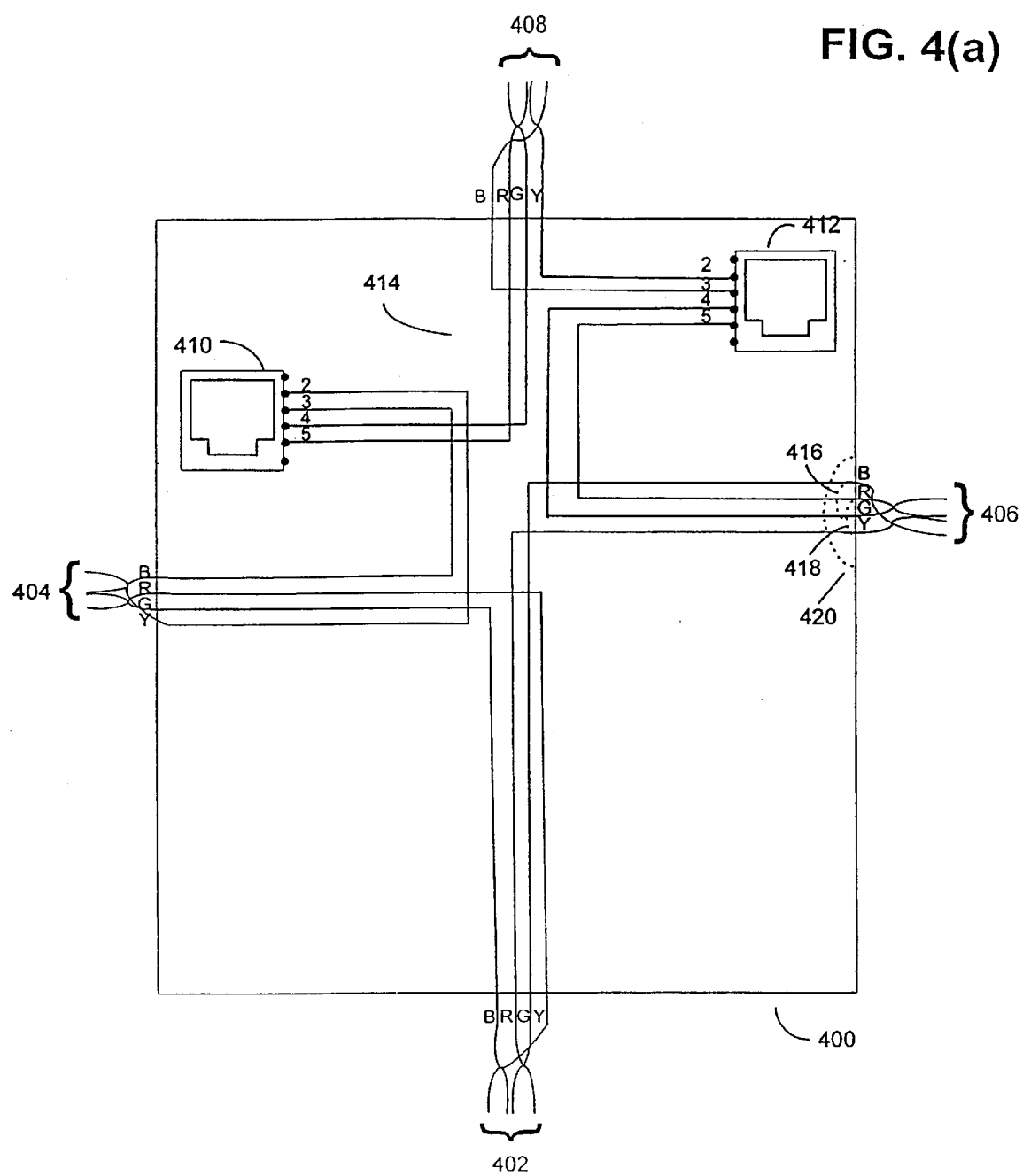
FIG. 4(a) is a wiring diagram illustrating a replacement junction box converting arbitrary physical topologies of standard unshielded twisted-pair telephone cables into a logical ring network of the present invention.

Unlike the physical parallel bus topology of a standard residential telephone network, illustrated in FIG. 3, a logical ring network requires the creation of a physical loop—i.e., a closed physical path. This physical loop can be created by daisy-chaining the two-pair wiring segments, including jacks, connected at a junction box (i.e., connecting one pair of each segment to a pair of another segment) until a physical loop is formed, as is illustrated in FIG. 4(a) discussed below.

Although this physical loop (and thus a logical ring network) can be formed using a single pair of wires, such a configuration requires that devices remain connected together directly to maintain this physical loop. If one device is removed from the physical loop, for example, the two devices to which it is connected must be connected to each other directly to reestablish the physical loop. This one-pair configuration therefore does not afford the same level of flexibility discussed below with respect to a two-pair configuration, in which virtually any physical network topology can be converted into a logical ring network via minor junction-box wiring modifications which create a physical loop. Moreover, as will be discussed below, "jumper wires" connecting the two pairs of wires within the jacks (at junction boxes and within devices themselves) of such a logical ring network maintain this physical loop regardless of whether other devices are inserted into these jacks.

Figure 4B:
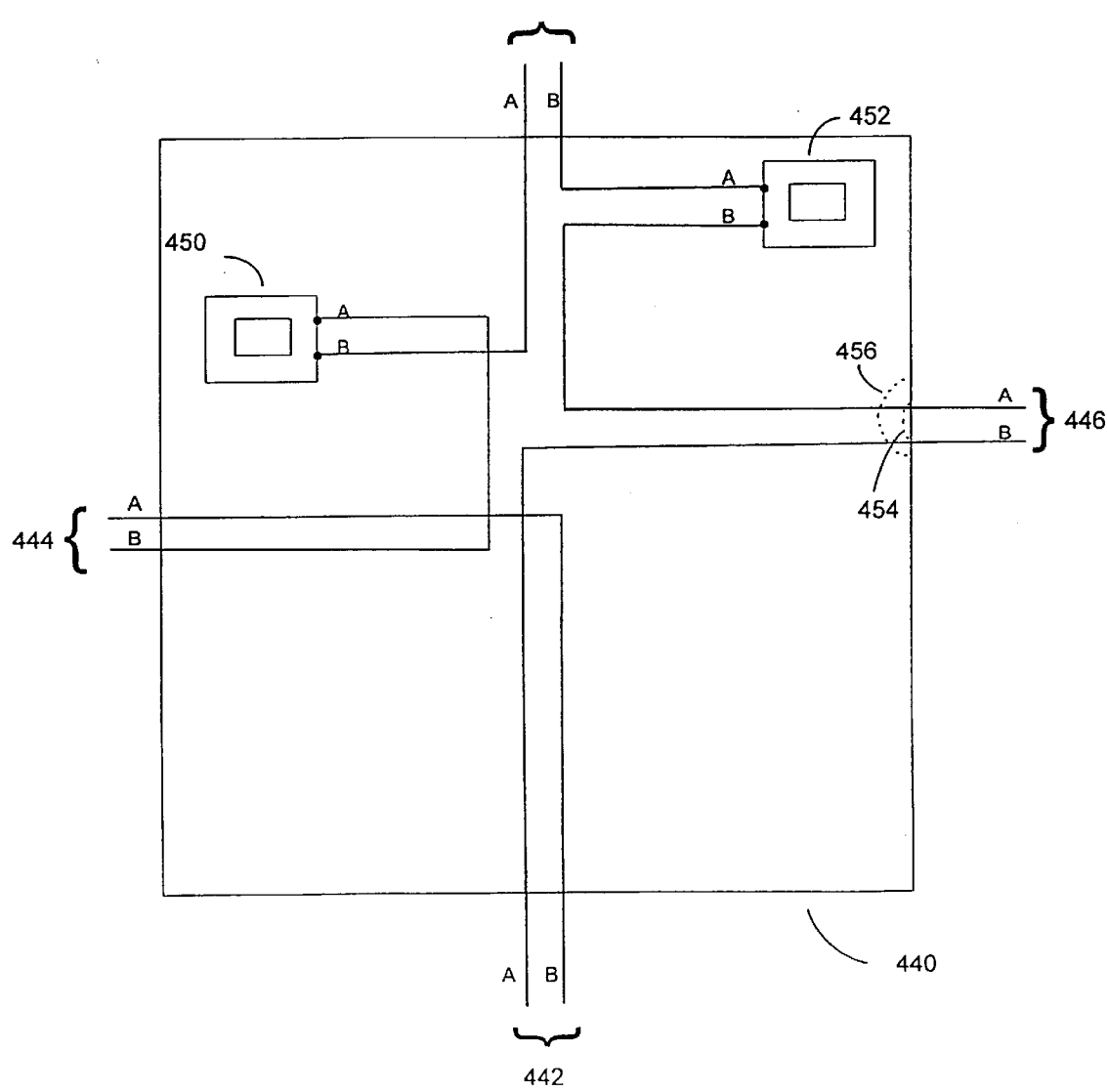
FIG. 4(b) is a wiring diagram illustrating generic wiring of a replacement junction box for converting arbitrary physical topologies into a logical ring network of the present invention.

The more flexible star configuration illustrated in FIG. 2(b) also requires similar wiring modifications. "Hub" junction box 230b, where many multiple-pair "in-wall" wiring segments come together, will of course have many more wiring connections than the remaining "spoke" junction boxes, each of which is connected only to one multiple-pair "in-wall" wiring segment. These wiring modifications are illustrated in FIGS. 4(a), 4(b) and 5(a) below.

To better illustrate these wiring modifications, consider typical junction box wiring for the physical parallel bus topology of a standard residential telephone network. This junction box wiring is illustrated in FIG. 3 by means of a typical junction box 300 having four sets of twisted pair wires 302, 304, 306, and 308, as well as two telephone jacks 310 and 312 (e.g., standard RJ-11 jacks). Each set of twisted pair wires 302, 304, 306 and 308, consists of two twisted pairs (the "B-Y" or black-yellow pair, and the "R-G" or red-green pair) made up of four wire segments, B, R, G and Y, in accordance with standard wiring practice. As noted above, standard telephone wiring is connected in parallel, with each red wire segment connected with each other red wire segment, each green with each other green, and so on. Thus, the wiring forms a parallel bus structure 314 as shown.

As illustrated in FIG. 4(a), replacement junction box 400 interconnects multiple external twisted pair wire sets 402, 404, 406 and 408 to two jacks 410 and 412. In one embodiment, each individual external wire segment (e.g., the red wire segment) of each of the external twisted pair wire sets 402, 404, 406 and 408 is attached to replacement junction box 400 via standard junction box screw terminals (not shown) or one of a variety of interface terminals or other means of connecting two wire segments. Replacement junction box 400 could be manufactured with its interface terminals already interconnected by internal interface wire segments 414, such that one could effectively interconnect external twisted pair wire sets 402, 404, 406 and 408 to one another merely by connecting their individual external wire segments to the interface terminals of junction box 400.

Internal interface wire segments 414 in junction box 400 support four external twisted pair wire sets and two jacks, which should be sufficient for most residential wiring configurations. In the event a junction box has more than four external twisted pair wire set "junctions" (e.g., "hub" junction box 230d in FIG. 2(d)), multiple of these replacement junction boxes could be used, with each such junction box handling up to four of these "junctions." Of course, extended replacement junction boxes supporting more than four external twisted pair wire sets (and/or more than two jacks) also could be utilized.

By convention in this embodiment, the B-Y pair of one external twisted pair were set is connected, respectively, to the R-G pair (via interface terminals, not shown, and interfaces wire segments 414, as noted above) of another external twisted pair wire set and/or jack. This "B-Y to R-G" connection pattern involves connecting the "outgoing" (e.g., B-Y) pair of one external twisted pair wire set or jack to the "incoming" (e.g., R-G) pair of another external twisted pair wire set or jack until a physical loop is formed.

In this embodiment, jacks 410 and 412 of replacement junction box 400 (as well as the jacks of network adapters connecting devices to a logical ring network, discussed below) utilize adjacent wire segments to connect the B-Y and the R-G pairs. For example, for a standard 6-wire RJ-12 jack, wires 2 and 3 would be connected to the B-Y pair of another external wire segment or jack, while wires 4 and 5 would be connected to the R-G pair of yet another external wire segment or jack (with wires 1 and 6, not shown, optionally used for phantom power as discussed below).

Thus, twisted pair set 402 connects to twisted pair set 404, which connects the jack 410, which connects to twisted pair set 408, which connects to jack 412, which connects to twisted pair set 406, which completes the physical loop by connecting back to twisted pair set 402. These connections mirror the connections shown in FIG. 2(c) inside junction box 226c, with segments 240c, 242c, 244c and 246c of FIG. 2(c) respectively associated with twisted pair sets 402, 404, 406 and 408, and jacks 269-3c and 269-5c respectively associated with jacks 410 and 412.

Also by convention, as will be discussed in greater detail below, devices with two jacks typically process information received on their "incoming" pair (wires 2 and 3) via one jack, and transmit it to another device via their "outgoing" pair (also wires 2 and 3) via the other jack. Eventually, information will return to the device on the other pair (wires 4 and 5) of that other jack and pass (unchanged) directly through the device and out the other pair (wires 4 and 5) of the first jack back to its original source. If one jack of the device is not connected to another device, then information will be transferred (as shown below) from that jack's "outgoing" pair (wires 2 and 3) to the jack's other pair (wires 4 and 5), as if the information had returned from another device, and back out of the device via the other pair (wires 4 and 5) of the other jack.

Although homeowners could hire a cabling technician to disconnect the "in-wall" external wire segments from existing junction boxes, and reconnect them to the interface terminals of replacement junction boxes, many homeowners may elect to perform these wiring modifications themselves, particularly if the replacement junction boxes are designed to greatly simplify the task and reduce the probability of "user error." In this regard, replacement junction box 400 can include removable jumpers (e.g., 420, shown in ghost) at the interface terminals (and an analogous device inside each jack, as will be discussed below in the context of FIG. 5(a)) to maintain the physical loop in the event that set goes unused.

Removable jumper 420 connects the B-Y pair to the R-G pair, through cross-wires 416 (e.g., connecting the "red" and "yellow" interface wire segments) and 418 (e.g., connecting the "green" and "black" interface terminals), respectively, which continues the physical loop in the absence of a connection with twisted pair set 406. The homeowner would remove the jumper only from those interface terminals that are to be connected to external twisted pair wire sets.

Thus, replacement junction box 400 could be used to replace virtually any standard residential telephone junction box. To replace "end" junction box 224c in FIG. 2(c), for example, only one jumper (e.g., 420) need be removed to connect twisted pair set 406 in FIG. 4(a) to wiring segment 242c in FIG. 2(c). To replace "4-way" junction box 226(c) in FIG. 2(c), however, jumpers from all four twisted pair wiring sets (402, 404, 406, and 408) would need to be removed to connect them to wiring segments 240c, 242c, 244c and 246c of FIG. 2(c), as discussed above. In the unusual event that a junction box and more than four twisted pair wire "junctions," multiple or extended replacement junction boxes could be used as noted above.

FIG. 4(b) illustrates a logical representation of a replacement junction box 440, independent of the precise transmission medium. Each set of wires 442, 444, 446 (with removable jumper cross-wires 454 and 456) and 448, as well as connections to jacks (or other connectors) 450 and 452, is shown as two lines ("A" and "B"), each of which could represent a twisted pair cable, a coaxial cable or other transmission medium. The connections among the lines and jacks are analogous with those shown in FIG. 4(a).

d) Replacement Jacks and Connectors

Replacement junction box 400 illustrated in FIG. 4(a) includes jacks 410 and 412 to connect network devices to the logical ring network of the present invention. In this typical embodiment in which twisted pair wiring is present, standard RJ-11 or RJ-12 jacks and connectors could be utilized, as illustrated in FIG. 5(a).

Jack 520, which would be part of a replacement junction box, includes a mechanism to interconnect the two pairs of twisted pair wiring set 522 to complete the physical loop in the event that no network device is connected to jack 520. Yet, this mechanism must be disabled when a network device is connected—i.e., when a connector, such as connector 500, is inserted into jack 520.

One embodiment of such a mechanism is protruding tab 526 (shown retracted) with attached wires 528 and 530 to interconnect wires 522 (e.g., R to Y and G to B) when connector 500 is not inserted, but to be pushed out of the way (breaking circuit) upon insertion of connector 500. This mechanism will ensure that the physical loop is completed regardless of whether a network device is inserted into jack 520. It is readily apparent to one of ordinary skill in the art that other mechanisms are available to solve this problem of interconnecting a jack's two pairs until a network device is connected to that jack (e.g., a spring-loaded mechanism, an electrical switch, etc.).

In all other respects, jack 520 can be a standard RJ-11 jack, with standard B, R, G and Y wires 522 (or a standard 6-wire RJ-12 jack) connected to twisted pair cable 524. Moreover, connector 500 can be a standard RJ-11 connector, with standard B, R, G and Y wires 502(or a standard 6-wire RJ-12 connector), twisted pair cable 504 and locking clip 506. Certain advantages, however, may be obtained by deviating further from standard RJ-11 and RJ-12 jacks and connectors.

For example, it may be desirable to make the jacks and connectors non-standard so that a user cannot mistakenly connect a conventional device, such as a POTS phone, into a jack on a replacement junction box. Thus, the addition of a protruding rib 508 (shown in ghost) along with a complementary notch 510 (also shown in ghost) on connector 500, and a similarly configured jack (not shown), could prevent such accidental connections. It should be evident to one of ordinary skill in the art that there are many other such "lock out" mechanisms that could be devised. In addition, the jack could include a light (or other indicator) indicating whether a device and/or appropriate connector is connected to that jack.

Moreover, as will be discussed in greater detail below, it may be desirable to create a "smart jack" which not only closes the physical loop regardless of whether a network device is connected, but also maintains a fixed amount of network delay. Such a mechanism enables one to connect and disconnect network devices (daisy-chained to the smart jack) without disrupting the transmission of information (e.g., an audio or video stream) among other devices on the logical ring network. As will be discussed below, this "hot pluggable smart jack" is itself a network device into which a chain of other network devices can be connected, but which adjusts its delay (and causes the logical ring network to be reconfigured) to account for the insertion or removal of any of such other network devices without disrupting the transmission of information among the remaining network devices (including information passing through the hot pluggable smart jack itself).

In yet another embodiment, it may be desirable to enable a homeowner to switch between the conventional POTS analog telephone network and the logical ring network of the present invention, merely by toggling a switch at the junction box. As illustrated in FIG. 5(b), a front view, a wall plate 540 has a vertically slidable jack 542, which locks in either of two positions, "LRN" 544 and "POTS" 546, for logical ring network and conventional analog telephone network operation, respectively, in the side view of FIG. 5(c), the jack 542' can be seen protruding on either side of wall plate 540'. In the upper (LRN) position, jack 542' abuts plate 548', and in the lower (POTS) position, abuts plate 548'. Plates 548' and 550' are connected in the "in-wall" wiring 556' through cables 552' and 554', respectively.

In one embodiment, plates 548' and 550' could be printed circuit boards such that plate 550' implements POTS circuitry (analogous to that shown in FIG. 3), while plate 548' implements logical ring network circuitry (analogous to that shown in FIG. 4(a)). It should be evident to one of ordinary skill in the art that there are many mechanisms for switching the wiring infrastructure from a POTS network to the logical ring network configuration of the present invention, including removable modules/printed circuit boards, reversible boards, relays, etc. As will be discussed below, it is even possible for a POTS network to coexist (i.e., to share a pair of wires) with a logical ring network.

e) Phantom Power

In one embodiment of the invention, it may be desirable to route power to devices (including hot pluggable smart jacks) via the same jack used to connect such devices to the logical ring network. In other words, instead of requiring the device to obtain power externally (e.g., from a battery or by plugging the device into a standard power outlet), the jack can include an additional pair of wires to (optionally) route power from a standard power junction box through a power supply to a network device. In this manner, the homeowner merely need plug in a single standard RJ-12 (6-wire) cable, and obtain both "phantom" power and a connection to a logical ring network. No separate power cable would be necessary.

As will be illustrated in one embodiment below, such "phantom" power could be transformer isolated to supply approximately 25 watts of power to network devices (including hot pluggable smart jacks). Such power would be sufficient for many network devices (such as telephones and satellite speakers), while others (such as powered subwoofers) might still require external power. Critical components (e.g., last one telephone in a house) could also be connected to a "battery back-up" device such as a standard UPS, so that they would continue to function in the event of a power outage.

FIG. 6 shows a standard six-pin RJ-12 connector 600, with locking tab 606 and twisted pair cable 604, which can be inserted into the corresponding six-pin jack 620 with twisted pair cable 632. This arrangement includes the conventional two pairs of wires 602 and 622 on the connector 600 and jack 620, respectively, as well as the protruding tab 626 on jack 620 with attached wires 628 and 630 to ensure completion of the physical loop. The remaining two wires of a standard 6-wire RJ-12 jack, however, are used for "phantom" power lines 608 and 610 on connector 600, and corresponding lines 624 and 625 on jack 620. These power lines may be supplied from the house current 629 via power supply 627 (or from any other "in-wall" power source), which in one embodiment supplies high-frequency AC 24V power synchronized to the 44.1 kHz "frame rate" described below. Note also that an RJ-11 connector could be inserted into jack 620 to connect a device to the logical ring network, though no phantom power would be supplied to that device.

As noted above, a hot pluggable smart jack (not shown here, but discussed in greater detail below) would itself be a network device. In the embodiment described below, this device would include two jacks. One jack would be of the type illustrated in FIG. 6, and would provide "in-wall" phantom power needed to power the hot pluggable smart jack itself. The other jack would be the hot pluggable smart jack into which another network device would be inserted and removed. This jack preferably would be of the type illustrated in FIG. 6, so that it could provide optional phantom power to any network device inserted therein. A more standard jack, however, such as the one illustrated in FIG. 5(*a*), would be sufficient.

f) Physical Media Hybridization

It should also be noted that, instead of providing a separate pair of wires for phantom power, or for a POTS network, either or both of these functions can share the same pair of wires with each other, as well as with a logical ring network. Because each of the pairs of a logical ring network is a balanced transformer-isolated transmission line, each wire of a given pair is doing the exact complement/opposite of its partner. Thus, the resulting electromagnetic field emanating from each pair of wires will be zero. This reduces the radio emissions of the network and provides noise isolation for these signals.

Signals that are common-mode, or which have the same potential on both of the wires of a pair, will radiate as if such signals were transmitted only on one wire. Such signals will thus be completely independent from the different signal between the wires. In other words, in the ideal case, there should be no interaction between the two transmission modes.

Because the data on a logical network is transmitted differentially in one embodiment discussed below, it is possible to use the common mode of each of the pairs as virtual wires to transmit other information and/or power. This information could be analog voice over a POTS line equivalent, or some other transmission system. Power can be transmitted simultaneously by utilizing a high pass filter to isolate the audio/phone signaling from the ultrasonic AC power signal.

These signals could be injected onto the wires by the equivalent of connecting these signals to the center-tap of the transmission and reception transformers. This has to be done very carefully so as not to misbalance the differential signal, which could result in less than complete cancellation of the differential signal, which in turn could create interferences.

Alternatively, a single pair of wires can support both a logical ring network (with bidirectional drivers) and a POTS network, as well as power. This can be accomplished by using high-pass, low-pass and band-pass filters, respectively, at each wiring junction to isolate each of these three types of signals from one another. All such filters could be "high-frequency balanced" to prevent the high-frequency network signal from becoming misbalanced, and thereby creating radio interference.

In one embodiment, all three types of signals could share the same pair of wires, which could be unshielded twisted pair, coaxial or other conductive media. If another pair of wires were available, it could be dedicated to a logical ring network and/or power, leaving the POTS network untouched on its own existing pair of wires, thereby preventing any interference between the phone system and the power lines or a logical ring network. Alternatively, one pair of wires could be dedicated to the bidirectional logical ring network, with the other pairs supporting the POTS network and/or power. This embodiment would greatly simplify the required hybrid circuitry. For example, relatively simple analog low-pass and high-pass filters could be employed to isolate these two types of signals, because no high-frequency network signal would need to be accommodated.

g) Logical Ring Network

Having illustrated the modifications to the physical network topology, one can now appreciate the advantages of a logical ring network independent of its underlying physical topology. The wiring at the junction boxes (including jacks and possibly connectors) may have been modified via replacement junction boxes as illustrated in FIGS. 3–6 to transform arbitrary physical topologies into a logical ring network. Devices have been connected to the logical ring network, either at those replacement junction boxes and/or directly to one another in a daisy-chained fashion, as illustrated in FIGS. 2(*c*) and 2(*d*) above. In either case, as noted above, a single physical loop, and thus a single default network path, has been formed.

Although information propagating along this default network path physically may reach the same device multiple times per "revolution" (e.g., as illustrated by device 268*c* in FIG. 2(*c*)), such information is processed only once by each device, thereby forming a logical ring network. In other embodiments discussed below, however, alternative paths to the default network path are utilized to increase overall network bandwith.

FIG. 7 illustrates the default network path of a logical ring network 700 having network devices "A" 702 (acting as the network "clock" as explained below), "B" 708, "C" 710, "D" 712, "E" 714 and "F" 716, respectively connected by logical cable segments 720, 722, 724, 726, 728 and 730. By convention, information is transmitted in a clockwise direction from network clock device A 702 to device B 708, to device C 710, to device D 712, to device E 714, to device F 716, back to network clock device A 702, and so on.

As noted above, and as will be explained in greater detail below, network devices on a logical ring network of the present invention are synchronized to one another. This synchronization occurs upon initialization of the logical ring network, during which each device capable of acting as a "clock" device arbitrates for election as the "network clock" device. The network clock device sends a synchronization marker at constant intervals along the default network path to which all other devices synchronize. As will be explained below, this low-level device synchronization greatly facilitates the synchronization of audio and video sources, audio sources received by multiple speakers, and many other media synchronization requirements.

Because network devices with single unidirectional drivers can transmit signals only in one direction along the default network path, and because (as noted above) the time for any given stream of data to propagate around this default network path remains constant, a logical ring network affords devices a fixed amount of total network bandwidth. As will be discussed below, this total network bandwidth can be allocated (by default, and later reallocated dynamically) into fixed-length channels, the size of which can be determined by the requirements of each particular media stream.

At some point, however, reallocation of existing network bandwidth may be insufficient, and additional network bandwidth may be desired. For example, if every member of a large family had his own television, and each wanted to watch a different program at the same time, total network bandwidth might be insufficient to accommodate such a situation.

Moreover, as more network devices are added to the logical ring network, the total delay around the logical ring network along this default network path may exceed the maximum delay necessary to ensure phase coherency between any two devices. For example, two or more 44.1 kHz audio samples sent by CD player device might reach a left speaker device before the first such sample reaches a right speaker device, resulting in and undesirable lack of phase coherency between the two speakers that would diminish the listening experience.

There are a variety of ways of increasing network bandwidth to accommodate such situations, which will be discussed in greater detail below. Logical ring network bandwidth can be increased, for example, by providing (i) better physical media supporting a higher data transmission rate; (ii) more efficient modulation techniques (i.e., compressing information); and/or (iii) alternate paths between devices for the transmission of data (e.g., by adding to the logical ring network a switching router device, or simply adding devices with multiple and/or bidirectional transceivers). The precise means by which network bandwidth can be increased will be better understood following an explanation of the manner in which devices transfer data and "system commands" to one another on a logical ring network.

2. Synchronous Logical Ring Network Architecture a) Overview

As noted above, a logical ring network of the present invention is a synchronous network. All devices transmit and receive information at periodic intervals determined by a "network clock" device (as described below). In one embodiment, during each clock cycle, each device simultaneously transmits information to the next device along the default network path.

In the case of switching routers and other devices with multiple and/or bidirectional transceivers, alternate, "shortcut" paths (as compared with the default network path) may be available as a means of increasing network bandwidth, as will be discussed in greater detail below. To the extent all network devices have only one unidirectional transceiver, however, all information is transmitted from device to device in a consistent order along the default network path.

As noted above, each device imposes a constant amount of delay to process information—i.e., to receive information and then transmit either the same information, or modified information, to the next device on the logical ring network (including signal propagation delays, which increase with the length of the physical wire between devices). This "device delay time," though constant, differs from device to device. Thus, as information propagates from device to device along the default network path, the delay from one device to the next may vary. Yet, the propagation time for a complete "revolution" around the logical ring network remains constant.

For example, if there are three devices on the logical ring network, it may take five clock cycles for information to propagate from the first device to the second device, but only four clock cycles to propagate to the third device and six clock cycles to propagate back to the first device. Yet, it will always take fifteen clock cycles for information to propagate from any device around the network along the default network path and back to that device. As will be explained below, this cumulative propagation time actually will be "rounded up" by the network clock device to an amount sufficient to accommodate fixed-length "frames" of information.

As a result of this fixed cumulative propagation time for information to travel around the logical ring network along this default network path, network devices are afforded a fixed amount of total network bandwidth for sending and receiving information along the default network path. As will be discussed below, however, the total network bandwidth is not simply divided equally among devices. Each device is allocated a fixed amount of bandwidth (appropriate for the particular type(s) of data which that device transmits and/or receives) which differs from device to device and can be altered dynamically.

b) Network Clock Synchronization and Information Framework

In one embodiment, at least one device on a logical ring network must be capable of acting as the network clock device, typically in addition to performing its "normal" function (e.g., CD player). During network initialization, a clock arbitration process determines which device (among those capable of acting as the network clock device) will be deemed the network clock device. In other embodiments, the network clock device could be predetermined—e.g., via a user-settable switch.

Once the network clock device has been selected, all other devices are synchronized to the network clock device. The precise details of the network initialization process, and the manner in which devices are synchronized to the network clock device, are discussed in greater detail below.

In one embodiment, all network devices, including the network clock device, transmit raw bits of information, referred to as "symbol bits"(described below), at a rate of 28.224 MHz. This rate was selected to facilitate compliance with current FCC regulations relating to radio frequency interference ("RFI") for information transmitted over standard unshielded twisted pair cables. Overall network bandwidth may be increased, for example (as discussed below), by utilizing better physical media supporting a higher data transmission rate.

These symbols bits are encoded, using a 4B/5B encoding scheme (also described below), to distinguish normal "data bits" (representing information such as digital audio or video streams, or embedded asynchronous data) from special markers used for various purposes such as identifying and delimiting frames, "system commands," null data, etc. Thus, the network "data bit rate" is 22.5792 MHz, or $4/5$ of the network "symbol bit rate" of 28.224 MHz. Every 5-bit "symbol" represents either one nibble (4 bits) of data or all/part of a special marker.

One of these special markers, the "frame header" (which actually comprises 2 symbols), is used to synchronize all other devices to the network clock device at a rate useful for synchronizing digital media streams, such as CD audio or MPEG video. Because audio, with its high sample rate, is particularly susceptible to distortion owing to timing discrepancies (compared to video, for example, which typically is sampled no more than 60 times per second), the network clock device generates frame headers at a "frame rate" of 44.1 kHz, the standard CD audio sample rate. In essence, by sending out a periodic frame header, the network clock device not only sends out a 44.1 kHz synchronization marker, but also creates the header for a fixed-length "frame" of information.

This fixed-length frame, which will be discussed in greater detail below, is comprised (in one embodiment) of 640 symbol bits or, equivalently, 512 data bits. One can derive this frame size by dividing the symbol bit rate (or data bit rate) by the frame rate of 44.1 kHz. The network clock device creates these fixed-length frames, which then propagate from device to device on the logical ring network. As will be discussed below, in one embodiment, the network clock device periodically (e.g., once per minute) sends out a "Time Sync" frame header ("WK" in Table I below) to mark a particular "time of day" in lieu of the far more frequently used "Clock Sync" frame header ("JK" in Table I below).

To maintain a consistent frame rate and avoid corruption of data, the network clock device in one embodiment buffers received data to ensure that an integral number of frames are present on the logical ring network at any given time. In other words, the network clock device imposes an artificial delay (using a mechanism described in greater detail below) to "round up" the sum of the individual device delay times to the next highest multiple of 22.676 $\mu$s (1/44.1 kHz), resulting in a "cumulative frame propagation delay" of 22.676 $\mu$s or an integral multiple thereof.

If this cumulative frame propagation delay equals exactly 22.676 $\mu$s, rather than a higher multiple thereof, information is guaranteed to propagate from any device to any other device within one CD audio sample time, thereby ensuring phase coherency among devices. For example, left and right speakers are guaranteed to be "synchronized" to the same audio sample time while playing stereo audio generated by a CD player.

Assuming a typical device delay time of approximately 6 of the 640 available 28.224 MHz clock cycles per "revolution" of a frame, a logical ring network will continue to guarantee this "one audio sample" level of phase coherency until over 100 such devices are added to the network. Even at the point at which the delay exceeds 22.676 $\mu$s, and the network clock device "rounds up" the cumulative frame propagation delay (e.g., to 45.332 $\mu$s, or 1/22.05 kHz), the logical ring network will continue to function, through with greater potential delay between devices.

For example, although the frame rate would continue to be 44.1 kHz, two full frames (instead of one) would be present in the logical ring network at any given time. Thus, information might require up to 45.352 $\mu$s (i.e., two audio sample times) to propagate from one device to another along the default network path.

Yet, as noted above, a logical ring network could be segmented into multiple physical loops or network "arms," and a switching router could be added, such that the frame propagation delay around each network arm would again equal (or be rounded up to) 22.676 $\mu$s. As will be discussed in greater detail below, the default network path would still traverse every device on the logical ring network (not just those on an individual network arm). Thus, information propagating along this path would still have a cumulative frame propagation delay exceeding the 22.676 $\mu$s delay present on each network arm. However, this path might be used only for "system commands" (at a much slower system command rate of approximately 1.1 kHz, as explained below), as opposed to streams of "normal" data which could follow a shorter path by switching, via the switching router, from one network arm (containing the source device sending the data) directly to another (containing the destination device receiving the data).

c) Data Encoding

As noted above, all information transmitted in one embodiment of a logical ring network is encoded using a 4B/5B coding system. Each 5-bit symbol represents either one of 16 possible data values (0–15) or all/part of a special marker, discussed below, used for various purposes such as frame headers, "system command" delimiters, error detection or null data.

A 4B/5B encoding of information transmitted at 28.224 MHz is employed so as to avoid a large DC offset and to ensure a sufficient number of voltage transitions over time to enable each network device to synchronize to the incoming data and receive the information accurately (as will be explained in greater detail below with respect to the synchronization hardware inside a logical ring network adapter for each network device).

At the physical layer, in one embodiment, network devices utilize an "NRZ" (non-return to zero) bi-level coding scheme. They transmit a "1" symbol bit by transitioning from a low-to-high (or high-to-low) voltage, and a "0" symbol bit by maintaining the current voltage level. To ensure a sufficient number of transitions, the 4B/5B logical encoding values are selected such that a valid sequence of symbols never includes more than 3 consecutive "0" symbol bits. Thus, only about ⅔ of the 32 possible 5-bit combinations are used.

In the embodiment illustrated in Table I (and discussed in greater detail below) a transmitting device can encode 4B data nibbles and special markers into 5B symbols in the following manner. The device encodes data and special markers as 5-bit quantities (shown as "Translated Values" in Table I) by appending a "0" onto the MSB of 4B data nibbles, and appending a "1" onto the MSB of 4-bit representations of each special marker. The device then translates these 5-bit quantities into the 5B symbols which it physically transmits to the next device on the logical ring network. Receiving devices then decode these 5B symbols by translating them back into the 5-bit Translated Values shown in Table I and interpreting them (based on the MSB of the symbol's Translated Value) either as 4-bit data nibbles or as special markers.

TABLE I

| 4B/5B ENCODING | | | | |
|---|---|---|---|---|
| SYMBOL BIT VALUES 4 3 2 1 0 | TRANS- LATED VALUES 4 3 2 1 0 | EQUIVALENT DATA 3 2 1 0 | NAME | FUNCTION |
| 1 1 1 1 0 | 0 0 0 0 0 | 0 0 0 0 | 0 | Data |
| 0 1 0 0 1 | 0 0 0 0 1 | 0 0 0 1 | 1 | |
| 1 0 1 0 0 | 0 0 0 1 0 | 0 0 1 0 | 2 | |

TABLE I-continued

4B/5B ENCODING

| SYMBOL BIT VALUES 4 3 2 1 0 | TRANS- LATED VALUES 4 3 2 1 0 | EQUIVALENT DATA 3 2 1 0 | NAME | FUNCTION |
|---|---|---|---|---|
| 1 0 1 0 1 | 0 0 0 1 1 | 1 0 1 1 | 3 | |
| 0 1 0 1 0 | 0 0 1 0 0 | 0 1 0 0 | 4 | |
| 0 1 0 1 1 | 0 0 1 0 1 | 0 1 0 1 | 5 | |
| 0 1 1 1 0 | 0 0 1 1 0 | 0 1 1 0 | 6 | |
| 0 1 1 1 1 | 0 0 1 1 1 | 0 1 1 1 | 7 | |
| 1 0 0 1 0 | 0 1 0 0 0 | 1 0 0 0 | 8 | |
| 1 0 0 1 1 | 0 1 0 0 1 | 1 0 0 1 | 9 | |
| 1 0 1 1 0 | 0 1 0 1 0 | 1 0 1 0 | A | |
| 1 0 1 1 1 | 0 1 0 1 1 | 1 0 1 1 | B | |
| 1 1 0 1 0 | 0 1 1 0 0 | 1 1 0 0 | C | |
| 1 1 0 1 1 | 0 1 1 0 1 | 1 1 0 1 | D | |
| 1 1 1 0 0 | 0 1 1 1 0 | 1 1 1 0 | E | |
| 1 1 1 0 1 | 0 1 1 1 1 | 1 1 1 1 | F | |
| 1 1 1 1 1 | 1 0 0 0 0 | SPECIAL MARKERS | I | Idle |
| 1 1 0 0 0 | 1 0 0 0 1 | | J | First symbol of Clock Sync Frame Header marker |
| 0 1 0 0 0 | 1 1 1 0 0 | | W | First symbol of Time Sync Frame Header marker |
| 1 0 0 0 1 | 1 0 0 1 0 | | K | Second symbol of Clock Sync and Time Sync Frame Header markers |
| 0 1 1 0 1 | 1 0 1 0 0 | | T | First symbol of System Command Start/Empty markers |
| 0 0 1 1 1 | 1 0 1 0 1 | | R | Second symbol of System Command Start marker |
| 0 0 1 0 1 | 1 0 1 1 0 | | U | Second symbol of System Command Empty marker |
| 0 0 0 0 0 | 1 0 1 1 1 | INVALID | V | Invalid Code |
| 0 0 0 0 1 | 1 1 0 0 0 | | V | NOT USED |
| 0 0 0 1 0 | 1 1 0 0 1 | | V | |
| 0 0 0 1 1 | 1 0 0 1 1 | | V | |
| 0 0 1 0 0 | 1 1 1 0 1 | | V | |
| 0 0 1 1 0 | 1 1 0 1 1 | | V | |
| 0 1 1 0 0 | 1 1 1 0 1 | | V | |
| 1 0 0 0 0 | 1 1 1 1 0 | | V | |
| 1 1 0 0 1 | 1 1 1 1 1 | | V | | d) Fixed-Length Frame Format

As noted above, in one embodiment of a logical network, the fundamental frame rate is 44,100 fixed length frames per second (44.1 kHz). In this embodiment, the length of each frame is 640 symbol bits or, equivalently, 512 data bits. As is illustrated below, a frame is divided into 128 "nibbles," encoded as 5B symbols for transmission, and representing, when decoded, mostly 4-bit data nibbles along with certain special markers, as shown in Table I above.

The size of this fixed-length frame could be expanded beyond 128 nibbles, in another embodiment, to accommodate more data and thus increase total network bandwidth. For example, better physical media could be used to support a higher data bit rate beyond 22.5792 MHz. Moreover, a more efficient modulation technique, such as 5-level, coding, could be used in the transceivers of each device's network adapter, enabling each device to transmit two data bits (instead of one) during each 22.5792 MHz clock cycle.

In any event, after a logical ring network is initialized (as discussed in greater detail below), each frame is created in the first instance by the network clock device, which fills the frame with a frame header, a "system command" (also described below) and, where no data is supplied, "idle" ("I") markers which other devices may overwrite with actual data. The network clock device also may itself embed actual data (e.g., a CD audio stream) into a frame.

As each frame propagates from device to device on the logical ring network, each device processes the information in the frame and either passes it along to the next device unmodified or overwrites certain information. As will be explained in greater detail below, devices typically pass along most of the frame unmodified.

For example, a CD player might "insert" samples of a CD audio recording into left and right stereo audio channels of the frame—e.g., by overwriting nibbles 2–7 of the frame with a digital sample of left-channel audio, and nibbles 66–71 of the frame with a digital sample of right-channel audio. Yet, the CD player would ignore most of the other nibbles, because they relate to other digital media streams (e.g., video, telephone, or embedded asynchronous data) which do not concern the CD player.

In one embodiment illustrated in Table II below, the frame header occupies the first two nibbles (0 and 1) of the 128 nibbles in each frame. Of the remaining 126 nibbles, 124 nibbles are allocated to the "data stream" which includes the audio, video, telephone and other streams or "channels" of digital media disturbed among the devices on the logical ring network. This data stream, discussed in greater detail below, is divided into two 62-nibble blocks in the frame (nibbles 2-63 and 66-127), separated by a one-byte (nibbles 64–65) "system command stream."

The system command stream, also explained in greater detail below, is used primarily for initializing and reconfiguring devices on a logical ring network. In one embodiment, this system command stream is comprised of fixed-length 40-byte "system commands" that occupy 40 consecutive frames (but only 2 nibbles per frame). Because system commands are processed by every network device, they are sent along the default network path.

Thus, fixed-length frames propagate from device to device on the logical ring network (transmitted as nibble 0, nibble 1 . . . nibble 128, with each nibble transmitted from MSB to LSB), and include, in addition to a frame header, two distinct information streams—the data stream and the system command stream. As will be discussed below, these two information streams operate independently from one another.

For example, as noted above, if alternate paths are made available to increase total network bandwidth (e.g., by using a switching router to route information from one network arm to another), these alternate paths are used by the data stream. The system command stream always propagates along the default network path (which will include every network arm) to ensure that it reaches every network device. Moreover, as explained in greater detail below, the network can be reconfigured (e.g., when a network device is added to or removed from a hot-pluggable smart jack) via the system command stream without interrupting the propagation of data among network devices via the data stream.

In one embodiment, illustrated in FIG. 7, network clock device 702 is responsible for buffering frames, via frame FIFO 706, to ensure that an integral number of frames are present on the logical ring network at any given time. Thus, network clock device 702 would finish transmitting the entirety of a frame before transmitting the frame header for the next frame. This prevents frames from overlapping one another and becoming corrupted.

Moreover, as noted above, each network device impose some delay (typically equal to about six 28.224 MHz symbol bit times in this embodiment, or 6×0.03543 μs=0.2126 μs) in order to receive/process/transmit each bit of a frame. Network clock device 702 artificially delays (i.e., buffers) each symbol bit it receives in order to "round up" the total of these device delay times to a cumulative frame propagation delay time equal to the next highest integral number of 44.1 kHz frames (i.e., an integral multiple of 22.676 μs).

Once this cumulative frame propagation delay equals 22.676 μs (i.e., frames propagate at 44.1 kHz, and exactly one 44.1 kHz frame is present on the logical ring network), then all network devices are guaranteed to receive any given 44.1 kHz audio sample before any network device receives the next such sample. If the logical ring network is segmented into multiple network arms, then a switching router can buffer frames (as explained in greater detail below) to ensure that exactly one frame is present on each network arm. As a result, data sent from one network arm to another may be delayed by a few audio sample times; though devices on the same network arm (e.g., left and right speakers) would receive such data at the "same time"—i.e., during the same audio sample time.

Although this buffering mechanism enables devices on the same network arm, such as left and right speakers, to remain "in phase," there are certain situations in which it is desirable to alter the effective phase relationships among devices (whether on the same or on different network arms). For example, rather than require speakers to be physically positioned at precise locations within a room to obtain a desired listening experience, one could simulate this physical positioning of speakers by programming a specified delay into one or more devices. This could be accomplished, for example, by employing a FIFO or analogous buffering mechanism within particular devices to delay the processing or retransmission of data by such devices. Such FIFOs could be programmed, for example, by a "smart" CPU-based controller device on the network.

In one embodiment, a DSP device, upon decoding a surround sound audio stream, might utilize an on-board FIFO to delay particular decoded audio streams before transmitting them over the logical ring network to one or more speaker devices—i.e., simulating the effect of physically moving those speakers. In this embodiment, each speaker still would play its audio team stream "immediately" upon receiving it via the logical ring network. In another embodiment, this buffering mechanism could be located within one or more speaker devices (perhaps in addition to the DSP device), such that a particular speaker would delay the playing of its audio stream for a special period of time after receiving it via the logical ring network, still achieving the same effect of simulating physical movement of the speakers.

Network clock device 702, in addition to buffering frames in this embodiment also is responsible for buffering system commands, via system command FIFO 704, to ensure that an integral number of system commands are present on the logical ring network at any given time. As is done for frames, network clock device 702 would finish transmitting the entirety of a fixed-length (40-byte) system command before transmitting the "system command leader" (explained below) for the next system command. This prevents system commands from overlapping one another and becoming corrupted. Network clock device 702 also performs certain system command maintenance functions which will be explained in greater detail below.

It should be noted that, in this embodiment, each network device buffers system commands for at least one frame (which includes one byte of a system command), to allow the device sufficient time to modify each byte of a system command, if necessary. Network clock device 702, however, performs additional buffering, as noted above to "round up" the cumulative delay (for system commands to traverse the default network path) to an integral multiple of 40 frame times. This "cumulative system command propagation delay" (an integral multiple of 40 frames) is the time required for a system command to propagate around the entire default network path. It should be distinguished from the cumulative frame propagation delay (an integral multiple of one frame), which is the time required for a frame to propagate around an arm of the logical ring network (which would be the entire default network path in the case of a network that is not segmented into multiple network arms).

TABLE II

FIXED-LENGTH FRAME FORMAT

| NIBBLES | DESCRIPTION |
|---------|-------------|
| 0–1     | Frame Header (Clock Sync or Time Sync) |
| 2–63    | First Block of Data Stream Channels |
| 64–65   | System Command Stream |
| 66–127  | Second Block of Data Stream Channels | e) Data Streams

The vast majority of the total network bandwidth is utilized by network devices sending and receiving digital media streams, such as audio, video, phone, asynchronous and other data. As noted above, in one embodiment, 124 of the 128 nibbles in each frame are allocated to the data stream. A single byte (2 nibbles) is allocated to the frame header, and another byte (2 nibbles) to the system command stream.

In this embodiment, the data stream is allocated by default into various fixed-width channels as illustrated in Table III below. These channel assignments can be modified dynamically, as is discussed in greater detail below. These channels may be associated with a particular type of media (e.g., digital audio) and may occupy a number of 4-bit data nibbles (varying from channel to channel) corresponding to the network bandwidth required by such media.

For example, in the default data stream channel allocation illustrated in Table III, "Audio Left Channel 0" occupies nibbles 2–7 of a frame, and represents the left channel of a stereo digital audio stream. In order to achieve CD-quality audio for that left channel, 4 nibbles (16 bits) are required to represent the range of audio intensity levels for each audio sample. The remaining 2 nibbles can be used for additional information, such as more phone lines or "surround sound" (e.g., Dolby ProLogic), which is encoded into stereo audio recordings.

Note that the 44.1 kHz frame rate in this embodiment guarantees that these audio samples will reach a playback device (e.g., a left speaker) at precise 22.676 μs (1/44.1 kHz) intervals. Moreover, each of these same audio samples will reach the corresponding right speaker, for example, within the same 22.676 μs (1/44.1 kHz) interval, thereby maintaining phase coherence (within the same audio sample time) between the left and right speakers.

As noted above, this same level of phase coherence is achieved even if the source device (e.g., a CD player) is physically located on another arm of the logical ring network, and requires multiple audio sample times to transmit each audio sample to the speakers. In other words, the speakers (assuming, as is likely to be the case, that they are both in the same room and on the same network arm) remain phase coherent, and thus receive the digital audio stream at the "same time" (i.e., same audio sample time) relative to each other, even though they both receive it delayed by a few audio samples from the time it was transmitted by the CD player.

It should be further noted that this 44.1 kHz level of "synchronization accuracy" (which could be modified if desired) is sufficient to enable other media types (e.g., digital video) to be synchronized to audio as well as to one another. Digital video frame rates, for example, require only 30–60 samples per second, compared to 44,100 audio samples per second. Where necessary, synchronization of the logical ring network to external clock rates (e.g., MPEG1 and MPEG2 clock rates) also can be achieved, via a general-purpose mechanism discussed below in the context of particular MPEG-related devices.

The default data stream channel assignments illustrated in Table III allocate the 22.5792 Mbit total network bandwidth (based on the 22.5792 MHz data bit rate) to allow for the following simultaneous digital media streams: (i) 4-CD-quality digital stereo audio streams; (ii) 2 MPEG2 compressed digital audio/video streams; (iii) 8 digital phone streams; (iv) 32 embedded asynchronous data streams, each "sample" occupying a nibble every eight frame; and (v) 2 miscellaneous data streams, each the size of an MPEG2 compressed digital audio/video stream.

As will be discussed in greater detail below, network devices can utilize these default channels in one embodiment via switches located on each device set to one or more particular default channels. For example, a CD player might have its switches set for "Audio Channel 0" by default, though a user could set these switches to "Audio Channel 1" accommodate other audio sources (e.g., the audio from a laserdisc player).

Moreover, in this embodiment, network devices also have on-board memory (e.g., registers), the contents of which can be set dynamically (e.g., by another network device) to override the channel(s) indicated by the switches. The manner in which this dynamic data stream channel allocation is performed is discussed in greater detail below.

As noted above (and discussed in greater detail below), certain users may require additional bandwidth beyond that provided by the default data stream channel assignments. For example, a user may desire a third simultaneous MPEG2 channel, so that three people in the house can watch different video programs simultaneously.

Dynamic data stream channel allocation may be sufficient to solve such a problem, e.g., adding a third simultaneous MPEG2 channel by utilizing one of the unused miscellaneous channels. If more simultaneous channels were required than could be obtained via dynamic reallocation of channels, then a switching router could be added to segment the logical ring network into distinct arms, each of which has a delay (in this embodiment) of exactly 22.676 μs (1/44.1 kHz). Alternatively, network devices with transceivers using 5-level coding or other modulation techniques also could be added to the logical ring network to increase bandwidth, e.g., doubling the size of a frame by sending two data bits (instead of one) during each clock period.

Moreover, the addition of a switching router might also be desirable in the unlikely event that the number of network devices (e.g., more than about 100) creates a cumulative frame propagation delay exceeding 22.676 μs (1/44.1 kHz). These and other solutions to the need for increased network bandwidth are discussed in greater detail below.

In addition to typical real-time continuous data streams, such as digital audio and video streams, one also can embed synchronous data (e.g., serial data, TCP/IP packets, compressed MPEG1 or MPEG2 video, etc.) into data stream channels, as will be explained in greater detail below. Such asynchronous data, though distributed among network devices synchronously (and thus without network collisions), can be processed by those devices on the logical ring network that are capable of interpreting such data types. Other network devices merely "pass on" such data, as they would other digital media streams in which they were not interest. As will be explained below, such data may not even occupy an entire nibble every frame (due to lesser bandwidth requirements), and may therefore be interleaved with other data (or "null" data), e.g., every nth frame.

Thus, the data stream provides multiple channels for network devices to transmit to one another a variety of different data types having differing bandwidth requirements. These channels enable network devices to utilize precisely the amount of network bandwidth required by a particular data type, with the ability to reallocate channels dynamically (as will be discussed below) as these requirements change (e.g., as a user selects different source devices, turns devices on or off, or adds/removes devices from the logical ring network).

TABLE III

DEFAULT DATA STREAM CHANNEL ASSIGNMENTS

| NIBBLE(S) | MEDIA TYPE | CHANNEL | DESCRIPTION | SIZE |
|---|---|---|---|---|
| 0–1 | Frame Header | — | — | 1 byte/2 symbols |
| 2–7 | Audio | 0 | Left/ LeftX | 16 bits/4 nibbles 24-bit extension byte/ 6 nibbles total |
| 8 | Phone | 0 | — | 1 nibble |
| 9 | Phone | 1 | — | 1 nibble |
| 10–15 | Audio | 1 | Left/ LeftX | 16 bits/4 nibbles 24-bit extension byte/ 6 nibbles total |
| 16 | Phone | 2 | — | 1 nibble |
| 17 | Phone | 3 | — | 1 nibble |
| 18–23 | Audio | 2 | Left/ LeftX | 16 bits/4 nibbles 24-bit extension byte/ 6 nibbles total |
| 24 | Asynch Net | 0–7 | — | 1 nibble |
| 25 | Asynch Net | 8–15 | — | 1 nibble |
| 26–31 | Audio | 3 | Left/ LeftX | 16 bits/4 nibbles 24-bit extension byte/ 6 nibbles total |
| 32–47 | Video | 0 | — | 8 bytes/16 nibbles |
| 48–63 | Miscellaneous | 0 | — | 8 bytes/16 nibbles |
| 64–65 | System Command Byte | — | — | 1 byte/2 symbols |
| 66–71 | Audio | 0 | Right/ RightX | 16 bits/4 nibbles 24-bit extension byte/ 6 nibbles total |
| 72 | Phone | 4 | — | 1 nibble |
| 73 | Phone | 5 | — | 1 nibble |
| 74–79 | Audio | 1 | Right/ RightX | 16 bits/4 nibbles 24-bit extension byte/ 6 nibbles total |
| 80 | Phone | 6 | — | 1 nibble |
| 81 | Phone | 7 | — | 1 nibble |
| 82–87 | Audio | 2 | Right/ RightX | 16 bits/4 nibbles 24-bit extension byte/ 6 nibbles total |
| 88 | Asynch Net | 16–23 | — | nibble |
| 89 | Asynch Net | 24–31 | — | 1 nibble |
| 90–95 | Audio | 3 | Right/ RightX | 16 bits/4 nibbles 24-bit extension byte/ 6 nibbles total |
| 96–111 | Video | 1 | — | 8 bytes/16 nibbles |

TABLE III-continued

DEFAULT DATA STREAM CHANNEL ASSIGNMENTS

| NIBBLE(S) | MEDIA TYPE | CHANNEL | DESCRIPTION | SIZE |
|---|---|---|---|---|
| 112–127 | Miscellaneous | 1 | — | 8 bytes/16 nibbles | f) System Command Stream

As noted above, the system command stream is used primarily for initialization and configuration of devices on a logical ring network. By propagating along the default network path, the system command stream reaches every network device. In one embodiment, the system command stream consists of fixed-length 40-byte system commands (formatted as illustrated in Table IV below), distributed over 40 frames, and thus occupying two nibbles (1 byte) per frame.

In this embodiment, the first 2 nibbles of a system command are interpreted as special "system command header" markers, and the remaining 78 nibbles (39 bytes) are interpreted as data. As shown in Table I above, the MSB of the 5-bit "Translated Value" of each symbol determines whether that symbol represents a special marker (MSB=1) or data (MSB=0).

The system command header delimits system commands within the system command stream and indicates whether the current system command already is "in use" (i.e., contains a system command already propagating along the default network path) or is "empty" (i.e. free to be overwritten by the receiving network device). The two-symbol "system command start" marker ("TR") indicates that the system command is in use, while the two-symbol "system command empty" marker ("TU") indicates an empty system command.

If a network device desires to initiate a system command, it waits for, and then overwrites, a system command empty marker (TU) with a system command start marker (TR). It then overwrites the subsequent 39 bytes in the system command stream (i.e., 1 byte per frame) with the appropriate data, as discussed below, filling unused portions of fields with numeric "0"s. Network devices have sufficient time to overwrite portions of a system command because, as noted above, each network device imposes at least a one-frame delay to process system commands. Thus, network devices can modify system commands initiated by other network devices, as well as initiate their own system commands (although, as will become apparent below, there is no requirement in this embodiment that network devices be capable of initiating system commands).

Following the system command header is a one-byte system command identifier. Like an opcode, this field distinguishes the various types of system commands described below. The seven LSBs of this 8-bit field are used to identify up to 127 different types of system commands ("0x00–0x7E"), with the "0x7F" value reserved for future extensibility via "extended" system commands which could be defined, for example, using part of the 20-byte "system command data" field described below. The MSB of the system command identifier ("age bit") is used to mark or "age" system commands so that they can be "removed" from the logical ring network and their bandwidth reclaimed (as is discussed in greater detail below).

Following the system command identifier field is an 8-byte network device "destination address" field. As will be explained below, each network device is identified in this embodiment by a unique 64-bit address. The destination address field indicates the intended target of the system command. A destination address of all "0" s indicates a "broadcast" destination address intended for all network devices. Although system commands propagate to every network device on the default network path, devices other than the intended target need not process or perform the system command. They merely "pass it on" to the next device on the default network path.

Following the destination address field is an 8-byte network device "source address" field which identifies the network device that initiated the system command. This enables network devices to communicate "privately" with one another—e.g., responding to a system command by placing the source address from the original system command in the destination address field of the responsive system command.

Following the source address field is a 20-byte "system command data" field which contains information specific to each particular type of system command (as will be discussed below). As noted above, this field could also include extended system command identifiers.

The next to last byte of a system command is the "status" byte. Network devices set the LSB or "acknowledge" bit of this byte in a received system command to acknowledge receipt of the system command. Because system commands propagate back to the network device that initiated them before being removed, the initiating network device can inspect the acknowledge bit and know whether the target device received the system command. The "next-to-LSB" (i.e., bit 1) of the status byte is undefined in this embodiment. As will be discussed below, most system commands that are addressed directly to a network device (i.e., not broadcast) require an acknowledgement.

The 6 MSBs of the status byte can be used by a network device as a "sequence number" to track system commands it initiates. This sequence number can be particularly useful if a network device transmits a sequence of system commands and the cumulative system command propagation delay exceeds 40 frames (e.g., 80 or 120 frames). Rather than having to "remember" (i.e., buffer) the entire sequence or system commands it has initiated in order to detect an error (e.g., a system command that is garbled during transmission), the device can detect such an error merely by detecting a gap in the order of the sequence numbers as it receives its own system commands (e.g. 1, 2, 3, 5, 6-indicating that the $4^{th}$ system command it initiated was somehow corrupted while propagating along the default network path). In addition, sequence numbers can be used by both the sender and recipient to distinguish otherwise identical system commands.

The final byte of a system command is the "checksum" byte, which contains an error detection checksum reflecting the other 39 bytes of the system command. Upon receiving a system command (even an empty system command), a network device can regenerate the checksum from the first 39 bytes of that system command, and compare that generated checksum to the received checksum byte (as shown below) to detect certain errors, such as an accidentally "flipped bit" during transmission.

In one embodiment, the network device only performs the system command after receiving it in its entirety and verifying it via its checksum byte. If the checksum byte does not match the generated checksum, then the device does not perform the system command. By that time, however, the device already may have passed on (and perhaps modified) many bytes of the system command.

In this embodiment, if the network device does not modify any portion of the system command, then it merely passes the entire system command (including the checksum byte, "matching" or not) onto the next network device on the logical ring network. That next device will thus generate the same matching or non-matching checksum, and act in a similar manner.

If, however, the network device modifies any portion of the system command (e.g., to initiate its own system command, acknowledge a system command initiated by another network device, etc.), then the device computes and transmits its own checksum byte, reflecting the other 39 (somewhat modified) bytes of the system command transmitted to the next device on the logical ring network. Yet, if the checksum byte of the received system command does not match the checksum generated from the other 39 bytes as received, then the device instead transmits the "one's complement" (i.e., logical complement of each bit) of that computed checksum byte. This virtually guarantees that the next device will receive a bad (non-matching) checksum and ignore the modified system command. Following is one embodiment of such a checksum algorithm.

To verify a received system command, a network device first concatenates each pair of 4-bit data nibbles it receives (after checking and stripping off the MSB of the 5-bit Translated Values of the received symbols as shown in Table I), with the first nibble received being the most significant nibble. For special markers such as the "System Command Start" and "System Command Empty" markers, the device checks and strips off the MSBs of the 5-bit Translated Values of each received symbol to create 4-bit values before concatenating them together.

The device uses these 8-bit values to regenerate a checksum to compare to the received checksum byte, by performing a cumulative "bytewise" addition (8-bit addition with no carry beyond the MSB) of the first 39 of these 8-bit values of the system command received, beginning with the system command header. It then extracts the received checksum byte as data—i.e., by stripping off the MSB ("0") from the 5-bit Translated Values of each of the 2 received nibbles of the received checksum byte, and concatenating them together into an 8-bit extracted checksum with the first nibble received being the most significant nibble. Finally, the device compares the 8-bit regenerated checksum to this 8-bit extracted checksum. Only an exact match constitutes a validly received system command.

To compute a checksum byte to transmit as part of a modified system command, the device concatenates pairs of 4-bit data nibbles (or the least significant 4 bits of the 5-bit Translated Value of each special marker symbol) derived from the (somewhat modified) data/markers, prior to further encoding/translating them into 5-bit symbols for transmission to the next device on the logical ring network. The device computes a checksum, as above, by performing a cumulative "bytewise" addition (8-bit addition with no carry beyond the MSB) of the first 39 of these 8-bit values of the system command to be transmitted, again beginning with the system command header.

As noted above, however, if the received system command was not valid (due to a non-matching received checksum byte), the device logically complements this computed checksum byte (i.e., inverts all 8 bits) for the purpose of propagating a "bad" checksum to the next device on the logical ring network, indicating that the system command cannot be trusted.

At this point, whether or not the received system command was valid, the device transforms this 8-bit computed (and possibly inverted) checksum into two distinct 5-bit Translated Values by prepending a "0" to the MSB of the most significant 4-bit nibble of the 8-bit computed checksum (to form the first 5-bit Translated Value of the new checksum byte), and prepending a "0" to the MSB of the least significant 4-bit nibble of the 8-bit computed checksum (to form the second 5-bit Translated Value of the new checksum byte). Finally, the device transmits this new checksum byte by encoding these two distinct 5-bit Translated Values into symbols for transmission to the next device on the logical ring network.

TABLE IV

SYSTEM COMMAND FORMAT

| FIELD | SIZE | DESCRIPTION |
|---|---|---|
| S | 1 byte/2 symbols | System Command Header "System Command Start" (TR) and "System Command Empty" (TU) markers |
| CMD | 1 byte/2 nibbles | System Command identifier (MSB is the age bit) |
| Destination ID | 8 bytes/16 nibbles | Destination address |
| Source ID | 8 bytes/16 nibbles | Source address |
| System Command Data | 20 bytes/40 nibbles | System Command-specific information |
| Status | 1 byte/2 nibbles | Sequence Number, Acknowledge, etc. |
| Checksum | 1 byte/2 nibbles | Error detection checksum |

Table V below illustrates one embodiment of a set of system commands. Assuming a 44.1 kHz frame rate along the default network path, the system command stream includes approximately 1100 of these 40-byte system commands per second. By supporting over 1000 system commands per second, the logical ring network can be reintialized and/or reconfigured in less than a second, as will be discussed below, even as the number of network devices increases substantially and devices such as switching routers are added to increase network bandwith for the data stream. If network devices need to send custom commands to one another, or simply need additional command bandwidth, they can embed such commands in the data stream, as discussed below.

It should be noted that, because every network device receives these system commands, the NRZ bi-level coding scheme is used for transmission of the system command stream. For example (as discussed in greater detail below), certain network devices might utilize 5-level coding or other advanced modulation techniques to increase network bandwidth for the data stream. Such portions of the data stream might propagate along an alternate "shortcut" path instead of the default network path, and might encounter only network devices capable of interpreting data transmitted via these advanced modulation techniques. The system command stream, however, propagates to every network device, and thus is transmitted via NRZ bi-level coding—the "lowest common denominator" modulation technique.

In one embodiment, the network clock device initiates a stream (over the course of 40 frames) of 40-byte empty system commands which propagate along the default network path. Following the system command empty marker, the network clock device transmits 38 bytes of numeric "0"s and a correct checksum byte (as described above).

As noted above, another device receiving one of these empty system commands can initiate a system command by modifying the system command header—i.e., overwriting the system command empty marker with a system command start marker. Because each device delays the system command stream by buffering system commands (typically for at least a few 44.1 kHz frame times), the network clock device must, as noted above, "round up" the cumulative system command propagation delay to an integral multiple of 40 of these 44.1 kHz frame times to prevent system commands from overlapping one another and becoming corrupted.

The network clock device also is responsible in this embodiment for "aging" and removing system commands, as noted above. Upon receiving a non-empty system command, the network clock device can set its age bit (the MSB of the system command identifier) and wait for that system command to propagate around the default network path of the logical ring network. Upon receiving any system command with its age bit set, the network clock device can remove that system command (which every network device, including the device that initiated the system command, has had an opportunity to process) by changing its system command start marker to a system command empty marker, and thereby creating another empty system command which other network devices can then overwrite to initiate their own system command.

The network clock device also ages and removes system commands with a bad (non-matching) checksum byte. The network clock device does not age empty system commands; though it does recreate them to avoid retaining any transmission errors.

The network clock device also does not need to age system commands which it initiates. Instead of setting the age bit, it may simply recognize its own system command (by its source address) after it propagates around the default network path of the logical ring network, and then remove that system command as described above. Other network devices also can remove their own system commands in this manner, thereby promoting "fairness" in that empty system commands will not be so readily available only to devices closely following the network clock device along the default network path. In addition, overall system command throughput is increased because system commands are removed from the network more quickly; and replaced with empty system commands.

In order to remove its own system commands, however, devices must buffer some portion of each received system command to determine whether it should be removed, thereby increasing system command latency. In one embodiment, 20 bytes are buffered, so that the device can identify its own system command via the Source ID field. The system command also will be removed, upon detecting a bad checksum byte, even if the Source ID field match was due to a transmission error.

As a result, system commands are delayed for 20 (44.1 kHz) frames when propagating through such devices (and even longer for the network clock device, which buffers an entire 40-byte system command and rounds up the cumulative system command propagation delay to an integral multiple of 40 frames).

In any event, a system command initiated by a network device will return to that network device before being removed (by the device itself or by the network clock device). That network device thus has an opportunity to recover data (e.g., an acknowledge bit or the location of device-specific data) which was "embedded" into the system command by the target/destination device to which the system command was addressed. Network devices embed such data by overwriting the relevant field(s) of the system command, padding any unused data nibbles of such fields (or entire unused fields) with numeric "0"s, and generating a new checksum.

In this manner, most network devices can be relatively "dumb"—i.e., capable only of responding to system commands (important for significant purposes, such as network initialization and/or device configuration), but not necessarily capable of initiating system commands or handling complex communications protocols. As smarter "system controllers" with CPUs are added to the network, these "smart" devices can reconfigure "dumb" devices by reading/executing their device drivers (stored, for example, in on-board memory) and reading/writing their on-board registers, as discussed below.

Illustrated in Table V below is one embodiment of a set of system commands. As noted above, these system commands are used primarily for initialization and/or configuration of network devices. Each of these system commands is explained in greater detail below in the context of the operation of the logical ring network.

Briefly, the MASTER RESET, CLOCK ID, SCAN RESET, SCAN REQUEST, SCAN REPLY and SCAN INITIATE system commands are used to reset and initialize network devices. Network devices (if capable) can communicate with one another, and read/write one another's device-specific information via the MESSAGE, READ, WRITE, SET and GET system commands. Data stream channels can be reallocated and controlled via the TALK ASSIGN, TALK QUERY, LISTEN ASSIGN, LISTEN QUERY, START STREAMS, STOP STREAMS, and QUERY STREAMS system commands. Network devices can utilize the PLL LOCK system command to synchronize to external information transmitted at reference frequencies that differ from the logical ring network frequency (e.g., data bit rate). The network clock device transmits the "time of day" periodically via the TIME MARK system command and WK Time Sync frame header marker. Finally, this set of system commands can be extended with additional system commands via the EXTENDED system command field identifier.

TABLE V

SYSTEM COMMANDS

| SYSTEM COMMAND | CONTENTS | | PURPOSE |
|---|---|---|---|
| MASTER RESET | 1 | TR | Used to perform a reset of individual or all network devices. Upon being reset, devices return to their "default"state, without the need for a subsequent network clock device arbitration and logical ring network topology scan. |
| | 2 | 0x01 | |
| | 3–10 | Destination ID* | |
| | 11–18 | Source ID | |
| | 19–39 | Zeros | |
| | 40 | CHECKSUM | |
| CLOCK ID | 1 | TR | Upon being reset (in response to power up, detection of an error condition or a MASTER RESET system command), "clock-capable" network devices repeatedly broadcast CLOCK ID system commands with their own Device ID source address (ignoring received CLOCK ID system |
| | 2 | 0x02 | |
| | 3–10 | Broadcast ID | |
| | 11–18 | CLK Device ID | |
| | 19–39 | Zeros | |
| | 40 | CHECKSUM | |

TABLE V-continued

SYSTEM COMMANDS

| SYSTEM COMMAND | CONTENTS | PURPOSE |
|---|---|---|
| | | commands having a lower Device ID) until they receive a CLOCK ID system command having a higher Device ID (indicating they will not become the network clock device) or a CLOCK ID system command with their own Device ID (indicating they will become the network clock device). |
| SCAN RESET | 1 TR<br>2 0x03<br>3–10 Broadcast ID<br>11–18 CLK Device ID<br>19–39 Zeros<br>40 CHECKSUM | Upon becoming the network clock device (or subsequently receiving a SCAN INITIATE system command), the network clock device performs a "soft" reset (scan) of network devices by broadcasting a SCAN RESET system command to notify every network device that it should respond to the next SCAN REQUEST system command it receives |
| SCAN REQUEST | 1 TR<br>2 0x04<br>3–10 CLK Device ID<br>11–18 CLK Device ID<br>19–22 Zeros<br>23–36 Returned Data Stream<br>37–38 Zeros<br>39 ACK<br>40 CHECKSUM | After sending a SCAN RESET system command, the network clock device repeatedly sends SCAN REQUEST system commands (listing itself as the "destination") until it receives one of these system commands unmodified (indicating that all network devices have received/modified one of these system commands). Each network device overwrites the first (and only the first) SCAN REQUEST system command it receives by changing the SCAN REQUEST system command identifier field to a SCAN REPLY (now destined for the network clock device), embedding in the system command data field its Device ID and the location and length of its device-specific configuration and code control block (stored in its local memory address space), and setting the acknowledge bit of the status byte. |
| SCAN REPLY | 1 TR<br>2 0x05<br>3–10 CLK Device ID/ Broadcast ID<br>11–18 CLK Device ID<br>19–22 Zeros<br>23–36 Returned Data Stream<br>37–38 Zeros<br>39 ACK<br>40 CHECKSUM | Created when each network device modifies a SCAN REQUEST system command, and then modified by the network clock device which broadcasts each of these modified SCAN REPLY system commands so that interested network devices can discern the logical ring network topology. |
| SCAN INITIATE | 1 TR<br>2 0x06<br>3–10 Broadcast ID<br>11–18 Source ID<br>19–38 Zeros<br>39 ACK<br>40 CHECKSUM | Used by a network device (e.g., a hot pluggable smart jack upon insertion or removal of a network device) to cause network clock device to initiate a "soft" reset (scan) of network devices to enable interested network devices to discern the logical ring network topology. |
| MESSAGE | 1 TR<br>2 0x07<br>3–10 Destination ID*<br>11–18 Source ID<br>19–32 Message Data<br>33–38 Timestamp**<br>39 ACK<br>40 CHECKSUM | Used to send events and other information (in a predefined "message data" format) to which interested devices can respond. The Timestamp indicates, for example, when an event occurred or will/should occur. |
| SET | 1 TR<br>2 0x08<br>3–10 Destination ID<br>11–18 Source ID<br>19–21 I/O Address<br>22 Length<br>23–32 Sent Data<br>33–38 Timestamp**<br>39 ACK<br>40 CHECKSUM | Used to write values (up to single-byte registers in one embodiment) in the local I/O address space of a network device. The locations and functions of these "registers" are documented in the configuration and code control block in the local memory address space of each network device, and can be read via a READ system command. The Timestamp, if supported by a destination network device, can be used to queue the actual write until the designated time. |
| GET | 1 TR<br>2 0x09<br>3–10 Destination ID<br>11–18 Source ID<br>19–21 I/O Address<br>22 Length<br>23–38 Returned Data<br>39 ACK<br>40 CHECKSUM | Used to read values (up to 16 single-byte registers in one embodiment) from the local I/O address space of a network device. The locations and functions of these "registers" are documented in the configuration and code control block in the local memory address space of each network device, and can be read via a READ system command. |
| WRITE | 1 TR<br>2 0x0A<br>3–10 Destination ID<br>11–18 Source ID<br>19–21 Start Location<br>22 Length<br>23–38 Sent Data<br>39 ACK<br>40 CHECKSUM | Used to write values to the local memory address space of a network device. The local memory address space of a device can address on-board ROM (which of course cannot be written), RAM or peripheral registers, and can contain the Device ID (in ROM), configuration and code control block and other information for the device. |
| READ | 1 TR<br>2 0x0B<br>3–10 Destination ID<br>11–18 Source ID<br>19–21 Start Location<br>22 Length<br>23–38 Returned Data<br>39 ACK<br>40 CHECKSUM | Used to read values from the local memory address space of a network device. The local memory address space of a device can address on-board ROM; RAM or peripheral registers, and can contain the Device ID (in ROM), configuration and code control block and other information for the device. |
| TALK ASSIGN | 1 TR<br>2 0x0C<br>3–10 Destination ID<br>11–18 Source ID<br>19–20 Zeros<br>21 Media Stream ID<br>22 Bank<br>23–38 Transmit Enable Mask<br>39 ACK | Used (e.g., by a "smart" system controller device) to assign a data stream "transmit" channel to a network device by associating individual "network nibble streams" of the data stream (identified via the Transmit Enable Mask and Bank fields) with one of |

TABLE V-continued

SYSTEM COMMANDS

| SYSTEM COMMAND | CONTENTS | | PURPOSE |
|---|---|---|---|
| | 40 | CHECKSUM | the device's "transmit media streams" (identified via the Media Stream ID field). |
| TALK QUERY | 1<br>2<br>3–10<br>11–18<br>19–20<br>21<br>22<br>23–38<br><br><br>39<br>40 | TR<br>0x0D<br>Destination ID<br>Source ID<br>Zeros<br>Media Stream ID<br>Bank<br>Returned Transmit Enable Mask<br>ACK<br>CHECKSUM | Used (e.g., by a "smart" system controller device) to query a network device to determine, for a specified one of the device's "transmit media streams" (identified via the Media Stream ID field), which individual "network nibble streams" of the data stream (identified via the Returned Transmit Enable Mask and Bank fields) are currently associated with that "transmit media stream". |
| LISTEN ASSIGN | 1<br>2<br>3–10<br>11–18<br>19–20<br>21<br>22<br>23–38<br><br>39<br>40 | TR<br>0x0E<br>Destination ID<br>Source ID<br>Zeros<br>Media Stream ID<br>Bank<br>Receive Enable Mask<br>ACK<br>CHECKSUM | Used (e.g., by a "smart" system controller device) to assign a data stream "receive" channel to a network device by associating individual "network nibble streams" of the data stream (identified via the Receive Enable Mask and Bank fields) with one of the device's "receive media streams" (identified via the Media Stream ID field). |
| LISTEN QUERY | 1<br>2<br>3–10<br>11–18<br>19–20<br>21<br>22<br>23–38<br><br><br>39<br>40 | TR<br>0x0F<br>Destination ID<br>Source ID<br>Zeros<br>Media Stream ID<br>Bank<br>Returned Receive Enable Mask<br>ACK<br>CHECKSUM | Used (e.g., by a "smart" system controller device) to query a network device to determine, for a specified one of the device's "receive media streams" (identified via the Media Stream ID field), which individual "network nibble streams" of the data stream (identified via the Returned Receive Enable Mask and Bank fields) are currently associated with that "receive media stream". |
| START STREAMS | 1<br>2<br>3–10<br>11–18<br>19–21<br>22<br>23–26<br>27–30<br><br>31–32<br>33–38<br>39<br>40 | TR<br>0x10<br>Destination ID*<br>Source ID<br>Zeros<br>Mask Number<br>IN Stream Mask<br>OUT Stream Mask<br>Zeros<br>Timestamp**<br>ACK<br>CHECKSUM | Used (e.g., by a "smart" system controller device after reallocating data stream channels) to signal one or more network devices to start transmitting/receiving data (at the time specified via the Timestamp field) on whichever "network nibble streams" of the data stream are currently associated with specified ones of the device's "transmit media streams" (specified via the Mask Number and OUT Stream Mask fields) and specified ones of the device's "receive media streams" (specified via the Mask Number and IN Stream Mask fields). |
| STOP STREAMS | 1<br>2<br>3–10<br>11–19<br>19–21<br>22<br>23–26<br>27–30<br><br>31–32<br>33–38<br>39<br>40 | TR<br>0x11<br>Destination ID*<br>Source ID<br>Zeros<br>Mask Number<br>IN Stream Mask<br>OUT Stream Mask<br>Zeros<br>Timestamp**<br>ACK<br>CHECKSUM | Used (e.g., by a "smart" system controller device following a sequence of QUERY STREAMS system commands) to signal one or more network devices to stop transmitting/receiving data (at the time specified via the Timestamp field) on whichever "network nibble streams" of the data stream are currently associated with specified ones of the device's "transmit media streams" (specified via the Mask Number and OUT Stream Mask fields) and specified ones of the device's "receive media streams" (specified via the Mask Number and IN Stream Mask fields). |
| QUERY STREAMS | 1<br>2<br>3–10<br>11–18<br>19–21<br>22<br>23–26<br>27–30<br><br>31–38<br>39<br>40 | TR<br>0x12<br>Destination ID<br>Source ID<br>Zeros<br>Mask Number<br>IN Stream Mask<br>OUT Stream Mask<br>Zeros<br>ACK<br>CHECKSUM | Used (e.g., by a "smart" system controller device prior to initiating a STOP STREAMS system command and reallocating data stream channels) to query a network device to determine, from among specified ones of the device's "transmit media streams" and "receive media streams" (identified via the Mask Number field), on which of those transmit media streams (identified via the OUT Stream Mask field) and receive media streams (identified via the IN Stream Mask field) a network device currently is transmitting/receiving data. |
| TIME MARK | 1<br>2<br>3–10<br>11–18<br>19–32<br>33–38<br>39<br>40 | TR<br>0x13<br>Broadcast ID<br>CLK Device ID<br>Zeros<br>Timestamp**<br>ACK<br>CHECKSUM | Broadcast by the network clock device to announce that the next Time Sync frame header ("WK," transmitted periodically in lieu of the "JK" Clock Sync frame header) it transmits will mark the exact time of day specified in the Timestamp field of this TIME MARK system command. |
| PLL LOCK | 1<br>2<br>3–10<br>11–18<br>19–20<br>21<br>22<br>23–30<br>31–32<br>33–38<br>39<br>40 | TR<br>0x14<br>Destination ID*<br>Source ID<br>Zeros<br>PLL Number<br>Zero<br>Phase Error<br>Zeros<br>Timestamp**<br>ACK<br>CHECKSUM | Used by a network device to synchronize to another network device at a reference frequency that differs from the logical ring network frequency. The source device calculates and transmits to the destination device(s) an identifying PLL Number and a "phase error" (via the Phase Error field) based on the difference between the reference and network frequencies. The destination device(s) calculate an analogous "phase error" using a free-running clock which is phase-locked over the network to the reference frequency based on the difference between the transmitted and calculated phase errors. A Timestamp can be used, along with the phase error, to synchronize external devices not on the logical ring network. |
| EXTENDED | 1<br>2<br>3–10 | TR<br>0x7F<br>Destination ID* | Used to extend the system command set (using the system command data field |

TABLE V-continued

SYSTEM COMMANDS

| SYSTEM COMMAND | CONTENTS | PURPOSE |
|---|---|---|
| | 11–18 Source ID | for the extended system command identifier codes as well as system command-specific data) after exhausting the available system command identifier codes in the system command ID field. |
| | 9–39 Extended CMD ID and Data | |
| | 40 CHECKSUM | |

*The Destination ID of 0x0000000000000000 is the broadcast address.
**The first three bytes of a Timestamp respectively represent hours, minutes and seconds in binary coded decimal (BCD) format. The next two bytes represent further "sub-second" resolution via an unsigned binary frame count, and the final byte represents still further "sub-frame" resolution via an unsigned binary sub-frame count. A Timestamp value of 0xFFFFFFFFFFFF is used to indicate immediate action (e.g., when broadcasting a system command to network devices only some of which support timestamps).

g) Device Identification, Addressing and Security (1) Device ID

As noted above, in one embodiment, every network device is identified by a unique 64-bit (8 byte) "Device ID." Conflicts among these Device IDs can be avoided by centralizing their issuance within a single operation. Thus, every network device ever manufactured can be uniquely identified. By accommodating a virtually unlimited number of network devices, logical ring networks can be interconnected without device conflict across homes, vehicles, buildings, and companies throughout the world.

A network device's Device ID is used in the Destination ID and Source ID "address" fields of system commands, and can be discerned by capable network devices during network initialization and used to access a device's local memory address space (discussed below). In addition, as will be explained below, the Device ID is used during network initialization to elect the network clock device—i.e., the competing device with the greatest Device ID value. One embodiment of the Device ID format is specified in Table VI below. In this embodiment, only the "Switch" field can be modified.

The Switch field, which occupies the initial (most significant) three bits of the Device ID, can be used to "force" the election of a device as the network clock device. The Switch field is set by default to all "0"s, but can be modified via a switch on the network device itself, or programmed dynamically by another network device. A user might, for example, set the Switch field of a particular network device to "010" (using a switch on the device itself) to force a medium priority which likely will cause that device to become the network clock device during network initialization (because the user probably will not set any switches on other devices).

Following the Switch field is a 5-bit "Network Revision" field that indicates whether the device is capable of becoming the network clock device and, if so, also identifies the version of the logical ring network for which this potential network clock device was manufactured. In this embodiment, the network version will be used for electing the network clock device during network initialization, with greater numbers indicating a more recent network protocol. This ensures that the network device capable of using the most recent clock protocol will be elected as the network clock device (unless overridden via the Switch field). A Network Revision field value of "00000" indicates that the device is not capable of becoming the network clock device.

In one embodiment (discussed below), the clock protocol would require "clock-capable" devices to initialize and auto-configure the logical ring network, and broadcast the "time of day" periodically (e.g., once per minute) via the TIME MARK system command and Time Sync ("WK") frame header. More advanced protocols could require support for initializing network devices capable of transmitting/receiving information on multiple different paths, as well as direct support for hot-pluggable smart jacks and switching routers (as will be discussed in greater detail below).

The final field of the Device ID is a 56-bit "Serial Number" which uniquely identifies and distinguishes network devices from one another. The number of distinct combinations is sufficiently large to guarantee, as a practical matter, that no two network devices ever will conflict with each other. In other words, it is unlikely that the number of network devices (or, for that matter, any article of manufacture) produced worldwide will ever exceed $2^{56}$.

TABLE VI

DEVICE ID FORMAT

| FIELD | SIZE | DESCRIPTION |
|---|---|---|
| Switch | 3 bits | Programmable/switchable field for overriding priority (e.g., for network clock arbitration) |
| Network Revision | 5 bits | Identifier of clock capability and network version (e.g., for resolving version compatibility) |
| Serial Number | 56 bits | Device unique identifier: $2^{56}$ combinations |

(2) Local Memory and I/O Address Space

In one embodiment, each network device has at least some memory, addressable via READ and WRITE system commands. This area of memory, referred to as the device's "local memory address space," can include RAM and peripheral registers as well as ROM. In addition, a network device also may have a "local I/O address space," e.g., a set of physical registers for storing I/O information relating to network device peripheral hardware.

In one embodiment, the local memory address space of a network device is 24 bits wide and is byte-addressable. Network devices stored their Device ID (8 bytes) in ROM, typically along with a "pointer" (e.g., 3-byte starting location and 3-byte length) to their configuration and code control block. This on-board information can, of course, contain virtually any type and format of information (e.g., interpretive bytecodes, URLs, etc.) which other devices, such as a "smart" CPU-based controller, can interpret.

Devices embed this information into SCAN REPLY system commands during network initialization (as explained below). Other interested devices can read this information for subsequent use in communicating directly with a particular device and/or obtaining additional information about a device from an external resource (e.g., the Internet via a URL "pointer"). For example, having discerned another device's Device ID and "pointer" from a SCAN REPLY system command, a "smart" controller could read information from that device's variable-length configuration and code control block (perhaps containing that device's capabilities) by initiating a READ system command.

Network devices thus can communicate directly with one another (via their Device IDs), and can send "messages" via the Message Data field of the MESSAGE system command. Such messages also can include a timestamp (in the Timestamp field) to indicate, for example, the precise "time of day" when an event (contained in the message) occurred or will/should occur. For example, one device could tell another device when to turn itself off.

Using these mechanisms, relatively "dumb" devices (even though incapable of initiating system commands) can be configured, for example, by a "smart" controller device that modifies configuration data in the configuration and control block of the "dumb" network device via READ and WRITE system commands.

The configuration and code control block of a network device could include information such as a machine-independent (e.g., interpreted bytecode written in Java, Smalltalk, etc.) device driver which a "smart" system controller could access and then execute on behalf of the "dumb" network device. It could also include a version number, as well as a pointer to a location (e.g., an Internet URL or BBS phone number) where a current version of this device driver can be found.

In one embodiment, a genetic URL could be employed to point to the location of the device driver either at an Internet address (e.g., "http://www.vendor.com/driverloc") or at an address within the device's local memory address space (e.g., "deviceaddress://deviceloc/driverloc"). Other similar pointers could be used for a variety of purposes, such as defining a device's user interface or enabling a user to sign up for selected services. A pointer to device vendor information, such as warranty registration data, could even be used to register a network device automatically—even a "dumb" device whose warranty data could be registered by a "smart" system controller.

Encryption codes also could be included to ensure that digital media on the logical ring network could only be accessed by "authorized" network devices. These codes might, for example, be accessible only to authorized television/monitor network devices.

If the network device also includes a local I/O address space containing, for example, byte-addressable "registers", the location and function of these registers could be identified in the configuration and code control block. These registers could contain configuration information, for example, relating to network device peripheral hardware. A "smart" system controller could initiate GET and SET system commands to read/write these registers.

As will be apparent to one reasonably skilled in the art, many different data structures (e.g., a linked list of objects) and combinations of RAM/ROM/registers can be employed to accommodate the various types of data contained within the configuration and code control block, as well as any other information stored in a network device's local memory and I/O address space, including "pointers" to external information.

3. Synchronous Logical Ring Network in Operation a) Network Initialization and Auto-Configuration In one embodiment, the initialization and auto-configuration of a logical ring network involves what is essentially a two-step process: (1) network clock device arbitration (to synchronize network devices to a single network clock device) and (2) logical ring network topology scan (to establish the default network plan and enable interested network devices to discern the network topology). As will become apparent, this entire process can be completed in less than one second for typical logical ring networks.

Should one desire to avoid any interruption of the data stream (e.g., to avoid even a short "glitch" in a song, television program or telephone conversation) whenever a new network device is added or removed, one can daisy-chain network devices to hot-pluggable smart jacks. When such network devices are added or removed, the hot-pluggable smart jack will, in effect, isolate the rest of the logical ring network, leaving the data stream intact. As noted above, the data stream can operate independently from the system command stream provided that network devices remain synchronized to the network clock device. A hot-pluggable smart jack maintains this synchronization (as will be explained in greater detail below) by maintaining a consistent cumulative device delay among network devices daisy-chained to that jack, even as such network devices are added or removed. Such jacks thereby avoid the need for another network clock device arbitration, though they will send a SCAN INITIATE system command to cause the network clock device to initiate a logical ring network topology scan to make interested network devices aware of the newly added or removed device(s).

A logical ring network is first initialized when the first "clock-capable" network device is added to the network, and is reinitialized during normal operation whenever a CLOCK ID system command is broadcast (e.g., in response to detection of an error condition, as described below). To initialize a logical ring network, all "clock-capable" network devices arbitrate to be elected as the network clock device to which all other network devices will be synchronized. Following network initialization is an auto-configuration process, managed by the network clock device, during which devices on the logical ring network are scanned to establish the network topology—i.e., the default network path and other paths along which information propagates from device to device on a logical ring network.

At this point, the logical ring network begins "normal operation"—i.e., network devices transmit digital media and other data to one another via the data stream while sending system commands via the system command stream. Though not required, if one or more "smart" system controller devices are present on the network, they can further configure network devices and enhance the functionality and effective bandwidth of the logical ring network in various ways (discussed in greater detail below)—e.g., enabling the functionality of hot-pluggable jacks and switching routers by redistributing network propagation delays among such devices, initializing user interfaces, causing device drivers to be executed, reallocating default data stream channels, and so forth.

In one embodiment, illustrated in FIG. 8, each network device is "reset" 1002 when it is powered on, and whatever it receives a CLOCK ID system command during normal operation. Upon being reset, network devices act differently, depending upon whether they are capable of becoming the network clock device.

A network device also can be "reset" upon receiving a MASTER RESET system command (not shown); though, in this embodiment, such a system command will not result in a reinitialization of the logical ring network. Instead, the device might merely reinitialize certain internal state information and registers, if any, and resort to a default allocation of its media streams (e.g., based upon its most recent stream allocation settings, or its default switch settings, discussed in greater detail below in connection with the default data stream channel allocation).

To initiate the network clock device arbitration process, each "clock-capable" network device immediately broadcasts repeated CLOCK ID system commands (with its own Device ID in the source address field) 1004. Because the logical ring network is not yet synchronized to a network clock device, each such device ignores all received information other than CLOCK ID system commands (i.e., resynchronizing to each received frame header). Upon receiving a CLOCK ID system command, it compares the received "source" Device ID with its own Device ID 1006. The "clock-capable" network device having the highest Device ID will win the arbitration. As will become apparent, this arbitration process will be decided very quickly—i.e., in a single "revolution" of a system command around the default network path of the logical ring network.

If the received Device ID is lower than its own Device ID, it is ignored (i.e., that CLOCK ID system command is not propagated to the next device on the logical ring network) because the "clock-capable" network device having that lower Device ID has already lost its bid to become the network clock device. It thus continues to broadcast CLOCK ID system commands with its own Device ID 1004 until the source Device ID of a received CLOCK ID system command either is:

(i) greater than its own Device ID, in which case it "loses" the arbitration, disables its "clock-capable" functionality and effectively becomes a "non-clock-capable" network device 1010 until the next reset, or (ii) is equal to its own Device ID, in which case it "wins" the arbitration and becomes the network clock device 1012 (i.e., because its Device ID is greater than that of all other devices, and thus propagated completely around the logical ring network).

In the interim, other network devices (including "clock-capable" network devices that have "lost" the network clock device arbitration process) begin "normal operation" 1010—i.e., they propagate received frames, and thus system commands (including CLOCK ID system commands initiated by "clock-capable" network devices), to the next device on the logical ring network until they received a SCAN RESET system command. They do not yet, however, transmit data on the data stream. The network clock device broadcasts this SCAN RESET system command 1012 upon winning the arbitration, effectively initiating the logical ring network topology scan phase of the process (during which data may be transmitted on the data stream).

It should be noted that, during the network clock device arbitration phase, network devices do not stand actual data on the data stream. Each network device instead waits (in one embodiment) for a sufficient passage of time, indicating likely completion of the network clock device arbitration phase and logical ring network topology scan phase (described below), before sending/receiving data (e.g., in accordance with its default channels or the channels it most recently used). If a smart controller device is present, such device may dynamically reallocate the default channels and/or enable particular streams following completion of the logical ring network topology scan phase.

Once the network clock device wins the arbitration and broadcasts a SCAN RESET system command, all other network devices receive this system command and switch to a "scan mode" (e.g., by setting a bit in an internal register) 1014 pursuant to which they will modify a subsequently received SCAN REQUEST system command by converting it into a SCAN REPLY system command, as explained below. In all other respects, network devices continue normal operation (i.e., they continue to propagate received frames to the next device on the logical ring network), and may begin to send actual data on the data stream, e.g., once a sufficient amount of time has elapsed.

The network clock device, upon receiving its own SCAN RESET system command (indicating that all other network devices have seen this system command and switched to their "scan mode"), effectively "broadcasts" repeated (interleaving empty system commands, in one embodiment) SCAN REQUEST system commands, embedding its own Device ID in both the source and destination address fields 1016. Each network device, upon receiving one of these SCAN REQUEST system commands 1018, (i) converts it to a SCAN REPLY system command (by modifying the system command identifier field), (ii) embeds device-specific information (i.e., its Device ID and the location and length of its configuration and code control block) into the system command data field, and (iii) switches from scan mode back to its normal mode of operation (e.g., by resetting a bit in an internal register) in which it ignores subsequent SCAN REQUEST system commands, passing them on to the next device on the logical ring network. The network device remains in this normal mode of operation 1020 until it is reset 1002 as above, or until it switches back into "scan mode" 1014 upon receiving another SCAN RESET system command.

The network clock device, upon receiving SCAN REPLY system commands from each network device, ages and rebroadcasts such system commands, enabling interested devices to discern the logical ring network topology by monitoring the device-specific information embedded in such SCAN REPLY system commands. Upon receiving its own unmodified SCAN REQUEST system command (e.g., the (n)th SCAN REQUEST system command for a network of "n" devices), the network clock device converts it to a SCAN REPLY system command and embeds its own device-specific information 1021, and then begins "normal" operation 1012, creating and transmitting frames (including embedding "empty" system commands into the system command stream) into which other network devices can embed information, such as digital media streams and system commands.

In one embodiment (not shown), the network clock device creates and monitors sequence numbers in both the unaged and aged/rebroadcast SCAN REPLY system commands it receives. If a lost or garbled system command is detected (e.g., if the sequence numbers are not received in order), then the network clock device reinitiates another logical ring network topology scan by transmitting a SCAN RESET system command.

Upon completion of a successful logical ring network topology scan, the network clock device resumes its normal mode of operation until it (i) is reset 1002 as above; (ii) receives a SCAN INITIATE system command (e.g., from a hot-pluggable smart jack upon detecting the addition or removal of a network device), causing it to reinitiate a logical ring network topology scan 1012 by first broadcasting a SCAN RESET system command as above; or (iii) detects an error condition indicating a loss of network synchronization (e.g., the loss of actual data or the lack of expected frame headers), causing it to return to the network clock device arbitration phase by broadcasting repeated CLOCK ID system commands 1004 as above, which will reset all other network devices. The manner in which the network clock device detects error conditions indicating that a network device has been added to or removed from the network, or has malfunctioned or been turned on or off, is discussed in greater detail below with respect to the clock processing hardware of a logical ring network adapter.

Once the logical ring network is initialized and the network topology scan has completed, "smart" system controller devices, for example, can further configure the network. For example, a "smart" network clock device, upon detecting the presence of switching routers and/or hot-pluggable smart jacks, could redistribute the cumulative frame propagation delay among such devices (e.g., by writing device-specific registers via WRITE system commands) to enable them to handle the addition and/or removal of network devices without interrupting the data stream. As will be discussed in greater detail below, maintaining a consistent delay through such network devices avoids the need for another network clock device arbitration, which would disrupt the data stream. Upon detecting the addition or removal of a network device, the hot-pluggable smart jack or switching router could broadcast a SCAN INITIATE system command (as discussed above) to enable other network devices to discern the "new" network topology, without disrupting the data stream.

A system controller also could load and execute device drivers (obtained, for example, via READ system commands) on behalf of particular network devices, as well as dynamically reallocate data stream channels based upon the types of devices currently present on the network (as explained in greater detail below). For example, if three MPEG2 video source devices (e.g., DVD players or DSS receivers) are present on the network, and only two are accommodated by the default allocation, a system controller might be able to reallocate an unused data stream channel to accommodate the additional MPEG2 source. Moreover, a system controller also could initialize user interfaces present on remote control displays; televisions and other similar devices.

Finally, in one embodiment of the current network clock device protocol, the network clock device periodically broadcasts a common "time of day" reference for interested network devices. The network clock device might, for example, transmit the "time of day" once every minute to provide a common reference point for network devices capable of tracking time and supporting time-based events.

In one embodiment, the network clock device transmits this "time of day" reference by first broadcasting a TIME MARK system command with the "time of day" specified in the Timestamp field, which indicates to interested network devices that such "time of day" will occur upon receipt of the next "WK" frame header. At the appropriate time, the network clock device then substitutes the Time Sync ("WK") frame header (in lieu of the far more common Clock Sync ("JK") frame header) to "mark" the previously specified time of day.

It should be noted that this "time of day" is a very accurate relative time marker. Although it is received at slightly different times by network devices due to propagation delays along the logical ring network, these relative time differences remain constant due to the synchronous nature of the logical ring network. Moreover, in one embodiment, the delay does not exceed one (44.1 kHz audio sample) frame time. The "sub-frame" field of the Timestamp therefore is set to zero in this embodiment.

b) Sending and Receiving Information over a Logical Ring Network via the System Command Stream and Data Stream Channels Upon completion of the network clock device arbitration and logical ring network topology scan process, network devices begin (or perhaps continue) "normal" operation—i.e., they transmit and receive data to/from one another via the data stream. As noted above, if any "smart" system controller devices are present on the network, they may perform additional network device configuration, via the system command stream, in parallel with the data stream.

For example, such devices may utilize the MESSAGE, READ, WRITE, SET and GET system commands to further configure particular network devices and/or establish proprietary protocols to communicate relatively small amounts of information. Moreover, network devices that transmit and receive MPEG2 streams (or other streams clocked at an external rate differing from the logical ring network rate) may utilize the PLL LOCK system command and associated circuitry (as discussed in greater detail below) to create, in effect, a "network phase-locked loop." This network phase-locked loop enables network devices to decode MPEG2 data, for example, at the MPEG2 external clock rate (approximately 27 MHz).

Briefly, the MPEG2 data stream would be (i) received/generated at the MPEG2 clock rate by a "source" device (such as a DSS receiver or DVD player), (ii) transmitted at the logical ring network data bit rate to a "destination" network device having an MPEG2 decoder (which could be embedded into a "digital" television or connected to a television via a traditional analog video cable); and (iii) decoded at the MPEG2 clock rate by the MPEG2 decoder, which contains a clock that is synchronized, via the "network phase-locked loop," to the reference MPEG2 clock received/generated at the "source" device.

(1) Default Data Stream Channel Allocation

In normal operation, network devices can transmit and receive information via the data stream even if no "smart" network devices are present on the logical ring network. As noted above, network devices can utilize a switch (e.g., a physical slide, toggle or rotary switch, or RAM, EEROM, etc.) setting to select from among multiple default data stream channels. If "smart" network devices are present on the network, they can override these default data stream channels by reassigning their "network nibble streams" dynamically, as explained below.

In one embodiment, network devices have up to 256 "IN Device Media Streams" and 256 "OUT Device Media Streams," each of which can be associated with a set of "network nibble streams"—i.e., nibbles (not necessarily contiguous) from among the 128 available nibbles in each "bank" of the data stream (less than four nibbles assigned to the frame header and system command byte in the initial bank—see Table III above). Multiple 128-nibble "banks" of the data stream may arise as additional network bandwidth is made available—e.g., by employing bidirectional network devices or advanced modulation techniques such as 5-level coding (as will be discussed in greater detail below).

For example, a simple CD player network device might not have any IN Device Media Streams, and have only two OUT Device Media Streams, each associated (initially by means of a switch setting) with a set of network nibble streams corresponding to one of the default data stream channel assignments (e.g., Audio Left Channel 1, occupying nibbles 10–15, and Audio Right Channel 1, occupying nibbles 74–79). During normal operation, the CD player would transmit its digital audio stream by overwriting nibbles 10–15 (left channel) and 74–79 (right channel) of each frame. A simple speaker network device might have a single IN Device Media Stream associated (e.g., via its switch) with default Audio Left Channel 1 (nibbles 10–15) to receive and play that "left channel" digital audio stream. Another simple speaker network device could be associated in an analogous manner with default Audio Right Channel 1 (nibbles 74–79) to receive and play the corresponding "right channel" digital audio stream.

As each frame propagates around the default network path (or alternate path) of the logic ring networks, the CD player would overwrite nibbles 10–15 and 74–79 with the respective (left and right channel) source digital audio streams. Other network devices would merely pass those nibbles of each frame along to the next network device on the logical ring network. One or more "left" speaker network devices (e.g., in different rooms of a house) would extract nibbles 10–15 of each frame and play that left channel digital audio stream. Similarly, one or more "right" speaker network devices would extract nibbles 74–79 and play that right channel digital audio stream.

Other source and destination network devices would transmit and receive digital media streams in a similar manner using different default data stream channels (and thus different network nibble streams), as illustrated in Table III above. This process would continue until the network nibble streams associated with these default data stream channels are reallocated dynamically (as discussed below), or until one or more network devices malfunctions or is powered off or rest.

If a device malfunctions or is powered off, a complete reinitialization of the logical ring network may result. If a device is connected via a hot-pluggable smart jack or a distinct arm of a switching router, however, it might simply continue transmitting or receiving data via the data stream in parallel with a logical ring network topology scan (as explained below).

In one embodiment, upon receiving a MASTER RESET system command, a network device would resume transmitting or receiving data based upon its default switch settings. In yet another embodiment, it would utilize its most recent dynamically allocated data stream channels, if any. In still another embodiment, the device would await dynamic reallocation of its IN and OUT Device Media Streams—e.g., by the "smart" device that initiated the MASTER RESET system command. In this manner, the entire network can be reset and all digital media streams restarted simultaneously, as discussed below.

(2) Dynamic Reallocation of Data Stream Channels

As noted above, a "smart" CPU-based controller network device can modify dynamically the data stream channels on which other network devices are transmitting and receiving data. For example, when a user wants to switch sources (e.g., from a DSS satellite broadcast to a DVD movie), a controller could reassign the relevant digital audio and video streams to the new source network device (e.g., the DVD player).

In a simple case, a controller need only reassign the default data stream channel from the former source network device to the new source network device. Yet, the architecture described above permits even greater flexibility. The network nibble streams assigned to the new source network device need not be contiguous, as are the default data stream channels. For example, If a third digital audio channel is required (e.g., where only two such channels are available by default, yet three people want to heat different songs or other audio streams simultaneously), a controller could reallocate individual network nibble streams from portions of unused default data stream channels (e.g., miscellaneous and/or sync channels), and assign those individual network nibble streams (e.g., as a discontiguous "channel") to a new source network device, which would transmit that third digital audio channel onto the logical ring network.

A controller could even assign network nibble streams that are "in use" to another source device (i.e., doubly assigning the same network nibble streams to multiple source devices), provided that the controller knew that no overlap would occur among devices listening to such sources. For example, if two speaker devices were the only devices listening to the digital stereo audio streams transmitted by a CD player device, and such speaker devices were adjacent to the CD player device on the logical ring network, then th network nibble streams carrying those digital stereo audio streams might be able to be reused by other devices adjacent to one another on another portion of the logical ring network (e.g., a DVD player adjacent to two speaker devices listening to the stereo audio soundtrack of a DVD movie).

In one embodiment, a controller dynamically reassigns these network nibble streams (i.e., data stream channels) to individual network devices via the TALK ASSIGN, TALK QUERY, LISTEN ASSIGN, LISTEN QUERY, START STREAMS, STOP STREAMS, and QUERY STREAMS system commands. In essence, these system commands enable the controller to query network devices to determine which of their IN/OUT Device Media Streams are being used, and with which network nibble streams such Device Media Streams are associated. A controller can identify another device's IN/OUT Device Media Streams by reading from the device's configuration and code control block as noted above. Having determined this information by querying one or more network devices (if necessary), a controller can then stop all relevant streams simultaneously, reassign the desired network nibble streams, and then simultaneously start the new streams.

A smart controller network device typically would maintain the table (whether stored locally or in some other device, or in a distributed fashion) indicating which network devices are transmitting or receiving data on each of the network nibble streams. Initially, however, network devices utilize the default data stream channel allocation discussed above and illustrated in Table III. The controller might therefore query each network device (by sending TALK QUERY and LISTEN QUERY system commands) to determine which network nibble streams are associated with each device's IN/OUT Device Media Streams.

For example, a DSS satellite receiver network device might have one OUT Device Media Stream for transmitting a stream of MPEG2 digital audio/video. The controller might send this device a TALK QUERY system command to determine which network nibble streams (e.g., default Video Channel 0 on nibbles 32–47) are associated with this OUT Device Media Stream. The controller would specify the relevant OUT Device Media Stream via the Media Stream ID field (as shown in Table V above), and the DSS receiver would return a 128-bit Transmit Enable Mask indicating the associated network nibble streams. Analogously, the controller would send a LISTEN QUERY system command to each television/monitor network device to determine which network nibble streams (e.g., default Video Channel 0 on nibbles 32–47) are associated with the IN Device Media Stream of the television/monitor.

The controller might also issue QUERY STREAMS system commands to the television/monitor and DSS satellite receiver devices to determine whether their IN/OUT Device Media Streams are "active." The Mask Number field (shown in Table V above) selects one of the eight 32-stream blocks of 256 possible IN/OUT Device Media Streams. For example, in one embodiment, the 3 LSBs of the Mask Number select one of the eight 32-stream blocks. The device returns an IN Stream Mask and OUT Stream Mask to indicate which of those Device Media Streams are active. For example, an OUT Stream Mask of "10000000000000000000000000000000" would indicate that the DSS Receiver was transmitting its MPEG2 stream via its first (perhaps only) OUT Device Media Stream, and was not currently transmitting any other streams.

Thus, the controller can utilize these "query" system commands (TALK QUERY, LISTEN QUERY and QUERY STREAMS) to maintain a table which maps each network nibble stream to particular IN/OUT Device Media Streams among the network devices on the logical ring network. When a change is desired (e.g., when a user switches sources via a remote control network device), the controller can stop the relevant streams, reallocate and reassign the appropriate network nibble streams, and then start those reassigned streams.

For example, a user listening to a song on a CD player might switch sources, via a remote control device, in order to watch a movie on a DVD player. The controller might first determine (by issuing TALK QUERY, LISTEN QUERY and QUERY STREAMS system commands to the extent necessary, as discussed above) the appropriate reallocation of network nibble streams necessary to accommodate this change. The 12 network nibble streams previously associated with the left/right digital audio channels transmitted by the CD player device might now be free to be reused (unless another person, e.g., in another room, is listening to the current CD). Yet, the MPEG2 digital audio/video stream to be transmitted by the DVD player would require reallocation of 16 network nibble streams. The controller could assign these 16 network nibble streams from among the "freed up" network nibble streams (assuming 16 were available, even if discontiguous).

The controller then could send the STOP STREAMS system command to any affected network devices (e.g., speakers, televisions/monitors, etc.). This system command also can be broadcast to stop all data stream transmissions, though this typically would not be required for a simple change of audio/video sources, because only a relatively few network nibble streams are affected. By stopping the transmission of such relevant streams before reallocating the network nibble streams on which such streams are transmitted, one can avoid unpleasant and potentially harmful side effects, such as a speaker attempting to play an MPEG2 stream for a short period of time before that MPEG2 stream is reallocated to different network nibble streams).

It should be noted that such potentially harmful side effects also can be avoided by "data detection" functionality within the device itself. For example, any device that "plays" media (e.g., a speaker device) could, upon detecting an illegal 4B/5B code, automatically "mute" itself. Moreover, such a device might also mute itself upon detecting unusual media-specific characteristics that extend for a period of time (e.g., greater than one second). In the case of audio, such unusual characteristics might include DC values that are not sufficiently close to zero, or large voltage excursions at high frequencies.

In any event, the controller uses the Mask Number field in the STOP STREAMS system command to select one or more 32-stream blocks of 256 possible IN/OUT Device Media Streams. In one embodiment, the 3 LSBs of the Mask Number select one of the eight 32-stream blocks, while the MSB can be used to select all such blocks—e.g., to stop all streams simultaneously. Alternatively, each of the eight bits of the Mask Number could be used to select a corresponding one of these eight 32-stream blocks.

The controller also uses the IN Stream Mask and OUT Stream Mask to specify which of those Device Media Streams should be stopped. For example, an OUT Stream Mask of "00110000000000000000000000000000" send to a CD player would cause it to stop transmitting data on all but its $3^{rd}$ and $4^{th}$ Device Media Streams. A "dual-CD" player, for example, might therefore stop transmitting audio streams associated with its $1^{st}$ CD (e.g., $1^{st}$ and $2^{nd}$ Device Media Streams for left/right audio channels, respectively), but continue transmitting audio streams associated with its $2^{nd}$ CD (e.g., $3^{rd}$ and $4^{th}$ Device Media Steams). In addition, the controller may use the "Timestamp" field to cause all network devices receiving a STOP STREAMS system command to stop transmitting their streams simultaneously, at the time specified by the Timestamp field, using the "time of day" mechanism discussed above.

Having stopped all relevant streams, the controller could reassign the newly reallocated network nibble streams— e.g., to the DVD player and television/monitor—via TALK ASSIGN and LISTEN ASSIGN system commands. In each such system command, the controller would specify the relevant OUT (TALK ASSIGN) or IN (LISTEN ASSIGN) Device Media Stream via the Media Stream ID field, and assign a set of (possibly discontiguous) network nibble streams to that Device Media Stream via the 128-bit Transmit Edit Mask or Receiver Enable Mask fields.

Finally, having assigned all reallocated network nibble streams to the relevant network devices, the controller could restart those streams simultaneously by sending the START STREAMS system command to such devices. The START STREAMS system command is identical to the STOP STREAMS system command discussed above, except that devices start (rather than stop) transmitting/receiving data at the time indicated by the Timestamp field.

Thus, a controller can accommodate virtually any programming change a user makes (typically via some form of remote control device) with respect to the source (e.g., DSS satellite receiver, DVD player, CD player, etc.) or destination (e.g., particular speakers, televisions/monitors, etc.) of an audio or video program, or other form of data. The mechanisms discussed above facilitate the use of relatively "dumb" devices throughout the logical ring network.

For example, most source and destination devices need only be capable of responding to the system commands discussed above. If the default stream channel allocation is sufficient, no "smart" controller network device is even necessary. If not, only a single device on the logical ring network need be responsible for maintaining a table indicating which network devices are transmitting or receiving data on each of the network nibble streams, and responding to user requests dynamically by reallocating the assignment of these network nibble streams and issuing appropriate TALK ASSIGN, TALK QUERY, LISTEN ASSIGN, LISTEN QUERY, START STREAMS, STOP STREAMS, and QUERY STREAMS system commands as discussed above.

(3) Embedded Asynchronous Data into Synchronous Data Stream

Typically, the data stream is utilized by network devices synchronously sending and receiving real-time continuous streams of data, such as digital audio. It also can accommodate asynchronous data, however, such as TCP/IP network protocols, as well as RS232 serial ports and virtually any other asynchronous and/or "collision-based" data protocols. As a general matter, this is accomplished by embedding asynchronous data packets in the synchronous network nibble streams of the logical ring network data stream. As a result, such asynchronous data can be transmitted/received synchronously at rates nearly equivalent to (and in some cases faster than) those achieved on asynchronous networks.

Embedded asynchronous data packets typically travel from device to device around a logical ring network, instead of being transmitted "directly" (e.g., via a network hub) to the destination device, as in a packet-based asynchronous network. Yet, such packets will never collide with one another on a synchronous logical ring network. Moreover, overall throughput and efficiency of a logical ring network is comparable to a typical Ethernet network. In both types of networks, a switching router could be employed as a centralized hub in a star configuration network topology.

The actual path along which such data packets travel need not be the default network path. In other words, such data packets need not traverse every device on the logical ring network. If a single switching router is present on the logical ring network, such packets need only traverse (in the worst case) those network devices present on two network arms. In addition, if the network topology is cabled in a star configuration, the path may be virtually equivalent to that found in a typical Ethernet network, with the added advantage of avoiding the performance loss due to arbitration of data packet collisions.

In order to embed variable bit-rate asynchronous data packets into the data stream of a logical ring network, participating network devices (e.g., two computers communicating via TCI/IP), in one embodiment, would embed idle ("I") symbols into the fixed-width data channel currently allocated to that asynchronous data whenever no data was available during a particular time interval (e.g., if a serial port device was not currently receiving data).

They also might embed special markers (e.g., "T" symbols) to provide synchronizing information, such as byte synchronization within a serial port stream, or signaling information, such as custom commands in a telephone audio stream, to delimit phone calls and provide other call-control functionality. For example, to embed such custom commands within 4-nibble telephone audio samples, a telephone interface device might embed a "T" symbol in the least significant nibble of a sample (as described in greater detail below), which could represent the equivalent of a "System Command Start" marker in the system command stream. Subsequent samples could contain the rest of the custom command, such as a command type and data, analogous to the system command format discussed above.

Management of TCP/IP and other asynchronous channels presents problems mirroring those that are faced by the network clock device with respect to frames and system commands. Thus, in one embodiment, participating network devices might elect a "TCIP/IP clock" device, for example, to manage a TCP/IP channel, which would utilize the network nibble streams assigned either by default (see Table III above) or reassigned dynamically by a smart controller, as discussed above.

This TCP/IP clock device in this embodiment would be responsible for creating "empty" TCP/IP frames (containing TCP/IP frame headers and perhaps other relevant control information, such as an age bit, and "I" symbols, some of which would be overwritten with TCP/IP packet data by other participating devices), and embedding them into the TCP/IP channel of the data stream. The TCP/IP clock device also would be responsible for delaying the TCP/IP frames traversing the logical ring network to ensure that an integral number of such TCP/IP frames were present on the logical ring network at any given time, in order to prevent data from being overwritten and corrupted. Moreover, this device also would "age" and remove TCP/IP frames that already reached their destination.

The election of such an asynchronous clock device, and the management of such an asynchronous channel, is greatly simplified by the fact that participating network devices typically will be CPU-based "smart" controllers. Thus, this process can be managed in software, making the creation, delaying, aging and removal of asynchronous frames a relatively simple task, compared with the task of designing the FIFO and system command processor state machine hardware (discussed below) for relatively inexpensive non-CPU based network clock devices. Such participating network devices also might age and remove their own asynchronous frames (rather than rely on the asynchronous clock device) in an analogous manner to that discussed above with respect to the removal of system commands.

C. Logical Ring Network "Core" Adapter

1. Introduction

Having described the basic operation of a synchronous logical ring network, the architecture and operation of a "core" network adapter hardware that enables a device to interface to a synchronous logical ring network can now be better understood. It should be noted that a core network adapter can be part of a standalone network device that enables existing devices with analog line-level inputs and/or outputs (e.g., a preamplifier or amplifier, or a CD, laser disc or DVD player) to interface to a logical ring network. In other words, a logical network is compatible with existing analog audio and video devices.

The core network adapter also can be part of a new type of digital network device that interfaces to a logical ring network and provides certain added benefits including, among others, digital inputs and/or outputs and distributed functionality that eliminates redundancy of various system components. For example, a new logical ring network DVD player would not include an MPEG2 decoder. MPEG2 decoders would instead exist at (or incorporated into) television/monitor network devices for example, from which digital video and/or audio signals can be extracted (and possibly delivered to other network devices). The DVD player itself might even be part of a "jukebox" of DVD players to enable different family members to watch multiple different DVD movies simultaneously.

Moreover, the allocation of functionality for virtually any encrypted, compressed or otherwise encoded data stream (such as MPEG2) can be distributed across digital network devices on a logical ring network in an analogous fashion. A "source" digital network device might receive (e.g., a DSS receiver) or generate (e.g., a DVD player) such an encoded stream, and then redistribute it across a logical ring network in encoded form. Thus, any network device containing (or connected to) an encoder can receive and decode such stream. Such variable bit-rate encoded streams could be distributed on a logical ring network as asynchronous data embedded into a synchronous data channel of the data stream, as discussed above. In the case of MPEG2 or any other stream transmitted at an external clock rate that differs from the logical ring network data bit rate, these two different rates could be synchronized via a "network phase-locked loop," such as that discussed in greater detail below in the context of MPEG2.

These new/standalone adapter logical ring network devices will be discussed in greater detail below. To better understand these devices, however, it is desirable to understand the architecture and operation of the core adapter which is common (with certain variations) to all of these devices, and which enables them to interface to a synchronous logical ring network.

As will become apparent, core network adapters contain circuitry shared by many different types of network devices, thus simplifying and standardizing the design of application-specific network devices. They also adapt a set of standard interfaces to a logical ring network and a standard architecture for network devices, making it easier to design software and hardware compatible with such network devices.

Illustrated in FIG. 9 is one embodiment of a core network adapter 2000, which incorporates an ASIC 2012 that includes basic transmitter, receiver and clock synchronization processing logic (discussed in greater detail below). ASIC 2012 functionality could, of course, be implemented in various other forms, e.g., using an FPGA, PAL, discrete logic and/or software.

ASIC 2012 interfaces with a logical ring network via transformers 2006 and 2008 and modified standard RJ-12 jacks 2002 and 2004, which also can distribute power to the device itself and to other daisy-chained devices (supplied, for example, by an external power source) via phantom power circuitry 2080 (also discussed below).

ASIC 2012 also includes one of various "applications" interfaces 2050 to the application-specific portion of the network device itself. As noted above, core network adapter 2000 can be part of a standalone adapter (e.g., to an analog CD player), or can be integrated into a new network device, such as a logical ring network CD player with a digital output. In one embodiment, there exist three different core network adapter interfaces: (i) a raw interface 2020, containing the lowest level signals sent to and generated by ASIC 2012; (ii) an I/O bus interface 2030, containing a standard address/data bus interface which permits (in addition to the raw interface) higher-level communications with ASIC 2012 (e.g., from a computer or other CPU-based controller); and (iii) other interfaces 2040, which may add to the raw and I/O bus interfaces certain standard bus protocols, such as serial or parallel ports, or an Inter-Integrated Circuits ($I^2C$) serial control interface.

Raw interface 2020 includes the following raw signals generated by and for ASIC 2012: (i) a receive count (RCV COUNT 2022) generated by ASIC 2012, indicating the location of the received data nibble (or special marker) within the current frame (e.g., received data bit 120, or the last data bit of mobile 24, out of 512 data bits or 128 nibbles per frame); (ii) the received data itself (RCV DATA 2024) from ASIC 2012—i.e., the 5-bit symbol representing the received data nibble or special marker; (iii) the transmit count (XMT COUNT 2026) generated by ASIC 2012, indicating the location within the frame of the data nibble (or special marker) currently being transmitted (e.g., data bit 115 or the last data bit of nibble 23); (iv) the data, if any, generated by the device to be transmitted (XMT DATA 2028) by ASIC 2012; and (v) a bypass control signal (BYPASS CTL 2029), indicating whether the device has data to transmit—i.e., whether ASIC 2012 should transmit XMT DATA 2028 or merely "pass through" (to the next device on the logical ring network) the 5-bit symbol representing the corresponding data nibble that will be received by ASIC 2012 (e.g., nibble 25).

These signals will be discussed in greater detail below in connection with the internal architecture of ASIC 2012. Briefly, however, ASIC 2012 is responsible for transmitting and receiving data, as well as for maintaining synchronization with the network clock device. As discussed above, each network device simultaneously transmits and receives a symbol bit during each 28.224 MHz clock cycle. Thus, each network device transmits and receives a 5-bit symbol (representing either a data nibble or a special marker) every five clock cycles. Due to signal propagation delays within the ASIC circuitry itself, there is a delay (e.g., four clock cycles) between the time data is received by a network device and the time that corresponding data (whether modified or merely passed through) is transmitted to the next device on the logical ring network.

Thus, at any given time, ASIC 2012 within a network device might be receiving (from the logical ring network) nibble 24 (of the 128 nibbles in a frame) while transmitting nibble 23 (either the nibble previously received or the nibble internally generated). In parallel, the network device generates for ASIC 2012 a nibble and a control signal indicating whether ASIC 2012 subsequently should transmit that generated nibble (e.g., as nibble 25 of the 128-nibble frame) or "pass through" subsequently received nibble 25.

Raw interface 2020 is particularly useful for "dumb" (i.e., non-CPU-based) devices that do not have I/O address/data bus circuitry. For example, a CD player may only need to transmit its digital stereo audio streams on particular nibbles, identified in its internal registers (as discussed above). Such a device need only monitor the XMT COUNT 2026 to determine the appropriate network nibble stream(s) on which to transmit its digital stereo audio streams (via XMT DATA bus 2028 and ASIC 2012), while setting BYPASS CTL signal 2029 accordingly.

Bus snooping devices that monitor the operation of the logical ring network for diagnostic or other purposes may also find raw interface 2020 useful. Such a device could monitor every nibble of every frame that passed through the device, and potentially discern or "reverse engineer" the operation of the logical ring network and its protocols, as well as the functionality of other network devices. Such devices could utilize some or all of the signals provided by raw interface 2020, as well as higher-level interfaces, including I/O bus interface 2030 or any of the other interfaces 2040 discussed below.

In addition to purely diagnostic and "reverse-engineering" purposes, such "bus snooping" devices might also, for example, monitor the use of licensed content on the logical ring network. User of certain data streams might be limited contractually to a particular user or a specific time period, or be priced based upon the number of uses, or various other license restrictions. A bus snooping device could, for example, encrypt, decrypt, overwrite and/or remove portions of the data stream, notify a user of a license violation and/or provide a mechanism for the user to resubscribe, and even report violations to a manufacturer or content provider.

Even if one uses a bus snooping device to "break" an encryption scheme (e.g., by capturing, modifying and/or replacing encryption keys or other content certification information), and successfully access certain content without authorization, such violation could be limited, for example, to a particular copy of a movie, or at least to a particular movie. The rest of the content would remain protected. In other words, the encryption scheme could be differentiated based upon the user, the network devices, and/or the particular content, at virtually any level of granularity acceptable to the content provider. This level of flexibility results in part from the distributed nature of digital devices in a logical ring network, as noted above, and from the flexibility inherent in software control. Such software could determine, for example, the time or other circumstances under which particular devices encrypt particular content via a particular encryption scheme, thereby limiting the exposure of that particular content to unauthorized tampering.

CPU-based "smart" controller devices may, however, elect to utilize a higher-level interface (in addition to raw interface 2020) for most aspects of its operation. For example, standard circuitry could be added to ASIC 2012 to create an address/data bus interface (well known in the art), such as I/O bus interface 2030. Such a device could, for example, read and write internal device memory and registers directly via memory and I/O addresses, in addition to obtaining information also available via the raw interface.

As noted above, other proprietary interfaces 2040 can be added to the raw and I/O interfaces. For example, I$^2$C serial control interface circuitry could be added to enable a network device to send and receive standard I$^2$C commands to/from other compliant network devices. ASIC logic 2012 may also have an interface 2060 to switches (for setting default data stream channels) and an interface 2070 to status indicators, as well as other more application-specific interfaces 2040. ASIC logic 2012 can exist on the same chip as the application logic with all interfaces internal to the chip, or it can be connected as a separate chip as illustrated in FIG. 9.

FIG. 9 is a high-level block diagram of one embodiment of a core network adapter 2000 for a network device with single unidirectional transmission and receive drivers. Cables 2001 and 2003, connecting this adapter to other adapters, are plugged into RJ-12 jacks 2002 and 2004 via connectors (not shown) such as connector 604 in FIG. 6 above. The electrical signals transmitted through jack 2002 pass through filter 2016 and transformer 2006 prior to entering ASIC logic 2012.

ASIC logic 2012 processes the input signal and modifies it prior to transmitting it on the cable connected to jack 2004 through filter 2018 and transformer 2008. The transformers 2006 and 2008 serve to maintain isolation between the devices on the network, avoiding ground-loop interference. The transformers 2006 and 2008 are also used to step the line voltage up or down as necessary to interface with the ASIC logic 2012. They also preferably include filters 2016 and 2018 to prevent radio frequency interference from entering or escaping from ASIC logic 2012.

Incoming signals on twisted wire pair 2003a are looped back out on twisted wire pair 2001a via loopback connectors 2007. This creates a return path to maintain the "loop" in the logical ring network. If there is no network device connected to output jack 2004, loopback terminator 2005 will maintain this loop. Loopback terminator 2005 may be installed manually, or automatically (e.g., electrically or mechanically as discussed above in FIG. 5(a)) when a device is plugged into jack 2004. When no device is connected to jack 2002, a similar loopback terminator would be present at the jack. If the adapter is only intended to be an "end" device, i.e., a device that will not allow daisy-chaining, output jack 2004 could be removed and the output from transformer 2008 could be connected directly to jack 2002.

ASIC logic 2012 synchronizes to the incoming signal (as discussed below), extracts the data and system command streams from the incoming signal and converts them into several formats, for both general and specific use. The converted streams are made available, via the interfaces 2050 discussed above, for use by the "applications" portion of the network device (e.g., CD player), which sends data and control signals back to the ASIC logic.

Core network adapter 2000 also may be equipped with phantom power circuitry 2080 to use power which may be supplied through twisted wire pairs 2001c or 2003c (and transformer 2082) or external power jacks 2096 and 2096', which may also supply power to another device. The phantom power circuitry rectifies and regulates AC power from 2001c or 2003c via diodes 2084 and 2086 and regulates external DC power from jack 2096 via voltage regulator 2090 (connected to power 2094 and ground via resistors 2088 and 2092) as shown. If it is desired to supply devices with power without dedicating a separate pair of wires for power, data and power could share the same pair of conductors if a high-pass filter is included to remove the AC power frequency from the data lines, as explained above.

2. Network Adapter Logic Overview

FIG. 10 is a block diagram of one embodiment of ASIC logic 2012 inside core network adapter 2000 (shown in FIG. 9) of a network device. Receive data logic 2100 receives differential (twisted pair) serial input signal 2105 (i.e., the symbol bits of each frame transmitted by the previous device on the logical ring network) and decodes it into 5-bit symbols (as shown in Table I) for distribution, via data bus 2024 (in one embodiment), to other device modules. Receive data logic 2100 also sends a single-ended (unlatched and undecoded) received serial signal 2204 to the clock processing logic 2110, to extract timing information, and sends the latched edge-detected serial receive data 2290 to the transmit data logic 2120 for bypassing transmit data bus 2028 (i.e., passing on the symbol bits to the next device on the logic ring network whenever its own network device has no data to transmit).

Clock processing logic 2110 extracts timing information from receive signal 2204 to aid in the device synchronization process. If this device is not the network clock device, clock processing logic 2110 also will lock a local voltage-controlled oscillator ("VCO," not shown) to the signal 2204. It also generates the receive count 2022 and transmit count 2026 timing signals and transmits them to other components within the device, as discussed below.

Transmit data logic 2120 encodes and transmits either the transmit data 2028 (generated by the applications portion of the device or system command stream processor 2130) or the latched serial receive data 2290 (from the receive data logic 2100). The latched serial receive data 2290 will be selected for transmission when the device is not the network clock device and neither the system command stream processor 2130 nor any data stream processor 2150 has data to transmit over the current nibble.

The system command stream processor 2130 receives, interprets, and responds to the system command stream, and may also issue its own system commands. In one embodiment, system command stream processor 2130 and data stream processors 2150 (and 2150' . . . ) communicate via address bus 2034 and data bus 2032 (e.g., to access each other's internal registers and/or memory locations). In other embodiments, the memory and I/O (e.g., register) space may be distributed throughout ASIC 2012, and accessed via dedicated hardwired circuitry, as opposed to a general-purpose address and data bus.

System command stream processor 2130 also is responsible for issuing and responding to initialization-related system commands, including those employed during network clock device arbitration (assuming the device is capable of becoming the network clock device). If the device participates in and wins the arbitration process and becomes the network clock device, system command stream processor 2130 enables FIFO 2140 to buffer frame data to ensure that the cumulative frame propagation delay is an integral multiple of 1/44.1 kHz=22.676 μs. The output of FIFO 2140 will be driven onto the transmit data bus 2028 to impose such delay, rather than transmitting the non-delayed receive data and bypassing the transmit data bus 2028. If the device is not capable of becoming the network clock device, then FIFO 2140 is unnecessary.

The manner in which the network clock device utilizes FIFO 2140, in one embodiment, to ensure a cumulative frame propagation delay of exactly 1/44.1 kHz=22.676 μs (i.e., to avoid data corruption by ensuring that only a single 44.1 kHz frame is present on the logical ring network at any given time) is relatively straightforward. The network clock device utilizes a one-frame (64-byte) FIFO 2140 both for transmitting and receiving information. This information is buffered via transmit and receive pointers (not shown) for an amount of time necessary to extend the cumulative frame propagation delay around the logical ring network to 22.676 μs.

In other words, the network clock device begins transmitting a frame header extracted from one end of FIFO 2140, and then increments the transmit pointer once every ten 28.224 MHz clock cycles (the time required, in one embodiment, to receive ten symbol bits or one byte of data). Due to the synchronization of devices to the network clock device, each frame header transmitted by the network clock device will be received by the network clock device a fixed number of 28.224 MHz clock cycles later (determined by the individual device propagation delays around the logical ring network). It is this cumulative delay which the network clock device increases (buffers) via FIFO 2140 to 22.676 μs, thereby creating a constant stream of 44.1 kHz frames.

Once a frame header is received, it is written into that end of FIFO 2140, overwriting the previously transmitted frame header. As subsequent bytes are received, the receive pointer is similarly incremented and such bytes are written into subsequent byte locations of FIFO 2140. When the transmit and receive pointers reach the end of FIFO 2140, each is decremented back to the beginning (i.e., implementing a circular buffer). The difference between the transmit and receive pointers reflects the additional buffering (delay) added by FIFO 2140 to the remaining cumulative frame propagation delay around the logical ring network.

ASIC logic 2012 also may contain one or more data stream processors 2150, 2150', etc. A typical data stream processor 2150' will receive certain nibbles from the receive data stream, via data bus 2024, and convert them to the proper format for the interface 2044 to the applications portion of the network device. At the same time, data stream processor 2150' may receive data via application interface 2044, convert the data into nibbles, and transmit the data nibbles at appropriate times onto the transmit data bus 2028. The data stream processor contains several registers (discussed below) connected, in one embodiment, to address bus 2034 and data bus 2032. The contents of these registers determine the network nibble streams on which the device transmits and receives data, and perhaps how the data stream processor 2150' converts the data to and from the data format of the application interface 2044.

3. Receiving Data Via a Logical Ring Network Adapter

FIG. 11 is a lower-level block diagram illustrating one embodiment of receive data logic 2100 shown in FIG. 10. In essence, receive data logic 2100 receives differential serial input signal 2105 (i.e., the bits of each frame transmitted by the previous device on the logical ring network) via transformer 2006, as well a receive count 2022 (indicating which data bit of each frame currently is being received) which is used for "centering" the received signal (as discussed below) once per frame to increase the accuracy of the data reception process.

Receive data logic 2100 decodes every five symbol bits of received signal 2105 into a 5-bit receive data symbol (as shown in Table I above), which represents one of the 128 data nibbles or special markers of each frame transmitted by the previous device on the logical ring network. This symbol is sent to other device components via data bus 2024. In addition, receive data logic 2100 generates an illegal data signal 2266, in one embodiment, indicating whether the received 5-bit data symbol is one of the invalid/unused 5-bit values shown in Table I above.

Prior to extracting each symbol bit from differential serial input signal 2105, receive data logic 2100 receives differential serial input signal 2105 via interface receiver 2200 and passes a single-ended version of this received signal 2204 (still unlatched and undecoded) to clock processing logic 2110 to aid in the synchronization process. After extracting and latching each symbol bit from input signal 2105, receive data logic 2100 passes this latched edge-detected serial receive data 2290 onto transmit data logic 2120, which may pass it along unmodified to the next device on the logical ring network. As noted above, the latched serial receive data 2290 will be selected for transmission when the device is not the network clock device and neither the system command stream processor 2130 nor any data stream processor 2150 (see FIG. 10 above) has data to transmit over the current nibble.

The symbol bit extraction process itself involves circuitry designed to receive each bit accurately despite the presence of clock jitter causing input signal 2105 to drift over time (as much as ±½ of a 28.224 MHz clock period per frame). Edge detector 2210 detects data transitions (representing logical "1"s) in the received input signal, using both edges of a 56.448 MHz clock (i.e., four times the frequency of the logical ring network) for extra accuracy. Shift register 2220 also uses both edges of the 56.448 MHz clock, and provides several delayed versions of the output of edge detector 2210.

In essence, this circuitry generates shifting "windows" of the received data (e.g., bits 1,2,3,4, and bits 2,3,4,5, and bits 3,4,5,6, and so on). By examining these "windows" when a frame header is received, the circuitry can identify the particular window that best "centers" the middle transition ("1" bit) of the frame header (see Table I above; JK="1100010001" and WK="0100010001"). This window is then used for data reception for the remainder of that frame, with the process being repeated as each successive frame header is received. Received data (symbol bits) therefore should be "centered" very accurately in the window used for data extraction.

The windows are created via eight 4-input logical-OR gates 2230a–h, each of which is connected to four neighboring outputs (shifted by one bit) of shift register 2220. Each OR 2230a–h acts as a window, one 28.224 MHz clock period wide. Each successive window is delayed from the previous one by one-quarter of a 28.224 MHz clock period.

Comparator 2280 determines when the receive count 2022 is such that the single transition at the middle of the frame header should (subject to drift) be at the middle of shift register 2220. At that instant, only one output of the eight 4-input logical-OR gates 2230*a*–*h* should be high, because there should be approximately twelve 56.448 MHz half-clock periods (three 28.224 MHz bits) without transitions on both sides of the transition at the center of the frame header (based upon the JK and WK bit encodings).

Priority encoder 2224 effectively encodes the "address" of the eight windows into a 3-bit value (given the eight potential locations, within shift register 2220, of the single transition at the middle of the frame header). This 3-bit value is latched, via 3-bit latch 2240, when comparator 2280 determines, via receive count 2022, that the frame header middle transition should be centered in shift register 2220. Latch 2240 thus identifies which window best centers the frame header.

In summary, receive data logic 2100 makes adjustments every frame (in increments of one-quarter of a 28.224 MHz clock period) to account for the phase offset between the unlatched input signal 2204 and the local clock (as evidenced by receive count 2022). Received data logic 2100 therefore can tolerate phase jitter of input signal 2204 of up to ±½ of a 28.224 MHz clock period per 44.1 kHz frame (in one embodiment).

Having determined the window (i.e., one of the eight 4-input logical-OR gates 2230*a*–*h*) which best centers the received frame header, this window should best center the received symbol bits of that frame, encoded in input signal 2204. Thus, multiplexer 2250 selects the output of the OR gate (2230*a*–*h*) selected by 3-bit latch 2240, which in turn represents the received serial stream of symbol bits transmitted by the previous device on the logical ring network.

This latched and synchronized serial data stream 2290 (with bits centered approximately on the positive edge of the 28.224 MHz clock) is sent to transmit data logic 2120 (shown in FIG. 10) for bypassing transmit data bus 2028 (also shown in FIG. 10) in the event that the device has no data to send—i.e., when the device is not the network clock device and neither the system command stream processor 2130 nor any data stream processor 2150 (see FIG. 10 above) has data to transmit over the current nibble.

Within receive data logic 2100, serial-to-parallel shift register 2260 transforms the serial data into 5-bit symbols. 4B5B decoder 2270 decodes/translates these 5-bit symbols into 5-bit data nibbles (4 bits of data with a leading "0") or special markers (see Table I above), and (in one embodiment) sends this decoded 5-bit data onto receive data bus 2024 for use by other network device components. Should this decoded 5-bit received data be illegal (i.e., one of the invalid/unused 5-bit values shown in Table I above)— e.g., due to a faulty connection, a disconnected network device, or various other changes to the synchronous logical ring network—then signal 2266 is set high to indicate the existence of illegal data (e.g., to other device components, such as command stream processor 2130).

4. Transmitting Data Via a Logical Ring Network Adapter

FIG. 12 is a lower-level block diagram of one embodiment of transmit data logic 2120 shown in FIG. 10 above. When a device desires to transmit data (e.g., a CD player overwriting particular network nibble streams to transmit its digital stereo audio channels), it sends that data to transmit data logic 2120 via transmit data bus 2028 (in one embodiment) from which it is encoded into 4B5B symbols (see Table I above) by data encoder 2360. The translated 5-bit symbols are then transformed into serial data via parallel-to-serial shift register 2350.

Bypass signal 2370 determines whether multiplexer 2340 selects the unmodified receive data 2204 from receive data logic 2100 (if the device has no data to transmit) or the serial output from shift register 2350. The output of multiplexer 2340 is gated by encode enable signal 2380, which allows the device to inhibit data transmission entirely (instead of either transmitting its own data, or passing received data through, to the next device on the logical ring network). The device might set enable signal 2380 "low" (disable) to force a reinitialization/resynchronization of the logical ring network—e.g., upon detecting a hardware problem in the device or a loss of data from the network via the previous network device.

Toggle flip-flop 2310 takes as input the serial (encoded) signal to be transmitted and creates data transitions whenever a logical "1" is to be transmitted. Interface transmitter 2300 converts this single-ended signal to a differential signal pair and interfaces with output transformer 2008, from which the signal is transmitted to the next device on the logical ring network.

5. Clock Processing within a Logical Ring Network Adapter

FIG. 13(*a*) is a block diagram of one embodiment of clock processing logic 2110 (shown in FIG. 10), which performs a variety of synchronization-related functions. The operation of clock processing logic 2110 varies depending upon whether the device is elected the network clock device. FIG. 13(*a*) illustrates clock processing circuitry for a device that is capable of becoming (but will not necessarily become) the network clock device during the network clock device arbitration phase of the initialization of a logical ring network. If a device need not be capable of becoming the network clock device, some of this circuitry (shown in dotted lines) is unnecessary.

Primarily, clock processing logic 2110 detects frame headers (transmitted by the previous device on the logical ring network) and either generates a 28.224 MHz clock (if the device is the network clock device) or synchronizes to the 28.224 MHz network clock device via a phase-locked loop. As discussed above, the network clock device also generates frame headers (and empty frames) in the first instance, as well as certain system commands, particularly during network initialization.

The bulk of the circuitry in clock processing logic 2110 is devoted to a phase-locked loop (PLL) 2415 used to synchronize an internal clock to the 28.224 MHz network clock device. As a result of this synchronization, clock processing logic 2110 generates 56.448 MHz, 28.224 MHz (via frequency divider 2440) and 22.5792 MHz (via frequency divider 2450) clocks, as well as a current transmit count 2026 and receive count 2022 (tracking the current data bit of a 512 data-bit frame), used by other components of core network adapter 2000 during the transmission of each frame.

The PLL 2415 within clock processing logic 2110 includes (among other components) a phase comparator 2410, a low-pass filter 2425, a 56.448 MHz voltage-controlled oscillator (VCO) 2430, and a frequency divider 2450 and receive counter 2470 to divide the PLL frequency down to 22.05 kHz (i.e., ½ of the frame rate). If the device is capable of becoming the network clock device, tri-state driver 2412 (shown in dotted lines and selectable via inverted signal 2420 from system command stream processor 2130, shown in FIG. 10) will be included to disable PLL 2415 while the device is acting as the network clock device. Frame header edge detect logic 2490 and multiplexer 2494

(also shown in dotted lines) also will be included, as explained below.

If the device is elected the network clock device, the detection of an incoming frame header (via frame header detection logic 2500 and frame header edge detect logic 2490, discussed below) will cause receive counter 2470 to be reset via multiplexer 2494. The relationship between receive counter 2470 and transmit counter 2460 therefore will be determined by the cumulative frame propagation delay around the synchronous logical ring network. In other words, as a result of this mechanism, an integral number of 44.1 kHz frames will be present on the logical ring network at any given time. The cumulative frame propagation delay therefore will be equal to an integral multiple (1 in this embodiment) of 1/44.1 kHz=22.676 μs.

If the device is not elected the network clock device, receive counter 2470 will be reset via multiplexer 2494, based upon a fixed timing relationship between receive counter 2470 and transmit counter 2460 (via comparator 2480). In other words, the delay between reception of a symbol bit and transmission of that (or a modified) symbol bit will remain constant, based upon delays internal to core network adapter 2000 (see FIG. 9).

PLL 2415 will ensure that receive counter 2470 is locked to the incoming symbol bit stream (via serial input signal 2204) and clocked at the data bit rate of 22.5792 MHz. Note that receive counter 2470 and transmit counter 2460 could alternatively be clocked at the symbol bit rate of 28.224 MHz. The phase-frequency relationship among phase comparator 2410, low-pass filter 2425 and VCO 2430 will be steep enough that small phase differences between receive counter 2470 and input signal 2204 will cause VCO 2430 to vary across a range of possible operating frequencies. Also, the circuitry within PLL 2415 will be adjusted such that receive counter 2470 has the proper timing relationship to input signal 2204. In other words, the range of possible phase offsets will be within the range of the phase adjustability of receive data logic 2100—a single 28.224 MHz clock period.

PLL 2415 has two modes of operation—coarse and fine—switched via multiplexers 2400 and 2402. In coarse (default) mode, PLL 2415 locks to the output of frame header detection logic 2500. In other words, the frame header transmitted by the network clock device (at a constant frame rate of 44.1 kHz) is used to synchronize each device to that network clock device. The internal architecture of frame header detection logic 2500 is illustrated in greater detail in FIG. 13(b), discussed below.

Frame header detection logic 2500, however, is subject to clock jitter caused by the discrete 56.448 MHz half-clock cycle edge detection (discussed below). The PLL fine mode is designed to minimize this jitter. Rather than lock merely to a signal indicating detection of a frame header, PLL 2415 locks instead to the single transition in the center of the actual frame header in serial input signal 2204. In essence, windowing and splicing logic 2540 splices the transition at the center of a frame header onto a 22.05 kHz square wave (generated by frame header detection logic 2500, which drives receive counter 2470), which is used as the PLL source input in fine mode (as discussed in greater detail below with reference to FIG. 13(b)).

This PLL fine mode does not suffer from the same jitter problems as does the PLL coarse mode. However, windowing and splicing logic 2540 requires at least rough synchronization with the arrival of an actual frame header in order to operate properly. In other words, in order to detect the transition at the center of a frame header, it must search during the appropriate "window in time"—i.e., in between the first and third transitions of that frame header. Thus, the PLL coarse mode is employed initially to achieve this rough synchronization (as discussed below).

Thus, PLL 2415 receives a signal indicating detection of an incoming frame header. This signal, selected via multiplexer 2400, is generated either by frame header detection logic 2500 (in coarse mode) or by windowing and splicing logic 2540 (in fine mode), as will be discussed below. Phase comparator 2410 of PLL 2415 compares this detected frame header signal to an internally generated reference clock 2022a, represented by receive counter 2470, but resynchronized from the data bit rate to the symbol bit rate via resynchronizer 2496. Because the detection of the complete frame header in coarse mode occurs at a slightly later time than the detection of the center transition of the frame header in fine mode (i.e., five symbol bit times), the reference clock in coarse mode is delayed appropriately (via delay circuitry 2404 and selected via multiplexer 2402) to account for this difference.

With reference now to FIG. 13(b), the mechanisms for implementing the coarse and fine modes of PLL 2415, and the process for switching between these modes, can now be understood. In short, frame header detection logic 2500 generates the detected frame header input to PLL 2415 in coarse mode, whereas windowing and splicing logic 2540 generates this input in fine mode. Stable PLL detection logic 2580 determines when to switch PLL 2415 between its default coarse mode and its fine mode (in one embodiment, switching to fine mode upon detecting four consecutive frame headers, and back to coarse mode upon detecting the absence of an expected frame header).

Comparator 2584 of stable PLL detection logic 2580 compares the resynchronized receive count 2022a to a fixed value to generate a signal indicating when a frame header should be detected. This signal enables latch 2582, which will contain a "1" if an actual frame header is detected, and a "0" otherwise. Edge detection logic 2586 detects an actual frame header by detecting an edge of the output of frame header detection logic 2500 (which, as will be discussed below, generates a 22.05 kHz square wave, toggling whenever a frame header is detected).

Frame header counter logic 2590 detects when a sufficient number of consecutive frame headers have been detected (each evidenced by a "1" in latch 2582) to deem the synchronization to be stable and PLL 2415 to be locked. It then generates a "1" in output stable frame header signal 2595, causing PLL 2415 to switch into (or remain in) fine mode. It also detects the absence of one expected frame header (or multiple frame headers in other embodiments), evidenced by a "0" in latch 2582, and generates a "0" in output stable frame header signal 2595, causing PLL 2415 to switch back to (or remain in) coarse mode. Output signal 2595 may also be made available to system command stream processor 2130 (from FIG. 10) if the network device desires to respond in a device-specific manner to these changing conditions.

Frame header detection logic 2500 recognizes the unique pattern of the two possible frame header symbol pairs, JK ("1100010001") and WK ("0100010001"), transmitted at a 44.1 kHz rate, and creates an output signal that alternates each time a frame header is recognized. This 22.05 kHz square wave is used as the source input (if coarse mode is selected via stable PLL detection logic 2580 and MUX 2400) to phase comparator 2410 of PLL 2415. The unique pattern of transitions common to both the JK and WK frame headers is the bit sequence "100010001" (where a logical "1" represents a transition). No other combination of valid symbols (see Table I) will result in this sequence.

The three key transitions in the frame header are separated by four 28.224 MHz clock periods or sixteen half-periods of the 56.448 MHz clock. Edge detect logic 2510 detects these transitions, signaling both WK/JK detection logic 2530 and transition frequency logic 2520 (which counts the number of clocks between transitions and notifies both WK/JK detection logic 2530 and frame header error handling logic 2536).

WK/JK detection logic 2530 receives each transition (from edge detect logic 2510) and the number of clocks since the prior transition (from transition frequency logic 2520), and looks for sixteen half-periods of the 56.448 MHz clock between transitions, plus or minus one half-period to allow for some jitter. When this occurs twice in a row (i.e., "100010001"), WK/JK detection logic 2530 signals that the frame header has just been detected. This signal toggles the 22.05 kHz frame header signal via toggle flip-flop 2534, which is used as the PLL source input in coarse mode. If too many transitions occur without a frame header, frame header error handling logic 2536 generates a "carrier lost" signal which each network device may handle as it sees fit (e.g., rebooting, waiting for resynchronization, etc.).

In fine mode, PLL 2415 receives its source input from windowing and splicing logic 2540 (selected via stable PLL detection logic 2580 and MUX 2400). The delayed and resynchronized reference frame header signal (generated from frame header detection logic 2500, via receive counter 2470, resynchronizer 2496 and delay logic 2404, as noted above) is selected via stable PLL detection logic 2580 and MUX 2402.

The timing of windowing and splicing logic 2540 is controlled via 28.224 MHz resynchronized receive count signal 2022a, driven by the square wave generated by frame header detection logic 2500. The transition at the center of the frame header in the incoming bit stream (i.e., 100010001"), received via serial input signal 2204, is, in effect, spliced into this regenerated/synthesized square wave (output by latch 2550), as explained below.

In every frame, due to the NRZ bi-level coding scheme, a transition in the incoming signal 2204 could be either low-to-high or high-to-low. Consequently, the signal might need to be inverted before being spliced into the square wave. Whether the incoming signal must be inverted will remain unknown until just prior to the transition. The frame header will appear on signal 2204 as binary sequence "0111100001" or "1000011110." The polarity will be unknown until the after the start of the frame header sequence. The square wave also may be transitioning either low-to-high or high-to-low. Windowing and splicing logic 2540 therefore must determine before splicing whether the transition at the center of the frame header and the square wave transition have the same polarity.

If the transitions have opposite polarity, serial input signal 2204 is inverted before being spliced. Latch 2550 outputs the square wave onto which serial input signal 2204 (inverted or not) will be spliced. At the precise moment at which the center transition of a frame header occurs (as determined by comparator 2542 and its resynchronized receive count input 2022a), a reference square wave (as generated by even/odd frame logic 2544) is latched into latch 2550. Until just before the center transition of a frame header occurs, this square wave will be the source input to PLL 2415 (via multiplexers 2570 and 2400).

At that moment, however (actually for a two-clock period immediately before and after that center transition), PLL 2415 source input will be switched (via multiplexer 2570 and comparator logic 2562) to the actual serial input signal 2204 received by the device (possibly inverted, as discussed below)—effectively "splicing" the received input signal onto the generated square wave during this portion of the frame header detection period.

In order to guarantee that the polarity of serial input signal 2204 matches the polarity of the square wave output by latch 2550, serial input signal 2204 becomes one of three inputs to exclusive-OR (XOR) gate 2560. The other two inputs reflect the respective polarities of serial input signal 2204 (samples during the frame header before the center transition by comparator 2548 and latched into latch 2554) and the square wave generated by even/odd frame logic 2544 (sampled sometime during the middle of the frame by comparator 2546 and latched into latch 2552). Only if these two inputs differ will they cause serial input signal 2204 to be inverted.

In summary, frame header detection logic 2500 generates an input to PLL 2415 roughly reflecting the occurrence (e.g., a few clocks late) of a frame header on serial input signal 2204. This accurate (albeit late) detection of a frame header is utilized by stable PLL detection logic 2580 to determine when to switch PLL 2415 from coarse to fine mode (e.g., after four consecutive frame headers) and back to coarse mode (e.g., after the absence of an expected frame header).

In fine mode, windowing and splicing logic 2540 utilizes more precise timing to detect a frame header by splicing the center transition of the actual frame header on serial input signal 2204 onto a synthesized square wave driven by frame header detection logic 2500. As a result, PLL 2514 locks to the frame headers generated by the network clock device to a high degree of precision, allowing for accurate reception and transmission of each symbol bit despite the presence of otherwise significant data transmission jitter.

6. System Command Stream Processor in a Logical Ring Network Adapter

As discussed above, for one embodiment, each network device is capable at least of interpreting and responding to a relatively minimal set of system commands, including certain initialization-related system commands (MASTER RESET, SCAN RESET, and SCAN REQUEST) and the READ system command (with at least one device being "clock-capable" and supporting the CLOCK ID system command). By supporting this set of system commands, every network device on the logical ring network can be initialized and configured automatically as described above.

By supporting additional system commands, network devices can exhibit enhanced functionality. For example, a smart controller could discern the entire network topology by supporting the SCAN REPLY system command—i.e., monitoring the information embedded by each device upon receiving its initial SCAN REQUEST system command. It could then further configure devices, via the WRITE system command, by writing certain configuration information into their configuration and code control block.

A switching router or hot-pluggable smart jack device could, upon detecting the addition or removal of a device from the network, cause the network clock device to reinitiate a logical ring network topology scan by sending a SCAN INITIATE system command. By supporting the MESSAGE, GET and SET system commands, network devices can establish private communications with other devices and enable other devices to read and write their optional internal registers.

If a network device transmits and/or receives any audio, video or other digital media streams (e.g., a CD or DVD player, or a speaker or television/monitor, and desires to do so on channels other than the default data stream channels, then such device would support some or all of the stream-related system commands (QUERY STREAMS, TALK QUERY, LISTEN QUERY, TALK ASSIGN, LISTEN ASSIGN, START STREAMS, and STOP STREAMS). Certain new digital devices (e.g., digital televisions and DSS receivers) may want to support the PLL LOCK and TIME MARK system commands to enable synchronization to an external clock such as the MPEG2 system clock.

FIG. 14(a) depicts in detail the architecture of one embodiment of a system command stream processor 2130 (shown in FIG. 10 above). System command stream processor 2130 reads system commands from and writes system commands (or at least portions thereof) to the two nibbles in each frame allocated to the system command stream. It also interprets and responds to particular system commands sent to it by other network devices. In particular, it responds to initialization-related system commands. If the device is the network clock device, it not only initiates certain initialization-related system commands, but also buffers the system command stream to ensure that the cumulative system command propagation delay around the default network path equals an integral number of system commands (40 bytes each in one embodiment).

System command stream processor 2130 receives the received data stream (latched and decoded) from receive data logic 2100 (see FIG. 10) via data bus 2024 (in one embodiment), as well as the current receive count 2022 and transmit count 2026 generated by clock processing logic 2110. Comparators 2602 and 2604 determine when the nibbles of the receive data stream on data bus 2024 are system command stream nibbles (i.e., the $64^{th}$ and $65^{th}$ nibbles, respectively of each 128-nibble frame), and causes them to be latched into latches 2610a and 2610b, respectively.

Comparator 2620 resets the system command receive counter 2640 when the current system command byte is a System Command Start (TR) or System Command Empty (TU). Otherwise, counter 2640 is incremented for each successive byte of a 40-byte system command.

If the device is the network clock device (as indicated by signal 2420), the output of free-running counter 2630 (shown in dotted lines) will be the system command stream transmit count (selected via multiplexer 2644, also shown in dotted lines), and system command FIFO 2612 will buffer the system command stream to ensure that the cumulative system command propagation delay around the default network path equals an integral number of 40-byte system commands. If the device is not the network clock device, then the system command stream transmit count will be calculated by subtracting (via delay logic 2642) from system command receive counter 2640 a fixed number of bytes equal to the constant propagation delay imposed by system command processor 2130. Counter 2630 and multiplexer 2644 need not be included if the network device need not be capable of becoming the network clock device.

In one embodiment, the system command stream processor delays the system command stream by at least one 640-bit frame (to enable a device to modify a byte of a system command, e.g., during network initialization). Multiplexer 2644 selects the appropriate system command stream transmit count based upon signal 2420 from system command processor state machine 2600, indicating whether the device is the network clock device.

System command processor state machine logic 2600 receives as input the system command receive count (from counter 2640) and system command transmit count (selected by multiplexer 2644), as well as the current byte of the system command (from latches 2610a and 2610b). It also receives the current checksum from the system command as received (via checksum logic 2650) and as being transmitted/modified (via checksum logic 2622). The operation of these checksum logic units is discussed in detail above.

System command processor state machine logic 2600 also receives data bypass signal 2670 from data stream processor 2150, indicating whether data stream processor 2150 has any data to send. If the current byte is not a system command stream byte, system command stream processor 2130 may simply pass this signal through (as bypass signal 2370) to data transmit logic 2120. In this manner, both system command stream processor 2130 and data stream processor 2150 have an opportunity to determine whether data transmit logic 2120 should transmit any generated data, or merely pass through received data to the next device on the logical ring network. Finally, system command processor state machine logic 2600 receives illegal data signal 2266 (from receive data logic 2100) and carrier lost signal 2538 (from clock processing logic 2110). Each network device responds to such error conditions in a device-specific manner.

Comparators 2606 and 2608 determine (based upon transmit count 2026) when it is time to transmit the next byte of the system command stream (i.e., the $64^{th}$ and $65^{th}$ nibbles, respectively, of each 128-nibble frame). At such time, they cause tri-state drivers 2616a and 2616b, respectively, to write the appropriate two system command stream nibbles onto transmit data bus 2028 (in one embodiment) for transmission by transmit data logic 2120. Multiplexers 2614a and 2614b select as the appropriate two system command stream nibbles either the received system command stream byte or the generated/modified byte from system command processor state machine 2600. In either case, this transmitted system command stream byte is passed into checksum logic 2622, which passes the current transmitted checksum to system command processor state machine 2600.

System command processor state machine 2600 performs the bulk of the work interpreting the system commands described in detail above. It can communicate with the applications portion of a "smart" network device via I/O Bus interface 2030, including data bus 2032, address bus 2034 and write enable 2036. Such an interface might be used by a network device to handle special-case conditions (e.g., illegal data) and/or to initiate a variety of system commands (such as embedding asynchronous data in the data stream), including those involving direct communications with other "smart" network devices.

The flowchart in FIG. 14(b) illustrates the primary steps performed by system command processor state machine 2600 in a non-clock-capable network device to interpret a relatively minimal set of initialization-related system commands. As will become evident, additional system commands, explained in detail above, can be implemented in an analogous manner using standard truth table/state machine techniques. A "smart" controller network device could, of course, implement these system commands entirely in software.

As each byte 2681 of a system command is received, system command processor state machine 2600 starts processing 2680 that current byte using the system command current receive and transmit counts as additional inputs. If a system command header byte is detected 2682, an "empty" (TU) system command header will be ignored (because the device does not initiate system commands in this embodiment) 2682b by setting an "ignore system command" flag. Upon receiving a "start" (TR) system command header, however, this flag is reset 2682a so that processing of the system command will continue as subsequent bytes are received.

Upon receiving subsequent (non-system command header) bytes, the "ignore system command" flag is tested 2683, and processing continues unless that flag is set, in which case processing of that byte (and subsequent bytes) is stopped 2684, causing the remainder of the system command to be ignored (i.e., passed unmodified onto the next device on the logical ring network). If processing continues, the system command field is determined 2685, based upon the system command current receive count (see Table IV above).

Upon receiving the system command byte, this byte is decoded 2686 to determine the particular type of system command received. In this relatively minimal embodiment, all system command other than the SCAN REST, SCAN REQUEST, READ and WRITE system commands (used primarily for initialization and auto-configuration) are ignored 2686a, by setting the "ignore system command" flag. Upon receiving a SCAN RESET system command, the device sets its "scan mode" flag 2686b, so that it will respond to a subsequent SCAN REQUEST system command from the network clock device (as discussed above with respect to the network initialization and auto-configuration process). The remainder of the SCAN RESET system command is ignored by setting flag 2686a.

Upon receiving the initial SCAN REQUEST system command following a SCAN RESET system command, the "scan mode" flag is tested 2686c and, if set, the device resets the "scan mode" flag and overwrites the SCAN REQUEST system command byte with a SCAN REPLY system command byte 2687 (which it then transmits before it stops processing that byte 2684). As will be discussed below, processing of this system command will continue so that the device also can transmit its device information. Subsequent SCAN REQUEST system commands will be ignored, however (because the "scan mode" flag has been reset), resulting in the "ignore system command" flag being set 2686a. As discussed above, this process enables the network clock device to determine that all network devices have responded and transmitted their device information.

Following the system command byte will be the destination address (the subsequent source address is ignored in this embodiment), which is tested 2688 as each byte is received to determine whether the system command is intended for the device (including system commands that are "broadcast" to all devices). If each byte of the received destination address matches the Device ID or the Broadcast ID thus far, then processing of that byte stops 2684 so that processing of the system command can continue. If any byte does not match, however, then the "ignore system command" flag is set 2686a, and the remainder of the system command will be ignored.

Once the "data" field of the system command is received, system command processor state machine 2600 first checks (e.g., a saved byte or other flag) whether the current system command is a SCAN REQUEST system command 2689. If so, it knows that the "scan mode" flag was set (because the remainder of the system command otherwise would have been ignored), and therefore overwrites the appropriate bytes of this field with its device information (including its Device ID and the location and length of its configuration and code control block, as discussed above) 2690, which it then transmits to the next device on the logical ring network. As each byte is overwritten and transmitted, processing of that byte stops 2684 to allow the processing of the system command to continue.

If the current system command is a READ or WRITE system command (i.e., not a SCAN REQUEST system command) 2691, then system command processor state machine 2600 either extracts the READ address and reads the data 2691a (for a READ system command) or merely extracts the WRITE address 2691b (for a WRITE system command). In this embodiment, the device will not write its internal registers or memory unless and until the system command is validated via the checksum byte. Note that test 2691 will reveal either a READ or WRITE system command in this embodiment, because all other system commands already will have been ignored.

Upon reaching the status byte of a system command, the acknowledge bit is set and transmitted 2692, because the system command must be a READ, WRITE or SCAN REQUEST system command to reach this point, all of which are to be acknowledged in this embodiment. Processing of the status byte then stops 2684 to allow the processing of the final (checksum) byte of the system command to continue.

Because the checksums (both for bytes of the system command as received and as transmitted) are calculated outside of system command processor state machine 2600 (see checksum logic 2650 and 2622, respectively, in FIG. 14(a)), the calculated checksum as received merely need be tested 2693 to determine whether it matches the checksum byte. If so, data is then written to the internal registers and/or memory of the device 2693b (only if the current system command is a WRITE system command 2693a) and the checksum (for bytes of the system command as transmitted) is transmitted 2695 to the next device on the logical ring network. If the checksum byte (for bytes of the system command as received) does not match, then the checksum byte (for bytes of the system command as transmitted) is inverted before being transmitted to the next device on the logical ring network 2694 (to alert subsequent devices to this invalid system command).

It should be evident to one skilled in the art that various implementations of system command processor state machine 2600 are relatively straightforward, both for minimal implementations of the system commands as well as for more complete implementations of the remaining system commands identified in Table V above and additional system commands devised in other embodiments. Moreover, error-checking could be implemented more stringently to guard against the possibility of system commands that do not comply with the restrictions noted above (whether due to data transmission errors, "renegade" network devices or other causes).

7. Data Stream Processors in a Logical Ring Network Adapter

FIG. 15 is a diagram of a data stream processor 2150 (shown in FIG. 10), which enables a network device to overwrite onto (and/or extract from) the data stream a set of (possibly discontiguous) network nibble streams. Only those network devices that transmit and/or receive data on the data stream (e.g., a CD player or speaker) require such functionality.

If no "smart" controller network device is present on the logical ring network, this set of network nibble streams will be set by default to the default data stream channel assignments set forth in Table III above, and controlled, for example, by an external user-accessible switch which allows a user to select a desired channel manually from among the default choices.

Otherwise, I/O bus 2030 (in one embodiment) can be utilized by a smart controller device to read/modify dynamically a set of internal registers 2700 in data stream processor 2150 to change these default allocations (e.g., by sending TALK ASSIGN and LISTEN ASSIGN system commands). As noted above, a smart controller can read (via a READ system command) the configuration and code control block of a device, which contains information identifying the type and location of such registers. Data can then be addressed via address bus 2034 and transmitted via data bus 2032 (using write enable signal 2660 to control modification of these registers).

As described in detail above for one embodiment, a network device can have up to 256 IN Device Media Streams (associated with IN Device Media Stream registers 2702) and up to 256 OUT Device Media Streams (associated with OUT Device Media Stream registers 2704). A CD player, for example, might have only two OUT Device Media Streams (for left and right digital audio channels).

Information is stored in internal registers 2700 in three distinct fields for each IN or OUT Device Media Stream. Transmit/Receive enable Mask field 2706 is a 128-bit field corresponding to the Transmit Enable Mask field of the TALK ASSIGN, and Receive Enable Mask field of the LISTEN ASSIGN, system commands described above. Each bit represents a network nibble stream, and indicates whether the device will transmit/receive data via that network nibble stream. Bank field 2707 is an 8-bit field representing the 128-nibble "bank" of the data stream to which the Transmit Enable Mask and Receive Enable Mask correspond. As noted above, multiple 128-nibble "banks" of the data stream may arise as additional network bandwidth is made available—e.g., by employing bidirectional network devices or advanced modulation techniques such as 5-level coding (as will be discussed in greater detail below). Finally, the one-bit Stream Enable field 2708 (set and reset, for example, by the START STREAMS and STOP STREAMS system commands described above) indicates whether the IN or OUT Device Media Stream currently is enabled to transmit/receive data.

Upon receiving the current receive count 2022 from clock processing logic 2110 (see FIG. 10), receive control logic 2710 discerns the current network nibble stream received by the device, and determines whether the device should receive data via that stream—i.e., whether, for each IN Device Media Stream, the current nibble (e.g., nibble 24) is enabled in Transmit/Receive Enable Mask field 2706 (and bank field 2707, if additional banks are present) and in Stream Enable field 2708. If so, logic 2730 latches the received data 2024 on that current nibble (also from clock processing logic 2110), performs whatever application-specific data conversion is required and passes that data onto the applications portion of the network device via applications interface 2044 (e.g., a speaker, which will play the data on the received network nibble stream representing the left channel of a digital audio recording). Receive control logic 2710 also communicates directly with the applications portion of the network device via applications interface 2044.

Similarly, upon receiving the current transmit count 2026 from clock processing logic 2110, transmit control logic 2720 discerns the current network nibble stream to be transmitted by the device, and determines whether the device should transmit data via that stream—i.e., whether, for each OUT Device Media Stream, the current nibble (e.g., nibble 24) is enabled in Transmit/Receive Enable Mask field 2706 (and bank field 2707, if additional banks are present) and in Stream Enable field 2708. If so, logic 2740 latches the data to be transmitted (generated by the applications portion of the network device, e.g., a CD player, and passed to data stream processor 2150 via applications interface 2044), performs whatever application-specific data conversion is required and passes that data onto transmit data bus 2028 (e.g., for transmission to the next device on the logical ring network by transmit data logic 2120). If not, transmit control logic 2720 enables and sends the data bypass signal 2670 to system command stream processor 2130 (see FIG. 14(a)), indicting that data stream processor 2150 has no data to send.

In this manner, network devices such as CD players, DVD players, speakers and televisions/monitors can transmit/receive data via the data stream, utilizing network bandwidth that can be allocated dynamically if one or more smart controller devices is present on the network. As will be apparent to one skilled in the art, additional application-specific functionality can be added to data stream processor 2150 itself, or via applications interface 2044, additional data stream processors, or (of course) custom logic.

D. Hot-Pluggable Smart Jacks

As discussed above (see FIG. 6) and illustrated in greater detail in FIG. 16, a special type of network device may be integrated into a hot-pluggable jack such as jack 2896, collectively creating a hot-pluggable smart jack adapter 2800 into which network devices can be plugged and from which network devices can be removed (either directly or via a daisy-chain of devices via jack 2896) without requiring reinitialization of the logical ring network. In other words, digital media streams and other data can continue to propagate among other devices on the logical ring network without interruption (and even through adapter 2800 with minimal interruption). Without hot-pluggable smart jacks, such digital media streams would be interrupted (albeit for a short period of time—e.g., less than one second) whenever any network device was added or removed.

When devices are added to or removed from a chain of devices connected to a hot-pluggable smart jack, another network clock device arbitration process is unnecessary. The network clock device will not even detect the interruption (because, as will be discussed below, hot-pluggable smart jack adapter 2800 maintains a consistent cumulative frame propagation delay). Adapter 2800 will, however, detect the addition or removal of a network device, and therefore will prompt the network clock device (via a SCAN INITIATE system command) to initiate a logical ring network topology scan to reestablish the default network path to include/exclude the added/removed network device, and enable interested network devices to discern the new network topology.

In essence, hot-pluggable smart jack adapter 2800 serves as a form of "mini-switching router," because it propagates data received from the logical ring network (via transformer 2802) along one of two different paths: (i) back out to the network via transformer 2804, or (ii) first along its device chain via jack 2896, and then back out to the network via transformer 2804. It switches between these two paths (usually temporarily) whenever a device is added to or removed from jack 2896 (or a device daisy-chained thereto).

As will become apparent from the discussion of FIG. 16 below, the internal architecture of adapter 2800 is quite similar in nature to a "dual-version" of ASIC 2012 in core network adapter 2000.

Hot-pluggable smart jack adapter 2800 contains receive data logic 2810, clock processing logic 2820 and transmit data logic 2830, each of which operates essentially as described above in connection with ASIC 2012 in core network adapter 2000 (except as noted below), enabling adapter 2800 to communicate with the remainder of the logical ring network (via transformers 2802 and 2804). Similarly, adapter 2800 also contains receive data logic 2890, clock processing logic 2880 and transmit data logic 2870, each of which operates in an analogous manner, enabling adapter 2800 to communicate directly with the network device (if any) connected to jack 2896.

Hot-pluggable smart jack adapter 2800 maintains a "constant delay" (independent of the number of devices that are connected via jack 2896, subject to a maximum delay imposed by the hardware) from the time information is received via transformer 2802 until the time information leaves via transformer 2804. This constant delay is maintained via delay control logic 2850, FIFOs 2860 and 2864, and multiplexer 2866. FIFOs 2860 and 2864 maintain a given delay in a similar manner to that described above with respect to FIFO 2140 (see FIG. 10) within the network clock device.

System command stream processor 2840 also operates as described above, though it preferably will need to interpret the SET and GET system commands (as well as the minimal set of system commands described above) to allow a "smart" controller to set its constant delay, which serves to isolate the remainder of the logical ring network from the addition or removal of devices via jack 2896 (and via devices daisy-chained thereto). It also may need to generate a SCAN INITIATE system command to notify the network clock device of the addition or removal of network devices, necessitating a new logical ring network topology scan (as explained below).

In one embodiment, following initialization and auto-configuration of the network (i.e., completion of the network clock device arbitration process and logical ring network topology scan), a "smart" controller could initiate a SET system command to set a register in delay control logic 2850 of hot-pluggable smart jack adapter 2800. The contents of this register represent the constant delay which adapter 2800 (including any network devices connected to it via jack 2896) must maintain.

For example, given that a typical network device imposes about six clocks of delay (at the symbol bit rate of 28.224 MHz), a smart controller might impose a 50-clock constant delay, permitting approximately seven typical devices (not including adapter 2800) to be daisy-chained to adapter 2800. A smart controller also might determine (e.g., during network initialization or via a "message" from the network clock device) the maximum amount of delay available without causing loss of audio samples. This delay could then be distributed among hot-pluggable smart jacks, switching routers and other similar devices on the network. Such delay could be distributed evenly among such devices, or in proportion to the number of devices currently on their network "arm" or device chain, or by various other apportionment mechanisms.

After imposing such constant delays upon such devices, a smart controller could cause the logical ring network to be reinitialized, whereupon such delays would then take effect.

The entire process of setting such constant delays and reinitializing the logical ring network would occur relatively instantaneously (e.g., within a second or two).

Moreover, reinitialization of the entire network could be avoided if the new delays took effect simultaneously (e.g., by use of "timestamps" as explained above). Also, a switching router (discussed below) could be employed to isolate any loss of synchronization to a single "arm" of the network when these new delays took effect—much as hot-pluggable jack 2800 isolates the rest of the network from the effects of adding and removing devices from its device chain.

When no devices are connected via hot-pluggable jack 2896, clock processing logic 2880 detects that no valid data and frame headers are being received and causes multiplexer 2866 to select the output of FIFO 2860 to be routed to transmit data logic 2830 and out to the rest of the logical ring network. Adapter 2800 always routes incoming data 2814 from the logical ring network through FIFO 2860 (as well as to transmit data logic 2870 and out via jack 2896), which imposes the constant delay, taking into account the delay imposed by this "shortcut path" through adapter 2800.

When one or more devices are attached to hot-pluggable jack 2896, clock processing logic 2880 will detect the existence of valid frame headers (passing through such devices and back to adapter 2800 via receive data logic 2890) and switch multiplexer 2866 to select the output of FIFO 2864. Incoming data 2884 received from devices daisy-chained via jack 2896 will always be routed through FIFO 2864, which will impose the appropriate amount of delay to maintain the constant delay (equal to that of the "shortcut path" described above)—i.e., by delaying a number of clocks equal to the constant delay less the amount of delay imposed by the additional propagation through transmit data logic 2870, the devices daisy-chained via jack 2896 and receive data logic 2890. Delay control logic 2850 controls FIFO 2864 to impose such additional delay.

It should be noted that, if a clock-capable network device is connected to or daisy-chained via jack 2896, its clock functionality could be disabled (e.g., by a manual user-accessible switch on the outside of the device) to avoid sending CLOCK ID system commands (with frame headers and thus newly created frames) when connected, which might otherwise cause a loss of synchronization requiring reinitialization of the network.

Because FIFOs 2860 and 2864 both use the same receive counter (from clock processing logic 2820) for received data, the total delay for each nibble received from the network via transformer 2802, and transmitted back to the network via transformer 2804, will be the same regardless of the path selected by multiplexer 2866. Should the number of devices attached via jack 2896 create a delay exceeding the constant delay, then the network clock device will lose synchronization due to this additional delay, and reinitialize the network. The smart controller device would then be responsible for detecting this error condition and imposing a greater constant delay.

Whenever devices daisy-chained via jack 2896 are added or removed, clock processing logic 2880 detects the resulting loss of synchronization (i.e., missed frame headers), switches multiplexer 2866 back to the "shortcut path" temporarily, and switches back only after it once again recognizes valid frame headers. Whether a device is added or removed, the chain of devices connected via jack 2896 must be disconnected, albeit briefly. During this period, data from such devices will be lost, but data on the remainder of the network will not be affected. Such data will merely take the "shortcut path" due to the switching of paths via multiplexer 2866. The constant delay provides ample time to make this switch without any loss of data.

Once the chain is restored (i.e., the devices are reconnected by the user), the longer path is reestablished as it was when a device was first attached to jack 2896 (as described above). Because one or more devices have been added or removed, however, system command stream processor 2840 will generate a SCAN INITIATE system command for the network clock device, which will initiate another logical ring network topology scan to account for the new (or removed) devices.

E. Switching Routers

As discussed above, a logical ring network may reach a point where the total network bandwidth (approximately 22 Mbps in one embodiment) is insufficient—e.g., due to the number of devices on the network or to user requirements for multiple simultaneous sources of various digital media streams. At that point, one of the most effective means of increasing network bandwidth is the addition of a switching router, as discussed below.

As noted above, once a logical ring network in a house or other environment includes more than about 100 devices, the cumulative frame propagation delay may exceed 1/44.1 kHz=22.676 $\mu$s. At that point, the network will continue to function, although the network clock device will round up the delay to 1/22.05 kHz=45.352 $\mu$s (as explained above), resulting in a loss of audio quality due to a potential delay between devices of up to two audio sample times. By adding a switching router, the network can be segmented into distinct network zones, each "arm" of which would have few enough devices to accommodate a 1/44.1 kHz=22.676 $\mu$s cumulative frame propagation delay.

Even if the number of network devices does not reach this point, users may exceed the number of available channels on the data stream, despite dynamic reallocation of such channels. For example, household members may desire to view four different video programs simultaneously, requiring four simultaneous MPEG2 digital audio/video streams. In many cases, a smart controller device could reallocate the currently unused channels dynamically to accommodate such requirements. If, however, no such device is present, or too many other channels (e.g., audio, telephone, asynchronous data, etc.) are in use, and cannot be reallocated dynamically at that point in time, these increased bandwidth requirements may not be able to be met.

If this situation occurs too frequently, a switching router could be added to segment the network into zones, each arm of which might accommodate, for example, devices in one or more rooms of a house. By distributing the video sources and the simultaneous viewers across separate zones, each network arm need only accommodate a lesser number (e.g., one or two) of simultaneous requests for MPEG2 or other digital media streams.

Thus, a switching router will, in effect, provide the total network bandwidth to each network arm or zone, while still allowing devices in different zones to communicate with one another when necessary. Switching routers also serve to isolate network zones from one another, so that an interruption of one arm of the network will not necessarily cause the entire network to be reinitialized.

1. Switching Router Architecture

Hot-pluggable smart jack 2800 described above (see FIG. 16) performs a simple coarse switching function, either transmitting all system commands and data first to its own chain of connected devices and then to the rest of the logical ring network, or diverting such system commands and data directly to the rest of the logical ring network. General purpose switching routers, such as switching router 3000 illustrated in FIG. 17, perform a very fine level of data discrimination, potentially allowing each network nibble stream from each network arm to be routed to any other network nibble stream of any other network arm.

FIG. 17 is a block diagram of one embodiment of switching router 3000 which can switch among incoming signals 3010a, 3010b, 3010c and 3010d from four distinct network arms. By connecting switching router 3000 to each network arm (i.e., creating separate physical loops which constitute distinct network arms or zones), switching router 3000 can act as a pseudo network clock device with respect to each network arm.

Switching router 3000 utilizes FIFOs 3030a, 3030b, 3030c and 3030d to buffer information propagating on corresponding network arms (entering switching router 3000 via respective incoming signals 3010a, 3010b, 3010c and 3010d, and received via respective receive logic 3020a, 3020b, 3020c and 3020d) in a similar manner to that described above with respect to FIFO 2140 (see FIG. 10) within the network clock device.

In other words, information will propagate around each network arm, buffered by switching router 3000, to create an integral number of frames (one in this embodiment) on such network arm at any given time. If switching router 3000 did not route information among network arms, each arm could operate as a separate logical ring network.

Switching router 3000 does, however, route information among network arms for a number of reasons. It maintains a single logical loop (i.e., the default network path) to ensure that the logical ring network can be initialized and auto-configured. Thus, information may propagate from switching router 3000 to a first network arm (e.g., clockwise by convention), reenter via incoming signal 3010a, then onto a second network arm and back via incoming signal 3010b, then onto a third network arm and back via signal 3010c, then onto a fourth network arm and back via signal 3010d, and finally back onto the first network arm to complete the default network path.

This path, however, which reaches every device on the logical ring network (and reaches switching router 3000 once per active network arm), is utilized only for the system command stream (i.e., nibbles 64 and 65 of each 128-nibble frame in one embodiment). By following this path for system commands, the logical ring network always can be initialized and auto-configured (as explained below).

For the data stream, however, switching router 3000 routes predetermined network nibble streams among network arms. This is accomplished by buffering each incoming frame (e.g., in FIFO 3030 for incoming signal 3010a on a first network arm), latching that frame (e.g., into holding latch 3032a) when the last nibble of the frame is received, and again latching that frame (e.g., into transmit latch 3034a) when the final nibble of the previous frame has been transmitted (via multiplexer 3040 and transmit logic 3050).

In other words, for each of the four network arms transmitting data to switching router 3000, via incoming signals 3010a, 3010b, 3010c and 3010d, incoming frames are first buffered (in respective FIFOs 3030a, 3030b, 3030c and 3030d) to maintain consistent 44.1 kHz frames on each such network arm. Note, however, that the propagation delay around each of these four network arms likely will be different, and thus that the current nibble being received from each arm may differ (e.g., switching router 3000 might be receiving nibble 28 from one arm while receiving nibble 72 from another arm).

In other words, after being buffered by switching router 3000, the network arms will be synchronized to one another, and the cumulative frame propagation delay around each network arm will be exactly 22.676 μs. Yet, incoming data from each network arm will be "out of phase" with the incoming data from the other network arms, in that the current nibble count of nibbles being received on each arm at any given time will differ.

Due to this lack of "receive synchronization" and the fact that any nibble from one network arm (e.g., nibble 25) can be routed to any other nibble of any other arm (e.g., nibble 24), switching router 3000 must impose some delay (i.e., 22.676 μs or a single 44.1 kHz frame) to permit this degree of flexibility. Thus, while FIFOs 3030a, 3030b, 3030c and 3030d are buffering incoming frames, switching router 3000 will latch each such incoming frame into corresponding holding latches 3032a, 3032b, 3032c and 3032d once the last nibble of each such frame is received. Switching router 3000 subsequently will latch that frame into corresponding transmit latches 3034a, 3034b, 3034c and 3034d once it transmits the final nibble of each previous frame (previously latched into such transmit latches).

It should be noted that the latching of incoming frames into holding latches 3032a, 3032b, 3032c and 3032d will occur at different times due to the fact that the incoming data received from each network arm is "out of phase." Yet, the latching of such frames from holding latches 3032a, 3032b, 3032c and 3032d into transmit latches 3034a, 3034b, 3034c and 3034d will occur simultaneously, as will the extraction and transmission of nibbles from such transmit latches. In other words, although nibbles are received "out of phase," they are transmitted "in phase." Thus, at any given time, a particular network nibble stream (e.g., nibble 22) is being extracted from each transmit latch for transmission.

This "realignment" of nibbles occurs during the one-frame delay during which time incoming frames are being buffered in their respective FIFOs. If a particular network nibble stream arrives earlier from a first network arm than from another, it is because the propagation delay on that first network arm is shorter. The respective delays, however, will "even out" because the additional delay imposed by the corresponding FIFO in switching router 3000 will be longer.

Having buffered and latched the incoming frames from each "source" network arm, switching router 3000 must now determine, for the current nibble being transmitted, the routing of that nibble from each "source" network arm to each "destination" network arm. Each nibble from a particular "source" network arm may be routed to the next device on one or all of the "destination" network arms (including the same network arm on which that nibble originated), based upon the contents of the routing tables (discussed below).

Switching and transmit circuitry 3070 (only one shown) is repeated once for each network arm, and is controlled by the routing table 3060 associated with that network arm. For the current nibble being transmitted (e.g., nibble 22) on each "outgoing" network arm, multiplexer 3040 (and its corresponding multiplexers, not shown) will select that nibble, from among all of the "source" nibbles in each of the four incoming frames (via transmit latches 3034a, 3034b, 3034c and 3034d), and transmit that nibble via transmit logic 3050 to the next device on that "outgoing" network arm.

Each routing table, such as routing table 3060, will contain an entry for each of the 128 "destination" network nibble streams to be transmitted in one embodiment. That entry will include both a "source" network arm (e.g., network arm 2 of 4) and a source network nibble stream (e.g., nibble 13) which switching router 3000 will route onto that entry's "destination" network nibble stream (e.g., nibble 22) for the "destination" network arm (e.g., network arm 1 of 4) associated with such routing table. Thus, the $22^{nd}$ entry of routing table 3060 (associated with network arm 1) might contain a "2" (for network arm 2) and a "13" (for "source" nibble 13). Switching router 3000 therefore might route/transmit nibble 13 from network arm 2 onto nibble 22 of network arm 1. In parallel, it would route/transmit onto nibble 22 of the three other network arms the corresponding "source" arm/nibbles in the router table entries associated with each such other network arm.

The routing table entries for switching router 3000 are determined by a smart controller network device based upon its knowledge of the logical ring network topology, and of the user's requests (via remote control and other "input" devices, and associated software) at any particular time. As the network nibble streams are reallocated dynamically, and as devices are added to and removed from the network, the routing tables within switching router 3000 may also be updated accordingly.

In most situations, the process of updating these tables is a relatively simple matter of determining the relevant source and destination devices for particular channels. Existing computer network ("shortest path") routing issues typically will not arise unless many switching routers are deployed, which is unusual in most home, recreational or even business environments. Such well-known techniques could, however, be employed should the need arise. Having determined the appropriate source and destination devices for particular channels, a smart controller device (in addition to possibly reallocating data stream channels dynamically, as discussed above) initiates READ and WRITE system commands to update the relevant routing tables.

Thus, switching router 3000 will route/transmit the appropriate nibbles simultaneously onto network nibble stream 1 of each network arm (while receiving nibbles "out of phase" from each network arm), then network nibble stream 2, and so on, until all 128 nibbles of each frame have been transmitted. Due to the synchronization of network devices, and the buffering/latching of incoming frames described above, the delay imposed by switching router 3000 to route nibbles from one network arm to another (or back to the same arm) remains constant. As noted above, this provides for very precise synchronization, despite the delay of passing through switching router 3000. For example, a digital stereo audio stream transmitted by a CD player from one network arm would reach both speaker devices on a different network arm at the "same time"—i.e., during the same audio sample (frame) time.

The delay through switching router 3000 also is very short—e.g., less than two 44.1 kHz frame times, 45.352 μs. Each nibble received from one network arm by switching router 3000 is buffered in a corresponding FIFO for less than one 44.1 kHz frame time, and then is transmitted on that same or a different network arm during the next 44.1 kHz frame time.

Switching router 3000 also includes system command stream processors (not shown) for each network arm, similar to system command stream processor 2130, described above and shown in FIGS. 10, 14(*a*) and 14(*b*). These system command stream processors interpret/initiate initialization-related system commands, as well as READ and WRITE system commands to update the routing tables. Switching router 3000, which also is a clock-capable device in one embodiment, will in effect appear as a network device on each network arm to which it is connected.

Upon startup or network initialization/reset, switching router 3000 will transmit CLOCK ID system commands (as discussed above) along each network arm in a predefined order, and, in one embodiment, determine which network arms are "active." In other words, if its CLOCK ID does not return on a particular network arm within a predefined maximum number of 28.224 MHz clock cycles, then a problem is presumed to exist with respect to one or more devices on that arm, which is thus "inactive."

As noted above, switching router 3000 utilizes the default network path (i.e., network arm 1, then arm 2, and so on) to route all system commands. The rest of the initialization and auto-configuration process proceeds as described above. Preferably, switching router 3000 responds as a device (embedding its Device ID and "pointer" information into a SCAN REPLY system command) on each of its network arms, enabling a "smart" controller to discern the entire topology, including switching routers and other similar devices.

Switching router 3000 may or may not become the network clock device. In either event, as explained above, it will continue to act as a pseudo network clock device, buffering incoming frames on each network arm to which it is connected.

Switching router 3000 may also be "hot-pluggable," in that it may detect when any network arm loses synchronization (e.g., due to the addition or removal of a network device on that arm), and respond by re-routing information to exclude that network arm (temporarily), as explained above with respect to hot-pluggable smart jacks.

2. Multiple Switching Routers

In certain situations where even greater network bandwidth is required, it may be desirable to further segment a logical ring network by adding multiple switching routers. Though such situations will not typically occur in most home, mobile recreational, or even business environments, they can be accommodated with relatively minimal changes from the single switching router case.

One embodiment of such a multiple switching router configuration is illustrated in FIG. 18. Switching routers A,B and C (3110, 3120 and 3130) are interconnected directly by two twisted pairs 3140 to enable information to be routed among the switching routers themselves. Note that "end" switching routers 3110 and 3130 are configured with "loopback" terminators in a manner similar to that described above for replacement jacks. Thus, each switching router can treat inter-router path 3140 essentially as another network arm, in that information will propagate in a loop. Each of switching routers 3110, 3120 and 3130 is shown respectively attached to three network arms (3110A, 3110B and 3110C, 3120A, 3120B and 3120C, and 3130A, 3130B and 3130C), though each switching router could be attached to any number of network arms.

In this configuration, a default network path is formed by default. Information will propagate, for example (beginning with switching router 3130) onto network arm 3130C and back to switching router 3130, onto network arm 3130B and back to switching router 3130, along network arm 3130A and back to switching router 3130, where it will propagate to switching router 3120 via the lower pair of inter-router path 3140. Upon entering switching router 3120, it will propagate along network arms 3120C, 3120B and 3120A in a similar fashion, and then to switching router 3110 via the lower pair of inter-router path 3140, whereupon it will propagate similarly along network arms 3110C, 3110B and 3110A, and finally along a return path to switching router 3130 (through switching router 3120) via the upper pair of inter-router path 3140.

Thus, during network initialization and auto-configuration, each of switching routers 3110, 3120 and 3130 will simply treat inter-router path 3140 as another network arm, and transmit its CLOCK ID onto each of its "four" network arms. Once a device (whether one of the switching routers or another network device) is elected the network clock device, each of switching routers 3110, 3120 and 3130 will continue to propagate all system commands along this default network path.

Information propagating on the data stream will be routed from one network arm to another within each of the switching routers as described above. If information is to be routed to a network arm on another switching router, then each switching router will route such information onto its special network arm—i.e., inter-router path 3140. The routing table architecture need not change to accommodate such "inter-router" routing of information, though a smart controller would of course need to manage this slightly more complex routing table configuration issue.

For example, if network nibble stream 20 from network arm 3110A (connected to switching router 3110) were to be routed onto network nibble stream 10 of network arm 3130B (connected to switching router 3130), then the routing table associated with inter-route path 3140 inside switching router 3110 would have an entry for network nibble stream 10 which contained a 20 and an identifier for network arm 3110A. Similarly, the routing table associated with network arm 3130B inside switching router 3130 would have an entry for network nibble stream 20 and an identifier for inter-router path 3140.

There would of course be additional propagation delays imposed by each switching router (as discussed above) for data routed among switching routers. Yet, the propagation delay from one network arm to another remains constant (to within one audio sample or frame time), enabling destination devices, such as left and right speakers, to remain in phase, regardless of the number of frame delays imposed by each switching router.

Other configurations of multiple switching routers are possible, though probably unnecessary in most typical logical ring network environments. For example, additional inter-router paths could be added to increase bandwidth between switching routers. Such paths would again be treated as additional network arms.

Moreover, multiple switching routers could be connected to a single network arm, enabling virtually arbitrary placement of switching rollers. Although such flexibility might alleviate a certain amount of wiring complexity, it would come at the expense of considerable complexity in establishing a default network path during network initialization.

In essence, the switching routers would need to guarantee that all paths among devices and among switching routers were followed during the initialization process, such that the path followed by the successfully elected network clock device would become the default network path. This can be accomplished by keeping track of the order in which information arrives from each network arm during network initialization. Information is then routed giving precedence to those network arms from which information has not yet been received (i.e., in a "last-in-first-out" or "LIFO" fashion). Various algorithms (well-known in the art of network routing) can be implemented to optimize for the shortest path, quickest resolution or other desired factors.

F. Increasing Bandwidth on a Synchronous Logical Ring Network

Switching routers are an effective means of segmenting a logical ring network into distinct zones. They increase network bandwidth significantly to the extent source and destination devices for particular digital media streams can be distributed across such network zones. Individual rooms in a typical home, for example, may be ideal network zones. Switching routers may, however, require additional in-wall wiring, depending upon their proximity to network divides on each of the desired network arms. Star configurations are ideal for adding switching routers at a central "hub" location; yet, many homes have legacy analogs POTS configurations, as discussed above and illustrated in FIG. 2(a).

As an alternative or supplemental means of increasing overall network bandwidth, the transmission and receive drivers within individual network device transceivers can be enhanced through a variety of different means, discussed in greater detail below.

Briefly, these techniques include multi-level coding (as opposed to bi-level or "binary" coding) of signals, such that multiple bars are transmitted/received each clock period. For example, 5-level coding would double the effective data bandwidth (from 22 Mbps to 44 Mbps in one embodiment) because two bits are transmitted/received during each clock period. More sophisticated coding techniques, which enable devices to transmit/receive more than two bits per clock period, would of course increase bandwidth even further. As noted above, bi-level coding still would be utilized for the system command stream, to ensure that all devices could interpret system commands.

In addition, just as switching routers increase network bandwidth by providing alternate paths (via multiple network arms) for the data stream, thus eliminating traffic (i.e., particular data stream channels) from "unnecessary" network arms (i.e., those which do not contain source or destination devices for such data stream channels), individual network devices can increase network bandwidth in a similar manner. They can act as "mini" switching routers by providing alternate paths for the data stream, albeit in a more limited fashion (i.e., not necessarily providing the full flexibility of routing any network nibble stream on one path to any network nibble stream on any other path).

For example, bidirectional transmission and receive drivers could be employed to double again the effective data bandwidth (to 88 Mbps, assuming 5-level coding as well) by transmitting and receiving data simultaneously in both directions on the same pair of wires. Finally, dual transmission and receive drivers could be employed (assuming certain wiring restrictions are met, as discussed below) to double yet again the effective data bandwidth (to 176 Mbps, assuming both 5-level coding and bidirectionally as well) by transmitting and receiving data simultaneously on both pairs of available wires. Of course, if additional pairs were made available, even greater bandwidth increases would be possible.

In one embodiment, particular data stream channels would be allocated by a smart system controller among these available paths. This allocation would be reflected in the "mini routing tables" on these devices, in a manner similar to the routing tables present on switching routers, as described above.

FIGS. 19(a)–19(e) illustrate how such devices can be connected to the two twisted pairs of wires in one embodiment of a logical ring network. For example, FIG. 19(a) illustrates how network devices with single unidirectional transmission and receive drivers (of the type thus far discussed above), such as device 800, are connected in between incoming (R-G) pair of jack 802 and outgoing (R-G) pair of jack 804. As explained above, if no other network device is daisy-chained to jack 804 (for example), then a loopback terminator would connect outgoing (R-G) pair of jack 804 back to incoming pair (Y-B) of jack 804 to send the signal back into and then out of device 800 via outgoing (Y-B) pair of jack 802. In any event, the receive driver 810 (in between incoming transformer 806 and device adapter 814) and the transmission driver 812 (in between outgoing transformer 808 and device adapter 814) operate in one direction only along a single pair of wires.

FIG. 20 illustrates how the connectivity of network devices at the junction boxes of logical ring network 250e remains essentially the same whether such devices have 5-level, bidirectional and/or dual (or merely single unidirectional—cf. FIG. 2(c) above) transmission and receive drivers. As explained below, devices having dual transmission and receive drivers require that both pairs from a physical loop (see twisted pair segments 290e/291e/292e and 280e/281e/282e at junction box 226e), rather using one pair as the incoming pair and the other as the outgoing "return path" pair (see, e.g., twisted pair segments 244e at junction box 228e) to complete the loop.

Bidirectional/5-level devices 252e, 254e, 256e, 258e, 260e, 262e, 264e, 266e and 268e are connected, respectively, to junction boxes 216e, 224e, 226e, 230e, 226e (again), 228e, 218e, 220e and 222e, via jacks 270-1e, 270-2e, 270-3e, 270-4e, 270-5e, 270-6e, 270-7e, 270-8e, and 270-9e. Segment 232e might, for example, be connected to a POTS telephone network (in which case device 252e could be a POTS adapter device, discussed in greater detail below). As noted above, despite the presence of alternate paths, the system command stream still propagates along default network paths 205e (shown in dotted lines).

Starting, for example, at device 252e, information would be transmitted along one pair of wiring segments 234e, 240e and 242e to device 254e, then along the other pair of segment 242e and segment pair 290e (entering the dual-device physical loop, discussed below) to one set of drivers in dual device 256e (which, in this example, routes/cross-couples the information onto its other pair—segment pair 281e), then along segment pair 281e to one set of drivers in dual device 260e, then along segment pair 282e and one pair of segment 246e to device 258e, then back along the other pair of segment 246e and segment pair 280e, returning to the other set of drivers in dual device 256e (which again routes/cross-couples the information onto its other pair—segment 291e), then along segment pair 291e to the other set of drivers in dual device 260e, then along segment pair 292e and (leaving the dual-device physical loop) one pair of segment 244e to device 262e, and then along the other pair of segments 244e and 240e to device 264e, then along one pair of segment 236e to device 266e, then along one pair of segment 238e to device 268e, and finally returning to device 252e along the other pair of segments 238e, 236eand 234e.

1. 5-Level Coding

Multi-level coding techniques are in widespread use in the telecommunications and networking industries as a way of increasing effective bandwidth. For example, various recent modem standards and 100-Mbit Ethernet standards utilize multi-level coding techniques such as 5-level coding. Various other modulation techniques, including "quadrature phase shift keying" (QPSK) and "quadrature amplitude modulation" (QAM), could of course also be employed.

Devices employing standard bi-level coding techniques encode/decode only low (0) and high (1) values of analog signals, whereas devices employing multi-level coding techniques encode/decode three or more different levels. Five-level coding techniques use five distinct analog values to represent two bits of data.

Network devices having 5-level transmission and receive drivers would connect to a logical ring network in the same manner as described above, as illustrated in FIG. 20 (cf. FIG. 2(c) above). Ignoring the dual and bidirectional drivers also illustrated in FIG. 20 (and discussed below), it can be seen that there is no change to the propagation of signals along the default network path, or along any other path (e.g., if a switching router were added). Information simply is transmitted and received at twice the rate.

Although 5-level driver implementations are well known in the art, there exist multiple ways in which a network device having 5-level drivers could interpret the two bits of data. For example, if network devices merely interpret the same 128-nibble frames (in one embodiment) as arriving twice as fast (i.e., at a 88.2 kHz frame rate), the information might be of little use, in that 44.1 kHz audio samples would have to be buffered, and most other digital media is sampled even less frequently. For certain applications requiring higher sample rates, however, 88.2 kHz frame rates could potentially be useful.

In the context of digital media streams, however, 44.1 kHz frame rates typically are sufficient. Thus, rather than increase the frame rate, the size of the frame could be doubled—in one embodiment, to 256 nibbles. For downward compatibility with network devices that do not have 5-level drivers, the system command stream could continue to be transmitted using bi-level coding. The data stream, however, would be double the size (248 nibbles), and thus could carry twice the data bandwidth (i.e., twice as many digital stereo audio, digital video, telephone, and other digital media streams, including embedded asynchronous data).

Moreover, network devices having 5-level drivers would work within the system command stream architecture as described above. In particular, the 248-nibble data stream could be considered two "banks" of 124-nibble data. The stream-related system commands (e.g., TALK ASSIGN) would continue to use a 128-bit Transmit Enable Mask and a one-byte Bank field to identify particular network nibble streams.

Thus, aside from the additional complexity (and cost) of multi-level coding drivers, this technique is a relatively straightforward way of doubling the effective bandwidth of a logical ring network, particularly if adopted by all devices on the network. Bi-level devices can coexist on the same network as multi-level coding devices (particularly if the system command stream utilizes bi-level coding), though data stream compatibility would require certain modifications to the architecture—e.g., dedicating a portion of the data stream to bi-level coding, providing a bi-level to multi-level adapter to "upgrade" legacy devices, etc.

2. Bidirectional Transmission and Receive Drivers

Whether the transmission and receive drivers in a network device employ bi-level or multi-level coding, such drivers can be designed with bidirectional capabilities using well-known techniques. Network devices having bidirectional drivers are, in effect, a form of "mini" switching router, capable of routing data along one of two paths using the same pair of wires.

Although bidirectional transmission and receive drivers can be implemented using well-known techniques, devices employing such drivers in a logical ring network must determine the path (i.e., clockwise or counterclockwise) along which particular information will be routed. For example, in one embodiment, during network initialization, clock-capable bidirectional devices initiate and transmit CLOCK ID (and other initialization-related) system commands along both paths (directions), similar to the initialization process described above for switching routers. Only when such a device receives its CLOCK ID back on both paths (assuming both paths are "active") will it be deemed elected the network clock device. The path used in electing the network clock device will become the default network path.

FIG. 19(c) illustrates how devices having bidirectional drivers are connected to a logical ring network. Note that all drivers are connected to a single (R-G) pair of wires—i.e., because bidirectional devices transmit and receive data in both directions on this same pair of wires.

Although shown as two separate device adapters 868 and 878, some of the device functionality need not be duplicated. For example, although a device having bidirectional drivers likely would have two sets of transmit, receive and clock processing logic, it might share system command stream and data stream processors.

In any event, device adapters 868 and 878 are connected in between bidirectional (R-G) pair of jack 852 and bidirectional (R-G) pair of jack 854. As explained above, if no other network device is daisy-chained to jack 854 (for example), then a loopback terminator would connect bidirectional (R-G) pair of jack 854 back to "return path" pair (Y-B) of jack 854 to send the signal back into and then out of device 850 via "return path" (Y-B) pair of jack 852.

Receive driver 874 (in between incoming transformer 870 and device adapter 878) and transmission driver 876 (in between outgoing transformer 872 and device adapter 878) operate in one direction, while receive driver 866 (in between incoming transformer 862 and device adapter 868) and transmission driver 864 (in between outgoing transformer 860 and device adapter 868) operate in the other direction. Standard echo cancellation and equalization circuitry 856 and 858 enables incoming and outgoing signals on the same (R-G) pair of wires to be directed to/from the appropriate transmission and receive drivers without significant interference.

FIG. 19(e) illustrates one embodiment of an adapter for enabling unidirectional devices, such as device 960, to work in conjunction with bidirectional devices on a logical ring network, in effect by adding a second set of drivers (cf., drivers 864 and 866 in FIG. 19(c)) to a set of unidirectional drivers (cf., drivers 810 and 812 in FIG. 19(a)). Before adding unidirectional-bidirectional adapter 980, information arrives on the R-G pair of jack 962, propagates to network adapter 970 (via incoming transformer 966 and receive driver 970), and then out of the R-G pair of jack 964 (via transmit driver 972 and outgoing transformer 968).

Once adapter 980 is added, "bidirectional" information coming into the R-G pair of jack 964 can be accommodated (i.e., "passively" passed through the device). Information arrives at the R-G pair of jack 964, and passes through echo cancellation and equalization circuitry 984, where it is passed directly through receive driver 992 (via incoming transformer 988) and transmit driver 990, and then out of the R-G pair of jack 962 (via outgoing transformer 986 and echo cancellation and equalization circuitry 982).

Returning to FIG. 20, it can be seen how bidirectional devices, such as 5-level/bidirectional device 252e, can transmit information in either direction on logical ring network 250e. Unlike 5-level drivers, which double either the frame size or the frame rate, bidirectional drivers, in effect, transmit and receive two frames of the same size at the same rate, but along different paths (directions) using the same pair of wires. The result, however, is the same—i.e., the effective bandwidth from one network device to another is doubled.

As noted above, one of these directions (e.g., clockwise) becomes the default network path for the system command stream. Data on the data stream, however, can be transmitted and received in both directions. In this regard, bidirectional and/or 5-level devices all can adapt to the same concept of multiple (i.e., two) banks of 124-nibble data streams. One bank could be deemed the "clockwise" path and the other bank the "counterclockwise" path. If network devices have both 5-level and bidirectional capabilities, the effective data bandwidth of a 28.224 MHz (symbol rate) logical ring network can effectively be quadrupled (from 22 Mbps to 88 Mbps).

3. Dual Transmission and Receive Drivers

Whether a network device has unidirectional or bidirectional transmission and receive drivers, and whether such drivers use bi-level or multi-level coding, such device can use multiple of these transmission and receive drivers to increase the effective overall network bandwidth of a logical ring network. In one embodiment of a logical ring network using two twisted pairs of wires, dual transmission and receive drivers wold enable a network device to transmit and receive information simultaneously on both pairs.

FIG. 19(b) illustrates how devices having dual transmission and receive drivers are connected to a logical ring network. Unlike bidirectional devices, dual devices utilize one pair of wires for each set of transmission/receive drivers. As with bidirectional devices, the two separate device adapters 834 and 844 of dual device 820 could be integrated, e.g., to share functionality such as system command stream and data stream processors.

Device adapter 834 is connected in between incoming (R-G) pair of jack 822 and outgoing (R-G) pair of jack 824. As explained above, if no other network device is daisy-chained to jack 824 (for example), then a loopback terminator would connect outgoing (R-G) pair of jack 824 back to incoming pair (Y-B) of jack 824 to send the signal back into and then out of the device (without being processed by adapter 844) via outgoing (Y-B) pair of jack 822.

Receive driver 830 (in between incoming transformer 826 and device adapter 834) and transmission driver 832 (in between outgoing transformer 828 and device adapter 834) operate on the R-G pairs, while receive driver 842 (in between incoming transformer 838 and device adapter 844) and transmission driver 840 (in between outgoing transformer 836 and device adapter 844) operate on the Y-B pairs.

FIG. 19(d) illustrates a hybrid device 900 having dual (two sets of) bidirectional transmission and receive drivers. Here too, the separate adapters 918, 928, 938 and 948 may well be integrated to share functionality, such as system command stream and data stream processors.

Information arriving on the R-G pair of jack 902 will pass through echo cancellation and equalization circuitry 906, into adapter 928 (via incoming transformer 920 and receive driver 924), and then out either R-G pair of jack 904 (via transmit driver 926, outgoing transformer 922 and echo cancellation and equalization circuitry 908) or routed/cross-connected to Y-B pair of jack 904 (via transmit driver 946, outgoing transformer 942 and echo cancellation and equalization circuitry 952). Similarly, information arriving on Y-B pair of jack 902 will pass through each cancellation and equalization circuitry 950, into adapter 948 (via incoming transformer 940 and receive driver 944), and then out either Y-B pair of jack 904 (via transmit driver 946, outgoing transformer 942 and echo cancellation and equalization circuitry 952), or routed/cross-connected to R-G pair of jack 904 (via transmit driver 926, outgoing transformer 922 and echo cancellation and equalization circuitry 908).

Analogously, from the other side of device 900, it can be seen that information arriving on the R-G pair of jack 904 will pass through echo cancellation and equalization circuitry 908, into adapter 918 (via incoming transformer 912 and receive driver 916), and then out either R-G pair of jack 902 (via transmit driver 914, outgoing transformer 910 and echo cancellation and equalization circuitry 906) or routed/cross-connected to Y-B pair of jack 902 (via transmit driver 934, outgoing transformer 930 and echo cancellation and equalization circuitry 950). Similarly, information arriving on Y-B pair of jack 904 will pass through echo cancellation and equalization circuitry 952, into adapter 938 (via incoming transformer 932 and receive driver 936), and then out either Y-B pair of jack 902 (via transmit driver 934, outgoing transformer 930 and echo cancellation and equalization circuitry 950), or routed/cross-connected to R-G pair of jack 902 (via transmit driver 914, outgoing transformer 910 and echo cancellation and equalization circuitry 906).

Because both R-G and Y-B pairs are used in dual devices, no dedicated free pair remains for use as the "return path" to complete the default network path. Such devices could be placed such that both pairs form a physical loop, as illustrated in FIG. 20. Alternatively, such devices (e.g., a dual-bidirectional device at the end of a "chain") could route signals from the R-G to the Y-B pair of its jack, though this would limit the effective data rate to that of a single driver device.

It can be seen that dual (as well as 5-level and bidirectional) devices 256e and 260e not only are connected to each other (via segment pairs 281e and 291e), but that each of dual devices 256e and 260e also is connected to junction box 226e (by respective jacks 270-3e and 270-5e), thereby forming a physical loop on both pairs. At least one such dual device in a logical ring network can route/cross-connect the information from one pair of the other pair (e.g., from segment pair 290e to segment pair 281e, as discussed above) to propagate the system command stream.

With respect to the data stream, dual devices operate similarly to 5-level and bidirectional devices, in that they too can adapt to the same concept of multiple (i.e., two) banks of 124-nibble data streams. One bank could be associated with the R-G path and the other bank associated with the Y-B path. If network devices have both 5-level and bidirectional capabilities, the effective data bandwidth of a 28.224 MHz (symbol rate) logical ring network can effectively be octupled (from 22 Mbps to 176 Mbps).

G. Network Device Components on a Synchronous Logical Ring Network

Having described the architecture and operation of a synchronous logical ring network, a core network adapter and certain key "network-level" hardware components such as hot-pluggable smart jacks and switching routers, the architecture of key "application-level" components of individual network devices can be explained. An understanding of such network device components is essential to appreciate the "system-level" advantages inherent in the operation of network devices on a synchronous logical ring network.

It should be emphasized that the components described below are not necessarily network devices themselves. It will become apparent from the discussion below that such components can be combined in various ways to form network devices addressing specific applications. Such components are, in essence, a set of building blocks that can be combined to build a wide range of consumer electronics and other devices.

As is apparent from the architecture of the network and core network adapter described above, devices on a synchronous logical ring network need not be "smart" (i.e., they need not contain CPUs or even memory), and thus can be quite inexpensive. The following architectural description of network device components will further illustrate the fact that devices on a synchronous logical ring network can be implemented entirely with hardware state machines. When smart controller devices are added to the network, however, the functionality of the system can be enhanced significantly, as is also illustrated below.

One significant consequence of the architecture of a synchronous logical ring network as described above is that consumer electronics and other network devices can be restructured, with their functionality distributed throughout the network, to provide simpler network setup and device interconnection, greater flexibility in operation, and enhanced audio and video quality. Such advantages are highlighted below in the context of individual device components and system applications.

The network device components described below include an interface to a synchronous logical ring network, having at least one set of input and output (RJ-11 or RJ-12) jacks, interface transformers, transmission and receive drivers and a core network adapter, substantially as described above. The following architectural description therefore focuses on the applications portion of such device components.

1. Logical Ring Network Prototype Board

FIG. 21(a) illustrates one embodiment of a logical ring network prototype board 3500 (with a logical ring network interface via core network adapter 3508 having interface jacks 3502, transformers 3504 and transceiver 3506 connected thereto), which can be used by developers to develop and debug network hardware and software devices and applications. It is designed to interface to a wide range of diagnostic and debugging equipment and systems.

Prototype board 3500 includes 64K ROM 3510 and core network adapter 3508, connected via data 3514 and address 3516 buses and J2 bus port 3512, which permits local device peripherals adapter 3508 to interface with RAM, ROM, hardware registers and other local device peripherals. Core network adapter 3508 also includes a J1 debug port 3524 which supports debugging (via bus 3526) using the Xilinx Xchecker probe.

General purpose I/O port 3518, including two I/O buses 3520 and 3522, enables adapter 3508 to interface directly to logical ring network system command and data streams, as well as I²C serial streams. The timing of adapter 3508 can be controlled externally via voltage-controlled crystal oscillator (VCXO) 3532. A 16-position input switch 3528 might be read by other network devices for inter-device communication during system debugging (or used internally to configure the device).

2. Stereo Audio Components a) Stereo Audio A/D and D/A Adapter

FIG. 21(b) illustrates one embodiment of an analog stereo audio adapter 3550 (with a logical ring network interface via core network adapter 3558 having interface jacks 3552, transformers 3554 and transceiver 3556 connected thereto), which can be used for a variety of purposes, including as an adapter interface to legacy analog audio input/output devices. Adapter 3550 provides a synchronous logical ring network interface to devices such as analog CD players, tuners, preamplifiers, power amplifiers, VCRs, laserdisc players, and virtually any other device with line-level analog audio inputs and/or outputs.

Stereo Audio A/D-D/A Adapter 3550 includes 18-bit A/D converter 3568 which receives left 3573 and right 3574 analog audio signal inputs, which it samples/digitizes and provides to core network adapter 3558, clocked by sample clock 3572 (which is provided by adapter 3558). Adapter 3550 also provides left 3564 and right 3566 analog audio signal outputs (from 18-bit D/A converter 3560, which converts digital stereo audio data 3562 provided by network adapter 3558) to legacy analog audio devices, such as VCRs, preamplifiers and power amplifiers, which receive line-level analog stereo audio inputs.

In one embodiment, unbalanced line-level analog stereo audio inputs 3573 and 3574 and outputs 3564 and 3566 are provided via high-quality Rotrium RCA phono connectors. 18-bit Crystal Semiconductor model 4331 D/A converter 3560 and model 5331 A/D converter 3568 (from Crystal Semiconductor Corp. of Austin, Tex.) meet audiophile standards. D/A converter 3560 also includes a digital overload detection circuit (not shown), which will shut down audio output to protect speakers, power amplifiers and human ears, and a programmable sample delay of up to eight audio samples for critical coherence applications. A gain control stage may be used in conjunction with D/A converter 3560 to provide quieter operation.

b) Monophonic Audio D/A and Integrated Power Amplifier

FIG. 21(c) illustrates one embodiment of a monophonic analog audio adapter 3575 (with a logical ring network interface via core network adapter 3583 having interface jacks 3577, transformers 3579 and transceiver 3581 connected thereto), which can be used for a variety of purposes, including as a logical ring network adapter interface to a legacy analog audio output device, such as a loudspeaker.

Monophonic Audio D/A and Integrated Power Amplifier 3575 provides monophonic analog audio output 3587 (e.g., to a loudspeaker) from 5–100 watt Class D high-performance power amplifier 3585 (which receives gain control 3589 from network adapter 3583), which amplifies monophonic line-level analog audio output 3597 from 18-bit D/A converter 3591 (also a Crystal Semiconductor model 4331), which converts a single channel of digital audio data 3595 provided by network adapter 3583 (which is clocked by sample transmit clock 3593). Module 3575 can provide oversampling, sample rate conversion, crossover functions and negative feedback interfaces for D/A converter 3591, amplifier 3585 and the speaker. Phantom power could be shared on a single bidirectional twisted-pair cable. High-efficiency Class D amplifier 3585 maximizes the power delivered by any phantom powering, as well as any power stage devices in the speaker.

c) Digital Preamplifier and Mixer

FIG. 21(d) illustrates one embodiment of relatively complex digital signal processing functionality—Digital Preamplifier and Mixer 4500—which directly handles up to 16 analog audio inputs and a digital audio input, which can be mixed with digital audio data from devices on a synchronous logical ring network, the resulting output of which can be provided to other network devices or directly to devices having MIDI, AES/EBU and/or RS232 serial interfaces. It should be noted that component 4500 provides digital preamplifier functionality, in essence, by combining a general purpose digital signal processing component (shown below local bus 4514) with various analog and digital audio inputs and outputs.

Digital Preamplifier and Mixer 4500 connects to a synchronous logical ring network via core network adapter 4550, which interfaces via two-arm switching router 4580 (which could be integrated into network adapter 4550) to interface jacks 4592 and 4593, transformers 4594 and 4595, and transceivers 4596 and 4597). Input signals 4582 and 4586 and output signals 4584 and 4588 from transceivers 4596 and 4597 are routed between two network zones by two-arm switching router 4580, and interface with network adapter 4550 via input signal 4585 and output signal 4587. Network adapter 4550 also includes an on-board RISC CPU and resident software (not shown) for digital signal processing, signal routing and network interface functionality, as well as 64K of 16-bit SRAM 4555.

Network adapter 4550 interfaces with a Motorola 56302 digital signal processor (DSP) 4000 (which includes 24 MB of DRAM 4545) via host interface bus 4570, DMA bus 4560 and two RS232 serial interfaces 4554 and 4556 for exchanging stream data (e.g., network nibble streams) with the logical ring network. DSP 4000 processes digital data from the logical ring network (via network adapter 4550) and from analog/digital inputs to Digital Preamplifier and Mixer 4500 (discussed below).

Network adapter 4550 interfaces with the direct analog/digital inputs/outputs of Digital Preamplifier and Mixer 4500 via local bus 4514, which interfaces with MIDI transceiver 4502 (having 5-pin DIN inputs 4516 and outputs 4518 to MIDI-based devices), RS232 transceiver 4504 (having serial interface 4520 for remote control and debugging), Audio Engineering Society/European Broadcast Union (AES/EBU) interfaces 4506 and 4508 (having two digital stereo audio outputs 4522 and 4524 and one digital stereo audio input 4526, respectively, for interfacing with digital audio devices via 3-pin XLR connectors), headphone power amplifier 4510 (having ¼ inch TRS phone plug for providing stereo audio headphone output 4530), and A/D D/A Array 4512 (having Crystal Semiconductor 4331 D/A and 5331 A/D converters, with 16 stereo line-level audio inputs 4538, two auxiliary line-level inputs 4536 and outputs 4534, two main outputs 4532, two monitor outputs 4533 and a stereo headphone output 4539).

Digital Preamplifier and Mixer 4500 can be mounted in a standard 19-inch RETMA rack, and occupies a single (1¾ inch high) rack space. The rack ears are removable so the unit can be used on a desktop or shelf.

d) AC-3 Surround Sound™ Processor

FIG. 21(e) illustrates one embodiment of moderately complex digital signal processing functionality—AC-3 Surround Sound™ Processor 3950—which distributes (via two network arms of a synchronous logical ring network) AC-3 Surround Sound™ (Left Main, Right Main, Center, Subwoofer, Left Rear and Right Rear) digital audio channels to any power amplifier/speaker network devices in a home theater environment.

AC-3 Surround Sound™ Processor 3950 connects to a synchronous logical ring network via core network adapter 3972, which interfaces via two-arm switching router 3992 (which could be integrated into network adapter 3972) to interface jacks 3952 and 3958, transformers 3954 and 3960, and transceivers 3956 and 3962). Input signals 3964 and 3968 and output signals 3966 and 3970 from transceivers 3956 and 3962 are routed between two network zones by two-arm switching router 3992, and interface with network adapter 3972 via input signal 3994 and output signal 3996. Network adapter 3972 also includes integrated AC-3 support (not shown) to interface with AC-3 Sound Processor 3974 (e.g., a standard Zoran ZR38600, manufactured by Zoran Corp. of Santa Clara, Calif.), as discussed below.

Network adapter 3972 interfaces with AC-3 Sound Processor 3974 (which uses external DRAM 3988) to decode digital audio from the logical ring network, using a host control interface 3986 (e.g., $I^2C$). Network adapter 3972 transmits encoded digital audio stream 3976 and sample clock 3978 to AC-3 Sound Processor 3974, which decodes stream 3976 into six AC-3 channels of digital audio, and transmitted back to network adapter 3972 Left and Right Main channel 3980, Left and Right Rear channels 3982 and Center/Subwoofer channels 3984.

e) Stereo Audio in a Synchronous Logical Ring Network

It should be emphasized that a synchronous logical ring network architecture as described above permits both digital and legacy analog audio source devices (e.g., CD players, FM Tuners, VCRs, laser disc players, DVD players, DSS and analog satellite receivers, and others) not only to interface to a digital network, but to provide higher quality (audiophile) stereo audio output by eliminating many of the redundant A/D and D/A conversion and analog signal processing stages which degrade audio quality.

For example, source stereo audio signals are provided either in digital form or converted (once) by a component such as A/D converter 3560 in Stereo Audio A/D-D/A Adapter 3550, illustrated in FIG. 21(b) above. At that point, they remain on the network as left/right channels of line-level stereo audio. Such audio signals can be processed digitally (e.g., by components such as Digital Preamplifier and Mixer 4900 from FIG. 21(d) and AC-3 Surround Sound™ Processor 3950 from FIG. 21(e)) without any degradation in performance.

Moreover, significant additional flexibility is provided by this distributed architecture. Source devices can be connected to the network at any point, using one of many analog device adapters, rather than all being tethered to one particular device (such as a legacy preamplifier) by fixed audio cables. This distributed architecture permits the line-level audio from any source network device to be processed by any other signal processing network device with no degradation in sound quality.

For example, a network device might extract low, medium and high frequencies from a line-level stereo audio source, and provide them over the network to three (or more) different devices, such as integrated monophonic power amplifiers and digital speakers, or to power amplifiers connected to legacy analog speakers. Digital or analog speaker drivers might be separate network devices (such as a woofer, tweeter or other single speaker driver) or integrated together into one network device. Digital crossover processing can be performed by one network device, and provided to legacy analog speakers, providing higher-quality audio than legacy speakers with integrated analog crossover circuitry.

Integrated monophonic power amplifiers/digital speakers can provide inexpensive yet extremely high-quality audio, leaving all signal processing to independent DSP-based network devices. Certain powered amplifiers (with relatively low power requirements) could even be trickle-charged over the network (using phantom power as discussed above). Only one A/D conversion (if any) need take place to provide the stereo audio source to the network. At the other end, only one D/A conversion need take place to generate the final audio signal. The result is virtually unlimited flexibility in mixing and matching source and destination devices, and in providing digital processing functionality, with minimal degradation of quality from the original audio source device.

Finally, not only can legacy twisted pair telephone wire be reused (as described in great detail above), but legacy speaker wire also can be reused—not only for connecting legacy speakers to a synchronous logical ring network, but also for providing a bidirectional signal, which can accommodate both network data and power on the same pair of wires, as described above.

3. Digital Telephony Components a) Digital Telephony in a Synchronous Logical Ring Network

Before describing the architecture of digital telephony components, it is important to note a distinction between digital audio streams generated from telephone conversions and "ordinary" digital audio streams, such as CD-quality stereo audio. Due to the relatively low data rate required for telephone-quality audio, only one nibble of data is transmitted per frame (in one embodiment).

Yet, a digital "sample" of telephone-quality audio requires four nibbles of data. To avoid corrupting the data when a telephone call begins, the stream should begin on the appropriate 4-nibble boundary. A "start telephone conversation" marker (e.g., a "T" symbol) therefore is supplied (in one embodiment) at the start of each call to establish this boundary,. This "out-of-band" sample synchronization marker and other commands/information (e.g., which line is ringing, caller ID, etc.) can be embedded, for example, as custom commands in the least significant nibble of a sequence of four-nibble samples.

For example, a "T" symbol in the least significant nibble could indicate that the next sample will be voice data (also used for reconstructing the voice data overwritten by the "T" symbol), followed by a sample containing the data portion of the command in its least significant nibble, followed by the rest of the 4-nibble data stream samples. Variable-length extended commands could be accommodated by an extension command value (e.g., "0xF"), which provides for two additional pairs of alternating voice data/command samples. This would accommodate two nibbles of command data, the second of which could be another "0xF" symbol, providing for two more nibbles of command data, and so on until the desired variable number of command data nibbles has been specified.

The component that interfaces to the POTS telephone line could transmit such markers before transmitting repeating 16-bit samples (representing the telephone call stream), perhaps with other custom commands embedded in the least significant nibble of such samples, as described above. Telephone devices would "sync up" to this "missing" sample whenever a new call was initiated.

To replace the analog POTS telephone system in a house, one would need a POTS line interface component (i.e., to digitize the incoming conversation and convert it back to analog once it leaves the logical ring network), some form of PBX or other controller (typically any smart controller device (to handle the call processing functionality), and a digital handset (which could range from a simple "dumb" phone to a complex device with an advanced user interface beyond that found even in high-end legacy PBX handsets in use today. Simple POTS and ISDN line interface components and a digital handset are discussed below.

b) PSTN 2-Line Telephone Adapter

With reference now to FIG. 21(f), PSTN 2-Line Telephone Adapter 3600 provides a logical ring network interface to two Public Switched Telephone Network ("PSTN") analog telephone lines. Telephone adapter 3600 interfaces to a logical ring network via core network adapter 3608, which is connected to interface jacks 3602 via transformers 3604 and transceiver 3606. This component is based on an off-the-shelf Cermetek CH1838 DAA Line Interface device, manufactured by Cermetek Microelectronics, Inc., of Sunnyvale, Calif.

Adapter 3600 receives incoming analog POTS telephone streams 3632 and 3634, respectively, via Data Access Arrangement (DAA) interfaces 3628 and 3630 (an analog hybrid which level-conditions the analog signal to meet PSTN specifications), and digitizes such streams, e.g., via 18-bit A/D converter 3618 (based upon a sample clock 3622 from network adapter 3608), which transmits the resulting digital audio streams 3620 to network adapter 3608. These digital audio streams are 16-bit sampled at a rate of 11.025 kHz.

The digital audio streams received from the logical ring network (sent from network adapter 3608 via line 3612) are converted by D/A converter 3610 to analog signals, sent along lines 3614 and 3616, respectively, for transmission to their PSTN lines via DAA interfaces 3628 and 3630.

Upon detecting a "ring" on analog PSTN lines 3632 and/or 3634, DAA interfaces 3628 and 3630 transmit respective "ring indicate" signals 3636 and 3638 to network adapter 3608. Similarly, when a device on the logical ring network (e.g., a digital handset, a computer modem, etc.) needs to use these analog PSTN lines 3632 and/or 3634, network adapter 3608 transmits respective "offhook" signals 3640 and 3642 to DAA interfaces 3628 and 3630. Call processing functionality, Caller-ID, DTMF dialing and multi-line conferencing can be provided by any smart controller device on the logical ring network.

c) Digital Telephone Set

Digital Telephone Set 3650, illustrated in FIG. 21(g), provides a user a digital telephone that interfaces directly to a logical ring network (via core network adapter 3658, connected to jacks 3652 via transformers 3654 and transceiver 3656). This device is based on an off-the-shelf telephone/speakerphone assembly, such as the AT&T 800 series, manufactured by AT&T Corp., Murray Hill, N.J. Digital Telephone Set 3650 also preferably includes a digital hybrid audio processor (not shown) to permit side tone injection, level control, feedback elimination and conferencing, i.e., simulating the functionality of an analog telephone set.

Digital Telephone Set 3650 includes a handset 3678 (with off-hook sensor 3680, that signals network adapter 3658), a speakerphone (speaker 3682 and microphone 3684), a keypad 3686 for user input 3690 to network adapter 3658), and LED/LCD display 3688 (for messages 3692, such as the number dialed by the user, caller ID, etc.). Analog audio 3676 generated by a user of handset 3678 is transmitted to 18-bit A/D converter 3668 (as is audio from microphone 3684), where it is digitized (based upon a sample clock 3672 from network adapter 3658) and transmitted as a digital audio stream 3670 to network adapter 3658. Digital audio 3662 from the logical ring network is digitized by D/A converter 3660, which transmits resulting analog audio 3664 and 3666 to speaker 3682 and handset 3678, respectively.

It should be noted that two independent audio streams (sent on lines 3664 and 3666 (incoming) and 3674, 3676 (outgoing), respectively) are supported by Digital Telephone Set 3650. One audio stream (carried via 3664, 3674) is directed to the speakerphone subsystem 3682 and 3684, while the other audio stream (carried via 3666, 3676) is directed to handset 3678. This allows the speakerphone 3682 and 3684 to be used as an intercom, baby monitor or even radio, simultaneously with handset 3678.

d) ISDN Line Telephone Interface

ISDN Line Telephone Interface 3700, illustrated in FIG. 21(h), provides a logical ring network interface to an ISDN connection 3714 to the Public Switched Telephone Network (via core network adapter 3708, which is connected to interface jacks 3702 via transformers 3704 and transceiver 3706). Both ISDN B-channels and the D-channels are processed as a single asynchronous logical ring network stream. ISDN interface 3700 is based on an off-the-shelf ISDN NIC 3710/interface ASIC 3716 which control the ISDN PSTN lines (based upon respective control signals 3712 and 3720 from network adapter 3708). Because the source signal from the ISDN PSTN is digital, such digital data 3722 can be transmitted directly (without any A/D or D/A conversions, or other signal processing) between ASIC 3716 and network adapter 3708.

Similar line interface components could be devised for DSL and ADSL phone lines, T1, T2, T3, ATM, as well as for "cable phone" gateways. All such components could provide the line interface for "dumb" telephone adaptors, cordless RF phones, etc.

4. Broadcast Adapters

Even as more devices move to support digital media, there remains a need to interface to "analog" broadcast signals (even if carrying digital data) in order to distribute such digital media across a logical ring network. Typical components, for interfacing to FM, NTSC (VHF/UHF/CATV) and DSS broadcast signals, are discussed below. Similar components could be devised for AM, shortwave (SW) and longwave (LW) broadcast signals as well.

a) FM/RDS Tuner

FM/RDS Tuner components 3730, illustrated in FIG. 21(i), receives standard FM and FM stereo broadcasts in the 88.1 MHz to 107.9 MHz FM broadcast band, and digitizes them for use (e.g., by speakers, telephone handsets, or any other audio output component) on a logical ring network (via core network adapter 3738, which is connected to interface jacks 3732 via transformers 3734 and transceiver 3736). This component 3730 is based on an off-the-shelf Philips FM Tuner subassembly 3740. All receiver functionality can be controlled via logical ring network system commands (or proprietary inter-device commands).

FM Tuner 3740 receives an FM or FM stereo broadcast via 75 Ohm, F-Connector antenna input 3744. High-quality analog to digital conversion (via A/D converter 3756, controlled by external clock signal 3758 from network adapter 3738) of left 3754 and right 3752 analog audio channels from FM Tuner 3740 produces a stereo or monophonic digital audio stream (fed to network adapter 3738 via line 3759). Radio Data System ("RDS") data decoder 3748 feeds network adapter 3738 with asynchronous RDS data 3750 (embedded in a synchronous logical ring network data stream channel) transmitted by the tuned FM station via RDS subcarrier 3746. Network adapter 3738 controls FM Tuner 3740 via a standard I²C control bus 3742.

b) TV/CATV/VBI Tuner

TV/CATV/VBI Tuner component 3760, illustrated in FIG. 21(j), receives standard over-the-air (VHF and UHF) and cable (CATV) television broadcasts, and digitizes the audio portion of such broadcasts for use (e.g., by speakers, telephone handsets, or any other audio output component) on a logical ring network (via core network adapter 3768, which is connected to interface jacks 3762 via transformers 3764 and transceiver 3766). As is explained below, the analog video signal itself must not only be digitized, but must be compressed (i.e., by another component attached to or integrated within a network device) before it can, as a practical matter, be distributed on a logical ring network. Tuner component 3760 is based on an off-the-shelf Philips TV/CATV Tuner subassembly 3770. All receiver functionality can be controlled via logical ring network system commands (or proprietary inter-device commands).

TV/CATV Tuner 3770 (which operates in both HRC and IRC channel allocation modes) receives a VHF or UHF over-the-air broadcast via 75 Ohm, F-Connector antenna input 3744 (or a CATV broadcast via a direct CATV cable input). High-quality analog to digital conversion (via A/D converters 3788, controlled by external clock signal 3790 from network adapter 3768) of left 3784 and right 3786 analog audio channels from TV/CATV tuner 3770 produces a stereo or monophonic digital audio stream (fed to network adapter 3768 via line 3792). An analog stereo audio output also is provided through a Mini TRS stereo phone headphone jack (not shown). Network adapter 3768 controls TV/CATV Tuner 3770 via a standard I²C control line 3772.

Vertical Blanking Interval ("VBI") data decoder 3780, fed the VBI Scan lines 3778 from tuner 3770, produces an asynchronous logical ring network stream with all, or selected, VBI data being broadcast by the received television station (supplied to network adapter 3768 via line 3782).

Video output 3776 is NTSC based band composite video, distributed via an RCA phono connector (not shown). This analog video signal 3776 typically will be routed to a real-time video compression component for creation of an MPEG or Wavelet compressed digital video stream suitable for transmission on a logical ring network.

Pending U.S. patent application Ser. No. 60/050,933, incorporated herein by reference, describes a very inexpensive Wavelet encoder that provides high-quality real-time compression and decompression of video signals. The compressed data stream bandwidth is four to eight million bits per second, with Hi8-level quality at six million bits per second. The use of Wavelet coding has significant advantages over MPEG coding, including easily-generated variable size frames (thumbnails), easier playback of frames in the forward or reverse direction, and more natural and pleasing (less blocky) artifacts.

c) DSS/DVB IRD Interface

DSS/DVB IRD Interface component 4050, illustrated in FIG. 21(k), provides an interface from a logical ring network (via core network adapter 4058, which is connected to interface jacks 4052 via transformers 4054 and transceiver 4056) to the multiplexed data stream (audio, video, PGGS and wideband data) available on most DSS compatible receivers 4068, primarily for reception of data broadcasts. The interface between IRD interface driver/receiver logic 4060 and IRD 4068 (each of which could be its own separate logical ring network device) consists of a parallel high-speed interface 4064 and a serial low-speed interface 4066. The read-only high-speed port 4064 outputs a data stream when enabled. The bi-directional low-speed 4066 is used for host control of the IRD as well as reading low data rate streams from the IRD, such as the PGGS Program Guide.

Data streams are sent to network adapter 4058 via bus 4062. A smart controller (e.g., storage server or user interface control device, described below) can control the IRD as well as receive data streams from the IRD 4068. This component 4050, combined with the PCI Adapter component described below, provides a simple and cost-effective solution to the problem of interfacing one or more personal computers to a DSS IRD 4068.

IRD 4068 can output the MPEG2 audio and video of the selected channel as a multiplexed stream via the high-speed parallel interface 4054. In fact, the entire transponder data stream could be enabled to the high-speed interface 4054. This would allow an existing DSS IRD to be used for distribution of audio and video program material to the rest of the logical ring network. As noted above, the MPEG2 decoder (which would be unnecessary in this component), could be located at the distribution (i.e., television and/or monitor), such that the compressed MPEG2 digital audio/video stream could be distributed (i.e., embedded as asynchronous data in a synchronous data stream channel) to a myriad of network devices, as well as be recorded, processed or otherwise manipulated for a desired application.

Component 4050 is based on an off-the-shelf DSS compatible IRD, such as the Sony or RCA IRD used for the DSS Network; or alternatively, the Echostar DVB receiver used in the Dish Network.

5. Digital Audio and Video Devices on a Logical Ring Network a) External Clock Synchronization via a Network Phase-Locked Loop As noted above, once a compressed digital audio/video signal is obtained (e.g., MPEG2 audio/video received by the DSS IRD described above, or Wavelet-encoded NTSC video received by the TV/CATV tuner described above), it can be distributed across a logical ring network to a variety of destination devices (e.g., televisions or monitors), where it can be decoded and displayed.

Digitizing an analog TV/CATV broadcast and compressing the NTSC signal with the Wavelet encoder described above (or the MPEG1 encoder described below) provides a compressed digital video signal that can be distributed throughout a logical ring network and decoded by a television or other monitor. MPEG2 source audio/video, however, presents an obstacle to such a procedure, apart from the need to embed asynchronous data (including synchronization and other commands, using out-of-band signaling in the asynchronous data) in a synchronous data stream channel.

Because MPEG2 decoders assume a particular clock rate (nominally set at 27 MHz) for the input stream being decoded, an MPEG2 compressed digital audio/video stream cannot simply be transmitted on a logical ring network (e.g., in one embodiment, at a symbol bit rate of 28.224 MHz and a data bit rate of 22.579 MHz) and decoded by a device having a standard MPEG2 decoder. The MPEG2 standard specifies that MPEG2 encoders must be synchronized to a very precise master reference clock, nominally set at 27 MHz, with a maximum allowed variation of ±540 Hz, and a maximum frequency drift rate of 75 Hz per second. In other words, MPEG2 encoders must adjust to the rate at which the encoded MPEG2 stream is being transmitted (whether via an over-the-air DSS broadcast, or a locally-generated DVD player).

Normally, MPEG2 decodes synchronize to the encoded MPEG2 stream being transmitted by a DSS IRD or DVD player, using the timing information in the encoded stream itself. Yet, the drawings of a logical ring network noted above—i.e., the ability to distribute the compressed MPEG2 audio/video data across a network to a variety of destination devices while recording/processing such data along the way—become an obstacle due to the fact that the logical ring network rate is different from the external MPEG2 clock rate which MPEG2 decoders expect to receive. In short, MPEG2 data is not necessarily received over a logical ring network at the MPEG2 clock rate.

This problem is addressed by devising a phase-locked loop to synchronize an MPEG2 decoder to the encoded MPEG2 signal. Because the source (e.g., DSS IRD or DVD player) and destination (e.g., television or monitor) devices are physically separated via the logical ring network, however, a "network phase-locked loop" must be created to synchronize the MPEG2 stream being transmitted over the network.

As illustrated in FIG. 21(*l*), synchronization circuitry 5400 in both the source device 5300 (e.g., inside core network adapter 5302 or a DSS IRD) and the destination device 5310 (e.g., inside core network adapter 5306 of a digital television) allows the external MPEG2 clock and the logical ring network (controlled by the network clock device) to run at different rates, each synchronized to its own master reference clock signal. By adjusting the rate at which information is transmitted over the network to the MPEG2 decoder 5410, and by linking the two systems (via a network phase-locked loop, described below), the external MPEG2 clock can, in effect, be simulated to a high degree of accuracy (as will be shown below), by relying on the consistently accurate (i.e., constant) rate at which information propagates on a logical ring network.

Synchronization circuitry 5400 consists of both a frequency drift detector 5402 in network adapter 5302 of source device 5300 and a frequency synchronizer 5406 in network adapter 5306 of destination device 5310. Ignoring the synchronization problem for a moment, it can be seen that network adapter 5306 receives the encoded MPEG2 data stream 5416 over the logical ring network, and sends this stream 5408 to MPEG2 decoder 5410 (connected to, or incorporated into, television 5412. Upon decompressing the encoded MPEG2 digital audio/video data, MPEG2 decoder 5410 generates a conventional analog composite baseband video signal 5414 (which it sends to television 5412), as well as analog left and right audio signals (which it sends to speakers 5416 and 5418, respectively).

As will be illustrated in FIGS. 21(*m*) and 21(*n*) below, the network phase-locked loop formed by distributed synchronization circuitry 5400 causes encoded data stream 5408 to be sent to MPEG2 decoder 5410 (in destination device 5310) at a rate controlled by the master MPEG2 clock received by frequency drift detector 540 2 in source device 5300.

FIG. 21(*m*) illustrates the internal architecture of frequency drift detector 5402 in source device 5300. It receives both the 28.224 MHz logical ring network clock 5454 (which is doubled to a 56.448 MHz clock by clock doubler 5452) and SCLK 5312, which is a serial clock signal based on the MPEG2 reference clock rate of 27 MHz (represented by clock 5458). The logical ring network (doubled) and MPEG2 clocks both are divided down to 72 kHz by respective "divide by 784" and "divide by 375" counters 5456 and 5460. The numbers "784" and "375" are chosen to divide the two asynchronous clock signals to the same frequency—i.e., 72 kHz.

It should be noted, however, that although the output of counters cycle at virtually the same frequency, the two counter output signals are still completely asynchronous with respect to each other. RESET signal 5462 is shared by counters 5456 and 5460, and can be used to reset the counter values to zero at appropriate times, such as on power-up or before the start of an MPEG2 stream.

Counters 5456 and 5460 preferably are sufficiently wide such that they overflow relatively infrequently. For example, if they are implemented as 48-bit counters, at their operating clock rate of 72 kHz, they will not overflow for approximately 45,000 days, or 124 years.

The 48-bit values stored in counters 5456 and 5460 are sent to 48-bit subtractor 5472, which arithmetically subtracts the two counter values and generates a 48-bit result. Because the two reference clock signal shave been divided down to frequencies that are virtually identical, the subtractor result changes slowly. Thus, only the least significant 32 bits of subtractor 5472 are sent to output tri-state latch 5466. The clock input to latch 5466 is based upon the logical ring network frame-rate clock 5468, operating at 44.1 kHz (derived by dividing the 28.224 MHz clock, generated by the logical ring network clock device, by 640).

Thus, the 32-bit output value 5470 of output latch 5466 contains a slowly-changing digital value which reflects the difference in phase and frequency between the MPEG2 and logical ring network reference clocks 5458 and 5412, respectively. This output is inserted into the system command stream at predefined time intervals (e.g., via the PLL LOCK system command described above) for delivery to a destination network device having an MPEG2 decoder, such as television device 5310.

In essence (as will be described below), destination television device 5310 will generate a similar differential value to output value 5470 (using frequency synchronizer 5406), and use the difference between that generated value and value 5470 (e.g., received via the PLL LOCK system command) to recreate a reference MPEG2 clock, as in any standard PLL. Because the logical ring network clock rate is synchronized to such a high degree of accuracy (as explained above), the MPEG2 decoder can be synchronized very precisely to the external MPEG2 clock across the logical ring network. Moreover, it is this high degree of synchronization which permits output value 5470 to be delivered at precise intervals with very little jitter, enabling the PLL to function with an accurate reference clock, as opposed to one that might drift over time, which is the very problem the network phase-locked loop is designed to solve.

The frequency synchronizer 5306, illustrated in FIG. 21(*m*), extracts the output value 5470 (e.g., from the PLL LOCK system command) and uses it to recreate an accurate MPEG2 clock (via 27 MHz VCXO 5508). It contains a similar clock doubler 5506 (to double the reference logical ring network 28.224 MHz clock to 56.448 MHz), although its MPEG2 clock is generated locally (via 27 MHz VCXO 5508), as well as similar "divide by 784" and "divide by 375" counters 5526 and 5510, respectively, to divide these two clocks down to 72 kHz (and subtractor 5514 to measure the difference between these two counters over time). In addition, frequency synchronizer 5306 contains a similar RESET signal 5512 to reset counters 5526 and 5510 at appropriate times, such as system power up.

Because VCXO 5508 operates synchronously with respect to the logical ring network clock reference 5504 and the original MPEG2 clock reference (at the source device 5300), it must be synchronized by PLL 5518 to generate an accurate MPEG2 clock. To achieve this synchronization, the SCLK output 5502 of VCXO 5508 drives counter 5510 (in a similar manner to that described above for source device 5300), and generates (via subtractor 5514) a "locally generated" output value (latched at the synchronized 44.1 kHz frame rate), which is "compared" by PLL 5518 to the reference output value 5470 (received over the network), also latched in latch 5520 at the 44.1 kHz frame rate (and triggered by the receipt of the PLL LOCK system command).

In other words, PLL 5518 latches (within a frame of accuracy) the received phase difference 5470 between he MPEG2 reference clock and the logical ring network reference clock, as well as that same locally-generated difference (from latch 5516), using the same (synchronized) logical ring network clock, along with a locally-generated (estimated) MPEG2 clock. PLL 5518 functions as it would if the MPEG2 reference clock were available locally, because it is effectively made available (in the guise of the phase error generated by both source and destination devices 5300 and 5310) at precise intervals, and with sufficient frequency, to account for any drift which might occur in the MPEG2 reference clock over time.

Digitally-controlled PLL 5518 uses the difference between these latched values (from latch 5520 and 5516) to effect minor corrections in the control voltage 5522 applied to VCXO 5508, using well-known PLL digital control loop techniques. In this manner, control voltage 5522 is varied in a carefully controlled manner to precisely adjust and lock the VCXO output 5502 to the original MPEG2 serial clock (5312 of FIG. 21(*m*) above) received by source device 5300. Thus, VCXO output 5502 operates at precisely the MPEG2 reference frequency, and can be used as the MPEG2 "SCLK" signal to a downstream MPEG2 decoder, such as decoder 5410 in television device 5310.

Finally, it should be noted that the above-described network phase-locked loop can be applied to synchronize data sent on a logical ring network to virtually any external clock, not merely the MPEG2 clock. For example, digital audio data sampled at various sampling rates and/or phases (32 kHz, other 44.1 kHz phases, 48 kHz, 50 kHz, 96 kHz and 192 kHz) can be accommodated on a logical ring network, as asynchronous data (including out-of-band synchronization and other commands) embedded in a synchronous data stream channel. The various digital audio sampling rates can be synchronized to the logical ring network symbol or bit rate via the network phase-locked loop approach described above.

b) MPEG2 Decoder and A/V Output

Having described the manner in which an MPEG2 reference clock effectively can be delivered over a logical ring network (operating at a different frequency), the architecture of an MPEG2 decoder component in a device (such as a television or monitor) will now be explained.

MPEG2 Decoder and A/V output component 3800, illustrated in FIG. 21(*o*), decodes (and decompresses for listening/viewing) audio and/or video streams transmitted over a logical ring network (and received by core network adapter 3808, connected to jacks 3802 via interface transformers 3804 and transceiver 3806. It is used to interface a standard NTSC television set to a logical ring network, and is based on an off-the-shelf MPEG2 decoder ASIC 3814, such as the Thompson STI3520, manufactured by SGS-Thomson Microelectronics S. A. of St. Genis, France.

MPEG1 and MPEG2 streams can be decompressed in "real time." A compressed MPEG1 or MPEG2 stream is received from the network (embedded in a synchronous data stream channel, as described above) and routed from network adapter 3808 via line 3810 to the MPEG2 decoder ASIC 3814. This MPEG2 stream can contain a compressed audio stream, compressed video stream, or both. The MPEG2 decoder 3814 decompresses the MPEG2 stream(s) and produces an uncompressed 4:2:2 digital video signal 3816 and/or an uncompressed stereo serial digital audio signal 3822.

The 4:2:2 digital video signal 3816 is converted to an analog NTSC video signal via video D/A converter 3838. Converter 3838 provides both a composite video output 3818 (through an RCA phono connector, not shown) and an S-Video, or Y/C, composite video output 3820 (through a standard S-Video DIN connector, not shown). Both MPEG2 Decoder 3814 and Video D/A converter 3838 can be controlled by standard $I^2C$ commands, received via line 3812.

Multiplexer 3826 permits selection of the audio delivered from MPEG2 decoder 3814 via line 3822, or the audio supplied via a separate digital stream 3824 from adapter 3808. The resulting audio signal is sent on line 3828 to audio D/A converter 3832. The digital audio stream is sample-rate converted and locked to the logical ring network sample rate clock (provided by line 3830). This is because the digital audio stream received from a satellite, for example, will not be synchronized with the local logical ring network sample clock. The serial digital audio signal is thus converted to analog stereo, left 3834 and right 3836 signals (through two RCA phono connectors, not shown). The digital audio signal may also be routed back to the network for distribution to other network devices, such as the AC-3 Surround Sound Processor discussed above.

c) MPEG1 Encoder and A/V Input

As noted above, legacy analog video received, for example, by TV/CATV Tuner described above, typically must be compressed before it is transmitted along a logical ring network. One preferred type of compression is a Wavelet encoder (mentioned above), while another standard method is MPEG1 encoding.

MPEG1 Encoder and A/V Input component 3850, illustrated in FIG. 21(p), provides real-time compression/decompression of audio and/or video streams, and is based on an off-the-shelf MPEG1 encoder 3864, such as the C-Cube CL4020, manufactured by C-cube Microsystems, Inc. of Milpitas, Calif. MPEG Encoder 3864 can be used to interface a standard NTSC compatible VCR, camcorder, laserdisc player or other video source to a logical ring network (via network adapter 3858, connected to jacks 3852 via interface transformers 3854 and transceiver 3856).

MPEG1 streams can be compressed in real-time. A compressed MPEG1 stream is transmitted to a logical ring network via line 3860 and network adapter 3858 by the MPEG1 encoder ASIC 3864. This MPEG stream 3860 can contain a compressed audio stream, compressed video stream, or both. As with an MPEG2 stream, an MPEG1 stream 3860 actually is transmitted as an asynchronous stream on the network (embedded in a synchronous data stream channel) because the MPEG stream data bit rate is variable.

Either a 4:2:2 digital feed 3868 or an analog NTSC video signal 3872 (converted to a 4:2:2 digital video signal 3876 by video A/D converter 3838) is routed to the MPEG encoder 3864 via line 3866, the selection accomplished via mux 3870. MPEG1 Encoder 3850 provides both a composite video input 3872 (through an RCA phono connector) and an S-Video, or Y/C 3874 composite video input (through a standard S-Video DIN connector, not shown).

MPEG1 Encoder 3850 provides left 3884 and right 3886 audio input through two RCA phono connectors (not shown). The stereo analog audio is converted to a serial digital audio stream (via audio A/D converter 3882) and routed via line 3878 to both the MPEG encoder 3864 and logical ring network adapter 3858. This allows the uncompressed stereo audio input to be routed to the rest of the network directly as an audio stream or as the compressed audio portion of the MPEG stream.

The network adapter 3858 also can provide $I^2C$ control of MPEG encoder 3864 and video A/D converter 3838 via $I^2C$ line 3862.

d) CD/DVD Digital Audio Transport

CD/DVD Digital Audio Transport component 3900, illustrated in FIG. 21(q), provides an interface to a logical ring network (via core network adapter 3908, connected to jacks 3902 via interface transformers 3904 and transceiver 3906) for the playback CD digital audio and DVD digital audio/video. As noted above, compressed digital video generated by DVD/CD transport 3918 can be distributed directly onto a logical ring network (as asynchronous data embedded in a synchronous data stream channel). Thus, an MPEG2 decoder (which would be unnecessary in this component), for example, could be located at the destination (i.e., television and/or monitor). This would enable the compressed MPEG2 digital audio/video stream to be distributed to a myriad of network devices, as well as be recorded, processed or otherwise manipulated for a desired application. Remote control of transport 3918 can be accomplished via the logical ring network itself, as well as via IR, PC or other controller devices.

CD/DVD Digital Audio Transport component 3900 is based on an off-the-shelf DVD transport 3918. Phase-locked loop 3910, clocked by network adapter 3908 via line 3912, synchronizes transport 3918 with Read and ECC electronics 3916, providing network adapter 3908 with the digital data stream 3920, under $I^2C$ control of the network adapter 3908 via line 3922.

6. Personal Computer Interface Components a) Personal Computer PCI Adapter

Referring to FIG. 21(r), PCI Adapter module 4100 provides personal computers with a PCI plug-in card interface to the logical ring network. This module 4100 does not require any resident software; however, device drivers and other software (not shown) support operation of the module 4100 in the host operating system (e.g., Windows 95™). In one embodiment, module 4100 conforms to the physical packaging and power consumption specifications of a standard half-size PCI card 4118 for Windows™/Intel™, based personal computers.

PCI Adapter module 4100 is based on an off-the-shelf PCI controller ASIC 4110, the AMCC S5933 manufactured by Applied Micro circuits Corp. of San Diego, Calif. Module 4100 provides an interface to a logical ring network (via core network adapter 4108, connected to jacks 4102 via interface transformers 4104 and transceiver 4106). PCI Controller ASIC 4110 interfaces to network adapter 4108 via bus 4112, and to a host PC 4116 via PCI bus 4114.

b) Bridges between Logical Ring Networks and other Digital Communication Systems As noted above, logical ring networks can handle both synchronous and asynchronous data in "real time"—e.g., by embedding asynchronous data, such as TCP/IP packets, into a synchronous data stream. Thus, a logical ring network can "bridge" to other networks or digital communication systems because it can accommodate these different data types and delivery schemes.

For example, the "universal serial bus" (USB) handles real-time audio as well as asynchronous mouse/keyboard events. A logical ring network device could bridge a logical ring network to USB, for example, by allocating one or more audio data stream channels to the real-time audio data, and embedding the asynchronous mouse/keyboard events into a separate data stream channel. Similarly, each of Firewire's real-time data streams could be assigned separate logical ring network data stream channels, while its asynchronous data could be embedded into another data stream channel.

Employing similar techniques, bridges can be built between a logical ring network and ATM, SCSI, IDE, ATI, SPDIF and a variety of other digital communication systems.

7. Miscellaneous Network Device Components a) RS232/RS422 Serial I/O Interface With reference now to FIG. 21(s), the RS232/RS422 Serial I/O module 4150 provides two general-purpose RS232 and RS422 interfaces to a logical ring network. Two asynchronous streams transmitted via lines 4162 and 4170, connected through RS232–RS422 transceivers 4160 and 4168, respectively, can communicate through serial ports 4164 and 4166, respectively, using DB9 connectors (not shown). These serial ports 4164 and 4166 can operate using standard asynchronous data formats at rates from 110–57,600 baud. Module 4150 can interface other serial devices (e.g., GPS receivers for mobile applications, X10/CEBus controllers, modems, weather stations, etc.) to a logical ring network. Component 4150 also can embed a serial port protocol into a synchronous data stream channel, as discussed above. Module 4150 interfaces to a logical ring network via core network adapter 4158, connected to jacks 4152 via interface transformers 4154 and transceiver 4156.

b) MIDI I/O Interface

Referring now to FIG. 21(t), MIDI I/O module 4200 provides a MIDI interface to a logical ring network. Component 4200 also can embed a virtual MIDI port protocol into the data stream. Through 5-in DIN connectors (not shown), MIDI In 4214 and MIDI Through 4216 lines are provided to MIDI Optotransceiver 4210, MIDI Out (channels 1–16) line 4220 from Optotransmitter 4218, and MIDI Out line (channels 17–32) 4226 from Optotransmitter 4224. This module 4200 interfaces to a synthesizer, sampler or effects unit that normally has analog audio outputs. Alternatively, a stereo analog audio input section such as the 18-bit analog to digital converter (shown in FIG. 21(b)) could be added. Module 4200 interfaces to a logical ring network via core network adapter 4208, connected to jacks 4202 via interface transformers 4204 and transceiver 4206.

Custom MIDI commands can be embedded in the synchronous data stream channel in which the asynchronous MIDI data also is embedded. Such custom commands could be embedded using special markers in a manner similar to that described above for telephone audio samples, or using other similar out-of-band signalling techniques.

c) Synthesizer/Audio Processor Interface

By integrating a logical ring network interface into a device requiring I/O interfaces for both digital media and control information, the logical ring network interface can handle both the digital media and control information with a single connection to the network, thereby eliminating the need for separate connectors and cables for each of the media and control inputs and outputs.

For example, a typical music synthesizer or audio processing device would have separate input/output interfaces for MIDI control information and for mono, stereo or multi-channel audio. By incorporating a logical ring network interface into such a device, the need for such separate I/O interfaces and connectors would be eliminated. All such information (including, for example, MIDI control information and multiple digital audio channels) could interface to the logical ring network via a single connection.

d) IR/IrDA I/O Interface

With reference now to FIG. 21(u), IR/IrDA I/O module 4250 provides a general purpose IR/IrDA interface to a logical ring network. Component 4250 also can embed a virtual IR/IrDA port protocol into the data stream. The module 4250 provides one on-board IR/IrDA wide aperture optical/LED transceiver 4260 with optics 4264. This transceiver 4260 resides in the unit. The module 4250 provides support for four remote-mounted IR transmitters 4268 operating through optics 4270. These transmitters 4268 can connect to the rest of the module 4250 by four TRS Mini-plugs (not shown) connected to adapter 4258 through line 4266. These remote IR transmitters 4268 are designed to mount on the front panels of IR-equipped consumer electronics and by this means can be controlled by a logical ring network controller.

Module 4250 also provides an RS232 serial port 4272 via RS232-RS422 transceiver 4274, connected to adapter 4258 through line 4276, allowing for the attachment of a remote IR transceiver for either consumer electronics IR or IrDA, Module 4250 interfaces to a logical ring network via core network adapter 4258, connected to jacks 4252 via interface transformers 4254 and transceiver 4256.

e) Relay I/O Interface

Referring now to FIG. 21(v), Relay I/O module 4300 provides a general-purpose relay interface to a logical ring network. The module 4300, provides two network-controllable Single-Pole-double Throw ("SPDT") relays 4310 with inputs and outputs 4314 and 4316 that can be configured for a wide variety of control applications (e.g., turning on and off of hour lights at predetermined times). The relays 4310, connected to adapter 4308 via line 4312, are Class II and provide normally open ("NO"), normally closed ("NC") and common connection for each relay. The contact rating is 1 amp at 32 volts. The module 4300 can also supply 12 VDC and ground 4330 via power supply 4328.

Module 4300 also provides, via general-purpose digital I/O block 4318, four pairs of digital inputs 4324 and outputs 4322 and common lines 4326. The input rating is 25 mA load at 12 V and the output rating is 4 mA sink at 12 V maximum. The maximum data rate for digital I/O is 1 MHz or less. Connector block 4318, connector to adapter 4308 via line 4320, is, in one embodiment, a Phoenix MDSTB manufactured by Phoenix Contact GmbH of Blomberg, Germany. Module 4300 interfaces to a logical ring network via core network adapter 4308, connected to jacks 4302 via interface transformers 4304 and transceiver 4306.

f) Analog I/O Interface

With reference now to FIG. 21(w), Analog I/O module 4350 provides a general-purpose analog input/output interface to a logical ring network. This module 4350 provides four network-readable analog inputs 4366 (via A/D converter 4368), four network-controllable analog outputs 4364 (via D/A converter 4360) and two network-controlled digital potentiometers 4372, accessed via lines 4374 and 4376. All of these inputs and outputs are connected via a Phoenix MDSTB connector block (not shown).

The A/D 4368 and D/A 4360 converters, connected to adapter 4358 through lines 4370 and 4362, are instrumentation grade, with 14-bit sample size, 20,000 samples per second maximum sample rate (on all four channels), or 80,000 mixture (for one channel). Input ranges are ±5 V at 50 mA, output range is −4.5 to +5 V at 50 mV.

The digital potentiometers 4372 feature 10 KΩ range, with 256 wiper positions, and have series connection capability, and are opto-isolated with non-volatile wiper position on power down, with the position both readable and writable.

Module 4350 also provides ±5 V 4382 and ground 4384 through power supply 4380 at 50 mA. Module 4350 interfaces to a logical ring network via core network adapter 4358, connected to jacks 4352 via interface transformers 4354 and transceiver 4356.

g) Temperature Sensor

Referring now to FIG. 21(*x*), Temperature Sensor module 4400 provides a general-purpose temperature sensor interface to a logical ring network. Module 4400 provides two industry standard ¼" phone jack Omega 400 family temperature probe inputs 4414 and 4416. Through twin A/D Instrumentation converters 4410 and 4418 (connected to adapter 4408 via lines 4412 and 4420, respectively), module 4400 allows calibration of an unknown source to a known source. The temperature range is −25C to +100C, with resolution of 0.5C and probe accuracy of ±0.2C. Module 4400 interfaces to a logical ring network via core network adapter 4408, connected to jacks 4402 via interface transformers 4404 and transceiver 4406.

h) Logical Ring Network Twisted Pair Repeater

With reference now to FIG. 21(*y*), twisted pair repeater module 4450 provides an active in-line repeater for an entire logical ring network system command and data stream. In one embodiment, a maximum cable length of 33 meters is permitted between any two devices. Modules 4550 can be inserted anywhere onto the network to extend the length as necessary. Each repeater extends the relevant network segment by 33 meters. The repeater module also can reconfigure the default network path by separating left and right arms for diagnostic purposes, or for healing a broken network segment.

Core network adapter 4458 passes all the digital streams via line 4468 to active repeater 4466, which can then repeat onto a second network arm. Module 4450 interfaces to a logical ring network via core network adapter 4458, connected to jacks 4452 via interface transformers 4454 and transceiver 4456.

8. Digital, Disk-Based Multimedia Player/Recorder

With reference now to FIG. 22, Player/Recorder 5000 is an all digital, disk-based, multimedia recorder and player. This all-purpose media device supports concurrent recording and playback of multiple logical ring network streams. Each stream can, of course, contain audio, video, telephony, or data. Media and data delivered by satellite can be stored for later access by users. In this way, Player/Recorder 5000 can serve as a digital VCR, answering machine, fax machine, electronic mail server, and many other digital consumer electronics devices.

For example, local advertisements could be embedded into previously recorded audio and/or video programs. As a result, programs that, in their original form, contained national advertisements, or perhaps no advertisements at all, could now be used by advertisers to target customers via particular local or other targeted advertisements. Moreover, programming could be downloaded overnight from external sources (e.g., at lower bit rates to conserve limited bandwidth) for later playback at the user's convenience, with or without embedded advertising.

In one embodiment, Player/Recorder 5000 uses a CPU 5002, synchronous DRAM 5004, flash memory 5006, dual EIDE interface 5014, dual RS232 interface 5030 and Ethernet controller 5038, logical ring adapter 5010, twin loop router 5008, SDRAM Memory controller 5012, interrupt controller 5028 and glue/miscellaneous logic 5036. In this embodiment, adapter 5010, two-arm switching router 5008, SDRAM controller 5012, interrupt controller 5028, dual EIDE interface 5014, dual RS232 interface 5030 and glue/miscellaneous logic 5036 are incorporated into one integrated circuit 5080, which communicates with the CPU 5002, SDRAM 5004 and flash memory 5006 via 32 bit wide address bus 5042, 32 bit wide data bus 5044, a 13 bit MUX address but 5046 and flash memory bus 5048.

In this embodiment, CPU 5002 is a StrongARM RISC SA-110 CPU, manufactured by Digital Corp., of Maynard, Mass., running at 233 MHz. The synchronous DRAM 5004 (in this embodiment, 16 MB provided by 4 KM48S8030 SDRAMs) are controlled by SDRAM Memory controller 5012. SDRAM Memory controller 5012 provides for RAS CAS refresh and burst transfers, but not unaligned transfers in this embodiment. 2MB of AM29F016 flash memory 5006, manufactured by Advanced Micro Devices, Inc. of Sunnyvale, Calif. ("AMD"), stores the operating system software for Player/Recorder 5000.

The adapter 5010 interfaces Player/Recorder 5000 with two logical ring network arms 5050 and 5052, via the two-arm switching router 5008 and bus 5054. The Dual IDE interface 5014 has two ATA-2 high speed data ports, permitting attachment of up to four mass storage devices 5018, 5020, 5022, 5024 (daisy-chained via buses 5056 and 5060, respectively). The Ethernet controller 5038, which in this embodiment, is a AM79C940VC controller, also manufactured by AMD, accesses 10Base-T Ethernet 5076 through transformer 5040, which in this embodiment is a PE68025 PHY. The dual serial interface 5030, operating through serial port 5032 (in this embodiment, a MAX3320 RS232 transceiver, manufactured by Maximum Integrated Products, Inc. of Sunnyvale, Calif.), offers serial connections 5066, 5070 which may be used for debugging and attachment to an X10 controller (not shown). A clock oscillator 5026 and real time clock 5034 provide for the clocking functions of the Player/Recorder 5000, while power supply 5034, with a +12V input, provides +5V 5074, +3.3V 5076 and +2V 5078 as needed.

9. Portable Remote Control and Multimedia/Data Viewer

With reference now to FIG. 23, Multimedia/Data Viewer 5100 is a portable interface and display device that can act as a remote control or interface for network devices or as a multimedia/data viewer. Physically, in one embodiment, Multimedia/Data Viewer 5100 is a simple tablet-like device that features a large, touch-sensitive, color LCD screen 5116. Under software control, Multimedia/Data Viewer 5100 can be used as an interface for appropriate network devices (e.g., Multimedia/Data Viewer 5100 could display virtual transport controls for a network CD player). The LCD display 5116 and audio hardware (stereo A/D 5122 and D/A 5124, respectively) can be used to handle multimedia content or data, such as MPEG2 audio/video, digital audio, still images, text and various combinations (e.g., Web browsing). Furthermore, the audio hardware (A/D 5122 and D/A 5124 converters) also be used for telephony applications.

Multimedia/Data Viewer 5100 includes a CPU 5102, synchronous DRAM 5104, flash memory 5106, LCD display 5116, serial interfaces 5130, Ethernet controller 5138, network adapter 5110, SDRAM Memory controller 5112, interrupt controller 5128 and glue/miscellaneous logic 5136.

In one embodiment, network adapter 5110, SDRAM controller 5112, LCD display controller 5114, interrupt controller 5128, serial interfaces 5130 (in part) and glue/miscellaneous logic 5136 are incorporated into one integrated circuit 5180, which communicates with the CPU 5102, SDRAM 5104 and flash memory 5106 via 32-bit wide address bus 5142, 32-bit wide data bus 5144, a 13-bit MUX address bus 5146 and flash memory bus 5148.

In this embodiment, the CPU 5102 is a StrongARM RISC SA-110 CPU running at 233 MHz. The synchronous DRAM 5104 (in this embodiment 32 MB provided by 4 KM48S8030 SDRAMs) are controlled by SDRAM memory controller 5112. In this embodiment, SDRAM Memory controller 5112 provides for RAS CAS refresh, burst transfers, but not unaligned transfers. 64MB KM64000 flash memory 5106 stores the operating system and applications software for Multimedia/Data Viewer 5100.

The adapter 5110 interfaces Multimedia/Data Viewer 5100 with logical ring network 5154. The LCD display 5116 in this embodiment is an active-matrix thin-film transistor ("TFT") 10.4 inch color LCD display with super bright backlight, 800×600 pixel resolution and 18-bit color depth.

Serial interfaces 5130 connects to two RS232 port transceiver 5132 (via buses 5164, 5168 to serial lines 5166, 5170), touch panel 5118 (via bus 5158), IR/IrDA infra red I/O 5120 (via bus 5160), and Stereo A/D 5122 and D/A 5124 (via buses 5162, 5164, respectively) and radio transmitter 5108 (via bus 5150). Twin serial port 5132 (in this embodiment, two MAX3320 RS232 transceivers) offers serial connections 5166 and 5170 which may be used for attachment of a GPS receiver, Metricom radio link, digital still cameras or other peripherals.

Touch panel 5118 overlays LCD display 5116, and uses capacitive technology for 2048×2048 resolution with finger and stylus operation and palm rejection. Consumer electronics style IR transmitter and IrDA transceiver 5120 allow for communication with an IR wireless keyboard and/or mouse, printers, PCs and PDAs (not shown). A high quality audio subsystem is offered through Stereo A/D 5122 and D/A 5124 (using Crystal Semiconductor 5331 and 4331 components, respectively), supporting a 44.1 kHz sample rate with 18-bit audiophile sampling.

Connections through TRS mini-plugs (not shown) permit connection of high quality stereo audio headphones (not shown) or telephonic headset and microphone (not shown). An integrated 900 MHz radio transmitter/receiver 5108 permits radio band communication at a relatively low data rate. The Ethernet controller 5138, which in this embodiment, is a AM79C940VC controller, accesses 10Base-T Ethernet 5176 through transfer 5140, which in this embodiment is a PE68025 PHY.

A clock oscillator 5126 and real time clock 5134 provide for the clocking functions of module 5100, while power supply 5134, with a +12V input, provides +5V 5174, +3.3V 5176 and +2V 5178 as needed.

We claim:

1. A network adapter for connecting a device, via conductive media, to a synchronous communication network having a logical ring network topology, the network adapter comprising:
   (a) one or more interface jacks to connect the device to a first adjacent device and a second adjacent device on the network, wherein the device and the first and second adjacent devices are synchronized to a common network clock; and
   (b) a transceiver coupled to the network for receiving a first signal from the first adjacent device and transmitting a second signal to the second adjacent device in a constant time counted by the common network clock;
   (e) a clock to which the first and second adjacent devices will be synchronized if the clock is elected the common network clock; and
   (d) a clock arbitrator, synchronized to the clock, which causes the transceiver to transmit repeatedly to the second adjacent device a first ID signal identifying the device and having a first priority, until the transceiver receives from the first adjacent device either that first ID signal or a second ID signal having a second priority greater than the first priority.

2. The network adapter of claim 1, further comprising a network topology scanner which:
   (a) upon receiving a first scan request signal from the first adjacent device, causes the transceiver to modify and transmit that signal to the second adjacent device, as a scan replay signal with an embedded first ID signal identifying the device;
   (b) upon receiving a subsequent scan request signal from the first adjacent device, causes the transceiver to transmit that subsequent scan request signal to the second adjacent device; and
   (c) upon receiving a scan replay signal from the first adjacent device, causes the transceiver to transmit that scan replay signal to the second adjacent device.

3. A network adapter for connecting a device to a first adjacent device and a second adjacent device on a communication network, wherein the device is adapted to be connected to a remote Internet server, the network adapter comprising:
   (a) a plurality of connectors for daisy-chaining the device between the first adjacent device and the second adjacent device via unshielded twisted pair media; and
   (b) a transceiver that can receive a synchronous stream of digital signals from the first adjacent device and transmit substantially that same stream of digital signals to the second adjacent device in a constant time period, the stream of digital signals representing information including digital audio and digital video data from a plurality of source network devices, whereby the information can propagate along the network in a daisy-chained fashion from device to device, and can be played or otherwise reproduced by one or more network devices wherein the information is organized into fixed-length frames of data bits, and a subset of the data bits represents data stream channels of information that can contain streams of digital audio or video data, and wherein the data stream channels can be reallocated by reassigning to a channel different data bit positions within the fixed-length frames of information.

4. The network adapter of claim 3, wherein the device is uniquely identified by a static ID that distinguishes the device from any other device that could be connected to the network.

5. The network adapter of claim 3, wherein the adapter can be synchronized to a common network clock device on the network.

6. The network adapter of claim 5, wherein the common network clock device can transmit information representing a synchronization header, and wherein the device can use the synchronization header to synchronize itself to the common network clock device.

7. The network adapter of claim 3, wherein the device is a personal computer.

8. The network adapter of claim 3, wherein the information transmitted from the device in a first room can propagate along the network to a device in another room.

9. The network adapter of claim 3, wherein the information that can be transmitted includes digital stereo audio having left channel and right channel data, and wherein the left channel data can propagate along the network to a first speaker device, and the right channel data can propagate along the network to a second speaker device, such that the left and right channel data can be played respectively by the first and second speaker devices at substantially the same line.

10. The network adapter of claim 3, wherein the information that can be transmitted from the device includes digital video data, and wherein the digital video data can propagate along the network to a first monitor device and a second monitor device, such that the digital video data can be displayed by the first and second monitor devices at substantially the same time.

11. The network adapter of claim 3, further comprising a D/A converter for converting the digital signals that can be received by the transceiver into analog input signals to the device.

12. The network adapter of claim 3, further comprising an A/D converter for converting analog output signals from the device into digital signals that can be transmitted to the second adjacent device by the transceiver.

13. A network adapter for connecting a device to a first adjacent device and a second adjacent device on a logical ring network, the network adapter comprising:
  (a) at least one wire connected to the first adjacent device for receiving a plurality of signals representing information including digital audio and digital video data;
  (b) at least one wire connected to the second adjacent device for transmitting substantially the same signals to the second adjacent device, such that those signals propagate among devices on the network in a fixed device order forming a logically closed loop; and
  (c) at least one wire connected to a power source for providing phantom power to one or more devices on the network.

14. A network adapter for connecting a device to a synchronous communication network having a logical ring network topology, the network adapter comprising:
  (a) one or more interface jacks to connect the device to a first adjacent device and a second adjacent device on the network, wherein the device and the first and second adjacent devices can be synchronized to a common network clock; and
  (b) a transceiver coupled to the network that can receive from the first adjacent devices and transmit to the second adjacent device in a constant time counted by the common network clock a plurality of signals representing data bits organized into fixed-length frames of information, wherein the fixed-length frames of information can propagate among devices on the network in a fixed device order along a default network path forming a logically closed loop, wherein a subset of the data bits in the fixed-length frames of information represents data stream channels of information that can contain streams of digital audio or video data, and wherein the data stream channels can be reallocated by reassigning to a channel different data bit positions within the fixed-length frame of information.

15. The network adapter of claim 14, wherein a first subset of the data bits in the fixed-length frames of information represents system commands that can propagate to all devices on the network along the default network path, and a second subset of the data bits in the fixed-length frames of information represents data stream channels of information that can contain streams of digital audio or video data that can propagate among devices on the network along an alternate network path that is not the default network path.

16. The network adapter of claim 14, wherein the data bits representing a data stream channel need not be contiguous within the fixed-length frame of information.

17. The network adapter of claim 14, wherein a first data stream channel is represented by a first number of data bits and a second data stream channel is represented by a second number of data bits that is different from the first number of data bits.

18. The network adapter of claim 17, wherein the first data stream channel contains a stream of digital samples of audio data and the second data stream channel contains a stream of digital samples of video data.

19. A network adapter for connecting a device to a first adjacent device and a second adjacent device on a logical ring network, the network adapter comprising:
  (a) a transceiver coupled to the network that can receive from the first adjacent device and transmit to the second adjacent device a plurality of signals representing data bits organized into frames of information having a plurality of data stream channels, the data stream channels including:
    (i) a first audio channel having a plurality of data bits representing a digital sample of an audio program; and
    (ii) a first video channel having a plurality of data bits representing a digital sample of a video program; and
  (b) a data stream processor that can extract from or insert into the first audio or first video channels the plurality of bits representing the respective digital samples of the audio or video programs.

20. The network adapter of claim 19, further comprising a controller that can interpret a command to reassign to the first audio or video channel different data bit positions within a frame of information.

21. A network adapter for connecting a device employing an asynchronous data communication protocol to a synchronous communication network having a logical ring network topology, the network adapter comprising:
  (a) one or more interface jacks to connect the device to a first adjacent device and a second adjacent device on the network, wherein the first device and the first and second adjacent devices can be synchronized to a common network clock;
  (b) a transceiver coupled to the network that can receive from the first adjacent device and transmit to the second adjacent device a plurality of signals representing data bits organized into a plurality of data streams channels, wherein the transceiver can transmit and receive signals over the data stream channels at consistent periodic time intervals, such channels including:
  (i) a first synchronous channel having a plurality of bits representing a digital sample of an audio or video program; and
  (ii) a second synchronous channel having a plurality of bits representing an asynchronous packet of data of fixed or variable length; and
(c) a data stream processor that can extract the asynchronous packet of data from the second synchronous channel, and can employ the asynchronous data communication protocol to interpret multiple of such asynchronous packets of data received at the periodic time intervals.

22. The network adapter of claim 21, wherein the asynchronous packets of data are IP packets.

23. The network adapter of claim 21, wherein the asynchronous packets are Ethernet packets.

24. The network adapter of claim 21, wherein the asynchronous packets are serial packets.

25. The network adapter of claim 1, wherein there are a plurality of devices coupled to the logical ring network and wherein each device imposes a constant amount of delay for transmitting a received signal to an adjacent device, and wherein the delay imposed by each device may differ.

26. The network adapter of claim 1, wherein the constant time counted by the common network clock is dynamically alterable.

27. The network adapter of claim 14, wherein each device on the network imposes a constant amount of delay for transmitting a received signal to an adjacent device, and wherein the delay imposed by each device may differ.

28. The network adapter of claim 14, wherein the constant time counted by the common network clock is dynamically alterable.

* * * * *

UNITED STATES PATENT AND TRADEMARK OFFICE
CERTIFICATE OF CORRECTION

PATENT NO. : 6,611,537 B1
DATED : August 26, 2003
INVENTOR(S) : Glen T. Edens et al.

It is certified that error appears in the above-identified patent and that said Letters Patent is hereby corrected as shown below:

Title page,
Item [56], References Cited, U.S. PATENT DOCUMENTS, please add the following references:

| | | | |
|---|---|---|---|
| -5,454,040 | 09/26/95 | Russell | 380/49 |
| 5,361,261 | 11/01/94 | Edem et al. | 370/85.3 |
| 4,922,536 | 05/01/90 | Hoque | 381/2 |
| 4,797,589 | 01/10/89 | Collins | 370/63 |
| 4,716,575 | 12/29/87 | Douros et al. | 375/3 |
| 4,701,907 | 10/20/87 | Collins | 370/63 |
| 4,293,948 | 10/06/81 | Soderblom | 370/90 |
| 4,270,203 | 05/26/81 | Collins et al. | 370/102 |
| 4,135,057 | 01/16/79 | Bayless, Sr. et al. | 178/67 |
| 3,992,580 | 11/16/76 | Bittel et al. | 178/69.5 R |
| 3,781,815 | 12/25/73 | Boudreau et al. | 340/172.5 |
| 3,681,759 | 08/01/72 | Hill, III | 340/172.5 |
| 3,597,549 | 08/03/71 | Farmer et al. | 179/15 AL |

OTHER PUBLICATIONS, please add the following references:
-- C&C Electronics, *C&C Newsflash*, Issue 1, March 1995, 2 pages.

C&C Electronics, *C&C Newsflash*, Issue 2, June 1995, 2 pages.

C&C Electronics, *C&C Newsflash*, Issue 3, October 1995, 2 pages.

Thompson et al., "Presto: A High-Performance Transport for Digital Audio, Video, Control, and Synchronization," *Journal of the Audio Engineering Society*, Preprint, 103rd Convention of the Audio Engineering Society, September 1997, 12 pages.

C&C Electronics, *OCC8001 'Conan' Optical Transceiver*, Product Specifications, July 1996, 63 pages.

The Home Phoneline Networking Alliance, "Simple, High-Speed Ethernet Technology for the Home," A White Paper, June 1998, 11 pages.

UNITED STATES PATENT AND TRADEMARK OFFICE
CERTIFICATE OF CORRECTION

PATENT NO. : 6,611,537 B1
DATED : August 26, 2003
INVENTOR(S) : Glen T. Edens et al.

It is certified that error appears in the above-identified patent and that said Letters Patent is hereby corrected as shown below:

<u>Title page (cont'd)</u>,
The HAVi Specification, "Specification of the Home Audio/Video Interoperability (HAVi) Architecture," Product Specification, November 1998, 384 pages. --

Signed and Sealed this

Sixth Day of April, 2004

JON W. DUDAS
*Acting Director of the United States Patent and Trademark Office*